US005906016A

United States Patent [19]

Ferrand et al.

[11] Patent Number: 5,906,016

[45] Date of Patent: May 25, 1999

[54] PATIENT CARE SYSTEM

[75] Inventors: Robert J. Ferrand, Burlingame; Marc M. Thomas, Portola Valley; Lincoln J. Alvord, Redwood City; Stephen D. Smith, San Francisco; Steven N. Roe, Los Altos; Richard W. O'Connor, Palo Alto; William A. Gilmartin, Los Altos Hills; William Loh, San Ramon; William R. Fish, San Jose; Jonathan Salsado, Sunnyvale; Charles W. Neder, Mountain View; William Silva, Fremont; Wesley E. Grass, Atherton, all of Calif.

[73] Assignee: Hill-Rom, Batesville, Ind.

[21] Appl. No.: 08/831,319

[22] Filed: Apr. 1, 1997

Related U.S. Application Data

[60] Division of application No. 08/162,514, Dec. 3, 1993, Pat. No. 5,802,640, which is a continuation-in-part of application No. 07/864,881, Apr. 3, 1992, Pat. No. 5,279,010, which is a continuation-in-part of application No. 07/641,697, Jan. 16, 1991, Pat. No. 5,138,729, which is a division of application No. 07/511,842, Apr. 20, 1990, Pat. No. 5,023,967, which is a continuation of application No. 07/172,264, Mar. 23, 1988, abandoned.

[51] Int. Cl.[6] .............................. A61G 7/05; G01G 19/52

[52] U.S. Cl. .............................................. 5/600; 177/144

[58] Field of Search ................................ 5/600; 177/144

[56] References Cited

U.S. PATENT DOCUMENTS

| | | | |
|---|---|---|---|
| 4,015,677 | 4/1977 | Silva et al. | 177/144 |
| 4,669,136 | 6/1987 | Waters et al. | 5/185 X |
| 4,793,428 | 12/1988 | Swersey | 5/611 X |
| 4,926,951 | 5/1990 | Carruth et al. | 177/144 X |
| 4,934,468 | 6/1990 | Koerber, Sr. et al. | 177/144 |
| 4,953,244 | 9/1990 | Koerber, Sr. et al. | 5/600 |
| 5,269,388 | 12/1993 | Reichow et al. | 5/600 X |
| 5,276,432 | 1/1994 | Travis | 340/573 |

*Primary Examiner*—Michael F. Trettel
*Attorney, Agent, or Firm*—Arnold White & Durkee

[57] ABSTRACT

A patient care bed with a patient weighing system having a first frame having a series of support units attached at designated locations and a second frame supported by the support units. The support units each having a load cell which senses a part of the weight supported by a second frame.

22 Claims, 92 Drawing Sheets

PATIENT CARE SYSTEM

CROSS-REFRENCES TO RELATED APPLCATIONS

The present application is a divisional of patent application Ser. No. 08/162,514 filed Dec. 3, 1993, issued as U.S. Pat. No. 5,802,640 which is a continuation-in-part of U.S. patent application Ser. No. 07/864,881 filed on Apr. 3, 1992, issued as U.S. Pat. No. 5,279,010, which application was a continuation-in-part of U.S. patent application Ser. No. 07/641,697 filed on Jan. 16, 1991, issued as U.S. Pat. No. 5,138,729, which application is a divisional application of U.S. patent application Ser. No. 07/511,842 filed on Apr. 20, 1990, issued as U.S. Pat. No. 5,023,967, which application is a continuation of U.S. patent application Ser. No. 07/172,264 filed Mar. 23, 1988, now abandoned.

FIELD OF THE INVENTION

This invention relates generally to beds, and more particularly, to a bed and associated features facilitating care of a patient supported on the bed.

CONTENTS

The Background of the Invention, Summary of the Invention, and Detailed Description of the Preferred Embodiments sections have the following section headings.

1. Pneumatic System
2. Footboard Gate
3. Stand-Up Board
4. Headboard
5. Weight-Sensing System
6. Control Unit
7. Transport Guide Wheels
8. Guard Rail Elevation System
9. Swing Arm Extension Brace
10. Platform Joint
11. Hydraulic Valve
12. Platform Support
13. Multifunction Control

BACKGROUND OF THE INVENTION

Hospital bed designs have recently been undergoing a transformation. Early beds were very basic devices providing limited patient support and care features. More recently, bed designs have been taking advantage of technological developments to provide improvements in bed articulation, mattress inflation, patient access, convenience and control. The following patents illustrate some of the designs that are currently known.

1. Pneumatic System

Valves are an integral part of a mattress inflation system. Recently, valves have been designed in which a metal alloy that changes shape in response to a change in temperature is used as the valve actuator. In U.S. Pat. No. (USPN) 3,540,479 issued to Thompson for a "Heat Rotor and Valve", a valve using a heat-expanding rod to open a biased-closed valve seat is disclosed. Willson et al. in U.S. Pat. No. 3,613,732 entitled "Temperature-Responsive Valve Operators", discloses various valve configurations utilizing temperature-responsive operators made with a shape-memory alloy such as a nickel and titanium alloy. The disclosed configurations include single and double poppet designs, as well as coaxial, single poppet designs.

U.S. Pat. No. 4,130,265 issued to Sakakibara et al. for "Electrically Operated Switching Valve" discloses the use of a warped plate controlled by a heat-activated element for selectively valving opposing ports relative to an intermediate port. Suzuki, in U.S. Pat. No. 4,736,587 entitled "Shape-Memory Electromechanical Drive" discloses the use of two shape-memory springs to move a slide member to couple alternate outer ports with a central-port.

A valve member that alternately opens and closes by heat-generating electrical current acting on a spring-biased linear alloy element is disclosed in U.S. Pat. No. 4,973,024 issued to Homma for "Valve Driven By Shape Memory Alloy". Hori, in Japanese Pat. No. JP61-17789 entitled "Valve Device", discloses a valve-opening device activated by a shape-memory alloy spring. The valve is held closed by a coaxial bias spring.

These valve assemblies provide for effective valving, but there remains a need for a valve assembly that is able to inversely vary the flow of air or other fluid through respective inlet and outlet ports, and to independently control the flow of air through input and output ports, and that is self-contained for convenient installation and removal from a fluid-chamber housing.

Inflatable mattress cushions or cells are often connected to a support surface of a base platform or frame. This connection may be provided by a connector having an inner channel or passageway, that attaches the cell to a port extending through the support surface. Further, it is known to connect two cells together with a passageway formed in the connection to allow air to flow between the connected cells. An example of such an arrangement is disclosed by Pertchik in U.S. Pat. No. 4,255,824 for "Cushion for Decubitus Ulcers". Pertchik discloses a seat cushion formed of a plurality of elongate cells that are connected at contact points to provide inflation of all the cells from a single inlet.

Hunt et al., in U.S. Pat. No. 4,525,885 entitled "Support Appliance for Mounting on a Standard Hospital Bed", discloses male and female parts of a connector assembly for connecting mattress cells to a mattress base inlet or outlet. Another form of connector for a mattress cell is shown in FIG. 6 of U.S. Pat. No. 4,949,413 issued to Goodwin for "Low Air Loss Bed".

Hunt et al., in U.S. Pat. No. 4,935,968 entitled "Patient Support Appliances" also discloses a connector of an air tube to a housing (FIG. 4). This is a quick release connection to allow rapid deflation for cardiac arrest procedures. In U.S. Pat. No. 4,949,414 entitled "Modular Low Air Loss Patient Support System and Methods for Automatic Patient Turning and Pressure Point Relief", Thomas et al. also disclose in FIGS. 5 and 6 a connector for connecting a mattress cell to the platform.

These connectors are constructed to be usable in a specific application, but do not permit use in various connections. For instance, there remains the need for fluid-transmitting connectors that are usable for coupling a cell to a support platform and for coupling cells together, with the integrity of the base cell remaining when a satellite cell is disconnected. Further, there is a need for a connector that can accommodate a reducer for connecting a tube to a cell.

When used on an articulating bed, the fluid supply and exhaust systems used for inflating and deflating mattress cells must either be formed integrally as part of the bed platform, or must be provided by external hoses or ducts. These arrangements result in bending and wear of connecting hoses, and exposure of external tubes to wear and contact by other moving parts.

The present invention makes use of expandable passageways, similar to bellows, for coupling manifolds supported on adjoining, articulating panels. Bellows-like support cells are known to be used in hospital beds. For instance, Hunt et al., in U.S. Pat. No. 4,099,276 entitled "Support Appliances Having Articulated Sections" shows the use of inflatable bellows to raise and lower the head end of a bed platform Similar structures are also shown in patent '885 issued to Hunt et al., identified previously. A bellows-type mattress cell is disclosed by Sato in U.S. Pat. No. 4,542,547 entitled "Pneumatic Mat with Sensing Means".

There thus remains the need for a flexible passageway structure that can connect air passageways of adjoining bed panels, that conforms with the panel structures is reliable, and expands and contracts in response to movement of the adjoining panels.

There also is a need for a simple efficient structure for conveying pressurized and exhaust fluids to mattress cells, and along articulated panels. As was mentioned, flexible tubes are usually used to connect mattress cells to an air supply and exhaust port. For example, Hunt et al., in patent '885, and Goodwin, in patent '413, disclose the use of a flexible tube serving each mattress section. Goodwin shows them as being external to the bed platform, while Hunt et al. show them to be within the platform. Also, Evans, in U.S. Pat. No. 4,864,671 entitled "Controllably Inflatable Cushion", discloses individual cushions inflated in groups or zones with supply lines and exhaust lines serving each zone being controlled by a three way valve.

U.S. Pat. No. 4,945,590 issued to Ogura for "Valve for Fluid Mat and Apparatus for Controlling an Attitude Assumed by Fluid Mat", discloses air mattress supply ducts that are positioned between relative positive and negative pressure air chambers. Separate solenoid valves connect each air supply duct with each of the air chambers.

Harkleroad et al. discloses, in U.S. Pat. No. 4,993,920 entitled "Air Mattress Pumping and Venting System", a pressure control system in which sensors control a venting valve and a pump for maintaining the mattress pressure between predetermined high and low values. The use of a valve having a rotatable disk for alternately connecting air supply and discharge pipes to two mattress sections is shown in U.S. Pat. No. 5,035,016 issued to Mori et al. for an "Air-Mat Apparatus".

With the development of elaborate inflatable mattresses and articulating support platforms, it became difficult to take immediate action when a patient needed CPR or other procedures to treat a life-threatening condition. Various means have been developed to make the bed become a hard, flat surface to facilitate, rather than impair these procedures.

For instance, in British Patent No. GB 2 141 333 entitled "Low Air Loss Support Appliance", Hunt et al. disclose in FIG. 2 and on page 2, lines 67–74, a quick release manifold that allows deflation from all ports.

In patent '968, Hunt et al. disclose an air distribution chamber for supplying air to mattress cells. An exhaust plate on the chamber is manually moved to open an exhaust hole for rapidly deflating the mattress. An air pump must be separately turned off, but a switch activated by the handle to the exhaust plate transmits a signal to open the exhaust valves used on the head & foot articulating bellows. FIG. 12 of patent '414 issued to Thomas et al. discloses the use of a CPR switch connected to a circuit board.

Various forms of cushions and mattresses have been designed in order to provide inproved support for a patient. Viesturs et al, in U.S. Pat. No. 4,534,078 entitled "Body Supporting Mattress", disclose an elongate inner cell supported on a pad having a peripheral inflated tube. Generally U-shaped cells that alternate and are offset for use in turning a patient are disclosed in U.S. Pat. No. 5,003,654 issued to Vrzalik for a "Method and Apparatus for Alternating Pressure of a Low Air Loss Patient Support System". In U.S. Pat. No. 4,768,249 entitled "Patient Support Structure", Goodwin discloses a more conventional low air loss mattress formed of upright cells extending across the width of the bed.

Such mattresses as shown by Goodwin and Vrzalik are prone to bend or lean into an adjoining cell location when the adjoining cell is deflated. This tends to reduce the effectiveness of controlling the support pressure and location which is necessary in the avoidance and treatment of bed sores, and also in the articulation of the bed.

It is also known to provide mattresses that have multiple layers. Grant in U.S. Pat. No. 3,674,019 entitled "Dual Layer Cellular Inflatable Pad", describes a pad formed of offset layers of interdigitated inflatable sections Welch, in U.S. Pat. No. 4,193,149 entitled "Beds and Mattresses", discloses a similar mattress, except the layer cells are aligned and separated by a preformed foam. Such mattresses assure resilient support for a patient, but provide limited control of support by adjacent cells.

Various cushions are also known for restraining a person. An elaborate example is disclosed by Boyce in U.S. Pat. No. 3,218,103 entitled "Pneumatic Restraint System". This patent discloses a chair having inflatable bands shiftable in position for selectively restraining a person. A restraining device that is releasably attached to a support platform for placement across the body of an infant is disclosed in U.S. Pat. No. 4,205,669 issued to Hamann for "Diaper-Changing Aid".

There thus remains a need for a means for restraining persons on a bed. In particular, it is desirable to have lateral cushions that conform to the sides of a patient, and selectively inflatable cushions that are positionable over a patient for keeping the patient in the bed.

The pneumatic system of a conventional hospital bed typically includes a single pressurized air source with valves and ducts or other conduits providing distribution to the cushions in a mattress. Examples of such systems are provided in U.S. Patents having numbers 4,799,276 4,949, 413, 4,993,920 and 5,044,029. A review of these patents shows the extent that people have gone in controlling air flow from a single source. The air flow is divided and distributed to cushions supported on several relatively articulatable panels. There typically are elaborate valves to control the amount of air flow and extensive flexible conduits and/or plenums to distribute the allocated air to each set of cushions. The air distribution system described herein with reference to FIG. 2 is an example of a more simplified air distribution scheme, but even it imposes significant structural requirements on the bed panels to form the air flow paths.

The manner in which the cushions are attached to or supported on the platform panels may also be involved. For instance U.S. Patents having numbers 3,879,776 and 3,909, 858 illustrate elaborate structures for attaching inflatable cushions to a bed platform for anchoring the cushions and providing an air passageway for inflating them.

There thus is a need for a pneumatic system that is simple in structure, readily serviced, and provides pressure control to individual sets of cushions supported on relatively articulatable panels.

2. Footboard Gate

In most any patient care environment in which the patient is bedridden, it is desirable, and often necessary to provide support for equipment, documents, and other materials. Where it is sufficient to use a shelf or horizontal platform for this, a movable tray on a stand separate from the bed is often utilized. In order to limit the amount of accessories around the bed or to provide a convenient table in the vicinity of the bed, various schemes have been developed.

Slivoski, in U.S. Pat. No. 3,327,328 entitled "Mattress Extension", discloses a bed having a foot-end kick board that swings upward to form a platform. In U.S. Pat. No. 3,344,445 entitled "Side Panel Construction for Stretcher-Beds", Crawford discloses a side guard panel that converts into a platform.

A board extending across an intermediate portion of a bed is disclosed by Donald in U.S. Pat. No. 535,945 entitled "Detachable Foot Rest and Table for Beds". The board is positionable as a table, and may be pivoted down to act as footboard for a person sitting in bed or extended beyond the foot of the bed for storage. A somewhat similar concept is disclosed in U.S. Pat. No. 4,724,555 issued to Poehner et al. for a "Hospital Bed Footboard". This footboard pulls out and pivots up to form a horizontal table. An alternative embodiment simply swings up to a horizontal, over-floor position and can slide partially over the foot of the bed.

3. Stand-Up Board

The extended articulation capabilities of some beds includes the ability to raise the head of the bed, and correspondingly lower the foot of the bed until the bed is sufficiently inclined to allow the patient to exit the bed from a standing position. In order to accommodate this, it is necessary for the bed to have a footboard that is strong enough to hold the weight of the patient and yet small enough that it will allow the mattress to be lowered near the floor.

A bed developed by England and described in U.S. Pat. No. 3,997,926 entitled "Bed with Automatic Tilting Occupant Support", is positionable in a stand-up position. A foot rest is shiftable between an inoperative position spaced from the end of the bed to an operative position adjacent to the end of the bed when the bed is inclined. The foot rest is disposed at an obtuse angled relative to the platform.

This footboard has limited capabilities and is always a part of the bed platform. Considering the infrequency that beds are used to raise a patient to a standing position, it is desirable to have a footboard that is adjustable, can serve different functions, and can be removed if desired.

4. Headboard

When CPR or other emergency procedures are performed on a patient the attending personnel desire to be as close as possible to the patient. Surgical tables, for instance, are built without any form of side barriers. Beds, however, are normally used to support a patient when such procedures are not being performed, and therefore have restraining elements, such as side rails, headboards and footboards. It is conventional to provide a side rail that collapses below the level of the mattress to facilitate care by a nurse, doctor or other attendant. The number of attendants that can reasonably access a patient is limited to the nunber that can conveniently stand along the sides of a bed. There is thus a need for providing increased access to a patient supported in a bed.

Also, for some forms of equipment, tables or trays are not adequate. For instance, intravenous (IV) equipment typically must be suspended above a patient to allow gravity to convey a fluid from a container to an intravenous needle. Also, traction devices must have an anchor connected to the bed frame. These requirements have led to other support configurations.

In an article entitled "Problems of Patient Support: The Air Fluidised Bed as a Solution", pp. 269–275 Hargest discloses in FIGS. 1 and 2 conventional traction and equipment-supporting apparatus. Peck et al., in U.S. Pat. No. 3,063,066 entitled "Sidegate for Beds", discloses an extension rod mounted to a corner post cap for supporting equipment.

The use of telescoping posts or members in beds are well established. U.S. Pat. No. 3,081,463 issued to Williams et al. for "Motor Operated Hospital Bed" discloses telescoping corner posts supporting end panels. A cable system provides motorized activation. Similarly, U.S. Pat. No. 3,220,020 issued to Nelson for an "Adjustable Height Bed", discloses a bed with leg posts having a spring-biased telescoping outer sleeve that raises and lowers with the bed platform. Hillenbrand et al., in U.S. Pat. No. 3,237,212 entitled "Retractable Bed", also discloses a bed with leg posts having spring-biased telescoping outer sleeves that raise and lower the bed platform.

U.S. Pat. No. 3,742,527 was issued to Johnston et al. for a "Hospital Bed" having hydraulically driven telescoping corner legs and a guard rail with manually telescoping support legs. In U.S. Pat. No. 4,686,727 entitled "Convenience Bar Assembly for Hospital Bed", Wilkinson discloses a vertical bar and cross member for supporting various controls and patient equipment.

The equipment supports thus known in the art are either disposed on the bed in usable position, where they get in the way of the patient and nurses when not used, or they must be removed and stored, and thus may not be readily available when needed.

5. Weight-Sensing System

One of the advantages of the newer technologies has been the ability to monitor the patient while in the bed. An example of this is a system in which the weight of the patient is monitored while on the bed. The weight of the bed itself is compensated for in order to derive the patient's weight.

One such system is used in a bed made by Kinetic Concepts, Inc. of San Antonio, Tex. That bed has a display for showing the patient weight and change in weight.

The conventional structure providing this capability is the use of a stress gauge at each of four corners of the bed. Examples of this structure are disclosed in U.S. Pat. No. 4,669,136 issued to Waters et al. for "Combination Hospital Bed and Surgical Table" (col. 5 lines 13–25 col. 7, lines 58–60); and U.S. Pat. No. 4,926,951 issued to Carruth et al. for "Weigh Bed". This latter patent discloses a weigh system in which a load cell at each of four corners is supported on a base frame using a ball to transmit the vertical weight without creating any lateral torque. Horizontal position is maintained by three tie rods connecting the weigh frame to the base frame to prevent twisting of the weigh frame for certain patient or bed orientations.

One problem with such systems is that warp inevitable exists in either or both the bed frame or the base frame. This warping results in inconsistencies in the stress on the stress gauges, and therefor produces inherent inaccuracies or complexities that must be compensated for in some other way.

Not only is it useful to measure the weight of a patient without requiring the patient to leave the bed, it is also desirable to monitor the movement of a patient on the bed. Fleck et al., in U.S. Pat. No. 4,539,560 entitled "Bed Departure Detection System", discloses the use of tape switch detectors in a mattress to detect a person's departure from a bed. Restlessness of a person in the bed can be detected through the use of two or three tape switches.

Peck et al. devised a system for sensing the departure of a patient from the bed of the invention by a decrease in pressure in a lower bladder, as is disclosed in U.S. Pat. No. 4,803,744 entitled "Inflatable Bed".

6. Control Unit

As the complexity of beds and patient care systems increase, the complexity of control of the patient support system also increases. The control of some features, such as bed configuration, are made available to the patient, and control of other features, such as mattress pressure, air flow and temperature, are made available only to the attending personnel. Various control designs have been developed to accommodate these two control needs.

An air suspension bed identified by the proprietary name TheraPulse™ of Kinetic Concepts, Inc. of San Antonio, Tex., includes a hand-held bed controller provided with a hook for hanging the controller on a side rail. The bed also has controls extending from the face of the footboard for use by attendants. Pauna discloses a control panel mounted on a guard rail in U.S. Pat. No. 4,821,348 entitled "Convertible Bed and Bathroom Combination".

In U.S.P Pat. No. 3,839,753 entitled "Hospital Bed", Benoit et al. disclose a nurse control panel located in the footboard and covered by a panel cover. These controls are in addition to patient controls. Drew et al. disclose various control units built into guard rails in U.S. Pat. No. 4,183,015 entitled "Side Guard for Bed Including Means for Controlling Remote Electrical Devices". This patent also mentions that removal, interchange, and replacement of the various controls is possible since the various controls are modular components. The controls may be easily replaced if service is required, or moved from one side to the other depending on the physical affliction of the patient. In patent '654, Vrzalik also discloses a control unit attached to the bottom of the footboard and control switches mounted in the footboard.

Except for the pendant control unit of Kinetics Concepts, such control units are mounted in fixed positions. The pendant control unit requires two hands to use, and is limited to controls made available to the patient. There thus remains the need for a controller that provides both attendant as well as patient controls that is variable in position and even capable of being hand held or removable in order to clear the patient area of the bed.

7. Transport Guide Wheels

One of the concerns with the newer, more elaborate beds is the strength and agility attendants need to maneuver them to different locations within a hospital. Typically, beds are provided with a wheel at each corner, with each wheel being free to turn about a vertical axis. This wheel arrangement is convenient for adjusting the orientation of a bed within a room, but makes turning corners and traveling along a straight line, such as when moving down a hallway, difficult.

Paramedic gurneys exist that have a fifth, center wheel that is fixed in alignment with the length of the gurney and is slightly below the plane of the four corner wheels. This assures that the fifth wheel is always in contact with the floor. However, the resulting rocking effect when weight is shifted from one end to the other is particularly undesirable in a permanent bed.

There is thus a need for a wheel system for hospital beds that allows maneuverability and yet assists in the movement of the bed significant distances.

8. Guard Rail Elevation System

As has been mentioned, beds typically have guard rails that can be fixed in a position above the mattress level, in order to keep patients from inadvertently exiting the bed. During times of attendance it is desirable to remove the guard rail from its position. This is typically accommodated by making the guard rail removable, or more commonly, adjustable so that it can be pivoted or otherwise lowered below the level of the mattress.

One way that guard rails are lowered is by the use of telescoping support members, such as is described in U.S. Pat. No. 4,439,880 issued to Koncelik et al. for "Geriatric Bed Construction with Sideguards".

Cable and pulley systems are also used in various movable bed mechanisms in order to facilitate movement of a portion of the bed. For instance Williams et al. disclose a cable-activated telescoping end panel in patent '463. Hunt et al., in patent '276, disclose the use of a cable and spring to operate a valve controlled by rotation of a pulley around which the cable is wound.

As is described in U.S. Pat. No. 4,747,171 entitled "Hospital Bed Rail Assembly", Einsele et al. developed a rail that pivots sideways to a lower position. It includes a spring, a cable and a cam link to resist gravity when lowered and raised.

There remains the need for a heavy duty side guard that raises and lowers in place, and is easy to operate with one hand.

9. Swing Arm Extension Brace

Hydraulic operation provides a readily controlled way to move articulating bed members. For example, Morrison developed a hydraulic ram for moving a pin resting on the edges of travel slots, as is shown in U.S. Pat. No. 3,462,772 entitled "Center-Pivoting Bed". This structure is confined to movement in the slots. Where a hydraulic arm is free to pivot it can experience a large bending moment when extended horizontally. It is therefore desirable to take advantage of the controllability of hydraulic arm movement while minimizing the size of the arm necessary to support a leveraged weight that can exist on the arm.

10. Platform Joint

Healthy people typically spend approximately one third of their time sleeping. People of what may be considered less than optimum health spend even greater amounts of time reclining. Beds of various forms have been developed in order to provide comfort to the user. This is particularly true of patients in hospitals and health care facilities, as well as those in homes who for various reasons, are bed ridden.

Once one is in bed for extended periods of time in a situation or condition that does not allow movement in order to maintain comfort, complications, such as bed or pressure sores may develop. One way that this condition has been alleviated is to build beds having support surfaces that can be moved into various orientations and configurations. Representative examples of such beds are disclosed in U.S. Pat. Nos. 3,081,463 issued to Williams et al.; 4,038,709 issued to Kerwit; 4,099,276 issued to Hunt et al.; 4,371,996 issued to Nahum; 4,745,647 issued to Goodwin; 4,935,968 issued to Hunt et al.; and 5,023,967 issued to Ferrand; and French Pat. No. 87 16722 issued to Pupovic.

Each of these patents disclose beds having platforms formed of a set of panels that pivot for assuming configurations corresponding to various positions of a person's legs and torso. Each of these provide a back panel that supports a person's torso and a seat portion that supports the person's hips or hips and thighs.

These panels are typically hinged together or caused to pivot about a fixed joint corresponding to the hip joint. It has been observed that the surface length of the buttocks increases when a person moves from a flat reclining position to a sitting position. Fixed joints do not allow for this variation in body surface length, thereby requiring the reclining person to adjust her or his body to accommodate it. If the person is immobile, such accommodation is not possible. There therefore remains a need for a bed interpanel joint that is not fixed, but rather compensates for changes in the body surface during bending.

11. Hydraulic Valve

Many different forms of hydraulic valves exist for controlling fluid flow and fluid pressure. These valves typically involve a gate or plunger that closes an opening or other fluid passageway when in a closed position, and rapidly opens to relatively full flow conditions. There is thus very little intermediate control of the fluid flow.

In order to control fluid flow rate over a range of positions of adjustment, proportionally adjustable hydraulic valves have been developed. These valves provide for continuous variation of a fluid opening over a range of adjustment positions. Although the change in opening varies proportionally with adjustment position, the relationship between the two is very complex, with control determined typically by measurements of the fluid flow or the effect of the fluid flow, independent of adjustment position.

Articulating beds, and in particular hospital beds may use a hydraulic system to control movement of a support surface, such as a bed platform or hinging panels forming the platform, relative to a base supported on a floor. The platform may be moved as a unit, or the panels may move relative to each other. In such a bed, it is desirable to vary the speed of articulation of the support surface. For instance, it is desirable to raise the head panel slower than it is lowered. If the bed is capable of standing up a patient, it is desirable to use different stand up speeds for patients with different conditions.

It is useful to tilt a bed from side to side. For patients with pulmonary complications, tilting the bed from side to side slowly for long periods of time helps them breathe. However, if a bed needs to be tilted to position a patient for transfer to a stretcher, the bed must be tilted more quickly. Also for emergency applications, such as CPR or Trendelenburg, it is desirable to get the bed in a particular configuration very quickly. Since the bed could be in any allowable configuration at the time of the emergency request, the cylinders must all move at one speed for normal uses and another speed for emergency use.

It is seen that speed control over a wide range is desirable. Conventional valves typically of the spool type and have a wide dynamic range of operation. The portion of the range applicable to articulation speeds for beds is a small portion of that range. These valves also have flow rates that vary relative to valve shaft position according to complex equations. As a result they are themselves expensive and also require expensive systems to control them.

There thus is a need for an hydraulic articulating system that provides control within a limited range that is economical, and is controllable simply.

12. Platform Support

Various apparatus have been developed for supporting a bed platform. Current designs provide for changing the elevation and attitude of the platform relative to the base frame. Conventional systems use linear drives on parallel linkages or one or more hydraulic cylinders positioned to change the pitch and roll of the bed relative to a central universal joint.

A simplified platform support system was developed by Ferrand, as disclosed in U.S. Pat. No. 5,023,967, that involves a triangulation support system providing full platform articulation using three platform supports. The patent discloses the use of a universal joint mounted to the platform and supported on two opposing hydraulic arms. A pair of laterally opposing side arms are spaced from the universal joint. Coordinated adjustment in the lengths of the various hydraulic arms adjusts the three basic forms of platform orientation: pitch, roll and elevation.

Although providing a simple and effective system for articulating a platform, the three-axis support system as disclosed by Ferrand requires the use of two heavy-duty base hydraulic rams for supporting the universal joint. A compact universal joint, as disclosed, results in a mechanically weak point when the forces of an articulating bed platform are applied to it. By attaching the upper ends of both base rams to the universal joint, the available range of motion of the platform is equal to the adjustable length of the rams. Further, by mounting the two side arms to the base frame or to the base of the adjacent base ram, elevation changes in the bed are further limited by the length of throw of the two side arms. The attachment of the universal joint and the side legs to different, relatively hingeable panels also requires the use of a control system that must account for changes in orientation between the associated panels. There thus is a need for a three-axis support system that is more economical to produce and easier to use.

13. Multifunction Control System

As beds become more sophisticated with an increasing variety of different features, the use of the various features becomes more complicated and it becomes increasingly difficult to coordinate the various features and keep track of the state each feature is in at a given time. Such coordination becomes increasingly important when the bed is used to support a patient in a critical condition.

Beds presently exist which allow an attendant to lockout the control of bed movement by the patient in order to assure that the bed is maintained in a selected support configuration. An example is where the patient is held in traction and the orientation and firmness of the mattress must stay the same. Also, if the bed has an equipment-support table that extends over the mattress certain movements of the mattress could upset the table. As yet another example, it would be unsafe to tilt the mattress sideways if one or more of the "downhill" guardrails is not in an upright position. There is therefore a need for a bed having controls that assist in the coordination of various features of the bed to assure proper patient treatment and safety.

SUMMARY OF THE INVENTION

The various features of the present invention satisfy these heretofore unrealized needs.

1. Pneumatic System

For example, in one aspect of the invention, a valve for controlling fluid flow comprises a first valve assembly having a first valve seat and a first valve member movable relative to the first valve seat. A second valve assembly has a second valve seat and a second valve member movable relative to the second valve seat. The first and second valve assemblies are structured for varying the fluid flow through each valve seat in proportion to the relative position of the respective valve member to the valve seat. An actuator is coupled to the first and second valve assemblies for moving the first valve member in a first direction relative to the first valve seat while concurrently moving the second valve member in a second direction relative to the second valve seat. The movement in the first and second directions produces increasing restriction to fluid flow in one of the valve seats and decreasing restriction to fluid flow in the other of the valve seats. Precise control of the fluid flow through the two valve seats is thereby achieved.

The present invention also provides various valve assemblies and air distribution paths for effectively and controllably inflating cells of an air mattress. For instance, in one air distribution system made according to the invention for a bed having an inflatable mattress formed of individual inflatable cells, a housing defines a first chamber in communication with a source of pressurized fluid and a second chamber in communication with an inflatable cell. A first fluid-flow port provides fluid communication between the first and second chambers, and a second fluid-flow port spaced from and in opposing relationship with the first fluid-flow port exhausts fluid from the first chamber. A first valve member is movable relative to the first fluid port for controlling fluid flow between the first and second chambers. A second valve member is fixed relative to the first valve member and movable relative to the second fluid port for controlling fluid flow out of the second chamber. An actuator is coupled to the first and second valve assemblies for moving the first and second valve members between the first and second fluid ports.

The present invention also provides a method of controlling the pressure in an inflatable cell of a mattress. This method includes the steps of providing communication between a positive pressure source and the inflatable cell through an inlet fluid-flow port, and providing communication between a negative pressure destination and the inflatable cell through an outlet fluid-flow port. The amount of fluid passing through the second fluid flow port is then varied.

In yet another aspect of the invention, a valve assembly is provided for controlling the pressure of a fluid in a control chamber. The assembly comprises a source of fluid of at least a first pressure, and a destination of fluid at a second pressure less than the first pressure. A housing has a first valve seat defining a first fluid flow port providing communication between the fluid source and the control chamber. A second valve seat is spaced from the first valve seat and defines a second fluid flow port providing communication between the control chamber and the fluid destination. A first valve member is movable relative to the first valve seat for varying the fluid flow from the fluid source through the first fluid port to the control chamber. A second valve member is movable relative to the second valve seat for varying the fluid flow from the control chamber through the second fluid port to the fluid destination. A first actuator is responsive to a first control signal and is coupled to the first valve member for moving the first valve member relative to the first valve seat. A second actuator is responsive to a second control signal and is coupled to the second valve member for moving the second valve member relative to the second valve seat. The first and second actuators are independently controllable for controlling, in combination, the fluid pressure in the control chamber.

In yet another feature of the present invention, a valve assembly is provided comprising a housing having a first wall and a replaceable valve cartridge. The valve cartridge includes a first fluid-flow element defining a fluid-flow path, a valve seat in fluid communication with the first fluid-flow path, and a valve member movable along a valve axis relative to and sealingly engageable with the valve seat for restricting fluid flow through the valve seat. One of the valve seat and valve member is fixed relative to the first fluid-flow element, and the valve member is manually engageable for securing and removing the valve cartridge relative to the first wall. The valve cartridge also includes apparatus for controlling movement of the valve member relative to the valve seat. A means is provided for attaching, preferably manually, the first fluid-flow element to the first wall by applying force on the first fluid-flow element along the valve axis.

Another valve assembly made according to the invention also includes a housing having a first wall and a replaceable valve cartridge. The cartridge includes a first fluid-flow element defining a fluid-flow path, a valve seat in fluid communication with the first fluid-flow path, and a valve member movable along a valve axis relative to and sealingly engageable with the valve seat for restricting fluid flow through the valve seat. One of the valve seat and valve member is fixed relative to the first fluid-flow element, and an extension member is fixed relative to the other of the valve seat and valve member and manually engageable for securing and removing the valve cartridge relative to the first wall. The first fluid-flow element and the extension member are structured to transfer force between the extension member and the first fluid-flow element when force is applied to the extension member relative to the first fluid-flow element along the valve axis. The cartridge further includes a mechanism for controlling movement of the valve member relative to the valve seat. A means is also provided for attaching the first fluid-flow element to the first wall by applying force on the extension member along the valve axis relative to the first fluid-flow element.

Another valve assembly according to the invention includes a housing having a first wall, and a second wall having a fluid-flow port spaced from the first wall. A base member is positionable through the fluid-flow port. A means is provided for attaching the base member to the first wall. A valve member is mounted and movable relative to the base member and the second wall for engaging selectively and sealingly the fluid-flow port. A means is also provided that is controllable for moving the valve member relative to the fluid-flow port.

In a different aspect of the invention, a modular connector system is provided for forming a sealed passageway between two air chambers. It includes a receptacle having an inner cavity with first and second open ends, and a lip extending inwardly around the first open end. The lip has an opening. A disk is positioned in the inner cavity of the receptacle adjacent to the first open end and sealingly positionable against the lip for closing the first open end when positioned against the lip. An insert has a main portion with an inner cavity defining an insert passageway with first and second open ends, and a shoulder extending outwardly from adjacent to the first open end. The main portion is sized to be received in the second open end of the receptacle with the second open end of the insert spaced from the lip. The space between the lip and the insert second end define a chamber in which the disk is captured. The disk is movable between a first position against the lip and a second position spaced from the lip.

The disk sealingly engages the lip when the disk Is in the first position. The modular system thus forms a check valve preventing fluid flow through the insert when the disk is in the first position, and allowing fluid to flow through the insert when the disk is in the second position.

The present invention also provides apparatus for inflating cells of a mattress. It includes a first inflatable cell having a wall and a first inlet mounted in the first cell wall for receiving pressurized fluid. An outlet coupling member is mounted to the first cell wall spaced from the first inlet for transmitting pressurized fluid input through the first inlet. A second inflatable cell has an inlet for receiving pressurized fluid for inflating the second cell. A means is provided that is selectively connectable to the outlet coupling member for joining the second cell inlet to the outlet coupling member. Pressurized fluid received in the first inlet is thereby received in the second cell.

In another apparatus for inflating cells of a mattress made according to the invention, a source of pressurized fluid is provided. A panel having at least two openings supports a plurality of inflatable cells. Fluid communication is provided between the source and openings. A first inflatable cell has walls supported on the panel over the openings. A first inlet coupling member is mounted to the first cell wall adjacent to a first of the openings. The first inlet coupling member is selectively securable to the one opening for providing fluid communication between the panel opening and the interior of the first cell wall. A second inlet coupling member is mounted to the first cell wall adjacent to the second opening. The second inlet coupling member is selectively securable to the second opening for providing fluid communication between the panel opening and the interior of the first cell wall.

An outlet coupling member is mounted to the first cell wall spaced from the first and second inlet coupling member. A conduit is disposed within the first cell walls for providing fluid communication between the second inlet coupling member and the outlet coupling member. The first cell is not inflated by pressurized fluid received in the second inlet coupling member. A second inflatable cell has an inlet for receiving pressurized fluid. A third inlet coupling member is in fluid communication with the second cell inlet and selectively connectable to the outlet coupling member for joining the second cell inlet to the outlet coupling member. Pressurized fluid received in the second inlet coupling member is thereby conducted into the second cell.

As another feature of the present invention, an air distribution apparatus comprises a first housing defining a first fluid-flow path. This first housing also has a first fluid-flow port. A second housing is supported for pivoting about a pivot axis relative to the first housing. This second housing defines a second fluid-flow path and has a second fluid-flow port generally facing the first fluid-flow port. A flexible duct joins the first and second openings for communicating the first fluid-flow path with the second fluid-flow path. A guide is supported relative to at least one of the first and second housings and is attached to the duct for maintaining the duct generally in alignment between the first and second openings during relative pivoting of the first and second housings.

An air distribution system according to the invention is for use in a bed having an inflatable mattress with first and second sections. The sections are relatively pivotable about a pivot axis disposed generally between the sections and are formed of individual inflatable cells. The air distribution system includes a first housing defining a first fluid-flow path and having a first fluid-flow port and a second fluid-flow port spaced from the first fluid-flow port. Both the first and second fluid-flow ports are in communication with the first fluid-flow path. The first housing has an upper surface adjacent to the first mattress section.

A second housing associated with the second mattress section defines a second fluid-flow path and has a third fluid-flow port in communication with the second fluid-flow path. The third fluid-flow port generally faces the second fluid-flow port. The second housing has an upper surface adjacent to the second mattress section. A duct Joins the second and third fluid-fluid flow ports for communicating the first fluid-flow path with the second fluid-flow path. A first coupling couples the first fluid-flow path to a cell in the first mattress section, and a second coupling couples the second fluid-flow path to a cell in the second mattress section.

In yet another air distribution system of the invention for use in a bed having an inflatable mattress formed of individual inflatable cells, a housing defines a first fluid-flow path and has a first fluid-flow port in communication with the first fluid-flow path. The housing has an upper wall adjacent to the inflatable cells. The first fluid flow path is adjacent to the upper surface. The housing further defines a second fluid-flow path and has an intermediate wall positioned between the first and second fluid-flow paths. The housing also has a second fluid-flow port in communication with the second fluid-flow path. A coupling couples selectively the first and second fluid-flow paths to a cell.

A patient support system made according to the present invention comprises a platform having a generally planar upward facing support surface and an inflatable mattress. The mattress comprises first and second separately inflatable cells having contiguous faces extending, when inflated, obliquely relative to the support surface, such that the contiguous face of the first cell extends over the contiguous face of the second cell. Securing means secure the first and second cells to the platform, whereby the first cell is partially supported on the second cell when a person is supported on the mattress. Individual cell support thereby results, regardless of the extent of inflation of adjacent cells.

The present invention also provides a relief mechanism for deflating an air mattress. A housing defines a fluid plenum in communication with the air mattress and has an outlet port. A valve member is mounted pivotably relative to the housing for pivoting about a pivot axis between a normal position in which the valve member sealingly closes the outlet port, and a release position in which the valve member is spaced from the outlet port. This allows fluid in the plenum to flow through the outlet port. A first securing means secures the valve member in the normal position. A second securing means secures the valve member in the release position. A simple, yet to effective means is thereby provided for rapidly deflating the air mattress.

In yet another aspect of the invention, a bed having a distributed-source pneumatic system for inflating a mattress is provided. More specifically, the present invention provides a bed comprising a platform with an upper surface and a mattress supported on the platform upper surface for supporting a person. The mattress includes a plurality of sets of separately inflatable cells or cushions distributed along the upper surface, with each of the cushions having an inlet. A plurality of sets of means for producing a flow of air, such as fans, are mounted relative to the platform. Ducts couple one set of fans to a corresponding set of cushions whereby there is a one-to-one correspondence between the sets of cushions and the sets of fans.

In the preferred form of the invention, the platform has a plurality of relatively articulatable panels. The panels have passageways aligned with the cushion inlets. Cylindrical connectors mounted to the cushions at the inlets extend into the passageways, and have ends with flanges spaced from the cushions. The fan for each set of cushions is mounted under the panel near the cushions to be inflated, and operates at a speed linearly proportional to the level of an applied voltage. The pressure produced by each fan is thus directly proportional to the level of the applied voltage. A controller applies a voltage to each fan corresponding to a target air pressure for the associated set of cushions.

An anchor plate associated with each passageway is slidable relative to the associated panel. Each plate includes an oblong opening-having an enlarged end sized to freely receive the flange end of the associated one of the connectors. The opening further has a cam-shaped anchoring end with a reduced dimension appropriate for engaging the flange when the flange end of a connector extends into it. The connector is anchored by inserting it through the enlarged end of the opening. The plate is then slid to a position in which the cam-shaped anchoring end of the opening is in line with the passageway and the flange is engaged by the cam-shaped shoulder of the plate forming the anchoring end of the opening. This sliding action also draws a rubber seal into engagement between the connector and the plate.

Such a pneumatic system can be seen to be readily serviceable, permitting easy installation and removal of the cushions. Further, the use of separate fans dedicated to the various sets of cushions provides simple operation and structure, and ease of controlling the sets of cushions individually. Further, fans can be provided in series to increase the range of pressures realizable in each set of cushions.

2. Footboard Gate

According to the invention, preferably embodied in a footboard, a collapsible table assembly for a hospital bed includes a frame extending in a generally vertical plane mounted to an end of a bed and having horizontally spaced, generally vertically extending channels. A table is positionable adjacent to the channels and has a guide element extending into each channel. The guide elements are slidable relative to the channels for moving the table between a storage position in which the guide elements are positioned in lower regions of the channels, and a raised position in which the guide elements are positioned at upper regions of the channels.

The table is pivotably coupled tc the guide elements for pivoting the table about a pivot axis extending through the channels when the table is in the raised position. In the raised position, the table pivots between an upright position in which the table is generally vertically disposed and a lowered position in which the table is generally horizontally disposed. A stop limits the pivoting of the table relative to the channels. A convenient, built-in storable table is thereby always available for servicing the needs of a patient.

In yet another aspect of the invention, a gate is provided for a hospital bed, which gate comprises a platform having opposite ends for supporting a patient above a floor, and a board mounted adjacent to one end of the platform. Apparatus is provided for pivoting the board about a generally vertical axis, whereby the board is movable between a first position in which the board is adjacent to the one end of the bed and a second position in which the board is pivoted away from the one end of the bed. Access to the end of the bed is thereby provided. Furthers when a storable table or set of controls is attached to it, the position of such items is variable.

In a more specific aspect of the invention a hospital bed comprises a base frame supported on a floor, and a platform for supporting a patient and having a foot end and opposite sides, each side meeting the foot end at a corresponding corner. The platform is supported on the base frame by apparatus for tilting the platform toward an upright position in which the platform has a generally vertical orientation with the foot end adjacent to the base frame. A first board is mounted to the base frame and extends adjacent to the foot end of the platform. The board pivots about a generally vertical axis positioned adjacent to a first one of the corners. The board is thereby movable between a first position in which the board is adjacent to the foot end of the bed and a second position in which the board is pivoted away from the foot end of the bed. When the board is in the second position and the platform is tilted toward the upright position, the board is positioned for use as a support by a patient in the bed.

3. Stand-Up Board

Another feature of the present invention is usable in a hospital bed having an elongate platform supported above a floor, which platform has a foot end and opposite sides. An inflatable mattress is supported on the platform and has a predetermined thickness, an upper surface, and a foot end on the platform foot end. The invention provides a stand-up board assembly having a stand-up board extending between the sides of the platform and means for mounting the stand-up board on the foot end of the platform adjacent to the mattress. The mounting means is preferably adjustable for varying the angle of the stand-up board relative to the platform.

The invention also provides a stand-up board assembly comprising a stand-up board extending between the sides of the platform, and means for mounting the stand-up board on the foot end of the platform adjacent to the mattress. Further, means are provided for moving the stand-up board from a support position in which the stand-up board extends above the mattress for contact by the feet of a person when the platform is tilted up with the foot end down, and a storage position in which the stand-up board is positioned below the upper surface of the mattress. The stand-up board is thereby readily available for use, but storable below the level of the mattress.

4. Headboard

The present invention also provides a hospital bed with a platform supported relative to the floor, which platform has opposite ends and opposite sides extending between the ends and an upper surface on which a patient is supported above the floor. A base end board is mounted adjacent to and extending generally along the length of one end of the platform. The base end board has a side portion adjacent to each side of the platform, and an intermediate portion between the side portions. The side portions extend above the upper surface of the platform and the intermediate portion is below the level of the side portions. A panel is positionable above the intermediate portion to extend upwardly adjacent to the side portions of the end board. An apparatus supports the panel on the end board. The panel is manually removable from the end board for providing access to the platform, and thereby, to a patient supported by the platform, over the intermediate portion of the end board.

Another hospital bed made according to the invention comprises a platform that has opposite ends and is supportable above a floor for supporting a patient. A board is mounted adjacent to one end of the bed and extends above the level of the platform along the one end of the bed. The board has ends at spaced locations along the one end of the platform and has a predetermined thickness adjacent to at least one end of the board. The one end of the board has an upper surface and an opening in the upper surface. Also, an extendable support bar is mounted in the one end of the board and has an upper end. The bar is extendable between a recessed position in which the upper end is disposed adjacent to the board opening, and a raised position in which the upper end is supported substantially above the board opening, with the bar extending through the board opening. Such an extendable bar is usable for supporting patient equipment and accessories.

More specifically, the present invention also provides a patient equipment support apparatus comprising a base supportable on a floor, and a frame supported on and extending upwardly above the base. An extendable support bar is mounted to the frame and has an upper end. The bar is extendable between a recessed position in which the bar means is disposed adjacent to the frame, and a raised position in which the upper end is supported substantially above the bar. Apparatus for supporting equipment is mounted to the bar. This apparatus is collapsible for storage with the bar in the recessed position. It is extendable outwardly from the bar when the bar is raised sufficiently to position the support apparatus above the frame.

The present invention also includes a release lockout on an equipment support member, such as a traction pole, mounted on an end frame of the bed. It includes apparatus movable relative to the end frame for holding the support member substantially in a fixed position relative to the end frame. A release element is movable for disengaging the holding apparatus for allowing movement of the support member. A lock mechanism is selectively operable for preventing movement of the release element. This thereby prevents inadvertent movement of the support member from the fixed position.

In the preferred embodiment, the release element is a handle conforming with an outer edge of the end frame. The lock mechanism prevents the operation of this handle. Thus, when a patient is held in traction on the bed an attendant will not inadvertently move the handle and release the support member, allowing it to collapse into the end frame.

5. Weight-Sensing System

The present invention also provides a scale having a base frame, a weigh frame overlying the base frame, and means disposed at three substantially horizontal, spaced-apart positions for supporting the weigh frame on the base frame. A load cell mounted on each of the supporting means senses the weight supported by the respective supporting means. The three support points define a plane of support that is relatively insensitive to variations in manufacture of the base and weigh frames.

Extending this concept, the present invention also provides an apparatus for sensing the position of an object. It includes a base frame, a support frame overlying the base frame and having a surface for supporting an object, and means disposed at at least two spaced-apart positions for supporting the support frame on the base frame. A means, such as a load cell, for sensing the weight supported by each supporting means of an object is supported on the support frame surface. Also a processor responsive to the weight supported by each of the supporting means determines the position of the object on the support frame surface.

6. Control Unit

A control unit made according to the invention is mountable on a bar, such as a guard rail, for controlling functions associated with patient care. The unit includes a first housing having a front face. Controls are mounted in the front face of the housing. A web has first and second oppositely disposed margins. The web is attached to the housing along the first margin and relative to the housing along the second margin. There is a sufficient distance between the first and second margins to wrap around the bar with the second margin attached relative to the housing.

Another aspect of a control unit made according to the invention and mountable on a bar for controlling functions associated with patient care comprises a first housing having a front face and a rear face. Controls are mounted in the front face of the housing. A second housing is attached to the second margin of the web and has a front face and a rear face. The first and second housings are attached to a bar with the rear face of the first housing facing the rear face of the second housing. Such a control unit provides conveniently accessibly back-to-back patient and attendant controls.

7. Transport Guide Wheels

Another aspect of the invention is a guide wheel assembly usable in a hospital bed having a frame for supporting a patient above a floor and a plurality of support wheels supporting the frame on the floor. The assembly includes at least one guide wheel, and preferably two, means for mounting the guide wheel for rotation relative to the frame so that the wheel contacts a floor on which the frame is supported, and means coupling the guide wheel to the mounting means for resiliently urging the wheel sufficiently toward the floor for maintaining the wheel in contact with the floor while the other wheels contact the floor. Thus, the benefits of a guide wheel are realized while maintaining support on all the wheels.

In a different guide wheel assembly, means are provided for retracting the guide wheel from a guide position in contact with a floor to a retracted position above the floor. The guide wheel is, or the guide wheels are thereby usable selectively.

8. Guard Rail Elevation System

As yet another aspect of the present invention, a guard rail assembly is provided for a hospital bed having a platform for supporting a patient. It includes a base member mountable relative to the platform, and a guard rail for providing a barrier to a patient exiting the bed. Means are provided for mounting the guard rail to the base member for vertically changing the elevation of the guard rail between a barrier position above the level of the platform, and a storage position below the level of the platform. Energy storage means couples the guard rail and the base member for storing energy when the guard rail is lowered from the barrier position toward the storage position, and releasing the energy by applying an upward force on the guard trail when the guard rail is raised toward the barrier position.

A collapsing guard rail assembly also according to the invention, means for mounting the guard rail to the base member, which mounting means includes a sleeve member fixedly attached to the base member and having a vertically disposed first passageway. A hollow first shaft is slidingly received in the first passageway of the sleeve member, and a second shaft is fixedly attached to the guard rail and slidingly received in the first shaft. The first shaft moves relative to the sleeve member and relative to the second shaft when the guard rail is moved relative to the base member. An extended distance of travel is thereby provided for the guard rail, allowing it to be moved below the upper surface of a bed platform.

9. Swing-Arm Extension Brace

In an articulated hospital bed according to yet another feature of the invention, a support apparatus includes first and second hydraulic rams. Each ram has opposite ends attached to the frame and platform, with the respective ends of the first and second rams attached to the frame at spaced apart locations. The rams are operable for lowering the platform toward a position adjacent to the frame. A means provides for transferring weight from the platform directly to the frame when the platform is in a lowered position. In this way, the rams are relieved of a substantial amount of weight, so that they can be built of smaller structural members, and the rams can be extended further than would otherwise be possible.

10. Platform Joint

The present invention also provides an interpanel joint that provides a change in the separation between adjacent panels with a change in the respective angle between the panels.

More specifically the present invention provides a bed comprising a platform having first and second panels with respective adjacent edges. An articulating joint couples the first panel to the second panel for varying the distance between the respective adjacent edges of the panels while the angle between the panels is varied.

The articulating joint preferably includes a first support member that extends from the first panel and has a distal portion spaced from the first panel. Correspondingly, a second support member extends from the second panel and has a distal portion spaced from the second panel. An adjustable-length rod is pivotably connected to the respective distal portions for varying the distance between them. A base member is carried on the rod means.

A first arm has a first end pivotably connected to the first panel and a second end pivotably connected to the base member, and a second arm has a first end pivotably connected to the second panel and a second end pivotably connected to the base member. An element couples the first arm to the second arm for providing corresponding movement of the first and second arms relative to the base member. In one embodiment this coupling element comprises a link interconnecting the first and second arms intermediate the arm ends. In another embodiment, the coupling element comprises a first pinion fixedly attached to the first arm and a second pinion fixedly attached to the second arm. The first and second pinions have meshing teeth so that movement of one produces a corresponding movement in the other. Such movement results in variation in the distance between the adjacent edges of the two interconnected panels.

When the two adjacent panels are pivoted from a flat or coplanar orientation to a mutually angled orientation, the adjacent edges of the panels move apart. The amount of movement is set to correspond to the change in surface length of a typical person's body, thereby maintaining the comfort and support of a person reclining on the platform.

11. Hydraulic Valve

The present invention also provides a hydraulic valve that varies fluid flow linearly with the linear displacement of a valve element. More particularly, the present invention provides a hydraulic valve for controlling fluid flow between two chambers. It includes means defining a channel for conducting fluid between the two chambers and has a restricted opening through which the fluid flows. A valve element is movable relative to the means defining the channel for varying the size of the opening. A moving means moves linearly one of the means defining the channel and the means for varying the size of the opening relative to the other. The opening has a cross-sectional area through which fluid flows that varies linearly as the means defining the channel and the means for varying the size of the opening move linearly relative to each other.

The hydraulic valve preferably includes a housing defining a cylindrical channel for conducting fluid along a channel axis between the two chambers. The housing has a protrusion extending into one of the chambers and through which the channel extends. The protrusion also has an open end and a restricted slit adjacent to the open end. The slit extends through the channel wall with a uniform width in the axial direction for conducting fluid between the one chamber and the channel.

A plunger is disposed in the channel and has an enlarged end for closing the channel open end. A reduced-diameter shaft extends from the enlarged end in the channel for allowing fluid to flow in the channel between the shaft and the channel wall. The plunger is movable along the channel axis for varying the size of the slit through which the fluid flows. The enlarged end seals the open end of the channel during movement of the plunger. The plunger is linearly moved along the channel axis whereby the size of the slit through which fluid flows varies linearly.

This hydraulic valve is relatively simple to manufacture and operate. It provides relatively precise control of flow volumes, for use in driving hydraulic motors or moving hydraulic rams, such as are used to control articulated beds. Accordingly, the present invention provides a bed having a support surface for supporting a person and a base supported on a floor for supporting the support surface. A hydraulic system moves the support surface relative to the base using a hydraulic cylinder, hydraulic fluids and a valve for regulating the flow of fluid relative to the cylinder. The valve is controllable for varying the speed of articulation of the support surface. Preferably, the valve is a linearly adjustable valve according to the invention as described above.

The use of a valve of this nature in a bed offers the advantage of operating at a range of fluid flow rates suitable for bed articulation, it is simple to manufacture and operate, and provides a backup valve in case of failure of check valves also typically in the hydraulic system.

12. Platform Support

The present invention provides for an improved platform support system. More specifically, the present invention provides for an improved three-axis support system having features that make the bed easier to control and less expensive to produce.

In one aspect of the invention this is provided by the use of a fixed-length swing arm having a lower end pivotably attached to the frame and an upper end coupled to the platform for supporting the platform above the frame. A means, preferably a universal joint, is provided for allowing pivoting of the platform relative to the swing arm. A first length-adjustable arm further supports the means for allowing pivoting relative to the frame. Second and third adjustable-length arms extend between the frame and the platform. These arms have upper ends that are pivotably attached relative to the platform at locations spaced from the means for allowing pivoting. Means are provided for varying the lengths of the first, second and third arms independently for pivoting the platform about three transverse axes. By making the swing arm fixed in length, only three length-adjustable arms are required to articulate the platform, thereby reducing the complexity and manufacturing expense of the bed.

Another feature of the invention provides that the first adjustable-length arm be attached to the swing arm, whether or not the swing arm has a fixed length. Preferably the point of attachment is well below the upper end of the swing arm so that the upper end of the swing arm moves further for a given change in the length of the first arm. A greater range of motion is thereby provided in the swing arm for a given change in the length of the first arm. Conversely, a shorter first arm provides an equivalent range of motion as a longer first arm that is attached to the means for allowing pivoting.

In yet another aspect of the invention, the second and third arms have lower ends mounted well up onto the swing arm. This configuration results in movement of the second and third arms when the swing arm is moved, and requires less motion by the second and third arms during compound motions with the swing arm. Further, control is simplified since the base of motion of the second and third arms is a proportion of the swing arm movement.

13. Multifunction Control System

The present invention also provides for coordination between the changing of various features on a bed in order to assure proper patient a treatment and safety.

In one aspect of the invention, this is provided by a method that starts with receiving a feature command for changing a first feature of the bed. A feature includes any changeable aspect of a bed, such as the position of a physical structure, the amount of pressure in a mattress cell, or whether a general function lockout exists.

A second feature is associated with the first feature and a determination is then made as to whether the second feature is in a first state. As used herein, the state of a feature depends on the feature and may be a position if the feature relates to a moveable structure, a condition such as the pressure of inflation of a mattress cell, or a logical state such as whether traction lockout has been activated.

If the second feature is in the first state, the first feature is changed according to the command. If the second feature is not in the first state, the first feature is not changed according to the command. Rather, a feature is changed that is different than changing the first feature according to the command. This change of a feature that is different may be generating an alarm to indicate that the second feature is not in the first state. This alarm could be audible, visible, and even a display of a phrase stating that the second feature is not in the first state. In this way the person entering the command is told why the attempted feature change was not made.

This method is also useful where an input command is for changing the first feature in a selected way. In this case, if the second feature is not in the first state, the different changing of a feature includes changing the first feature in a way different than the selected way. This method is useful for moving the bed when a patient is being set up for tractions. It is desirable in such an instance to move the mattress at a slower rate than normal in order to make small, controlled changes in the mattress position.

In some instances changes may be allowed if the user is aware of the state of an associated feature. The method according to the invention in such a case then includes determining whether a confirming command has been input requesting the change of the first feature while the second feature is not in the first state. The first feature is then changed if the confirming command is input. This method is useful where an equipment-support table is positioned over the bed and the attendant wants to raise the mattress toward the table.

The present invention also contemplates a bed having the capability of performing these steps. In particular, it includes first and second features associated with the bed and being changeable between respective first and second states. The bed includes sensor means coupled to the second feature for determining whether the second feature is in the first state. Input means, such as control switches, are used for manually inputting a feature command for changing the first feature. A controller coupled to the first feature and the sensor means is provided for changing the first feature according to the input command if the second feature is in the first state. If the second feature is not in the first state, the first feature is not changed according to the command. Adequate outputs are also preferably provided for the audio, visual, and verbal alarm condition displays.

These and other features and advantages of the present invention will be apparent from the following detailed description of the preferred embodiments of the invention, described for purposes of illustration but not limitation, and as illustrated in the accompanying drawings.

BRIEF DESCRIPTION OF THE DRAWINGS

FEG. 1 is an isometric view of a hospital bed made according to the various features of the present invention.

DETAILED DESCRIPTION OF THE PREFERRED EMBODIMENTS

General Overview

Figure 1:
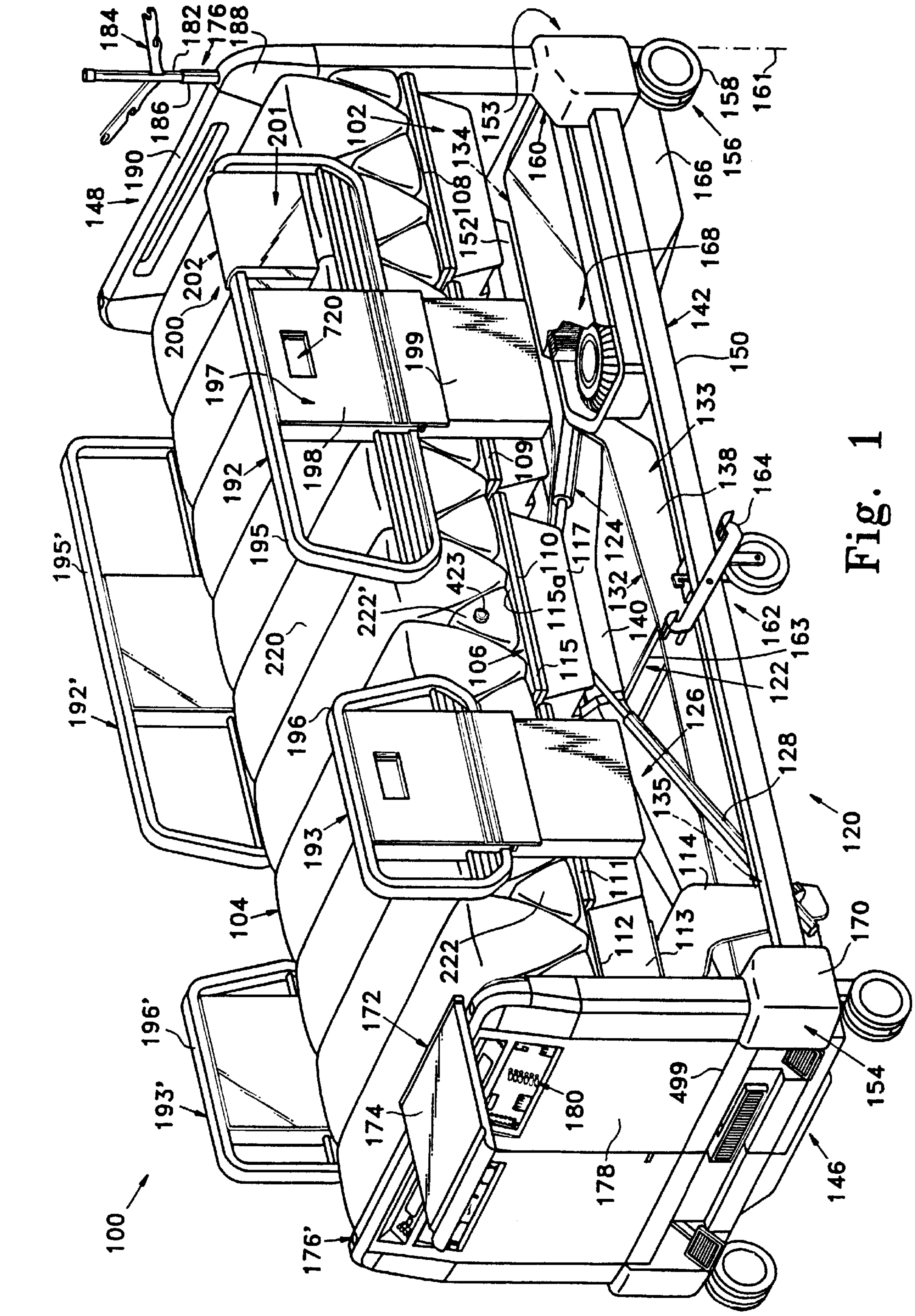

Referring initially to FIG. 1, a bed 100 made according to the invention is shown. Bed 100 includes a pneumatic system 102 for controllably inflating a mattress 104 supported on a platform 106 formed of mutually articulating links or panels 108, 109, 110 and 111. Panel 108 is at what is referred to as the head of the bed, and panel 111 is at the foot of the bed. Panel 111 also includes an extension portion 112 that includes an equipment housing 113. Each panel has a top plate 115 with a top, supporting surface 115*a*, and a subtending tray 117.

Platform 106 is supported above a base assembly 120 by a supporting apparatus 122 that includes opposing hydraulic supports 124 and 126 mounted at spaced locations on the base assembly and at a common universal mounting hidden from view. This structure is like the structure described in U.S. Pat. No. 5,023,967 issued to Ferrand for "Patient Support System". Support 124 is referred to as a drive cylinder and support 126 is referred to as a swing arm. Additionally, there are opposing roll cylinders at the foot end of the bed, such as cylinder 128.

Figure 85:
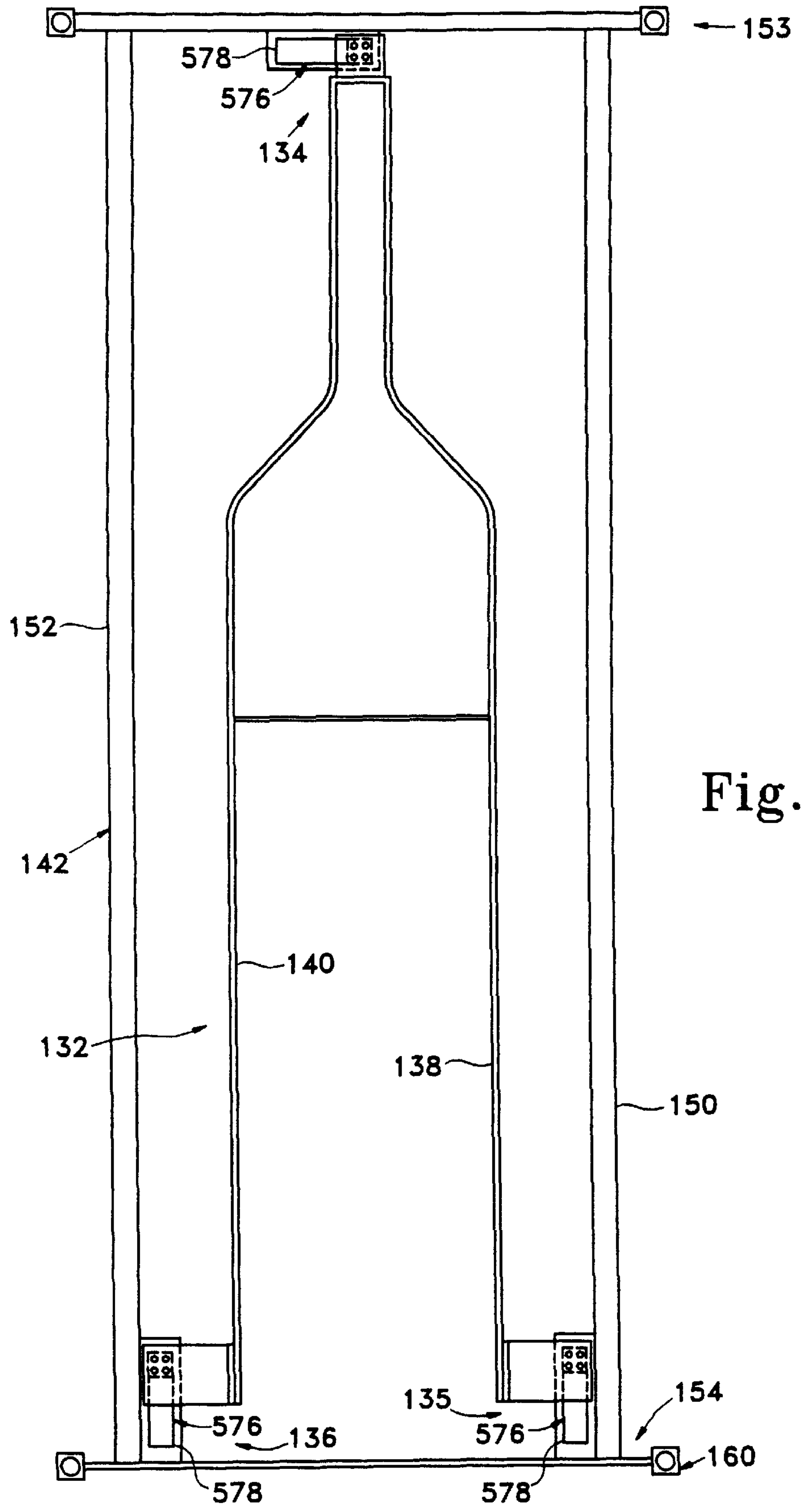
FIG. 85 is a plan view of the base frame supporting the three-point weigh frame.

The base of the hydraulic supports are mounted to a weigh frame 132 forming part of a position-sensing weigh system 133. The weigh frame has a wishbone shape and extends from a central support 134 at the head of the bed to two lateral supports 135 and 136, shown specifically in FIG. 85, at the foot of the bed, by structural members 138 and 140. The platform and support system are supported on the weigh frame at the foot of the bed by a yoke member 144.

Base frame 142 includes a footboard assembly 146, a headboard assembly 148, and connecting side rails 150 and 152. At each corner of the bed frame such as corner 153 or 154 shown in FIG. 1, the junction between the end (foot or head) board and associated side rail is a castor assembly 156 having a castor 158 and a mounting apparatus 160 that allows free pivoting of the castor about a vertical axis 161, and is lockable to capture the castors in a position in alignment with the longitudinal length of the bed for use during transport.

Figure 101:
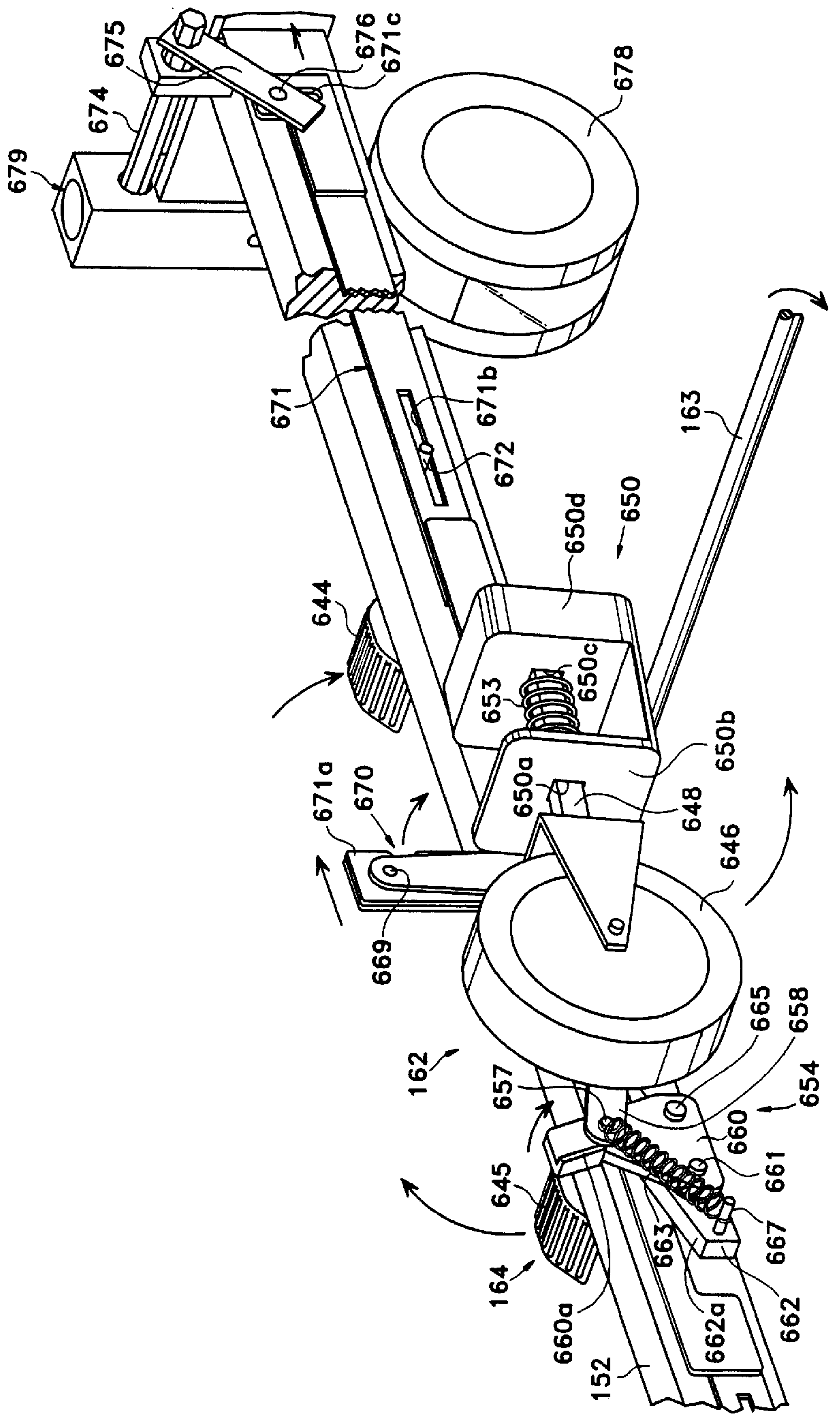
FIGS. 101, 102, and 103 are partial isometric views showing the structure of a guide wheel assembly and castor actuator according to the invention in different positions.
Figure 102:
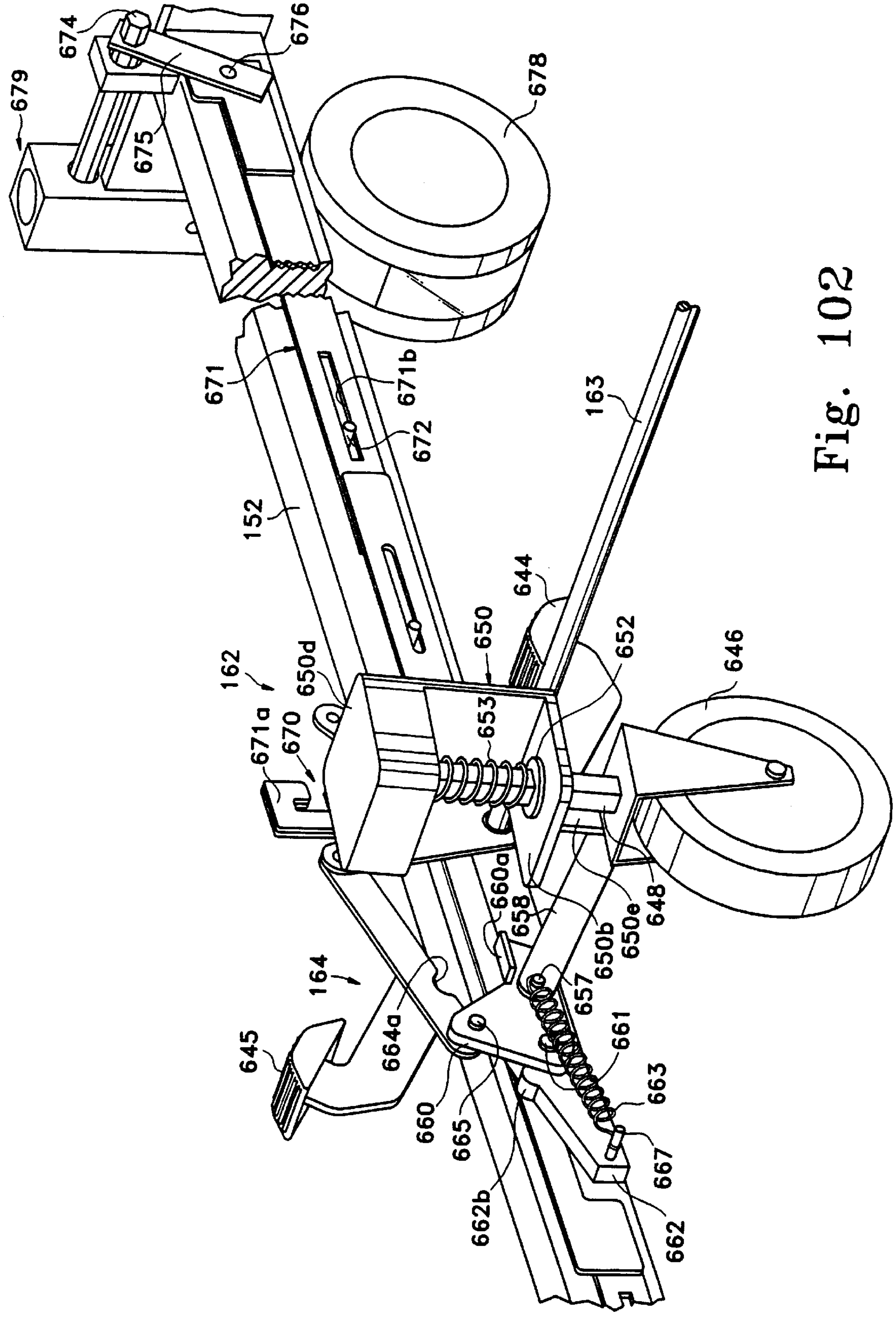

Disposed at the middle of each side rail is a guide wheel assembly 162 connected by an actuator rod 163 to a foot pedal lever 164, particularly shown in FIG. 101.

A basket 166 supported at each front corner of the base frame carries supporting operating and control equipment, shown generally at 168.

Footboard assembly 146 includes a footboard frame 170, left and right footboard table assemblies such as assembly 172 having a storable table 174, an extendable equipment support assembly 176, and a footboard panel 178 having a built-in control unit 180 for controlling various bed and patient related functions.

Headboard assembly 148 similarly has an extendable equipment support assembly 176 with an extendable upper bar 182 having equipment support apparatus 184 and received in an intermediate bar 186 adjustable in position relative to the headboard panel 188. An emergency procedure access or intermediate panel 190 is removable from the headboard.

Bed 100 also has patient guard rail assemblies, such as assemblies 192 and 193, positioned along the platform sides. Assembly 192 includes an extended guard rail 195 and assembly 193 includes a smaller guard rail 196, as shown. Guard rail 196 is shorter than guard rail 195 primarily to allow relative articulation of panels 109–111 into sitting or folded positions. Each guard rail assembly includes an elevator mechanism 197 hidden by telescoping housings 198 and 199.

The manipulation and control of the bed, and other patient care systems, are provided by a portable "saddle-bag" controller 200 that wraps around a guard rail, such as guard rail 195, as shown. This controller provides an outer, attendant-operated control panel 201, and an inner, patient-operated control panel 202.

1. Pneumatic System

Referring now to FIGS. 2, 3, 4, 5, 6, 7 and 8, pneumatic or air distribution system 102 is shown in further detail. System 102 includes a source of pressurized fluid, such as a blower 204 that forces air through a channel 206 heated by a heater 208. Blower 204 is also referred to as inflating means or a pressurized fluid source. The heated air is directed serially through respective trays 217 of each of panels 108–111 as shown. Each panel includes, generally a basin or outer tray 210, and an inner tray assembly 212 that includes a lower tray section 214, an intermediate tray portion 216, and an upper tray section 218. Each tray assembly, also referred to generally as a housing, defines manifolds used for distributing air to and from individual cells, such as upper cells 220 and base cells 222 of mattress 104.

Figure 2:
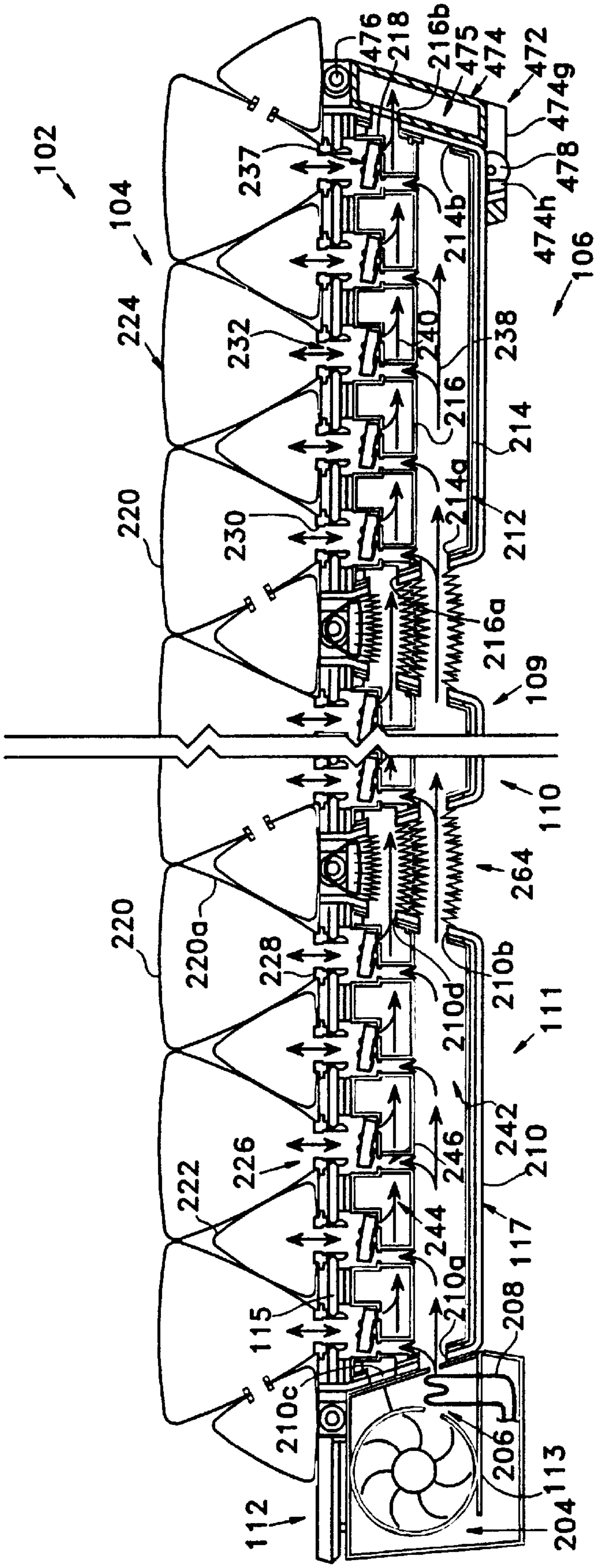
FIG. 2 is a side cross section showing the pneumatic system of the bed of FIG. 1.

As can be seen in FIGS. 1 and 2, mattress 104 has alternating cells 220 and 222. As viewed in FIG. 2, both types of cells are generally triangle shaped, with a base of a cell 222 supported on the associated platform, and a point of a cell 220 supported on the platform. Since cells 220 are larger than cells 222, they extend above the base cells. The upper or patient support surface 224 of the bed is thus formed by the upper, exposed surfaces of cells 220. The larger cells thus have faces or sides such as side 220*a* that extend at an oblique angle to the platform and over the tops of the lower cells and, the adjacent side walls of adjacent cells touch.

During articulation of the bed, different combinations of upper and base cells are deflated to allow pivoting of the associated panels. When a base cell is deflated, the upper cell is then allowed to pivot over. This is generally avoided. However, when an upper cell is deflated, the adjacent upper cells do not move to fill in the gap, because the intervening base cell acts as a wedge to keep it from moving. Thus, so long as the base cells are inflated, the upper cells are independently pressure-controllable, without altering the cell position. Since the face of the base cell is supported on the platform, it also does not bend. Thus, a very stable cushion system is provided with this combination cell structure.

Figure 25:
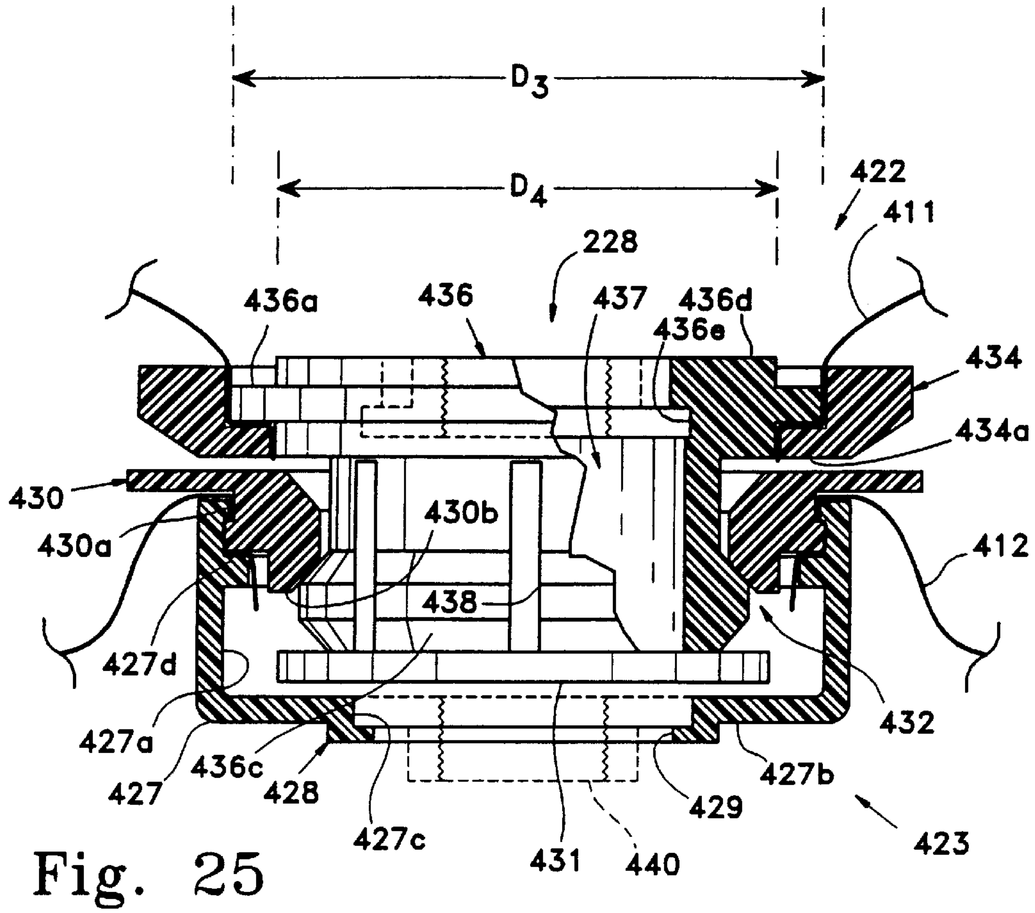
FIGS. 25 and 26 illustrate connector assemblies made according to the invention for use in the cushions of the previous figures.
Figure 26:
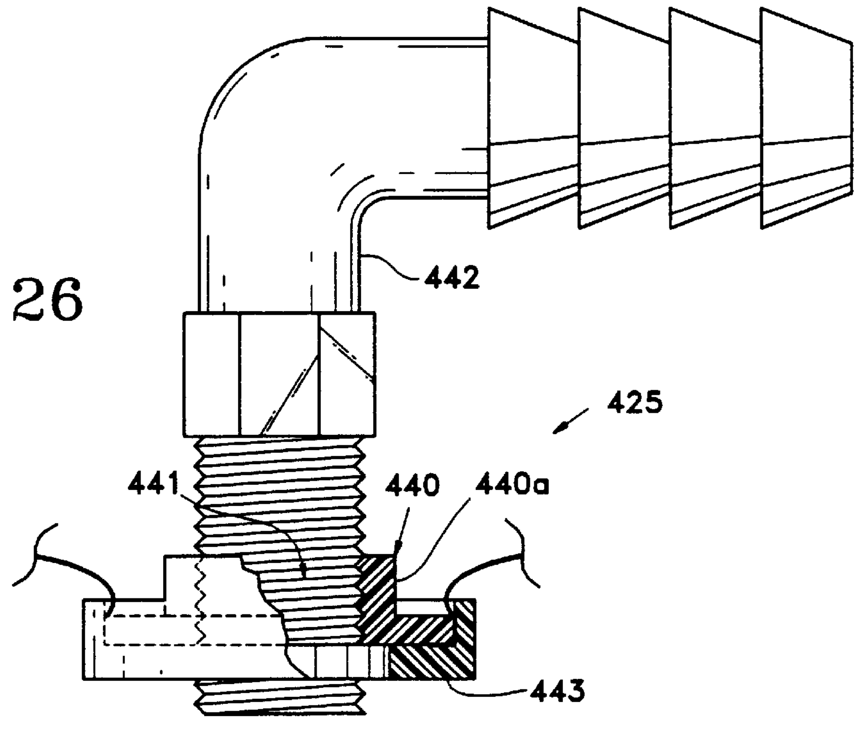

The cells have fluid-flow ports, such as port 226 formed by the combination of cell fabric or envelope, such as a breathable or waterproof fabric as are well known, and an insert connector 228, to be described further with reference to FIGS. 25 and 26. The insert connector sealingly snaps into a coupling port 230 extending through the upper plate of the associated platform. Below port 230 is a control chamber 232 that has substantially the same pressure as the associated cell.

The control chamber is defined by the platform plate and tray assembly 212. It has an inlet fluid-flow port 234 and an outlet or exhaust fluid-flow port 236. Mounted relative to the inlet and outlet ports is a valve assembly 237, for selectively controlling the air pressure in the associated mattress cell. One or a plurality of control chambers may be associated with each cell.

The panels are all made with the same base components of top plate, outer tray, inner tray assembly and associated sealing materials. As has been mentioned, the top plate has an array of coupling ports for connection with associated mattress cells, there being a control chamber and valve assembly for each coupling port.

Each panel provides a pair of air or fluid-flow travel paths 238 and 240 along the length of the bed, with path 238 providing higher pressurized air and path 240 providing reduced pressure (exhaust) air. Path 238 is provided by a pressure chamber 242 formed by lower and intermediate tray sections 214 and 216. Path 240 is provided by an exhaust chamber 244 formed by intermediate and upper tray sections 216 and 218.

Each travel path in a panel has a corresponding inlet and outlet. In the case of higher pressurized air path 238, the outer tray has an inlet 210*a* and an outlet 210*b*, and lower tray section 216 has corresponding aligned inlet 214*a* and outlet 214*b*. In the case of path 240, outer tray 210 has an inlet 210*c* and an outlet 210*d* and intermediate tray section 216 has a corresponding aligned inlet 216*a* and outlet 216*b*.

Note that for foot end panel 111 the path 240 outlet is sealed, and for head end panel 108, the path 238 outlet is also sealed, during normal operation. Also, a cylindrical supply cavity 246, also referred to as means coupling the path to the cells, or channel means, couples pressure chamber 242 to each control chamber 232 via inlet port 234.

Although not shown, sensor receptors and processor controllers are also preferably mounted in or on the trays, with associated pressure and temperature sensors mounted in the corresponding control chambers. The trays are preferably formed with troughs for holding such devices.

Figure 3:
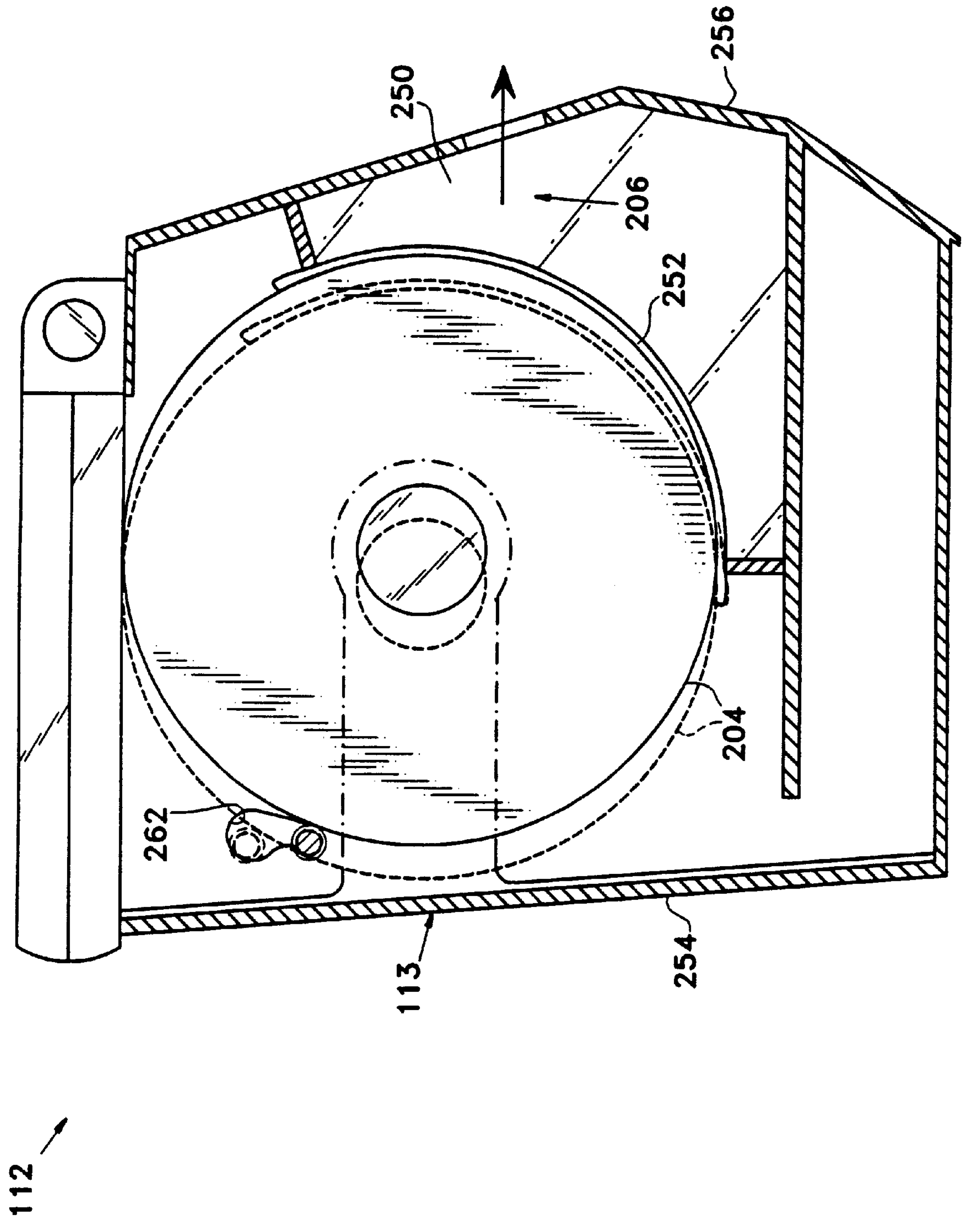
FIG. 3 is an enlarged view of the left end of FIG. 2 showing the blower mounting.

An enlarged cross-section, as viewed along an axis 248 of rotation of air blower 204, is shown in FIG. 3. The blower housing is generally cylindrically shaped. It seats, during operation in a pair of parallel mounting panels, such as panel 250, having curved edges conforming to the blower housing, and with associated plates, not shown, forming channel 206. The plate and mounting panel edges are lined with a suitable resilient liner 252 for forming an air seal.

Equipment housing 113 includes a removable cover 254 mounted on a fixed wall 256. Removal of cover 254 provides access to the blower. The blower is held in position by a rod 258 having a resilient sleeve 260. The rod is held in place against the blower housing by lodgement in an aperture 262 in each of the mounting panels. Aperture 262 has an offset kidney shape to allow positioning the rod in the apertures for holding the motor, as shown by solid lines during operation. The position of the rod in phantom lines illustrates the position when the rod is positioned by sliding it through the enlarged end of the apertures while the blower is held in position near the mounting panel edges. This mounting structure provides for rapid access for removal or installation of the blower.

Figure 4:
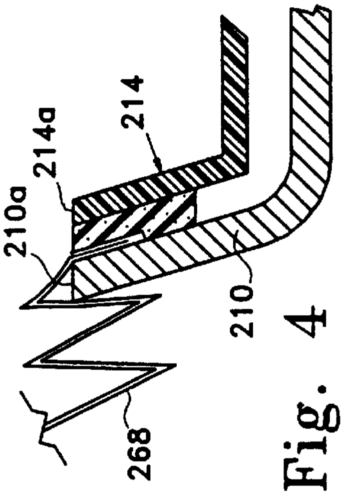
FIG. 4 is an enlarged fragmentary cross-section of a portion of FIG. 2.

The pneumatic system 102 also includes a bellows assembly 264 for providing fluid communication between associated fluid-flow ports in the adjacent panels, as shown. Each bellows assembly, also referred to generally as duct means, includes an upper connecting bellows 266, a lower connecting bellows 268, and a guide assembly 270. The bellows are each formed of a resilient material with alternating enlarged sections, such as sections 266*a* and 268*a,* aiid reduced sections 266*b* and 268*b*. These alternating sections result in folds in the bellows, as is common of bellows structures, allows the bellows to expand and contract. Also, by nesting the folds of one bellows in the creases of the other, they can be made with a relatively larger passageway for airflow. The ends of the bellows are mounted sealingly to the respective inlet and outlet ports of the outer tray 210, as shown in FIG. 4 to form sealed passageways for the air flow as has been described.

Figure 5:
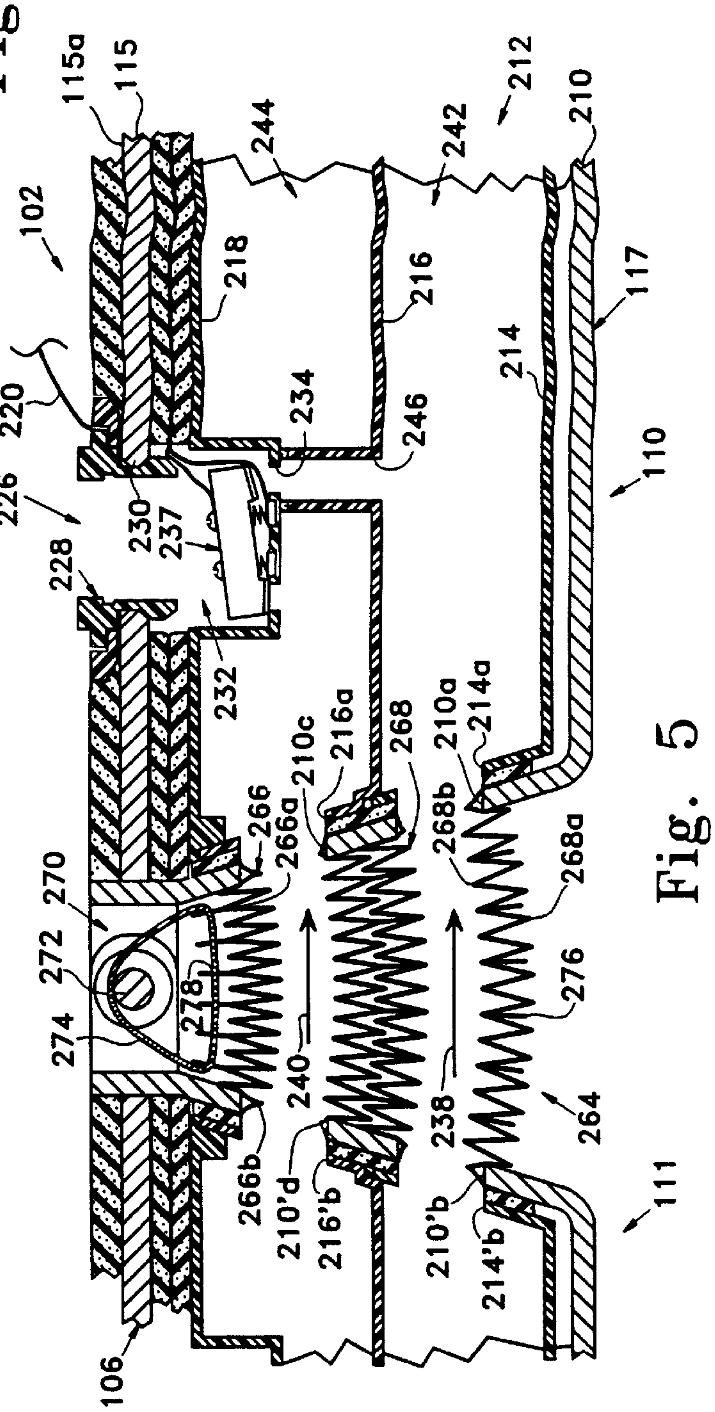
FIG. 5 is an enlarged view of a portion of FIG. 2.
Figure 7:
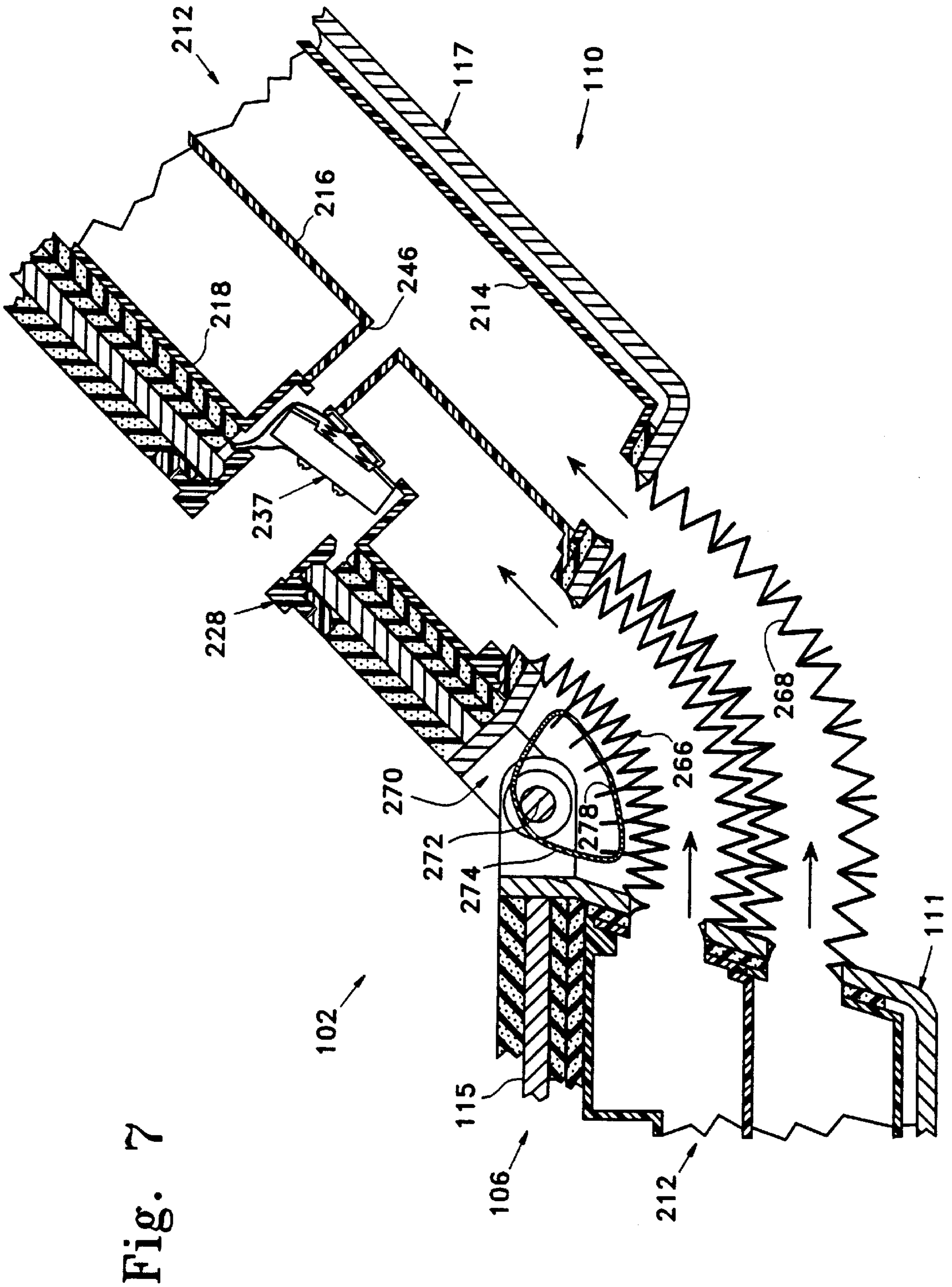
FIG. 7 is a view similar to FIG. 5 showing two bed sections articulated.

FIG. 5 shows the position of the bellows when the associated top plates coextend in a plane, i.e., the platform support surface is flat. Even in this configuration, the bellows are each longer than they are thick. FIG. 7 shows the relative positions of the bellows when the associated platform panels are relatively pivoted about a pivot axis defined by a common pivot rod 272. The bellows, in this example, extend along a substantial arc. Correspondingly, when the panels are relatively pivoted the other direction, the bellows must accommodate very close spacing between the adjacent, connected outer tray ports.

Figure 6:
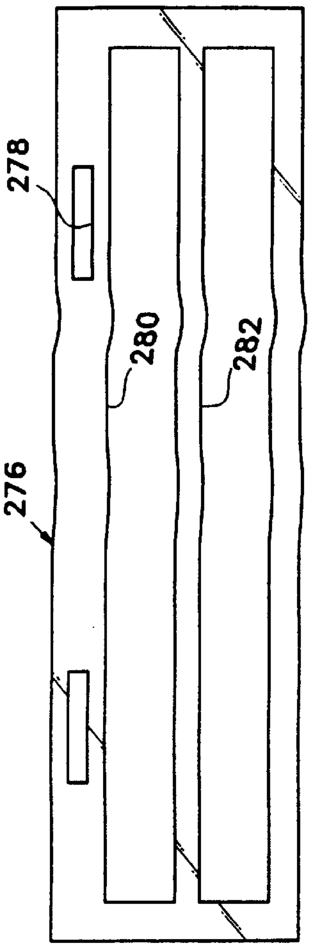
FIG. 6 is a plan view of a spacer used in the bellows assembly of FIG. 5.

Because of their resilience, these bellows tend to droop. Guide assembly 270 provides support to the bellows as they are expanded and contracted during articulation of the associated platform panels. It includes a pair of flexible collars, such as collar 274, spaced apart on pivot rod 272. A plurality—in this case six—of planar spacers 276 support the bellows. As is shown in FIG. 6, each of these spacers or membranes has an opening 278 through which the collar passes, an opening 280 through which the upper bellows passes, and another opening 282 through which the lower bellows passes. Bellows openings 280 and 282 are sized and positioned to conform with the reduced sections 266*a* and 268*a* of the respective bellows when the bellows are intermeshed. The spacers are preferably positioned at alternate reduced sections and are preferably made of a reasonably rigid material, such as plastic. The guide assemblies thus hold the respective bellows in alignment with the corresponding fluid-flow ports of the outer tray to maintain uninterrupted air flow while allowing substantially unlimited flexure of the bellows as they are expanded and contracted by the articulating of the associated platform panels.

Figure 8:
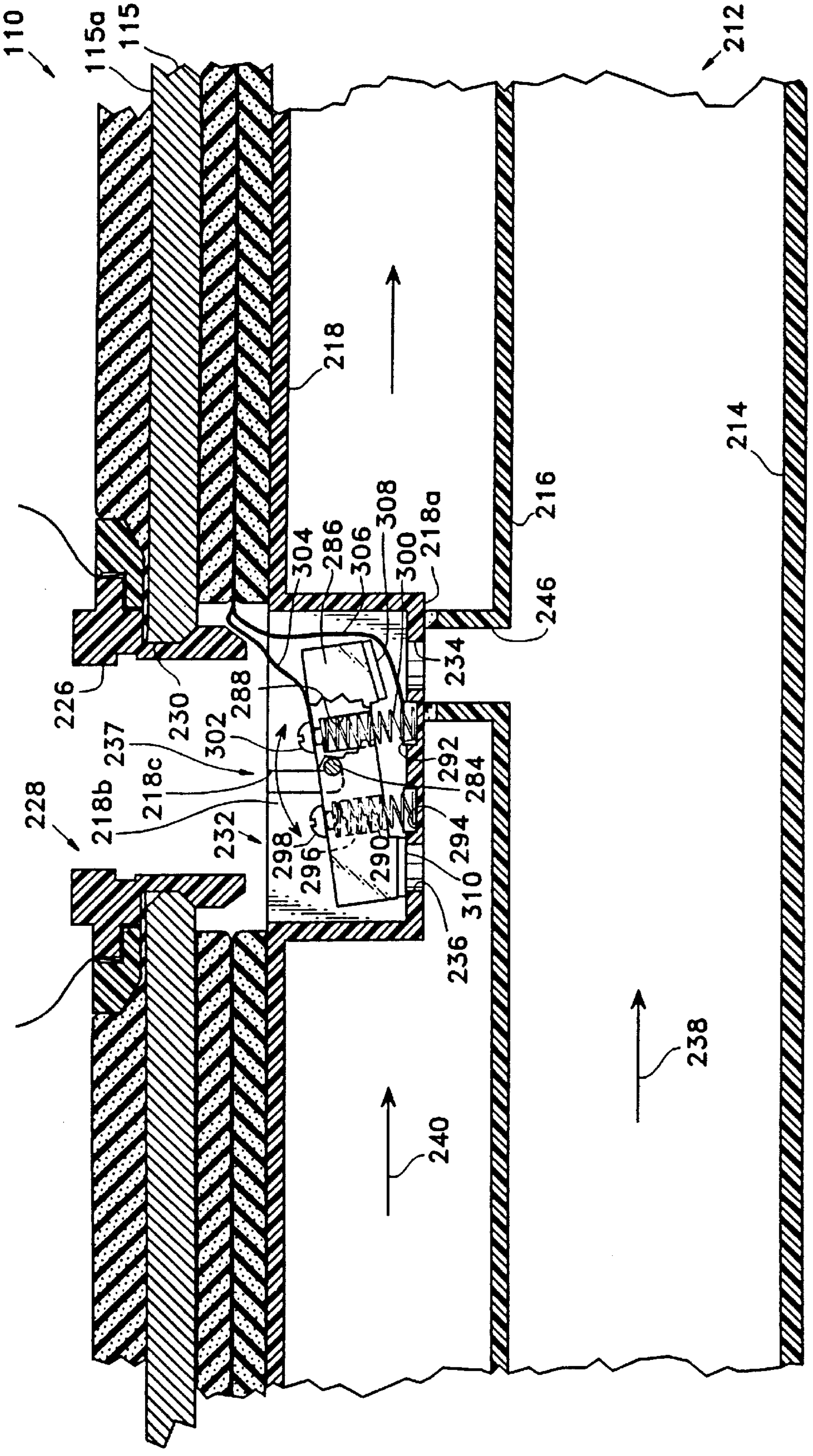
FIG. 8 is a further enlarged view of a portion of FIG. 2 showing a rocker-arm valve in a bed section.

FIG. 8 shows an enlarged illustration of a valve assembly 237 and associated housing provided by tray assembly 212. Upper tray section 218 includes a box 218*a* open at the top adjacent to connector 228 to form control chamber 232. The bottom of the box has inlet and outlet ports 234 and 236. Two opposing sides of the box, including side 218*b,* have "L" shaped grooves 218*c* for receipt of a pivot rod 284. A valve frame 286 pivots on the rod and has two vertical cavities 288 and 290, open from the bottom, as shown in the figure. A corresponding pair of recesses 292 and 294 exist in the floor of the box between ports 234 and 236. These recesses are aligned with respective cavities 288 and 290.

A plain, compression spring 296 is positioned in cavity 290, the upper end of which is held in position by a screw 298, and the lower end of which is seated in recess 292. A temperature-responsive spring 300, preferably made with a shape-memory alloy such as a nickel and titanium alloy, is positioned in cavity 288 with a lower end seated in recess 292. The upper end is attached to a metal screw 302, that is also connected to an electrical conductor 304. Another electrical conductor 306 is connected to the foot of spring 300.

On the lower surface of the ends of valve frame 286 are respective valve members 308 and 310 positioned at a slight angle relative to each other so that they will lie flush on the rims or valve seats forming valve ports 234 and 236, sealing them. Because both valve members are on a single pivoting frame, only one port is closable at a time. As one port is opened the other closes. This results in three general operative positions for the valve assembly: closed inlet port, closed outlet port, and both ports open.

Figure 9:
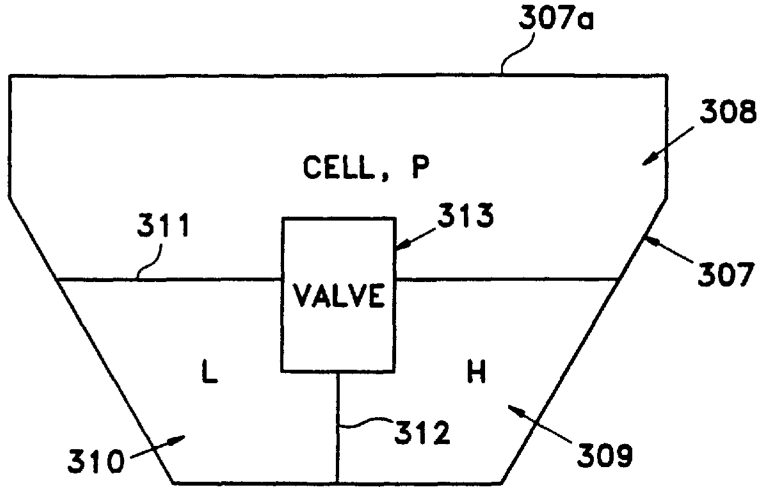
FIG. 9 is a general diagram showing a lateral cross-section through a bed section having an alternative air chamber structure.

FIG. 9 shows conceptually an alternative manifold structure usable in a pneumatic system made according to the present invention. The embodiment shown in FIG. 2 has air flow paths that are vertically spaced, i.e., the exhaust path is above the pressure path. In the embodiment of FIG. 9 these fluid flow paths are horizontally spaced.

More specifically, a housing 307 defines an upper surface 307*a* that corresponds to the platform upper surface having a port, not shown, coupling a mattress cell to a cell controlled-pressure (P) chamber 308 shown below it. Chamber 308 is disposed over a pressurized-fluid supply or high pressure (H) chamber 309 and an exhaust or low pressure (L) chamber 310, as shown. Chambers 309 and 320 are separated from chamber 308 by a wall 311, and chamber 309 is separated from chamber 310 by a wall 312. At the junction between walls 312 and 312 is a valve assembly 313 for controlling fluid passage from the high pressure chamber into the control chamber and from the control chamber into the low pressure chamber. Salve assembly 313 could be any suitable structure, such as valve assembly 237 shown in FIG. 2.

Figure 10:
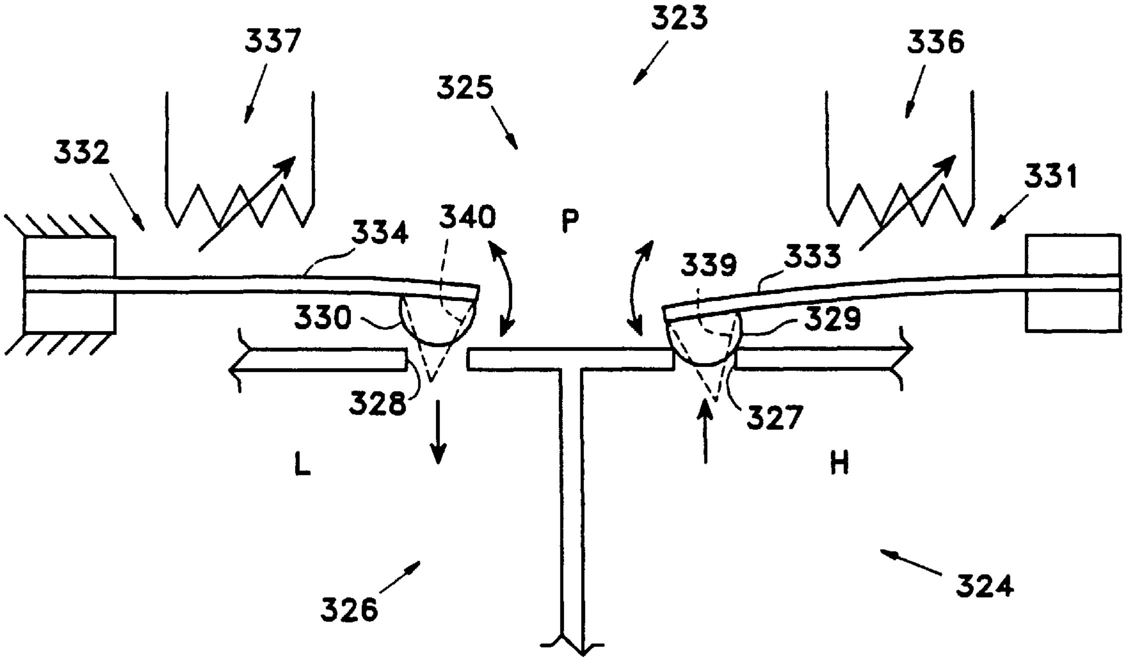
FIG. 10 is a side view of a dual poppet valves usable in the pneumatic system of FIG. 2 for providing independent high and low pressure control.

An alternative valve assembly 323 is shown in FIG. 10. In this embodiment there are high pressure (H), controlled pressure (P), and low pressure (L) chambers shown generally at 324, 325 and 326, respectively. An inlet port 327 provides communication between chambers 324 and 325, and an outlet port 328 provides communication between chambers 325 and 326. These ports are valve seats that are controlled by valve members 329 and 330. Movement of these valve members is controlled by actuators 331 and 332, respectively. These actuators are also preferably of a temperature-responsive material as was described for the actuator of FIG. 8. In the embodiments shown, temperature-responsive, cantilevered arms 333 and 334, respectively, are fixed at one end, and have the corresponding valve members 329 and 330 attached to the distal end. Controlled heat sources 336 and 337 provide the necessary control over the flexure of the cantilevered arm to control opening and shutting of the respective ports.

Valve members 329 and 330 are hemispherical. With this shape, as they approach the respective port, a portion of the member enters the port before it seats on the valve seat, as shown by valve member 329. An alternative form of the valve members is a cone-shape, as is shown in dashed lines by alternative valve members 339 and 340. These valve members extend well into the respective ports, prior to sealing them off. They thus provide significant control for varying the flow through the ports, thereby allowing pressure control through restriction of the port. The air flow restriction at each valve port is proportional to the distance of the valve member from the valve seat. Additionally, they are particularly effective for reducing the noise of air passing through the valve. Conventional flat valve seats, as shown in FIG. 8, simply open and close the associated valve ports.

One advantage of having a double-sealing valve assembly, such as assembly 323, is that changes in the cell pressures, while they are sealed can be used to identify the location of the patient. Each cell that supports a portion of a patient's body has a pressure that is higher than the cell pressure when it does not support a patient's body. If the cells are inflated to respective predetermined pressures before a patient is supported, the distribution of the patient's body on the various cells is readily determined once the patient is on the mattress. Further, changes in the cell pressures while the cells are kept sealed are then due to changes in the patient's position. The relative pressure changes can then be used to determine the patient's new position.

Figure 11:
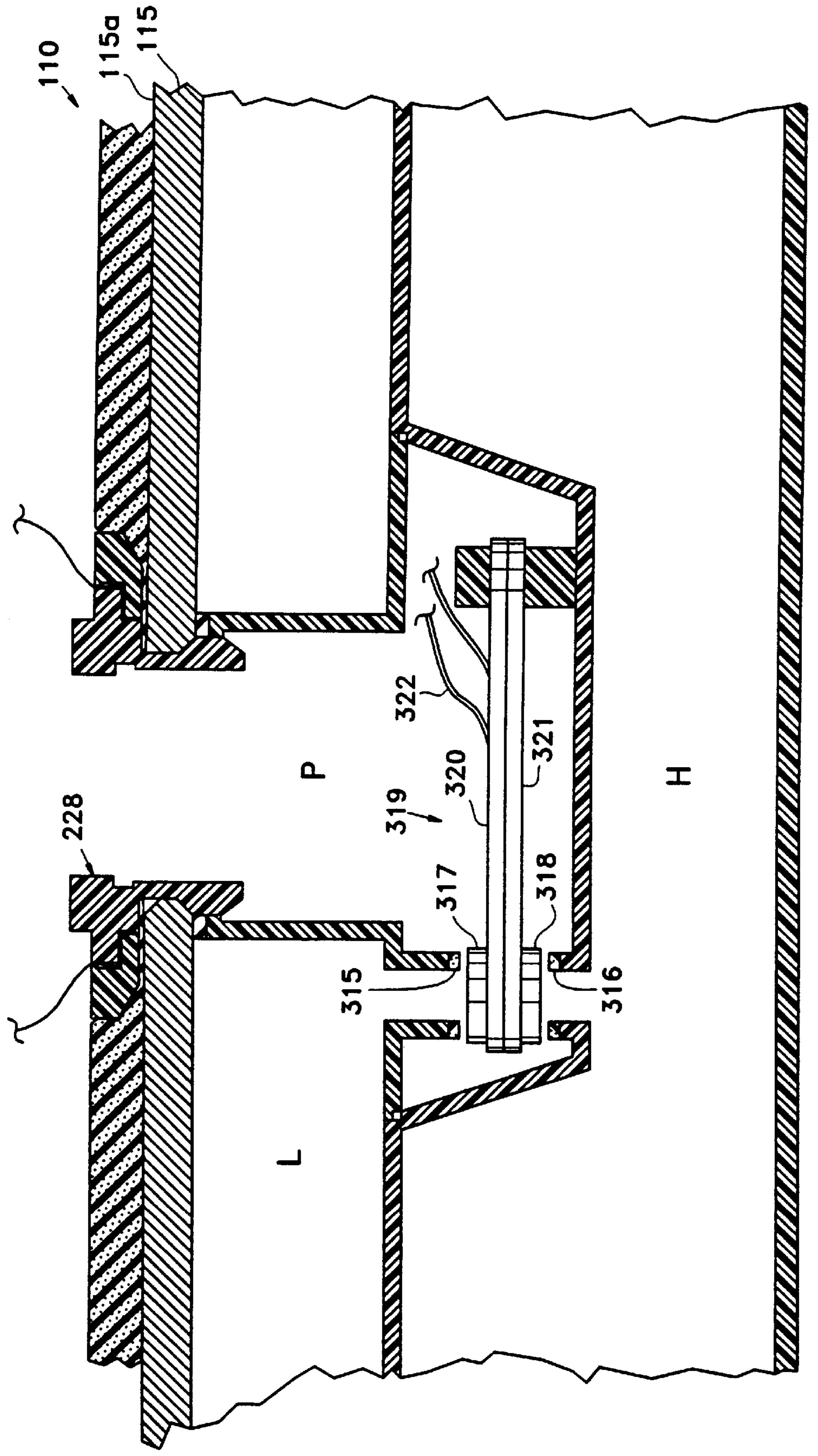
FIG. 11 is a view similar to FIG. 8 showing yet another embodiment of a valve assembly.
Figure 12:
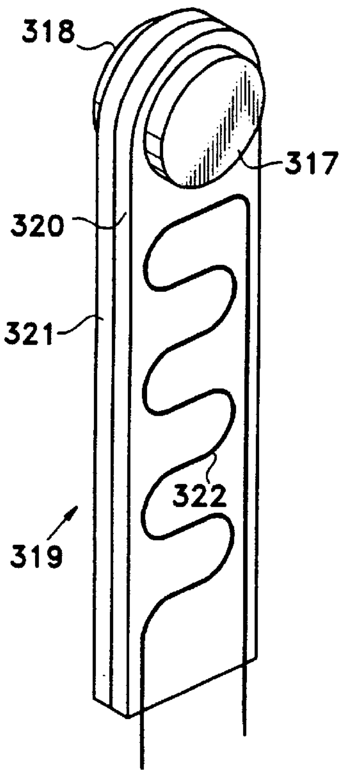
FIG. 12 is an isometric view of a valve member arm in the valve assembly of FIG. 11.
Figure 19:
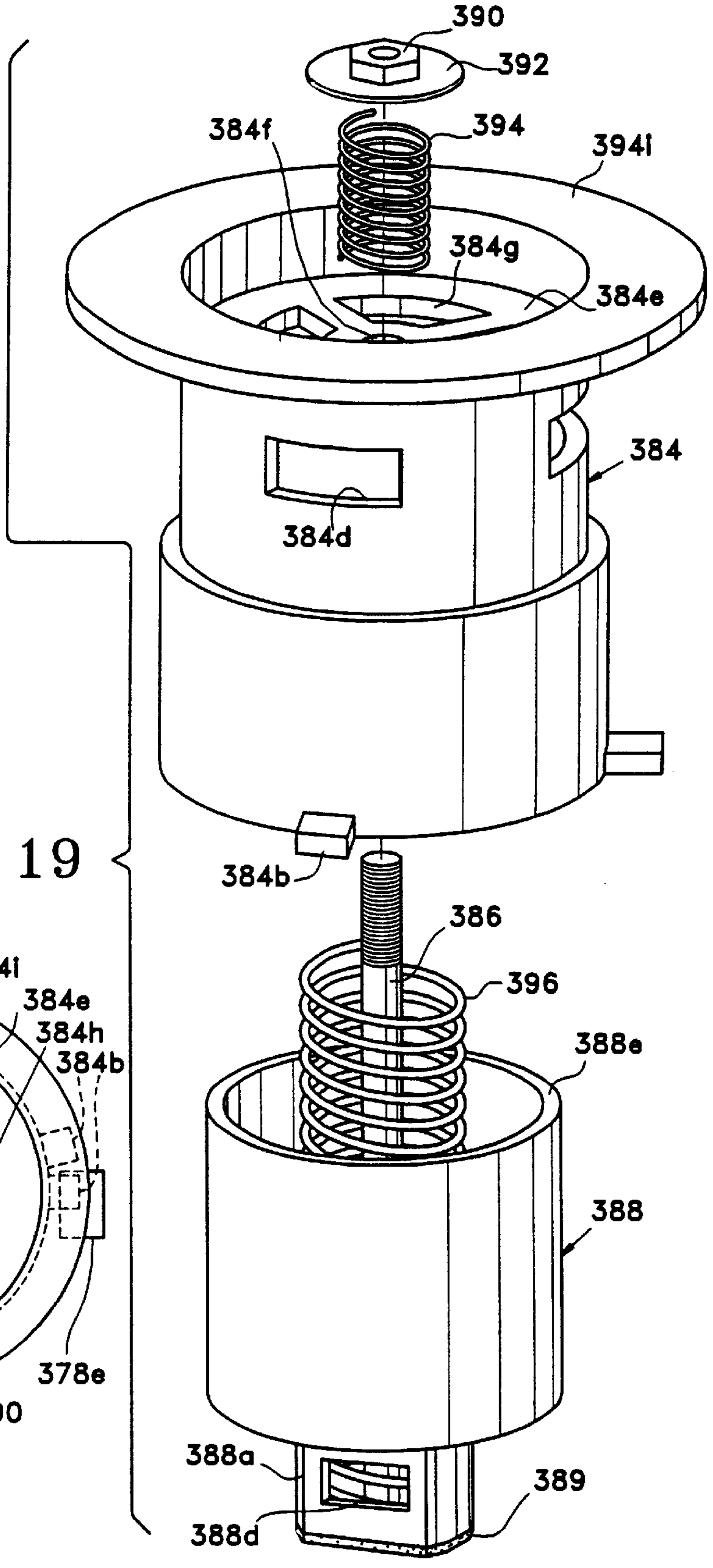
FIG. 19 is an exploded view of the cartridge valve of FIG. 17.
Figure 20:
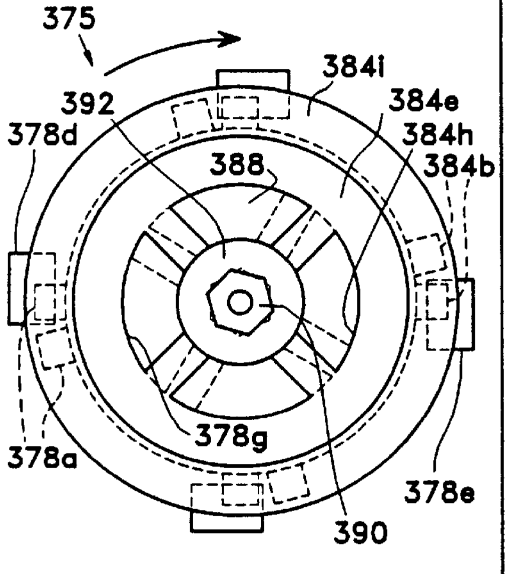
FIG. 20 is a top view of the cartridge valve of FIG. 19.

Yet another valve assembly 314 is shown in FIGS. 11 and 12. A port or valve seat 315 is coupled to a low pressure chamber L. An opposing port or valve seat 316 is coupled to a high pressure chamber H. Corresponding valve members 317 and 318 are attached to a cantilevered bimetallic arm 319 having a heat-responsive layer 320 and a non-heat responsive layer 321. Layer 321 biases the arm to close port 316. Layer 320 is heated by an electrical heating element 322, causing it to bend toward port 315. Arm 319 thus provides a single activator for concurrently opening one port while closing the other. Valve assembly 324 thus provides equivalent function to valve assembly 237 shown in FIG. 8.

FIGS. 13–16 illustrate yet another valve assembly 342 particularly useful in a patient support system as shown in FIG. 2. Assembly 342 includes a dual-acting cartridge valve 344 mounted in a housing 346 having a lower wall 347 and an upper wall 348. Lower wall 347 separates a high pressure chamber 350 from a low pressure chamber 352, and has an inlet port 353 defined in part by a circumferential ridge 354 that extends upward from the plane of the wall. Ridge 354 has an outer diameter $D_1$.

Wall 348 separates low pressure chamber 352 from a controlled-pressure chamber 356. This wall has an air-flow port 357 formed by an upwardly extending ridge 358. Ridge 358 has an inner diameter $D_2$ greater than diameter $D_1$.

Cartridge valve 346 includes a base member 360, also referred to as a fluid-flow element or channel means, is generally tubularly shaped about a vertical axis 362, as viewed in the figure. It includes a lower end **360*a* having an inner diameter sized to frictionally receive ridge 354, and thereby provide means for attaching the base member to wall 347, and means for sealing cartridge valve 346 relative to inlet port 353. An inner passageway 364 extending through base member 360 has a reduced size at inwardly extending, and downwardly facing valve seat 360*d*. The exterior of the upward end of the base member is preferably cylindrical about axis 362**.

An upper end **360*b* has arms 360*c* that extend across passageway 364 to provide lateral support for the member, and to serve as a base for a spring 366. The spring surrounds a shaft 368 that extends along axis 362 and is attached at its lower end to a tapered valve member 369 that is sealingly seatable on valve seat 360*d*. The lower end of spring 366 contacts the upper surface of valve member 369**, as shown.

The upper end of shaft 368 is connected to an extension member 370, also tubular shaped, that fits around the upper end of the base member and is slidable relative to the base member along axis 362. A second spring 372 surrounds the upper end of shaft 368 and extends between extension member 370 and the top sides of arms **360*c*. Although not shown spring 372 is preferably made of a temperature-responsive alloy for controlling movement of the extension member relative to the base member Lower spring 366 is fabricated from normal spring material, and tends to keep the inlet open thereby keeping the associated mattress cell inflated. This opens and closes the valve provided by valve seat 360*d* and valve member 369**.

The top surface of ridge 358 is also a valve seat 374. Extension member 370 has a radially extending, circumferential flange **370*a* with a lower surface 370*b* that sealingly seats against valve seat 374. Flange 370*a* is thus also a valve member. The extension member upper end 370*d* has slits 370*e* that allow air flowing up through passageway 364 out into controlled-pressure chamber 356**.

Figure 13:
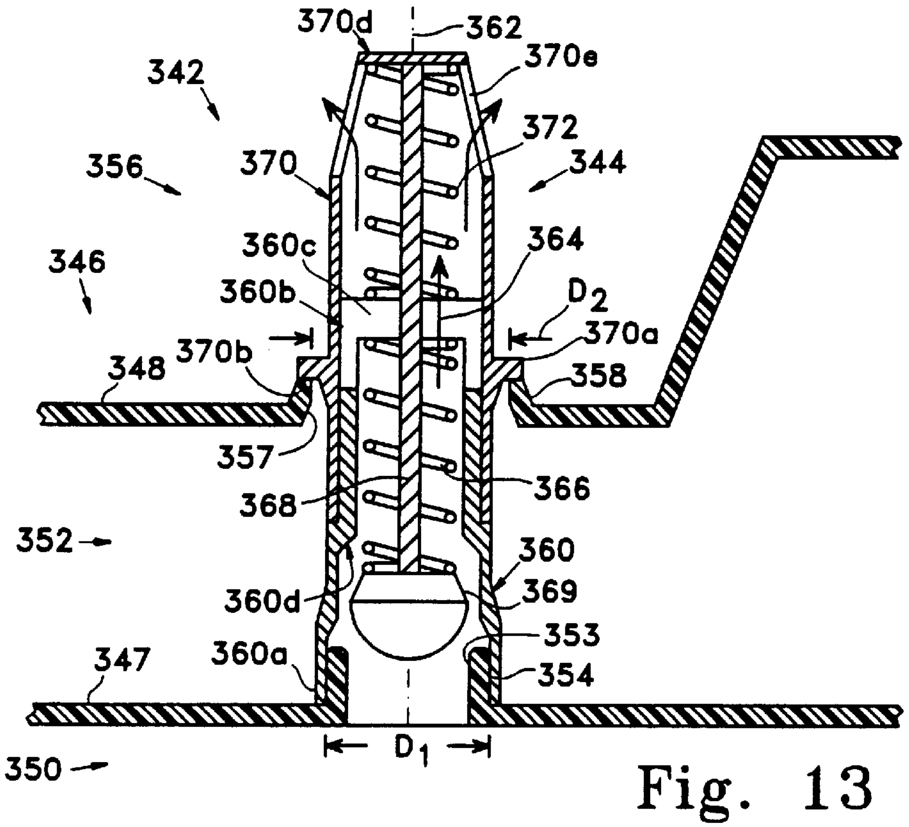
FIG. 13 is a cross-section showing a first cartridge valve, usable in the pneumatic system of FIG. 2, in a first operative position.

It is seen in looking at FIG. 13 that flange **370*a* is seated on valve seat 358, preventing travel of air between chamber 356 and chamber 352; and valve member 369 is spaced from valve seat 360*d*. Also, in this position, the bottom edge 370*c* of the extension member is seated against an outward extending protrusion or shoulder 360*e* of the base member. The shoulder thus serves as a stop or means to limit the sliding of the extension member relative to the base member. As will also be seen, the cartridge valve 344 is manually installed in the position shown by applying pressure on the extension member toward the base member. Shoulder 360*e*** directly transfers the applied force from the extension member to the base member, without distorting the springs from their normal operating range.

Figure 14:
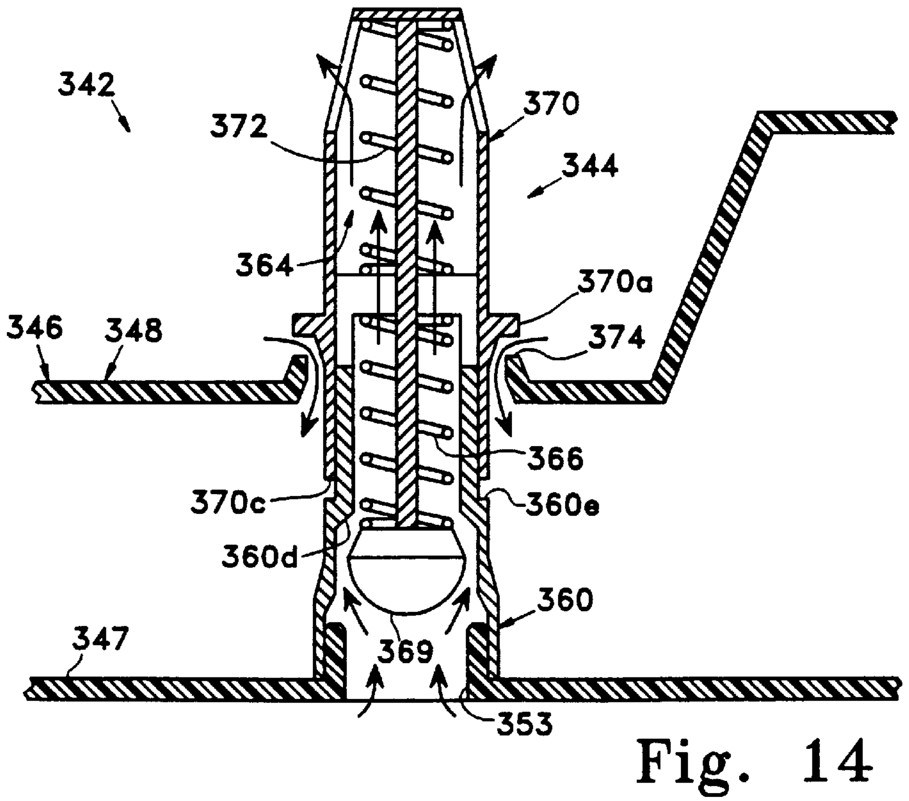
FIG. 14 is a view similar to FIG. 13 showing the first cartridge valve in a second, intermediate position.

In FIG. 14 the cartridge valve is shown with the extension member in an intermediate position in which neither of valve seats **360*d* and 370*b* are closed. Air is thereby allowed to flow from high-pressure chamber 350 through passageway 364, into controlled-pressure chamber 356, and out into low-pressure chamber 352**, as shown by the flow arrows.

Figure 15:
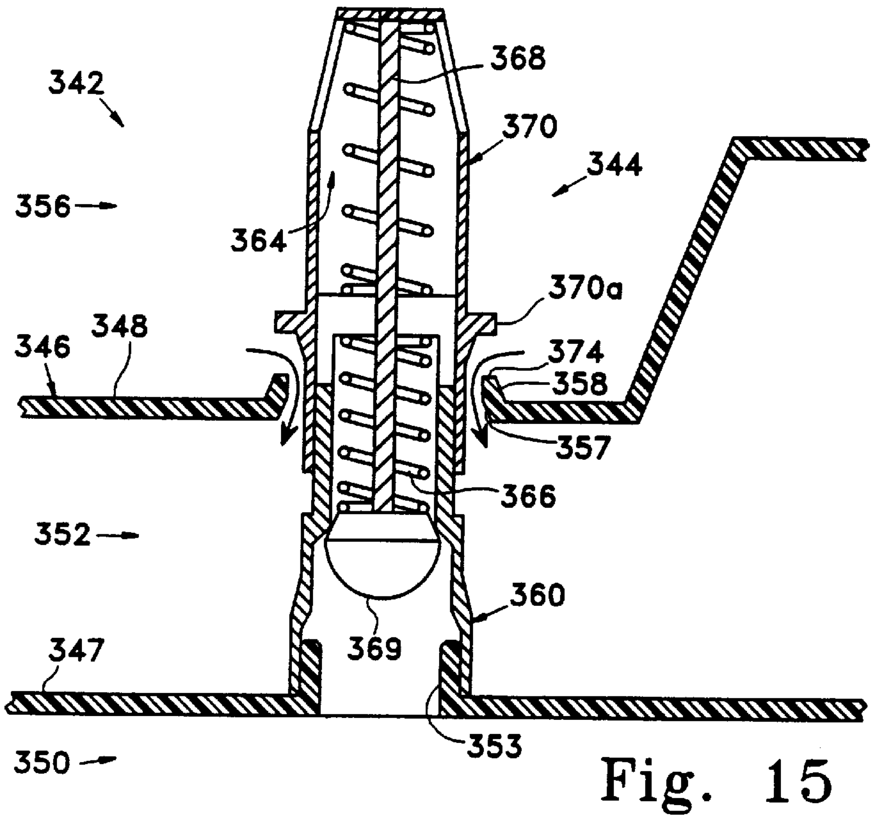
FIG. 15 is a view similar to FIG. 13 showing the first cartridge valve in a third operative position.

FIG. 15 shows cartridge valve 344 in a terminal position in which extension member 370 is in a fully raised position relative to the base member. Travel of the extension member upwardly is stopped by the seating of valve member 369 against valve seat 360*d*. Air flow port 357 is open. The mattress cell associated with valve assembly 342 is thereby deflated, being allowed to have the same internal pressure as the low-pressure chamber.

Cartridge valve 344 thus provides full control of the pressure in chamber 356 by selective or combined communication with the pressure chambers 350 and 352. It is a flow-force-balanced, open-center, dual-poppet, throttle valve. The inlet and outlet ports are controlled simultaneously and are inversely configured. As the input port is opened, the outlet port is closed, and visa versa.

The flow forces on the valve are balanced. An increase in flow through the inlet tends to close the inlet, and therefore open the outlet. At the same time, an increase in the flow through the outlet tends to close the outlet, and therefore open the inlet. Since the same flow passes through both inlet and outlet, changes in flow have little effect on the net forces on the springs. With the forces netting to zero, the drive or control force is minimized.

Figure 16:
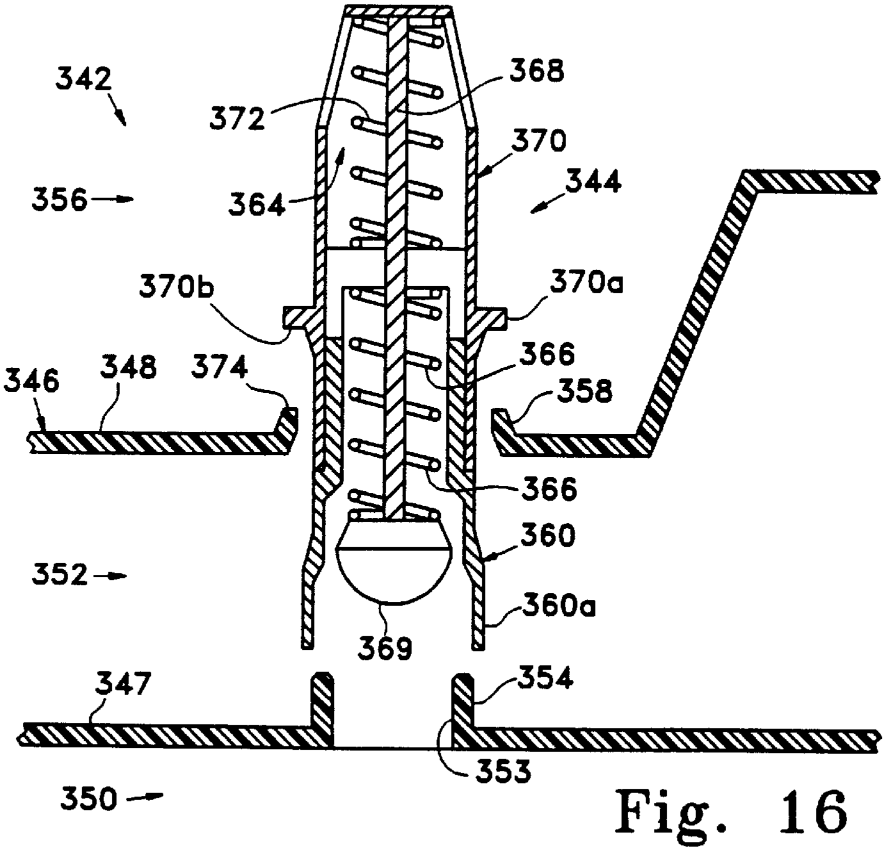
FIG. 16 is a view similar to FIG. 23 showing the first cartridge valve being installed.

As has been mentioned, cartridge valve 244 is manually installable and removable in housing 346. FIG. 16 further illustrates the position of the cartridge valve during installation or removal. The base member is positioned into port 357 until the lower end 360*a* seats on ridge 354, after which pressure is applied until the position shown in FIG. 14 is reached. Upon removal, pressure is applied upwardly on the extension member until the position shown in FIG. 15 is reached. During removal, the force applied to the extension member is mechanically transferred to the base member via shaft 368 and valve member 369.

An alternative cartridge valve assembly 374 is shown in FIGS. 17, 18, 19 and 20. Assembly 374 includes a dual-acting cartridge valve 375 mounted in a housing 376 having an upper wall 377 adjacent to the top surface of a bed section, an intermediate wall 378, and a lower wall, not shown. A low pressure chamber 379 exists between the upper and intermediate walls. A high pressure chamber is below the intermediate wall. An insert connector 228 connects a mattress cell, such as a cell 222 to valve 375 via a pressure-controlled chamber 381. Wall 377 has an opening 377*a* coupling chambers 381 and 379. Wall 378 has a raised section 378*a* with an inward flange 378*b* with an internal opening 378*c* coupling chambers 379 and 380. Four raised tabs, such as tabs 378*d* and 378*e*, are spaced around raised section 378*a*.

Figure 17:
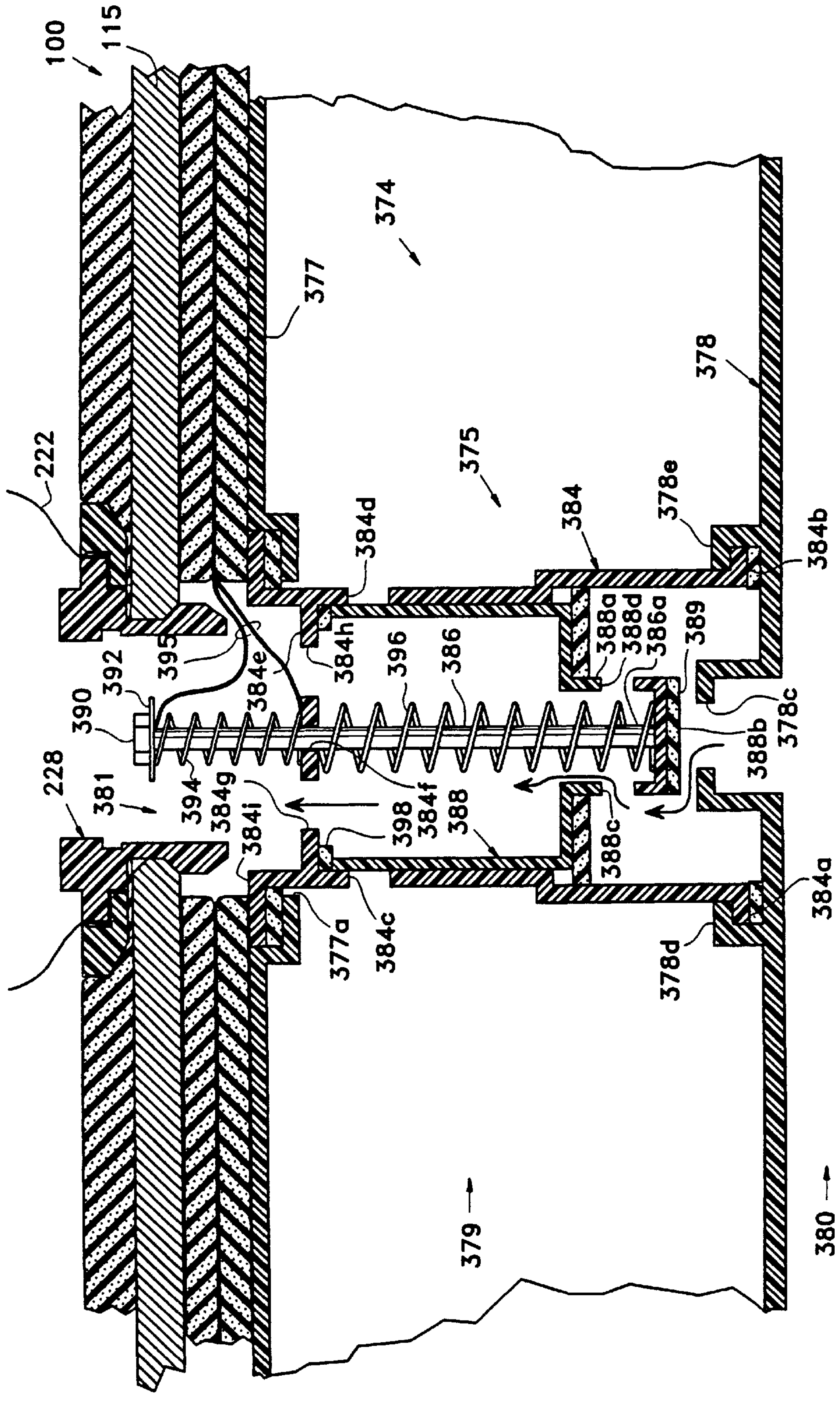
FIGS. 17 and 18 are views similar to FIG. 8 of a second cartridge valve assembly in two operating positions.

Cartridge valve 375 includes an outer sleeve 384 having radially extending feet, such as feet 384*a* and 384*b* at the lower edge, corresponding to tabs 378*d* and 378*e*. Sleeve 384 is rotated during installation on wall 378 so that the feet are frictionally secured under the tabs, as is shown in FIG. 17 and illustrated in FIG. 20.

A set of four exhaust ports, such as ports 384*c* and 384*d* are disposed at spaced locations around the upper periphery of the walls of sleeve 384. A recessed top 384*e* has a central bore 384*f* sized for receipt of a shaft 386. Disposed radially outwardly from bore 384*f* are a plurality of vents, such as vents 384*g* and 384*h*. A radially-extending, raised mounting flange 384*i* is sealingly seated on wall 377.

Figure 18:
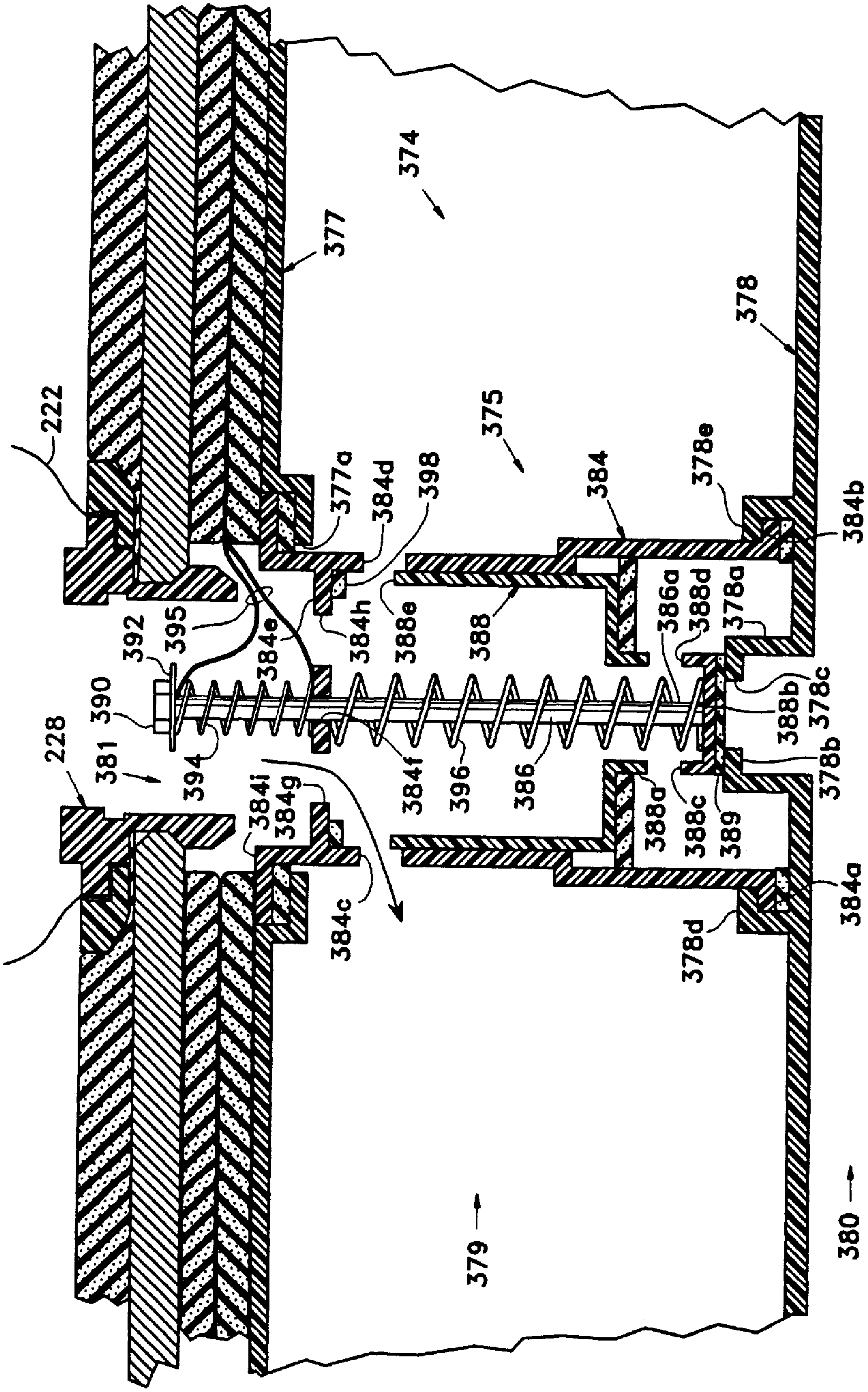

A generally cylindrical insert 388 is sized for sliding inside sleeve 384. Insert 388 is open at the top and has a well portion 388*a* extending downward from the bottom. Well portion 388*a* has a closed bottom 388*b* covered with a resilient pad 389, sized to close opening 378*c* when seated on flange 378*b*, as is shown in FIG. 18. There are a plurality of lateral openings, such as openings 388*c* and 388*d*, in well portion 388*a*. The upper edge 388*e* of insert 388 is low enough to leave exhaust ports 384*c* and 384*d* uncovered when pad 389 is seated on flange 378*b*.

Shaft 386 has a lower end 386*a* attached to bottom 388*b*. The shaft extends slidingly through bore 384*f* to a top end 386*b* threaded to receive a bolt 390 anchoring a washer 392. A heat-sensitive spring 394 is disposed between washer 392 and sleeve top 384*e*. Spring 394 is heated by electricity from wires 395. A standard compression spring 396 is disposed between sleeve top 384*e* and insert bottom 388*b*. Spring 394 urges insert 388 to the lower or exhaust position shown in FIG. 18 in which the high pressure opening 378*c* is closed and exhaust ports 384*c* and 384*d* are open.

When spring 394 is heated, it expands, raising insert 388 and opening inlet opening 378*c*. In the fully raised position, as is shown in FIG. 17, top edge 388*e* extends above exhaust ports 384*c* and 384*d*, closing them. This top edge preferable seats against a resilient O-ring 398 positioned inside sleeve 384 against top 384*e*. In this raised position, the pressure in the pressure chamber is increased, since the exhaust ports are closed and communication is provided with high pressure chamber 380.

Figure 21:
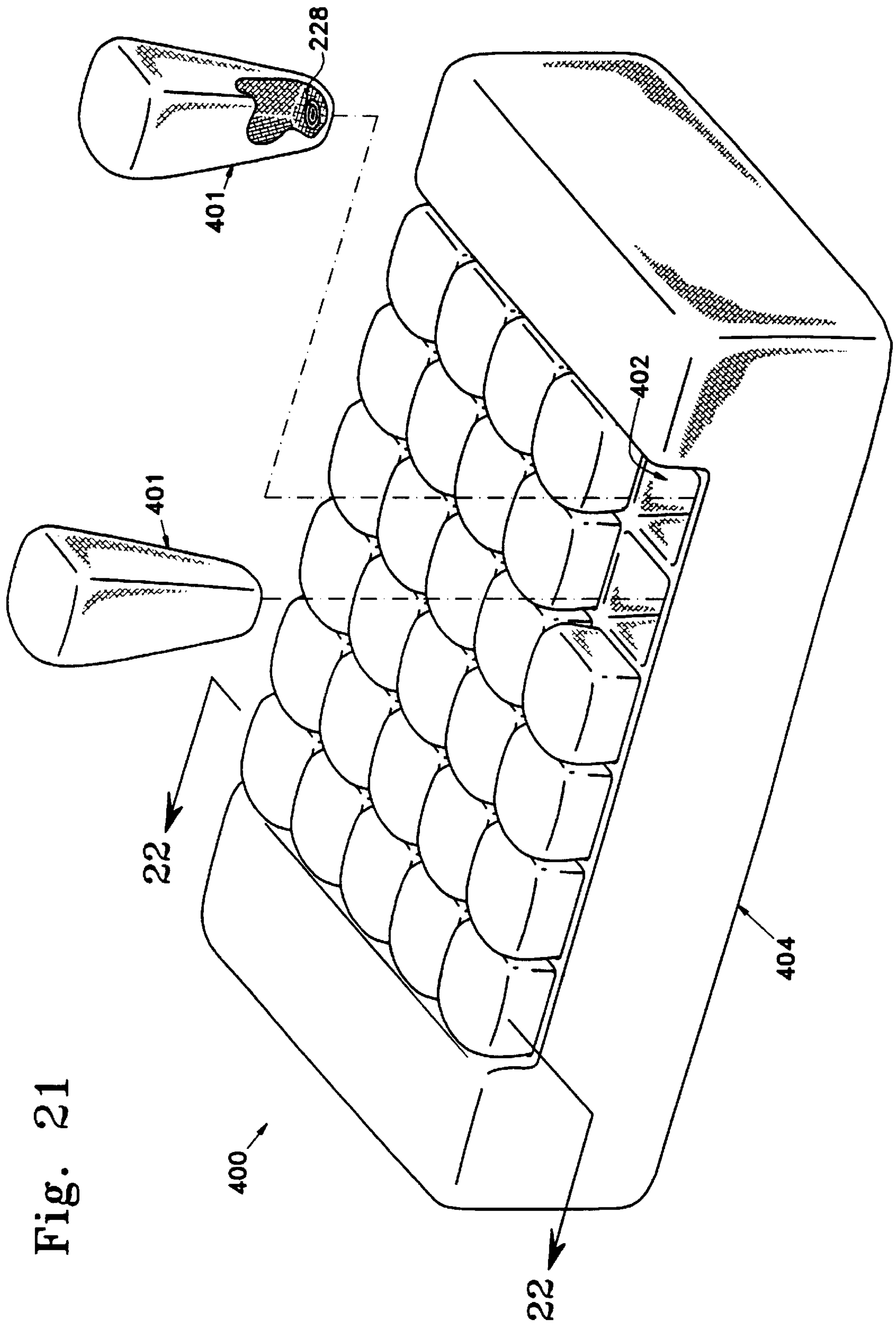
FIG. 21 is an isometric view of a portion of a second embodiment of a mattress made according to the invention.
Figure 22:
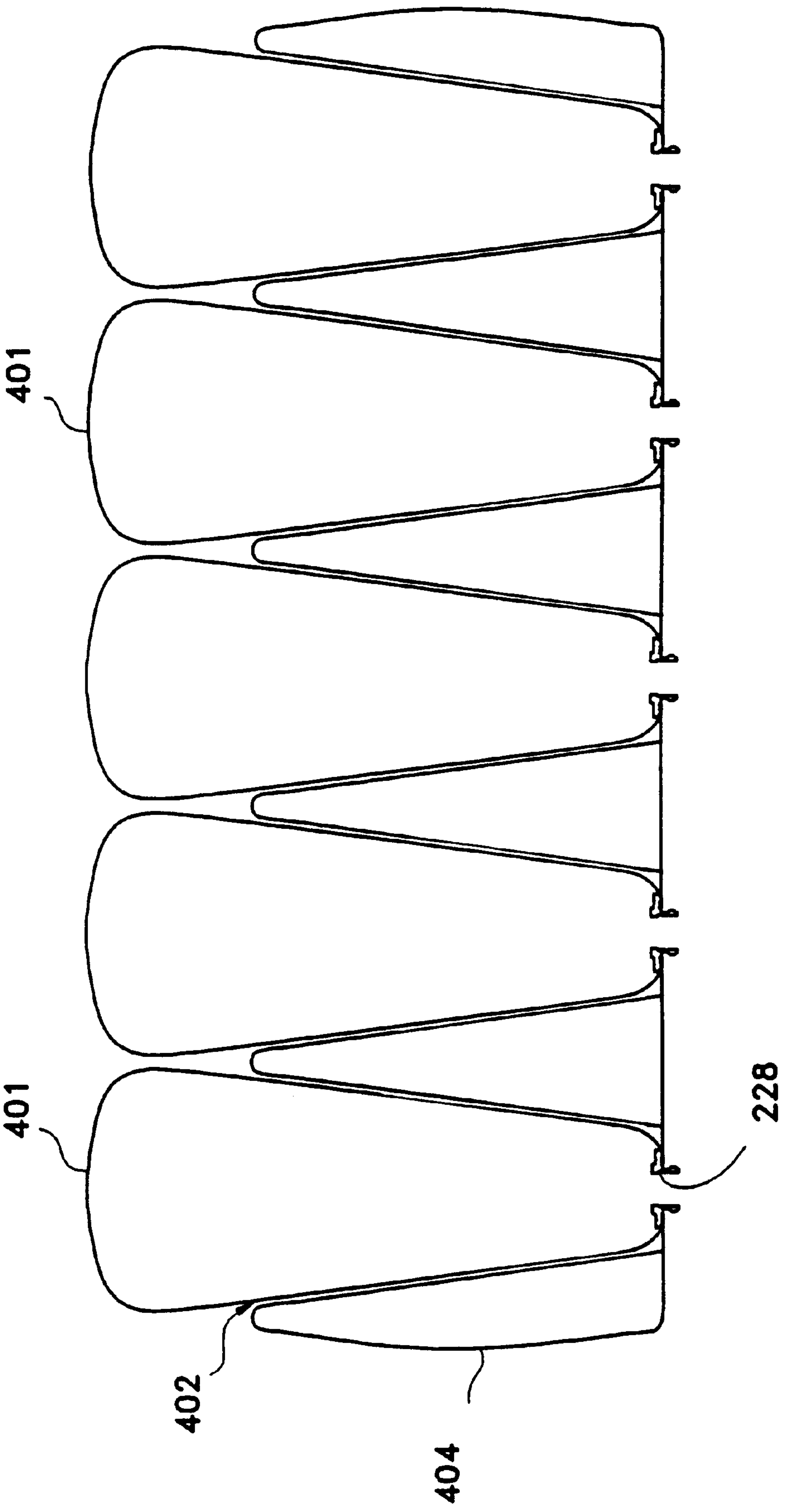
FIG. 22 is a simplified cross-sectional view showing the structure of the mattress of FIG. 21.

An alternative mattress structure is shown in FIGS. 21 and 22. FIG. 21 shows a mattress section 400 as is mounted on a single platform link or panel, such as one of panels 108–111. Such a section may be mounted on each of the four panels to form a bed having a uniform mattress. Clearly, the mattress sections can be varied to achieve a combination of capabilities.

Mattress section 400 includes 30 individual cells 401 that may be individually controllable, as is described in the previously referenced U.S. Pat. No. 5,023,967. Each cell has an insert connector 228, as was described with reference to FIG. 2, for connection to a coupling port of the top plate of a platform panel. The cells have a four-sided, inverted frustum-pyramidal shape, as shown, and are matingly received in correspondingly shaped cups, shown generally at 402.

Cups 402 are formed in a base mattress cell 404 that is maintained at a constant, fully inflated pressure. Alternatively, cell 404 could be formed of a semi-rigid material that has similar pliability and strength as an inflated cell. Thus, when an individual cell 401 is deflated, the surrounding cells are prevented from flexing into the now "empty" cup by the strength of the adjoining cup walls.

Figure 23:
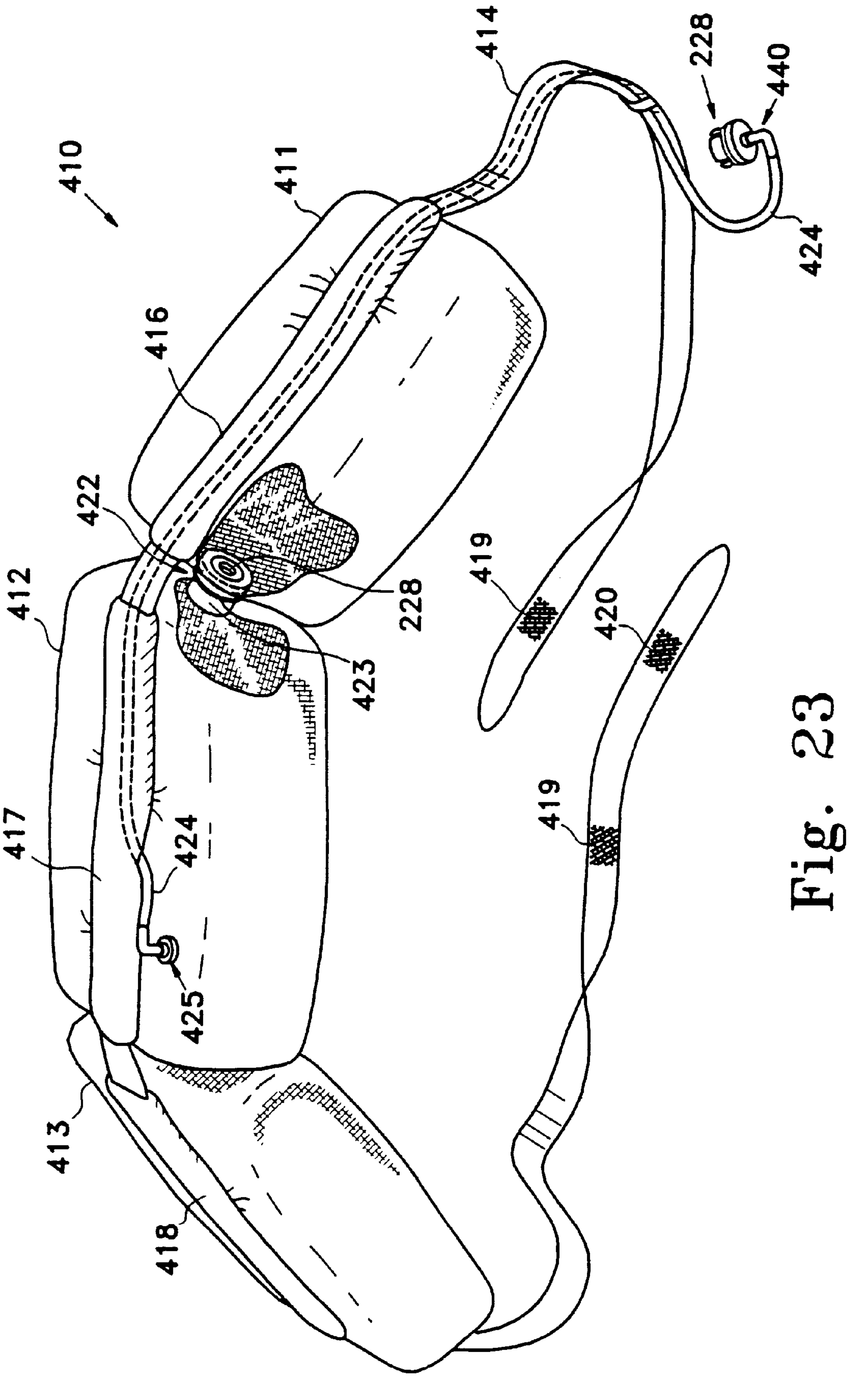
FIG. 23 is an isometric view of a restraining cushion system made according to the invention.
Figure 24:
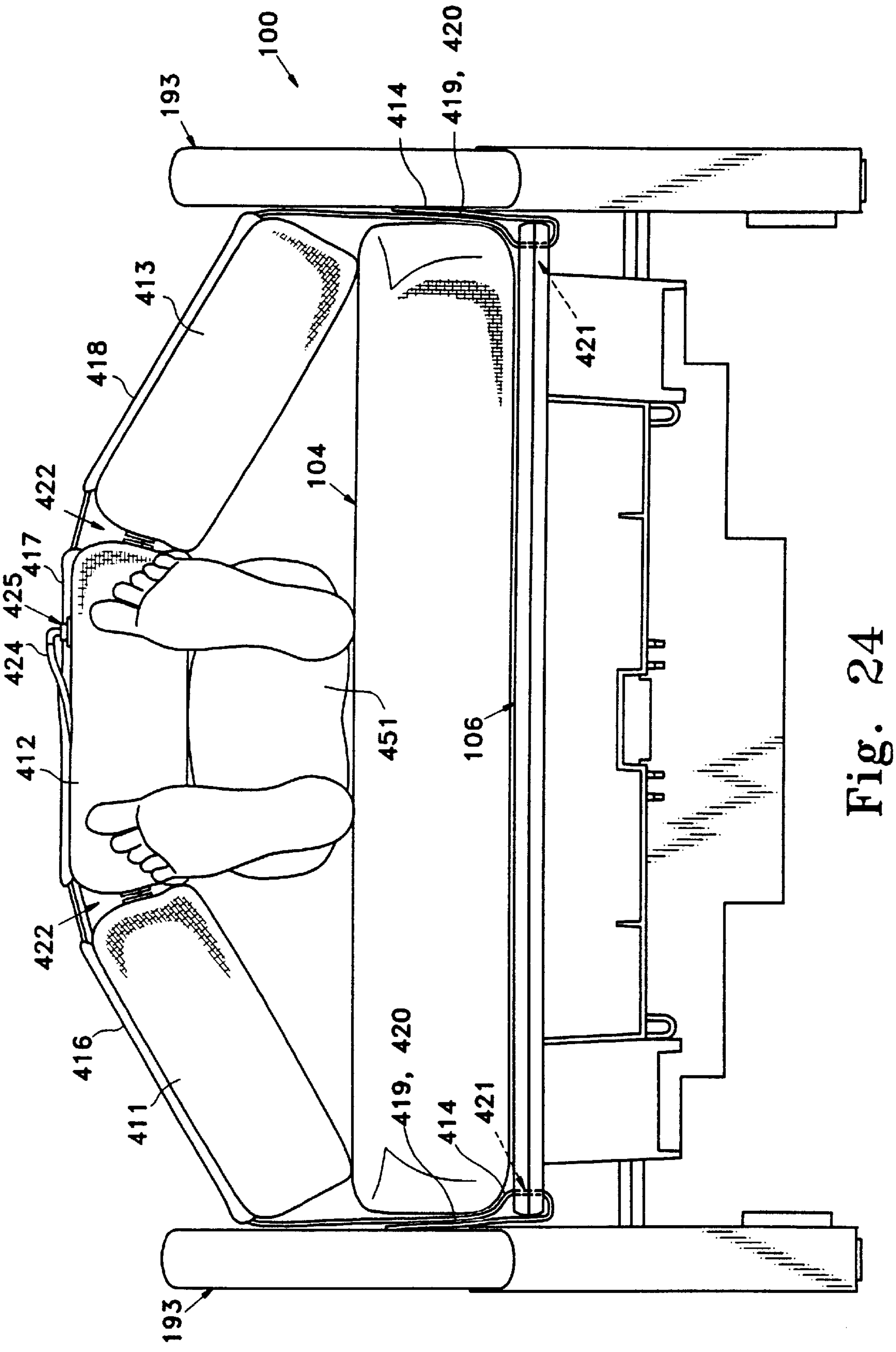
FIG. 24 is an end view of a bed showing the restraining cushion system of FIG. 23 in use.

The present invention also includes a cushion system for restraining the movement of a person on a bed. These cushions are shown in FIGS. 23–29. In particular, FIGS. 23 and 24 illustrate a restraining belt system 410 including three inflatable cushions 411, 412 and 413. These cushions are supported serially by a belt 414 that is held on a common, upper face of the cushions by respective sleeves 416, 417 and 418. Belt 414 is preferably slidable in the respective sleeves relative to the cushions. At each end of belt 414 are hook and loop fabric pieces 419 and 420 for securing the belt through a slot 421 in the platform panel edge, as is shown in FIG. 24. FIG. 24 shows an end view of the restraining belt system 410 fastened to a bed panel 109.

Figure 28:
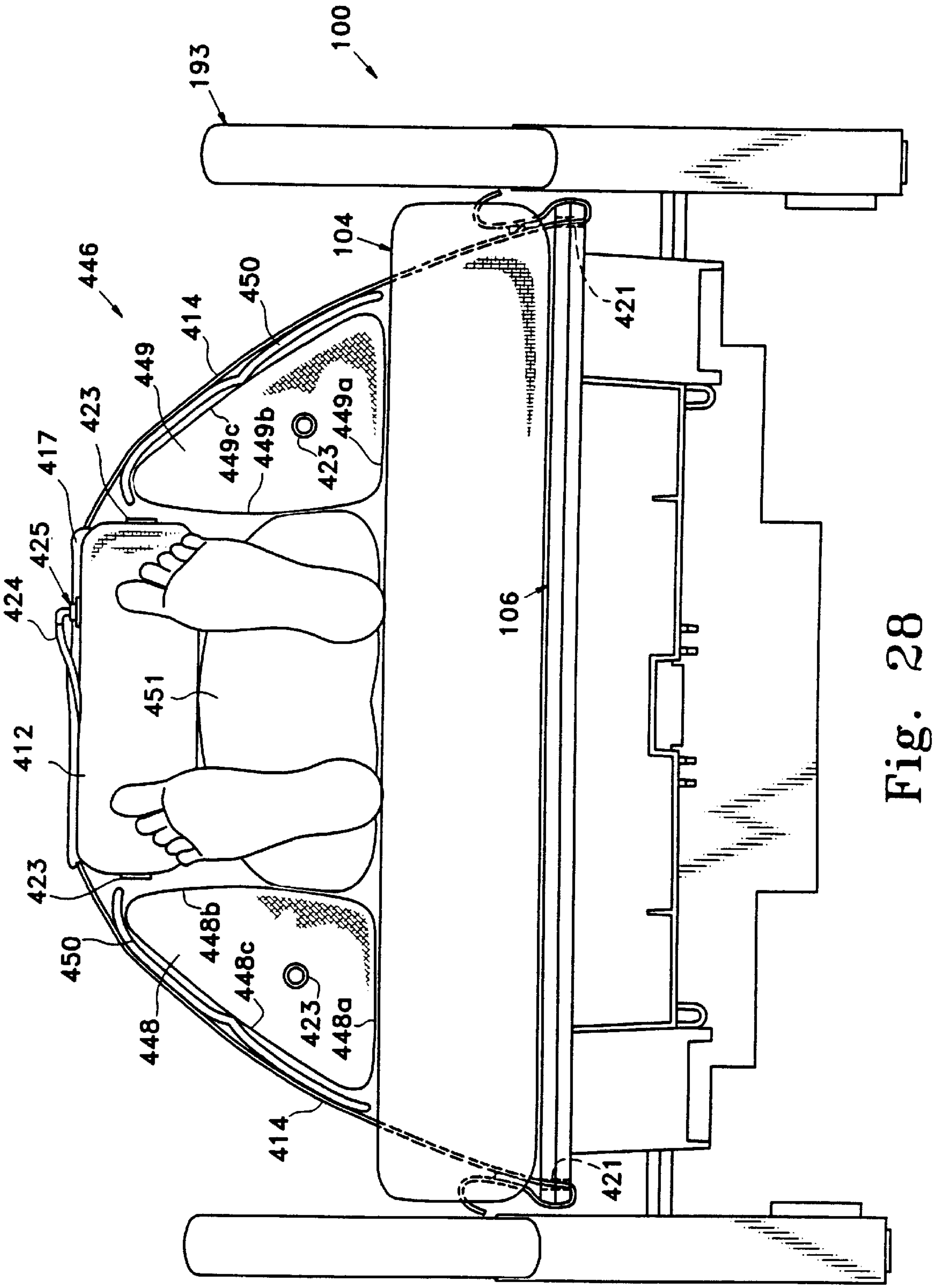
FIG. 28 is an end view of a bed showing the use of an alternative restraining belt system.

Cushions 411 and 413 are each connected to cushion 412 by a connector assembly 422, including an insert coupling member or connector 228 and a connector coupling member or receptacle 423, described in further detail with reference to FIGS. 25 and 26. Cushions 411 and 413 are thereby inflated directly from cushion 412. Receptacle 423 also functions as a check valve, so that when the end cushions 411 and 413 are disconnected, cushion 412 stays inflated, as is shown in FIG. 28.

Cushion 412 is inflated via a tube 424 that extends through sleeves 417 and 418, and along belt 414 to an insert connector 228 with a tube reducer 440 for attachment to the tube. The tube is connected to cushion 412 by a tube connector assembly 425. The tube end insert connector 228 is connected to a connector receptacle 423 mounted in a base mattress cell 222', as is shown in FIG. 1 and in FIG. 27.

FIG. 25 illustrates a connector assembly 422 formed of an insert connector 228 and a connector receptacle 423, such as is used between cushions 411 and 412 or between cushions 412 and 413. Connector receptacle 423 includes an outer member 427 having a general U-shape with walls 427*a* forming an inner cavity and having an open end 428 and an inward-directed lip or flange 427*b* defining a reduced opening 429. Around opening 429 is a recess 427*c*. Just inside walls 427*a* from open end 428 is a slight groove 427*d* sized to receive a corresponding ridge 430*a* of a seal member 430. Positioned inside outer member 427 in a disk chamber or cavity between flange 427*b* and a shoulder 430*b* of seal member 430 is a disk 431 that is freely movable therebetween. When pressed against shoulder 430*b* such as when the insert connector is removed, a seal is formed, maintaining the pressure in a cell or cushion the connector receptacle is mounted in. When an insert connector 228 is inserted into an opening 432 extending through seal member 430, as is shown in the figure, the disk is held away from shoulder 430*b*, allowing air to flow around it.

Insert connector 228 includes a ring 434 having an inner diameter $D_3$ and inward-directed flange 434*a* defining a reduced diameter $D_4$. An insert member 436 defines a passageway 437. At one end is an outward-directed flange 436*a* having a shoulder 436*b*. Flange 436*a* is received by friction fit in the recess formed by flange 434*a* of ring 434. Extending away from flange 436*a* are a plurality of fingers 436*c* having longitudinally extending slits 438. These slits allow the fingers to flex inwardly during insertion and removal from a connector receptacle, and allow for the passage of air around disk 431 when received in a connector receptacle. Adjacent to the end 436*d* associated with flange 436*a* is an inner groove 436*e*. The diameters of groove 436*e* and recess 427*c* are the same.

FIG. 26 shows a tube connector assembly 425 for connection to a tube 424, as shown in FIG. 23. Assembly 425 includes disk-like reducer 440 having an outer diameter sized to be received with a friction fit in a recess 427*c* or a groove 436*e*, as is shown in phantom lines in FIG. 25, or in a reducer mounting ring 443, as is shown in FIG. 26. An inner opening 441 is defined by walls 440*a* threaded to receive a tube adaptor 442 that is connectable to a tube such as tube 424.

Figure 27:
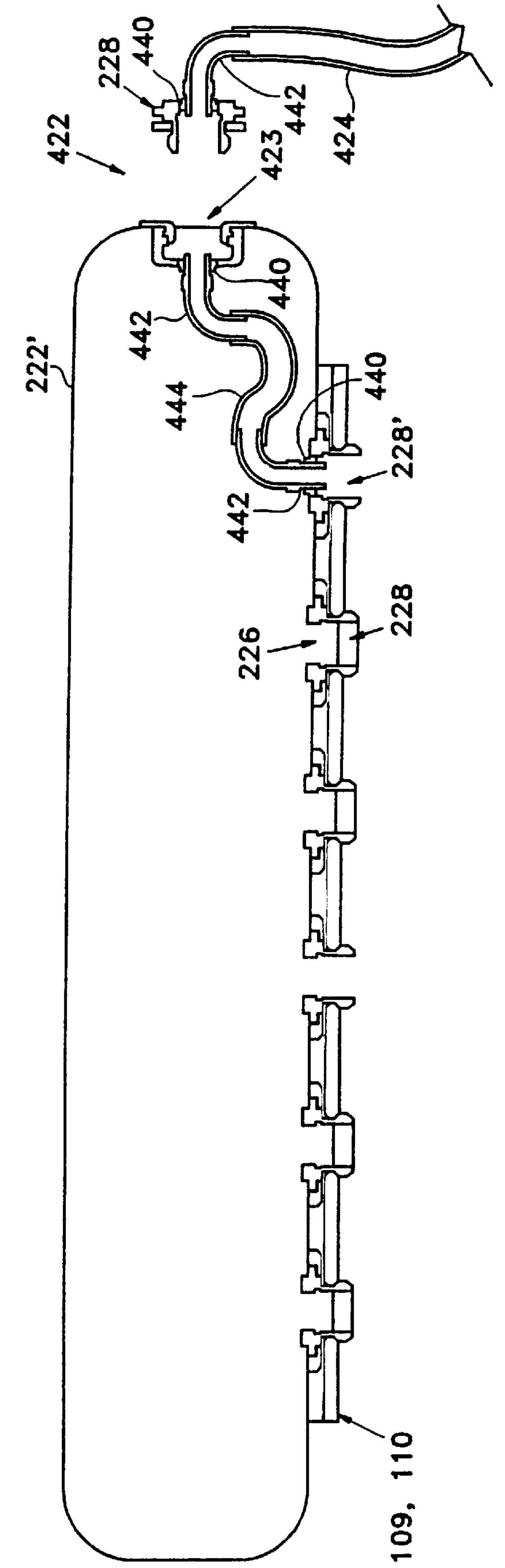
FIG. 27 is a cross-section of a cell modified to provide communication of the air supply with a secondary cell.

FIG. 27 shows a cross section of a cell 222' cut away to show the internal structure. Cell 222' is inflated through an inlet port 226 defined by an insert connector 228 connected to a coupling port of the top plate of a panel, as has been described with reference to FIG. 2. However, cell 222' also has a second insert connector 228' to which is attached a reducer assembly 426. Assembly 426 is connected to a conduit or tube 444, the other end of which is connected to a second reducer assembly 426 mounted on a connector receptacle 423, also referred to as an outlet coupling member, mounted on the end of cell 222', as shown. Tube 444 thus is means for joining insert connector 228' to receptacle 423 in the end of cell 222'. The insert connector shown on the end of tube 424 in FIG. 27 is insertable in receptacle 423 to provide inflation of the restraining cushions shown in FIGS. 23 and 24.

Figure 29:
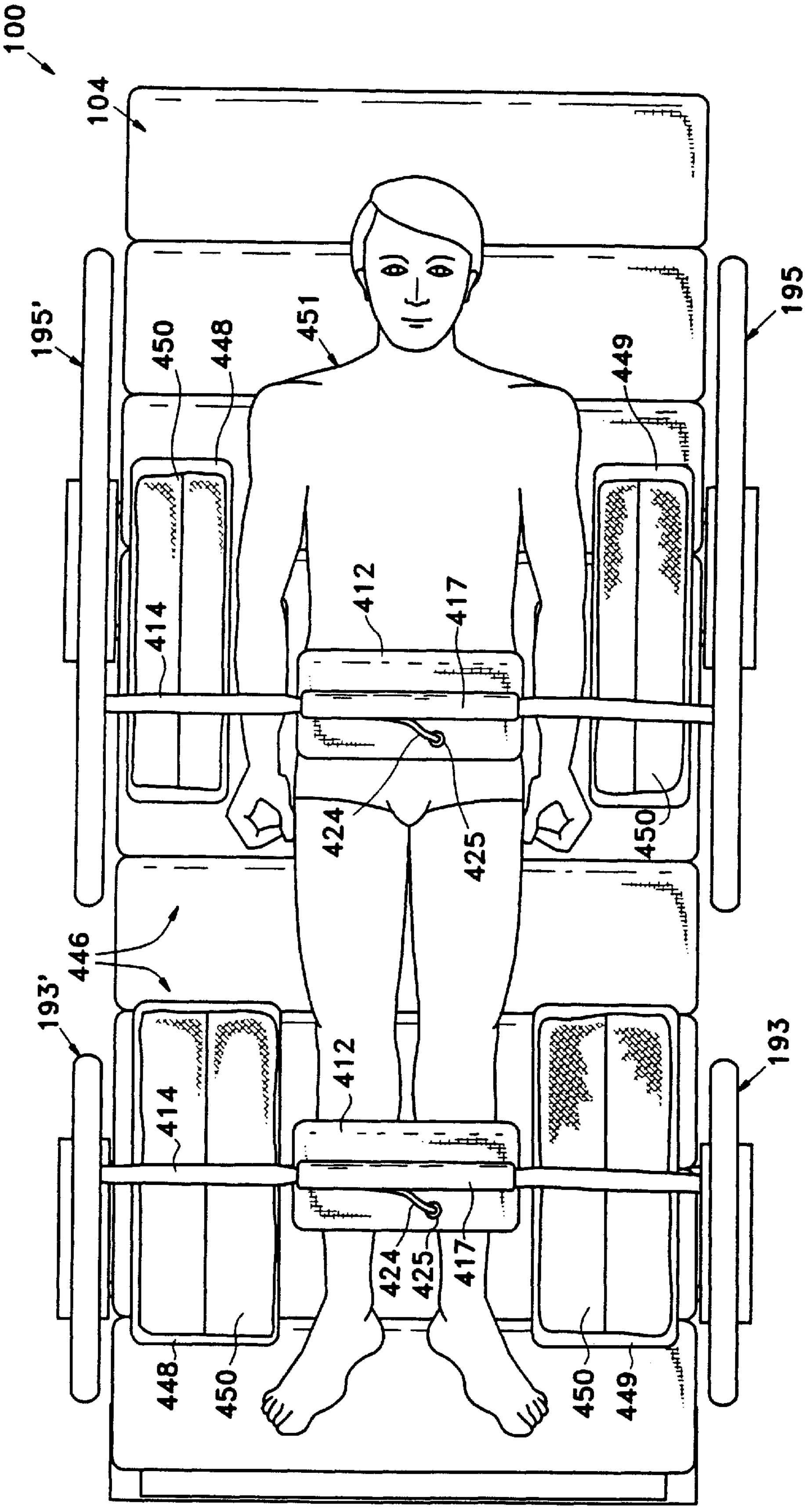
FIG. 29 is a top view of the bed of FIG. 28.

FIGS. 28 and 29 illustrate an alternative restraining system 446 that includes all the parts of belt system 410 except the outer cushions 411 and 413. As a result, for clarity of illustration, those parts that are common to belt system 410 have the same reference numbers. Replacing the outer cushions are extended side cushions 448 and 449. As particularly shown in FIG. 28, these side cushions have a right-triangle cross section, preferably in the ratio 3–4–5. In the preferred embodiment short sides 448*a* and 449*a* have lengths of 6 inches, long sides 448*b* and 449*b* have lengths of 8 inches, and hypotenuses 448*c* and 449*c* have lengths of 10 inches. A protective stretch or web of a fabric tether 450 is generally coextensive with the hypotenuse and is attached along the length of the hypotenuse, as shown.

Each side cushion is inflated via a connector receptacle 423 that functions as a check valve to prevent leaking after inflation. Alternatively, the side cushions can be left connected to an inflating tube all the time.

As shown in FIG. 29, when restraining belt system 446 is used to contain the legs of a patient 451, long sides 448*b* and 449*b* are placed against the top surface of the mattress. However, when the belt system is used to restrain the torso, since the torso is wider on the bed and extends higher above the bed than the legs, the short sides 448*a* and 449*a* are placed on the mattress surface, thereby accommodating the variations in the patient's body structure without using different cushions.

FIGS. 30–35 illustrate the structure and operation of a pneumatic release valve 472 mounted on the head end of panel 108, as shown in FIG. 2. Valve 472 includes a housing 474 with an elongate box section 474*a* that has an inner chamber 475 that couples an exhaust inlet port 474*b* to an exhaust outlet port 474*c*. Housing 474 is pivotally coupled to panel 108 by rings 474*d* and 474*e* mounted on the top surface and supported on a pivot rod 476. From each end of box section 474*a* extends a handle 474*f* providing for manual manipulation of the valve.

Figure 30:
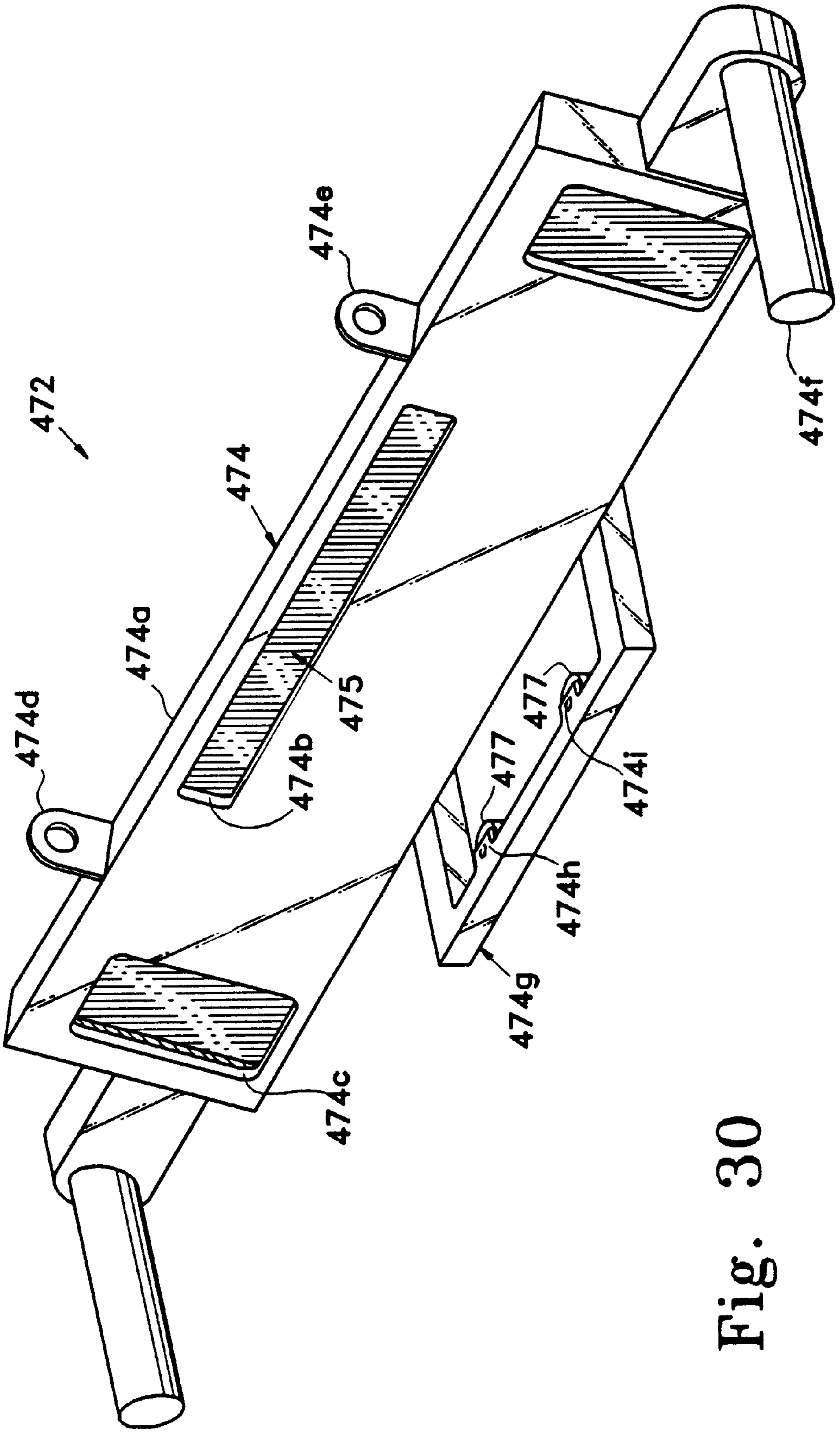
FIG. 30 is an isometric view of a pneumatic release valve made according to the invention.

As particularly shown in FIG. 30, extending under outer tray 210 of panel 108 is a U-shaped frame 474*g* having tapered nipples 474*h* and 474*i*. Mounted on each of these nipples is a roller 477 for engaging a recess 478*a* of a boss 478 extending down from the bottom of tray 210. The recess functions as a detent to hold housing 474 in the operative position. When housing 474 is slid sideways along rod 476, the rollers move out of the recess and past the edges of bosses 478, thereby freeing the valve housing to pivot outwardly away from the face of the tray.

Figure 31:
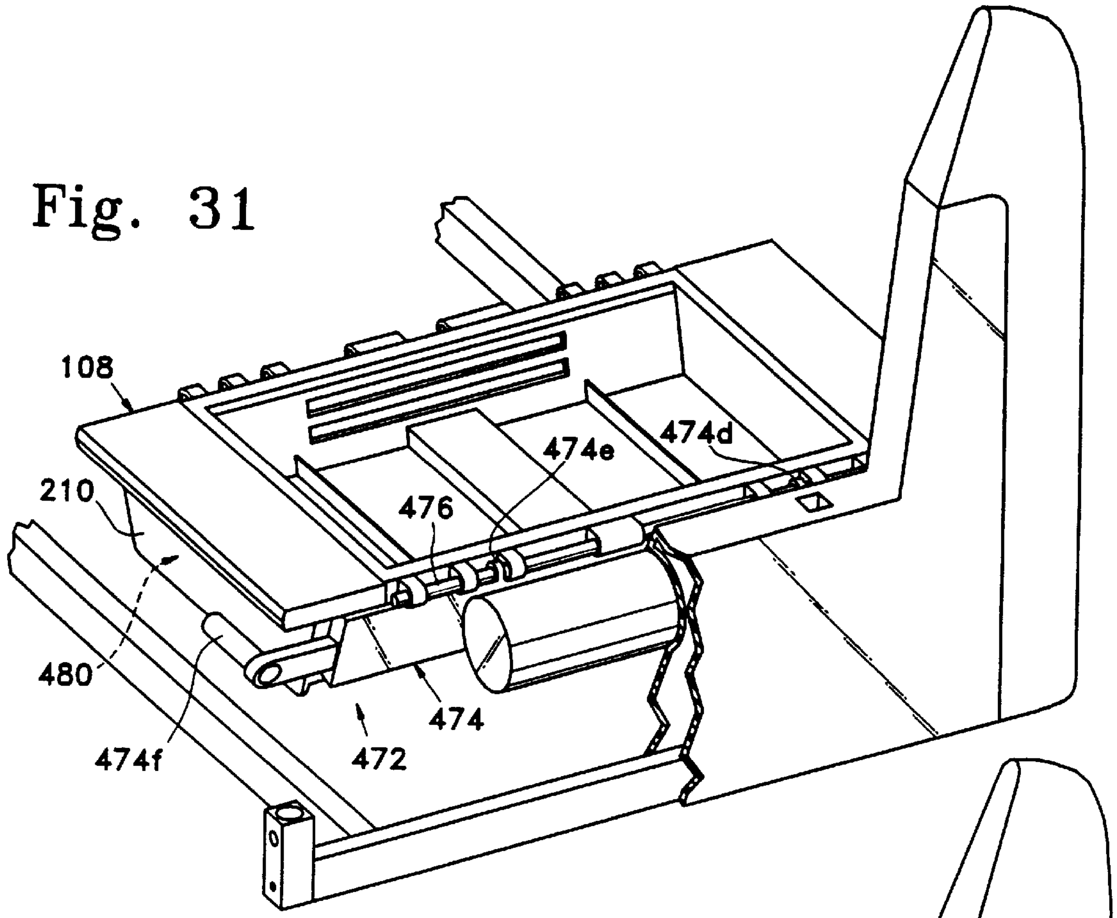
FIGS. 31 and 32 are partial fragmented, cut-away isometric views of a bed end made according to the invention showing two operating positions of the release valve of FIG. 30.
Figure 32:
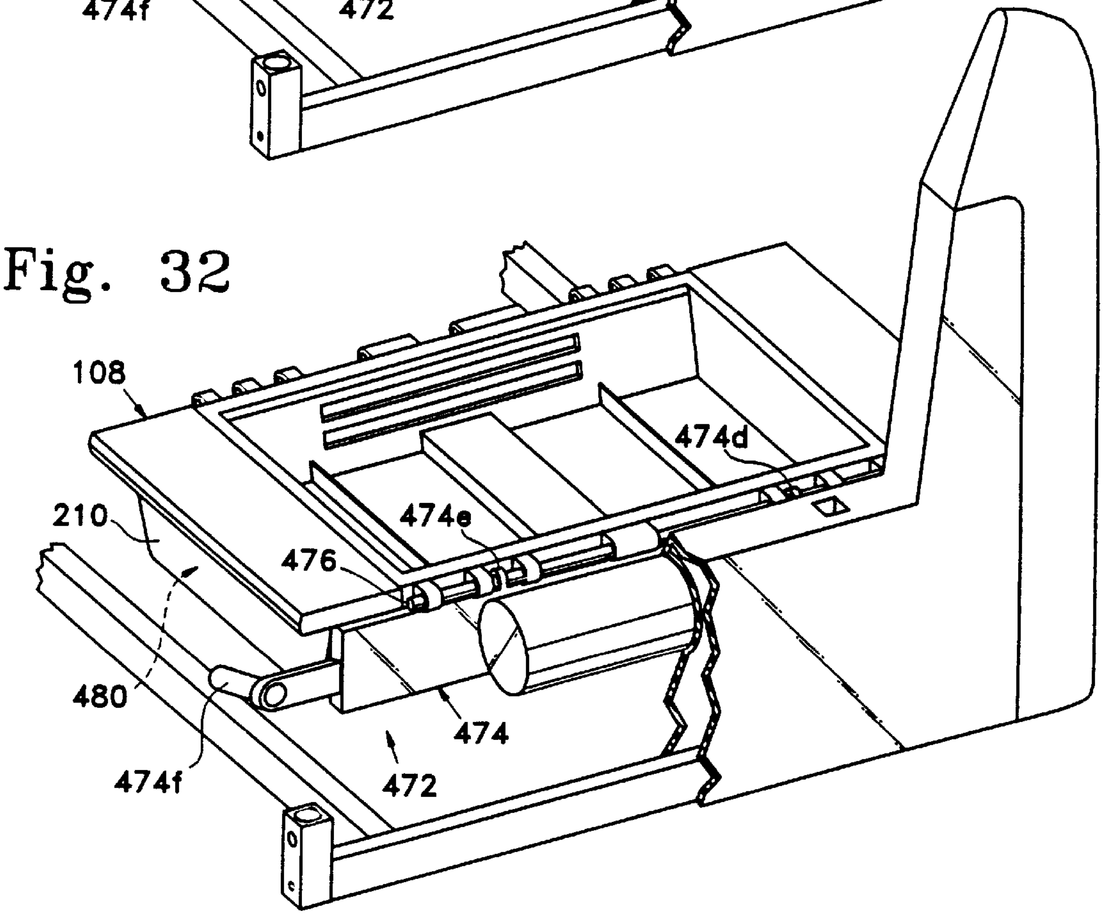
Figure 33:
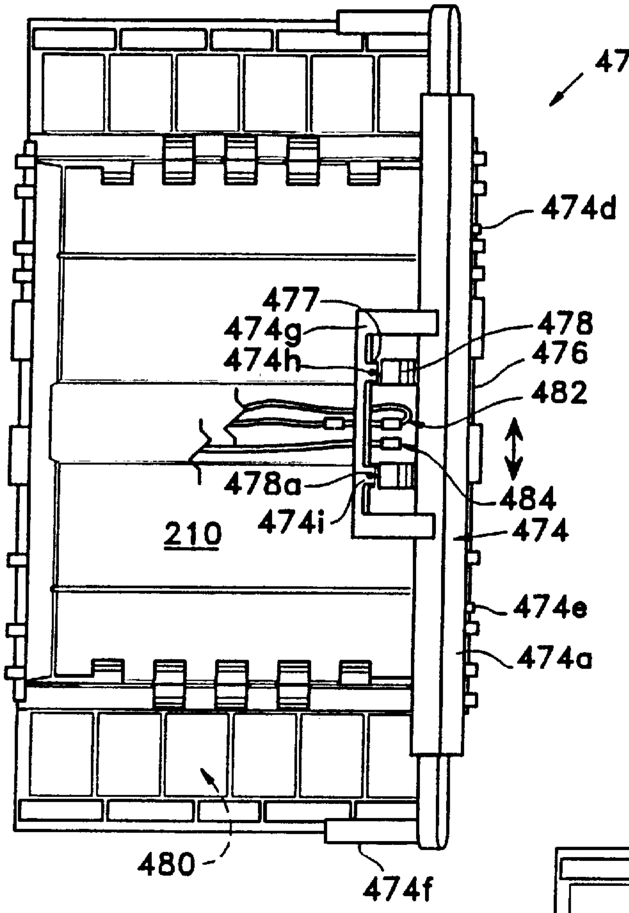
FIGS. 33 and 34 are plan views of a portion of the underside of the bed end of FIGS. 31 and 32 showing further structure of the release valve of FIG. 30.
Figure 34:
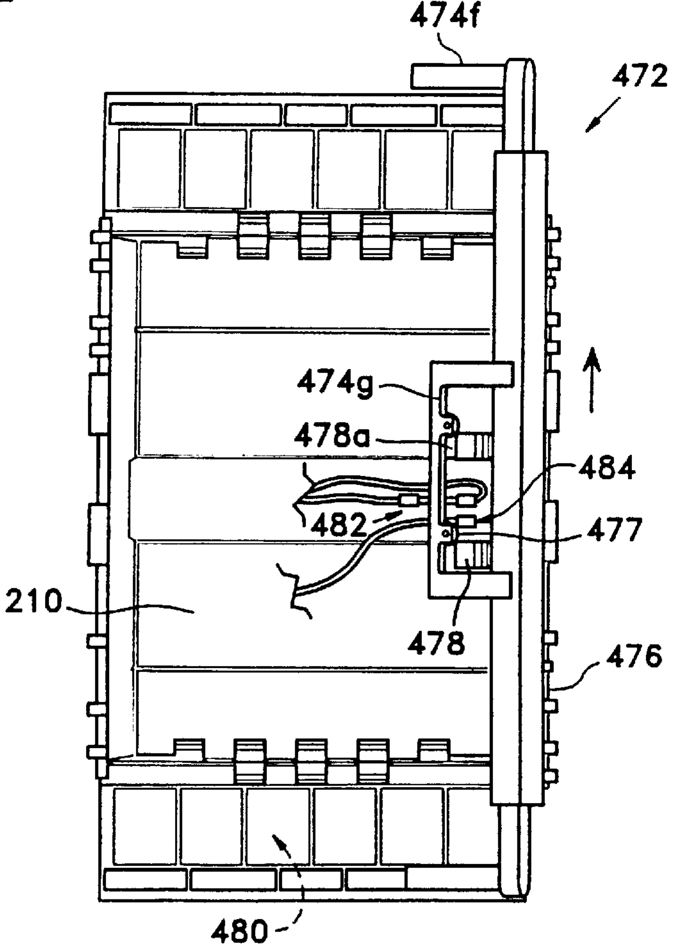
Figure 35:
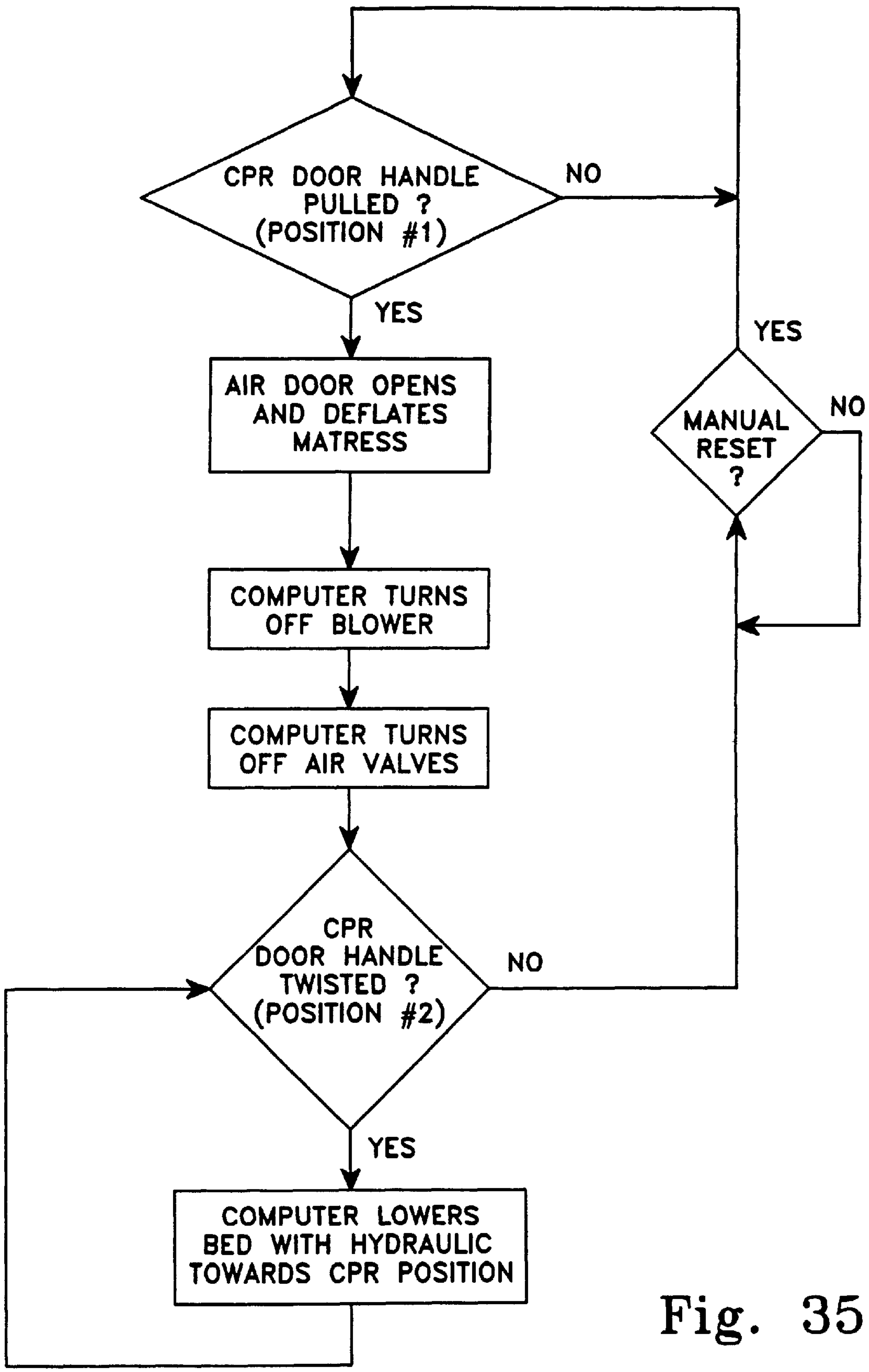
FIG. 35 is a flow chart of the basic operation of the release valve of FIG. 30.

When in the engaged or operative position shown in FIG. 31, the housing seals the high pressure chamber in the bottom of tray 210 and transmits the exhaust air from outlet port 216*b* through inner chamber 475 and through the sides of tray 210 in an open chamber 480 existing between the outer tray and the inner tray assembly, to be disbursed out holes not shown in the opposite side of the outer tray. When in the release position shown in FIG. 32, outlet ports 216*b* and 214*b* are both open to the atmosphere, thereby dumping all air from the blower and mattress cells.

When housing 474 is moved to the side to disengage rollers 477 from the respective boss 478, a switch 482 is activated. As shown in the flow chart of FIG. 35, this switch is connected to the bed processor for turning the blower off and opening all the valves. This completely collapses the mattress, providing a firm surface for the patient on the platform top plate. The handle 474*f* may then be further pulled open against a hydraulic switch 484 that lowers the bed to a flat position so long as pressure is applied to it. When pressure is released, the housing returns to the free-hanging open position and no further hydraulic operation takes place.

A pneumatic system 750 made according to an alternative embodiment of the invention is illustrated in FIGS. 36–44. System 750 includes a bed platform 752 formed of a plurality of mutually articulatable panels, including head panel 754, chest panel 755, seat panel 756, thigh panel 757, and foot panel 758. Platform 752 is supported relative to a floor such as is shown for bed 100.

Figure 36:
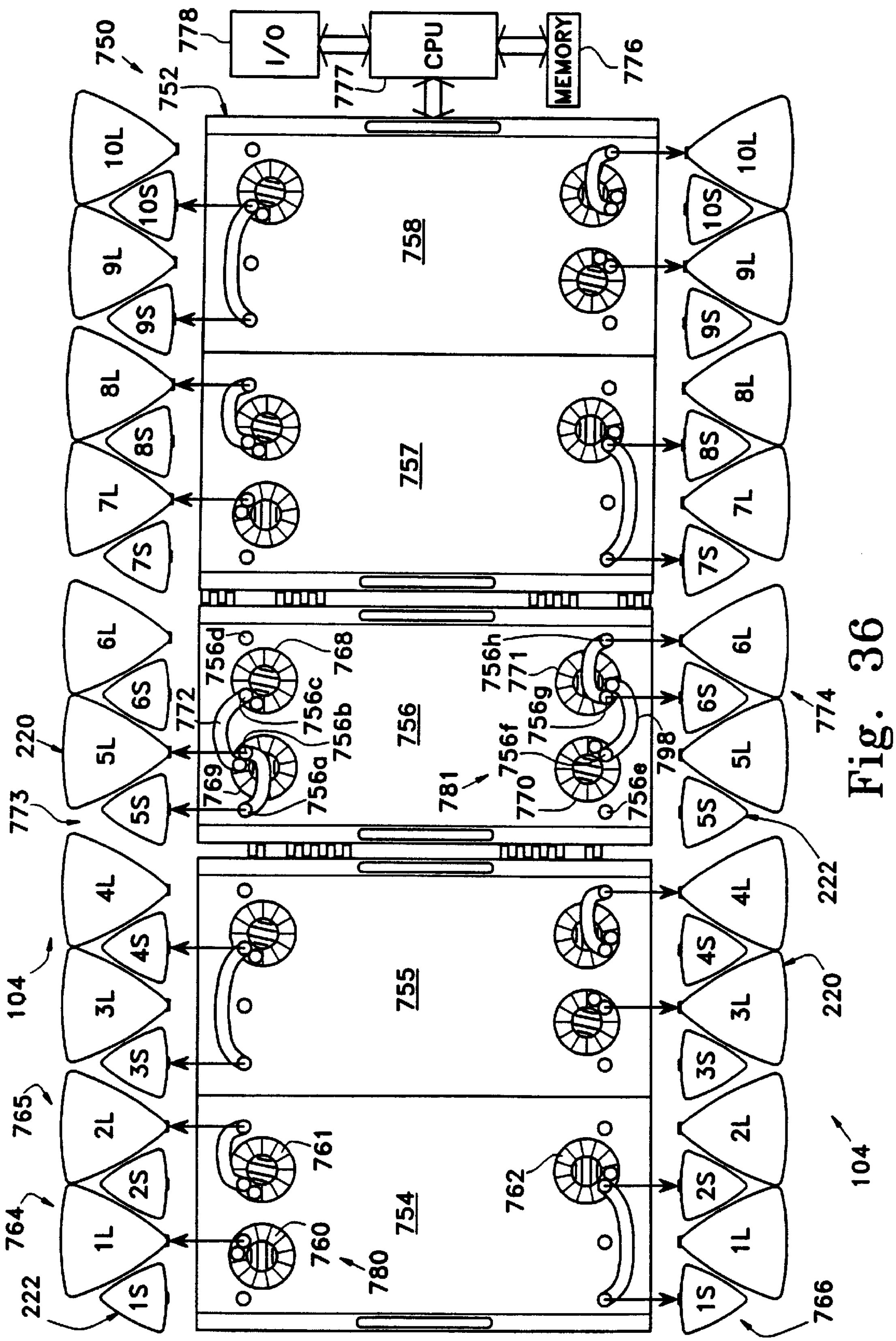
FIG. 36 is a schematic illustration of a bed having a distributed-source pneumatic system made according to the present invention.

Each panel has a plurality of passageways, such as passageways 756*a*–756*h* in the seat panel. Each passageway extends through the panel for providing air to mattress 104 formed of a plurality of sets of upper, large cushions 220 and base, smaller cushions 222, as has been described. For instance, head panel 754 has a fan 760 that inflates large cushion 1L, a fan 761 that inflates large cushion 2L, and a fan 762 that inflates small cushions 1S and 2S. Thus cushions 1L and 2L form cushion sets 764 and 765, and cushions 1S and 2S form set 766. Thus, as used herein, a set of cushions can have one or more cushions. Panels 755, 757 and 758 are structured similarly to panel 754, as shown in FIG. 36. However, seat panel 756 is structured a little differently.

Seat panel 756 has fans 768–771, also referred to as means for producing air flow. Fans 768 and 769 are mounted under the right end of the seat panel (when viewed from the foot of the bed) and fans 770 and 771 are mounted under the left end, as shown. Fans 768 and 770 are referred to as primary fans and fans 769 and 771 are referred to as secondary fans. Primary fan 768 has an inlet for receiving ambient air and an outlet connected through a duct 772 to secondary fan 769. Fan 769 then provides pressurized air for inflating a set 773 of cushions 5S and 5L. Fans 770 and 771 are similarly connected in series for inflating a set 774 of cushions 65 and 6L.

The fans thus are combined in widt may be referred to as sets of one or more fans. For example, fan 764 in the general sense forms a fan set 780 and series fans 770 and 771 form a set 781.

These fans are all identical and the motors are similar in structure to conventional muffin fan motors. They are driven by brushless DC, 4 coil, 12 volt, 25 watt motors, such as a motor available from PAPST, a company located in Heiligenstadt, Germany. These motors have a free speed that is proportional to the back emf. That is, the motor and fan blades rotate at a speed in which the back emf equals the applied voltage. The resulting pressure in the cushions is directly proportional to the rotational speed. Thus, the resulting pressure is substantially linearly related to the applied voltage.

The relationship between the applied voltage and the resulting pressure is selected from predetermined voltage/pressure data corresponding to typical fan performance. These values are either stored directly in a memory 776 for a CPU 777 using an appropriate input/output device 778, or are used to determine a continuous or incremented function and the function is stored in memory. A selected pressure, as input on device 778 or based on an appropriate pressure control program, is then used to determine or compute a corresponding applied voltage for each fan on platform 752.

Each individual fan produces a maximum cushion pressure of about 15 mm Hg. Each set of series connected fans produces a maximum pressure of about 30 mm Hg. The increased pressure that may be produced in the seat portion of the mattress is necessary to support the substantial weight of a person's torso when the panels are articulated to support the person in a sitting position.

It will be appreciated that other configurations of cushions, sets of cushions, fans, and sets of fans may be used depending upon the application involved. For instance a single, primary fan, such as blower 204 could be used to generate a base amount of air pressure, and then distributed fans could be used to apply incremental pressure increases for the various sets of cushions.

The specific embodiment of bed pneumatic system 750 is shown in FIGS. 37–44. Platform 752 is shown in particular in FIG. 37. In addition to the platform panels and the associated passageways, a slider assembly 782 is built into the underside of each panel, with four identical sliders, such as slider 784, also referred to as gate means. For simplicity of presentation, only the structure associated with seat panel 756, cushion set 774, and fan set 781 will be described. The corresponding structure that is used for inflating the other sets of cushions will then be apparent from FIG. 36.

Figure 37:
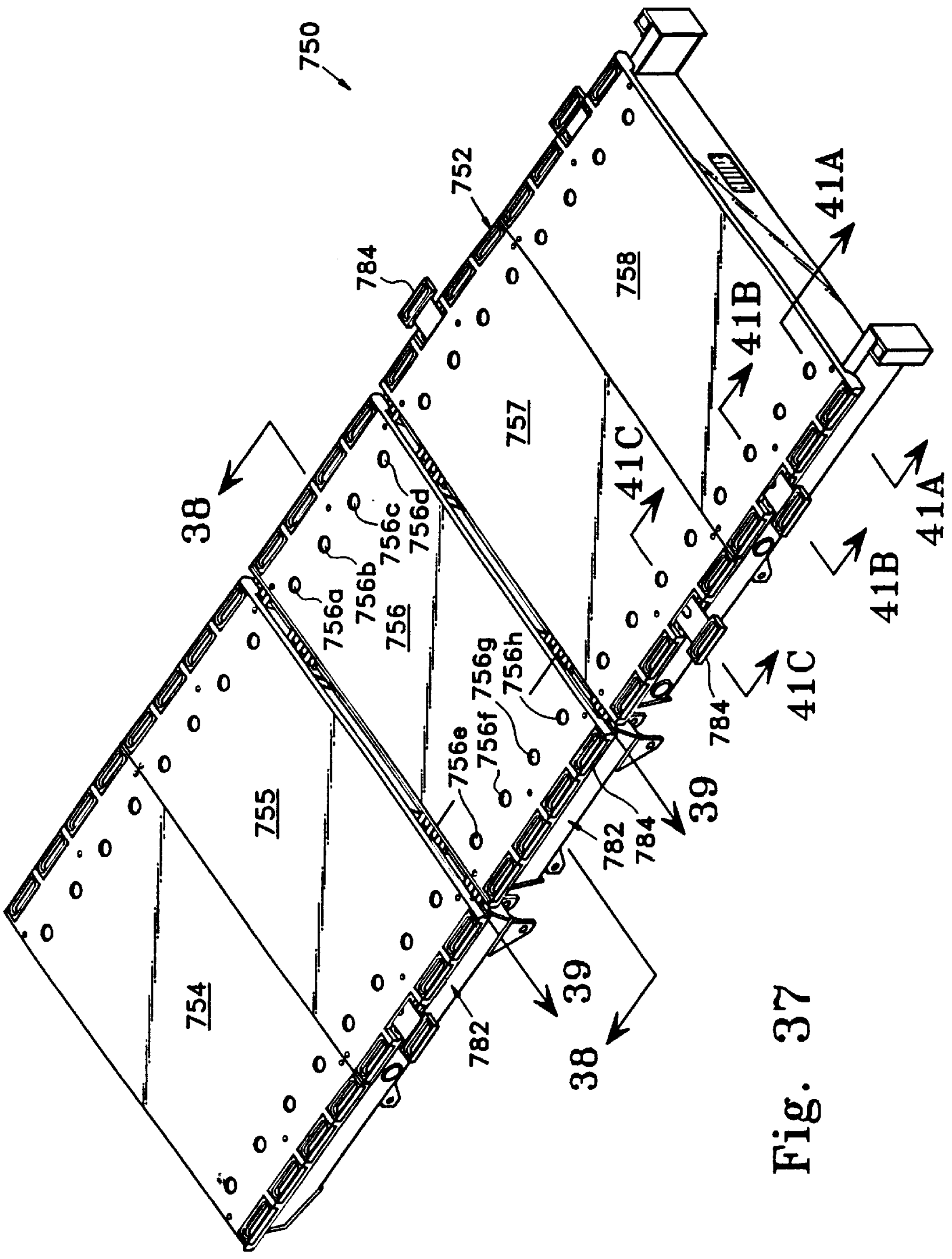
FIG. 37 is a perspective view of a portion of a hospital bed platform incorporating the pneumatic system of FIG. 36.
Figure 38:
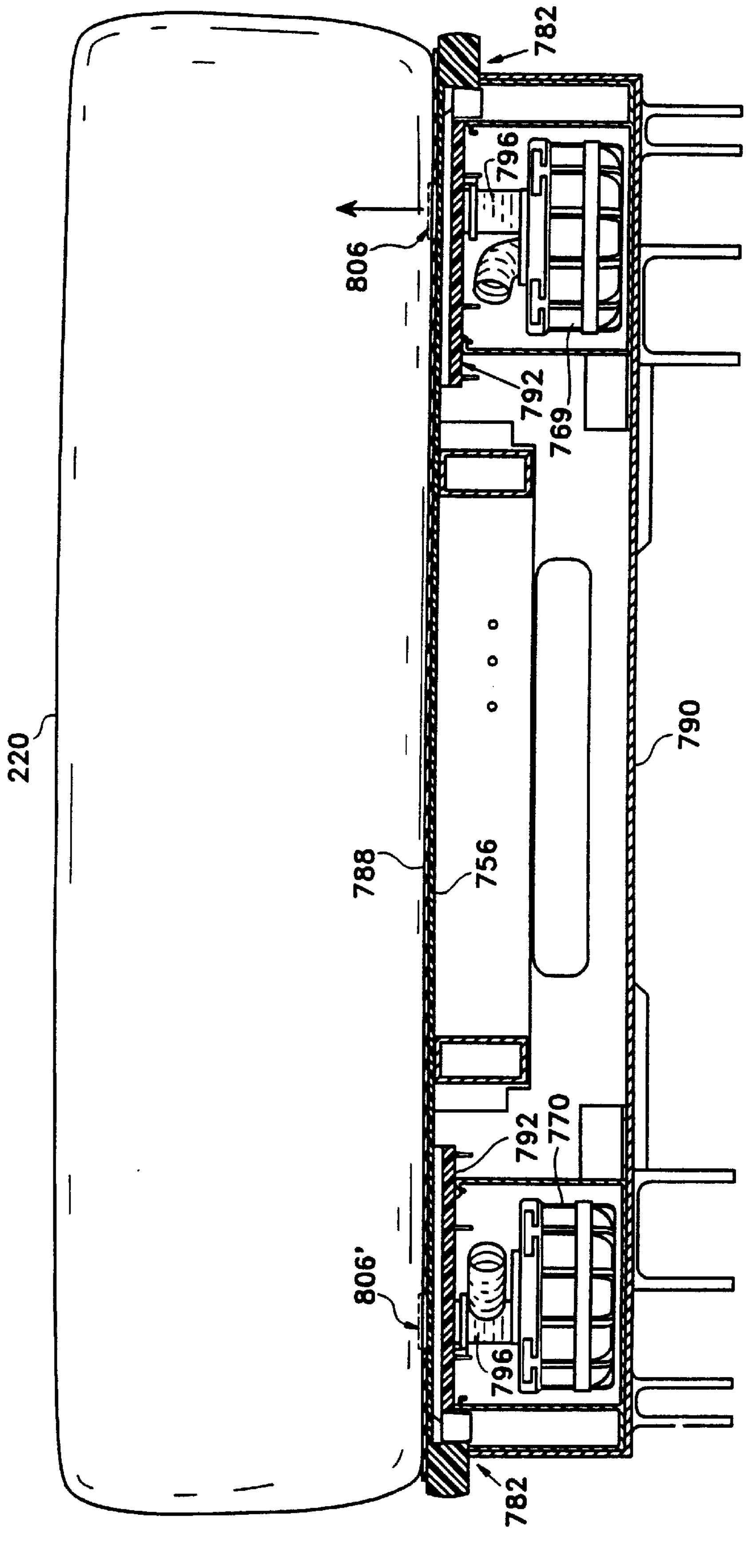
FIG. 38 is a cross section taken along line 38—38 in FIG. 37.
Figure 39:
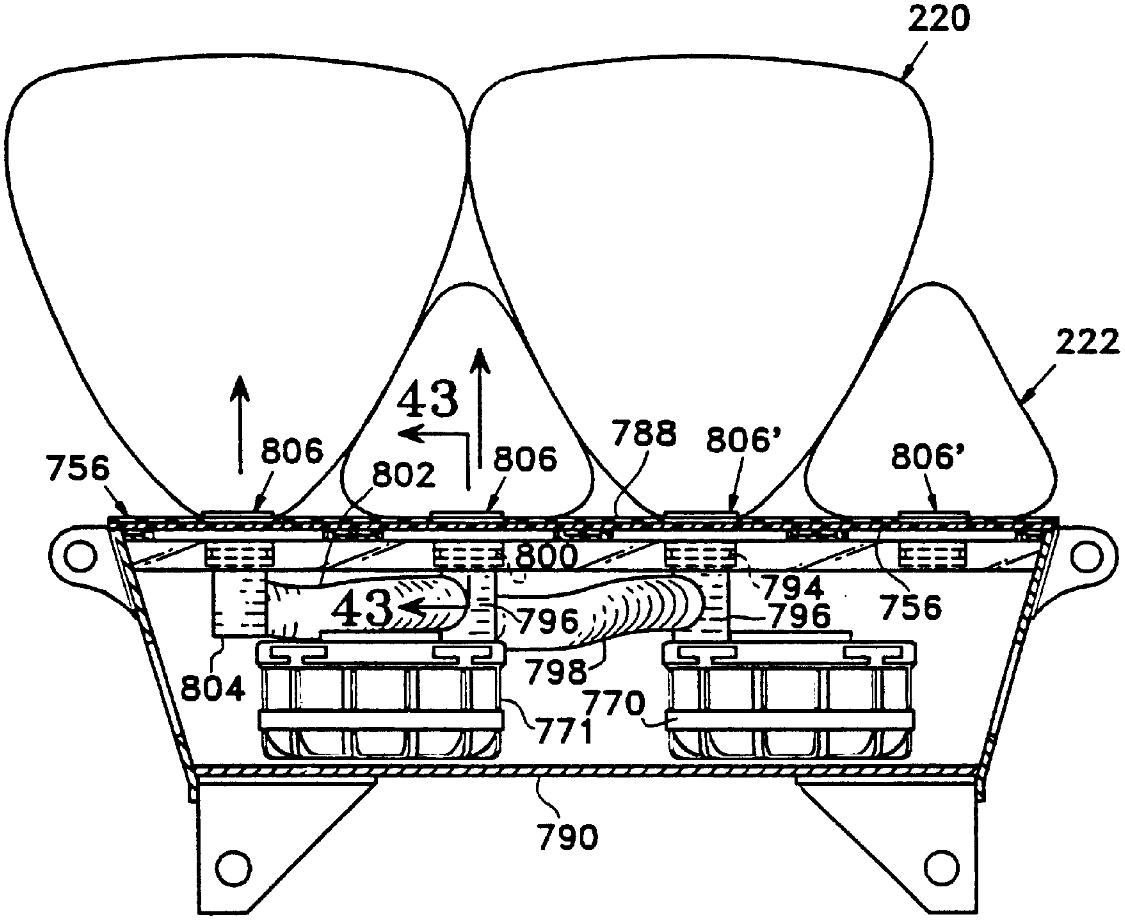
FIG. 39 is a cross section taken along line 39—39 in FIG. 37.

FIGS. 38 and 39 show lateral and longitudinal cross sections taken along lines 38—38 and 39—39, respectively in FIG. 37, with the addition of cushions and a foam pad 788 on the panel. Each pad includes identical passageways 788*a* in alignment with and corresponding to passageways 756*e*–756*h*. A housing 790 encloses the fans and ducts, except for appropriate openings, such as opening 790*a* that allows ambient air into the fans.

The slider assembly further includes a slide base 792 having broad channels 792*a*–792*d* sized to slidingly support sliders 784. The slide base at each slider station also has passageways 792*e*–792*h* aligned with the corresponding passageways in the panel. Mounted below each base passageway is a shoulder, such as shoulder 792*i* that is formed as an arc slightly greater than 180° sized to snugly receive a resilient coupling element 794, as particularly shown in FIG. 43.

Each fan is suspended from a rigid nozzle of one of two types. The nozzle extends from a fan outlet to a coupling element 794. The top of each nozzle is secured in an element 794 by mating circumferential ribs and grooves not shown. Correspondingly, the bottom end of each nozzle has knobs that lock into corresponding grooves in the associated fan housing, also not shown, using well known "push and turn" structure.

The nozzles come in various forms. A nozzle 796, shown for supporting fan 770, has a laterally extending section to which an end of a duct 798 attaches. The opposite end of the duct is attached to the inlet of fan 771. The top of nozzle 796 is blocked by a diaphragm formed across the top of coupling element 794. Thus pressurized air exiting primary fan 770 is entirely diverted to the inlet of fan 771.

Figure 43:
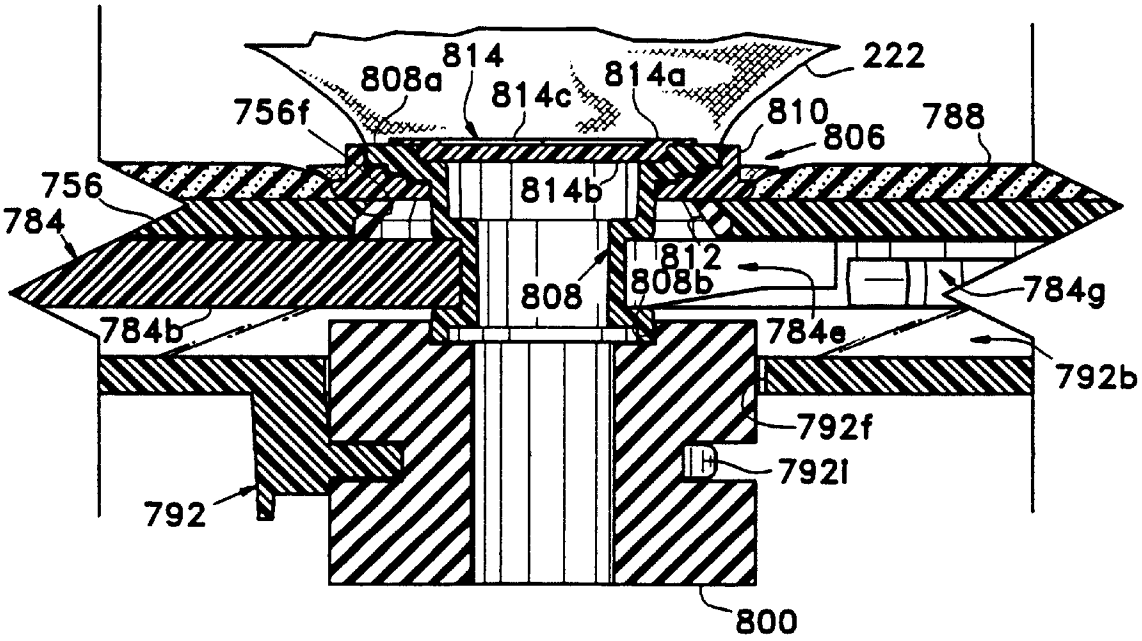
FIG. 43 is an enlarged cross section taken along line 43—43 in FIG. 39.

Fan 771 is also supported by a nozzle 796. However, it is supported by a coupling element 800 that is open upwardly, as shown in FIG. 43, for allowing inflation of cushion 6S. The lateral section is connected to another duct 802 that terminates in a lateral section of third rigid nozzle 804. The bottom of nozzle 804 is closed, thereby forcing the pressurized air upwardly into cushion 6L.

Figure 40:
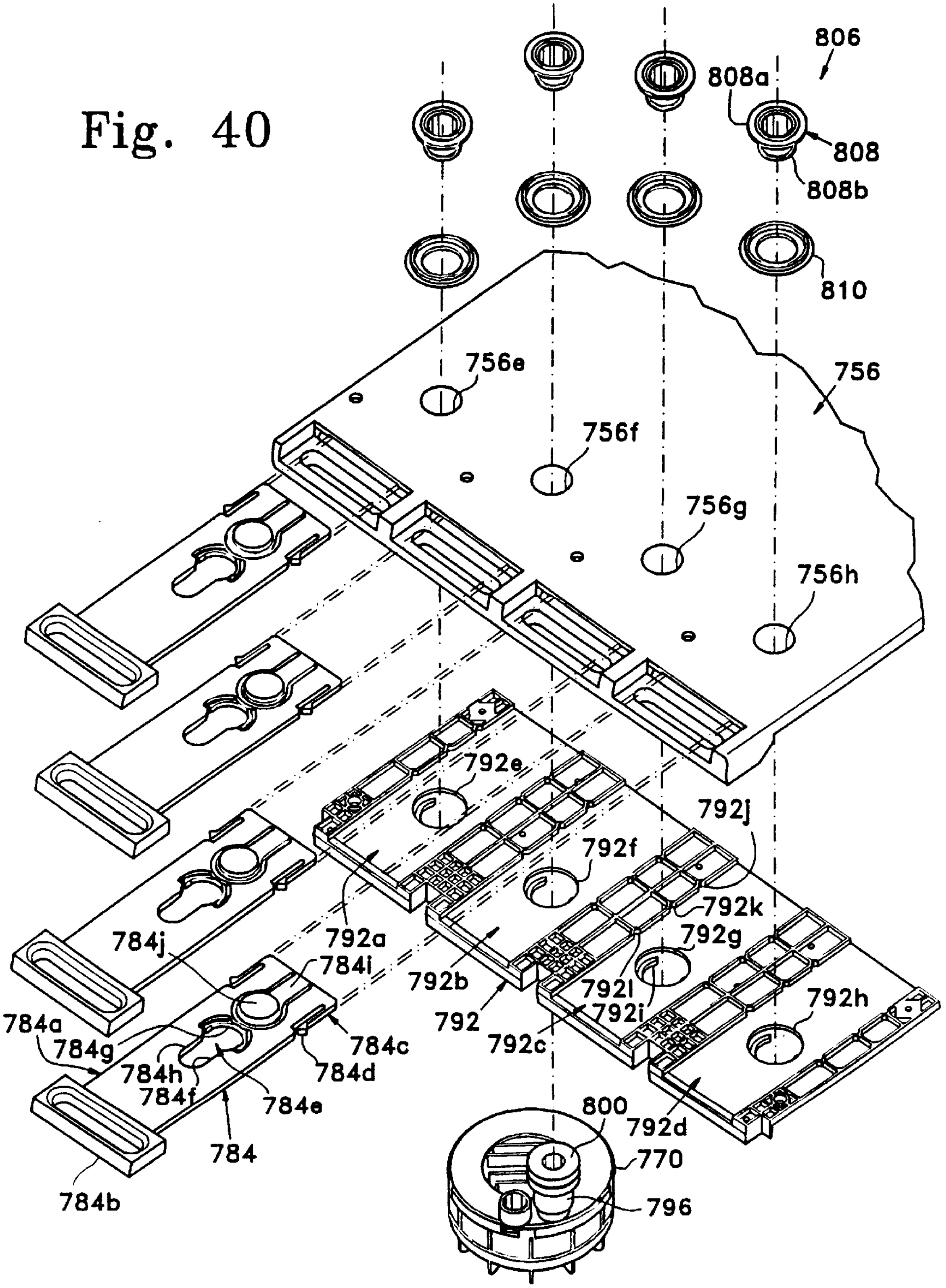
FIG. 40 is an exploded view of a portion of a panel of the platform of FIG. 37.
Figure 41A:
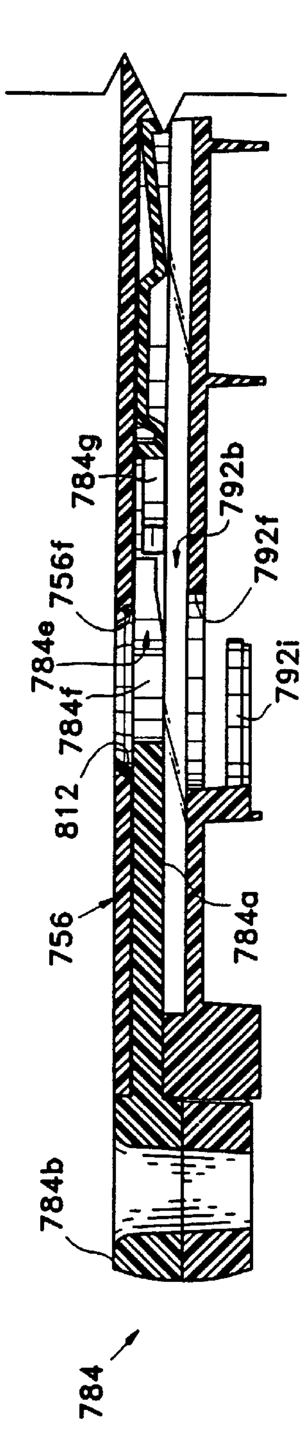
FIGS. 41A–41C are simplified cross sections taken along corresponding lines in FIG. 37 showing three operative positions of a slider assembly used in the panels of FIG. 37.
Figure 41B:
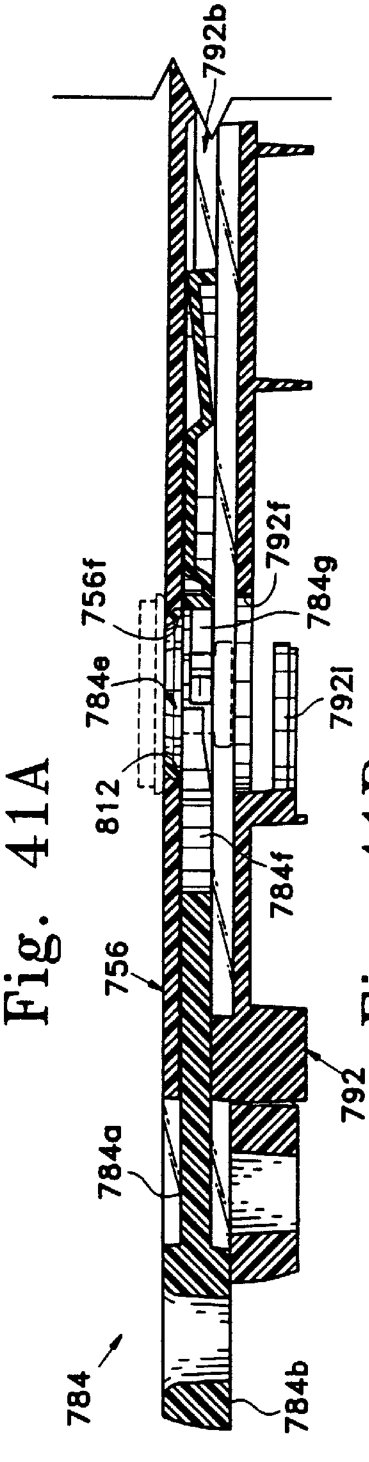
Figure 41C:
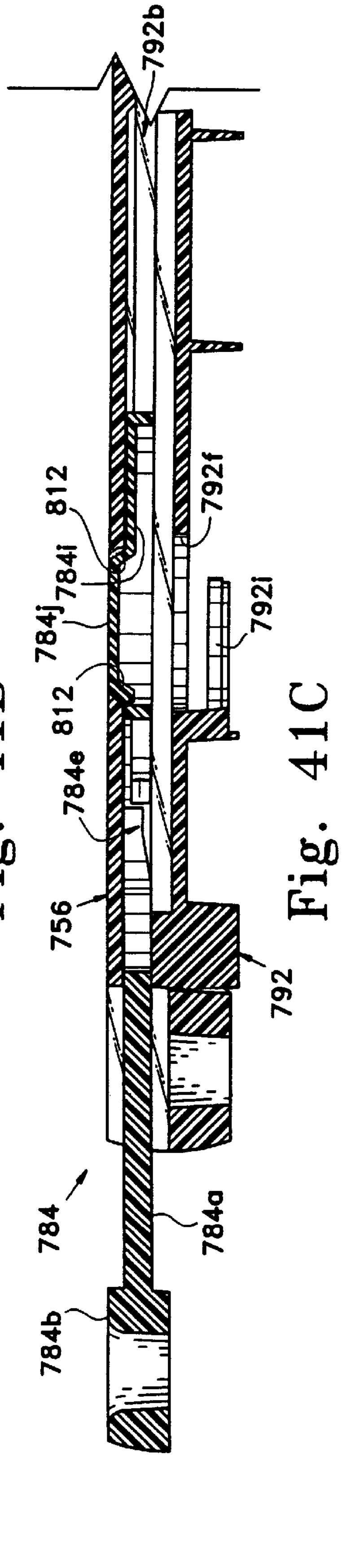
Figure 42:
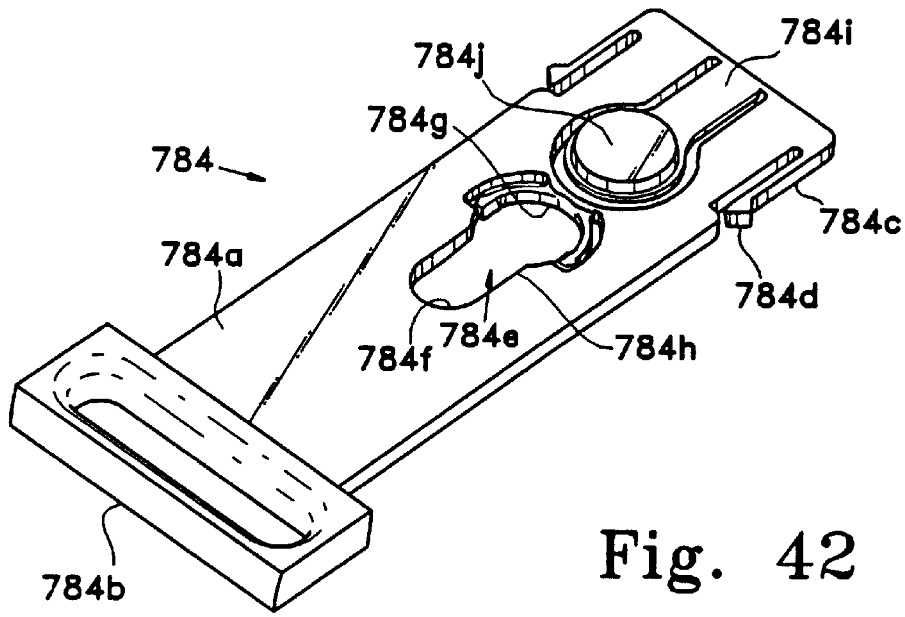
FIG. 42 is an isometric view of a slider used in the bed of FIG. 37.

The detail of slider assembly 782 is shown in further detail in FIGS. 40–42. Each slider 784 includes an elongate plate member 784*a* and an enlarged handle end 784*b*. A couple of resilient wings, such as wing 784*c* have outwardly extending projections, such as projection 784*d*. These wings are positionable selectively and alternatively in corresponding notches, such as notches 792*j*–792*k* shown in the sides of base 792 forming channel 792*c*. These notches then correspond to three positions of the slider in the slide channel, as is illustrated in FIGS. 41A–41C.

The fabric forming each cushion is secured by a connector assembly 806 formed of a connector 808 and securing collar

810. The fabric is sandwiched between an outwardly extending lip 808*a* and the collar, as shown in FIG. 43. The cushion inlet is aligned with connector 808 to allow inflation of the cushion, similar to connector 228 described previously with reference to FIG. 25. The connector is generally cylindrical with lip 808*a* formed at one end and with a radially outwardly extending flange 808*b* at the other end. The flange end of the connector passes freely through the passageways in foam pad 788 and panel 756.

The slider has an elongate opening 784*e* disposed centrally in plate 784*a*. This opening includes a reduced-width anchoring section 784*f* and an enlarged access section 784*g*. Access section 784*g* is sized sufficiently large to allow the flange end of the connector to pass freely through it, as is shown in FIG. 41B. The sides of anchoring section 784*f* form cam-shaped shoulders 784*h* that capture flange 808*b* of the connector when the flange end is positioned in anchoring section 784*f* of opening 784*e*.

The cushions are thus mounted to the panels by inserting the flange end of the connector through the pad and panel passageways and through the enlarged access section of opening 784*e* of the slider plate. Projection 784*d* is located in middle notch 792*k* when the access section of opening 784*e* is aligned with the panel passageway as shown in FIG. 41B.

With the flange end of the connector extending through the access section of opening 784*e,* slider 784 is pushed inwardly by handle 784*b* until projection 784*d* sets in notch 784*j*. The connector is then anchored in anchor section 784*f* of the opening, as is shown in FIG. 41A. The end of each cushion not having an inlet is held in place by a connector assembly 806 having a plug, not shown, to prevent leakage of air out of it. This is the position for normal use of the bed with the cushions inflated. When it is desired to remove the cushions, the reverse procedure is followed.

The sliders also have a third operating position. This corresponds to the position of the slider when projection 784*d* sets in notch 792*l*, as is shown in FIG. 41C. Slider plate 784*a* also has a tongue 784*i* generally coplanar with and formed in the distal end of the plate. This tongue is attached to the distal end of the plate and extends toward opening 784*e,* as shown. The tongue is movable resiliently transverse to the plane of the plate. The free end of the tongue is formed as a plug 784*j* that is matingly received in platform passageway 792*g*. The tongue is biased so that plug 784*j* is urged into the passageway when slider 784 is in this third position.

There also is a seal 812 positioned in the panel passageway to make a fluid seal between the panel and plug. With the cushions removed and the panel passageways plugged and sealed, the panel top surface may then be cleaned with fluids without the fluids getting into the ducts and fans situated below the panels.

Referring again to FIG. 43, connector 808 preferably has attached, such as by a suitable adhesive, to lip 808*a* a flex valve 814. Valve 814 includes an outer lip 814*a* that is in contact with the top of lip 808*a,* as shown. A reduced diameter inner portion 814*b* is received on inset shoulder 808*c*. The center of valve 814 is formed of four flaps, such as flap 814*c*. Salve 814 is made of flexible rubber so that flaps 814*c* may flex upwardly or downwardly to allow air flow either direction past them.

Figure 44A:
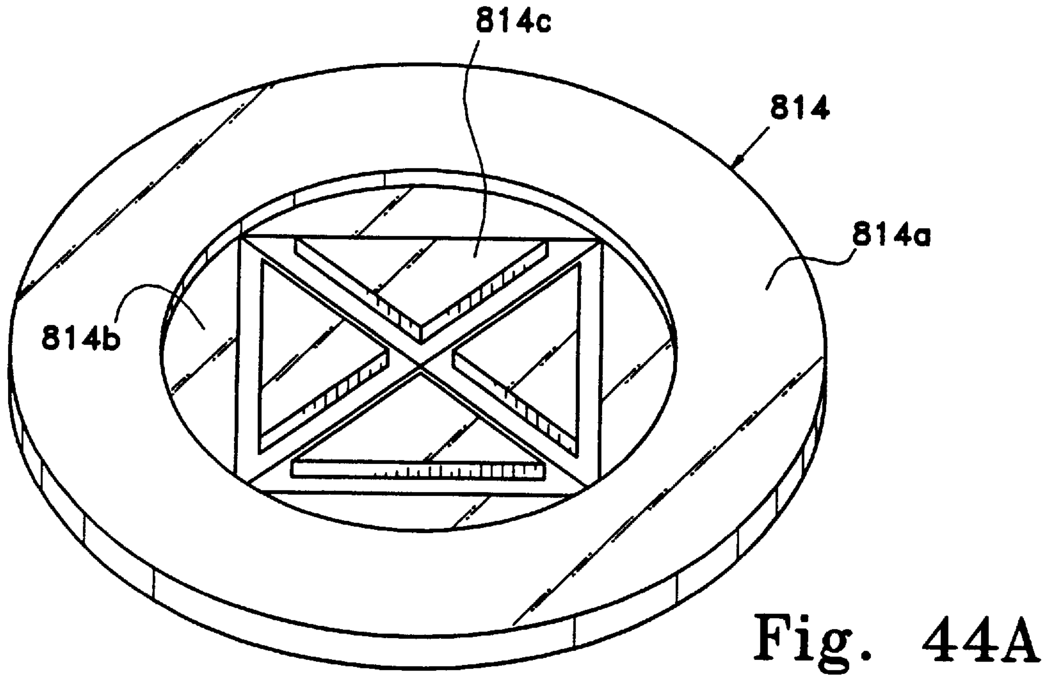
FIGS. 44A and 44B are perspective views of a flex valve of FIG. 43 showing two operating positions of valve flaps.
Figure 44B:
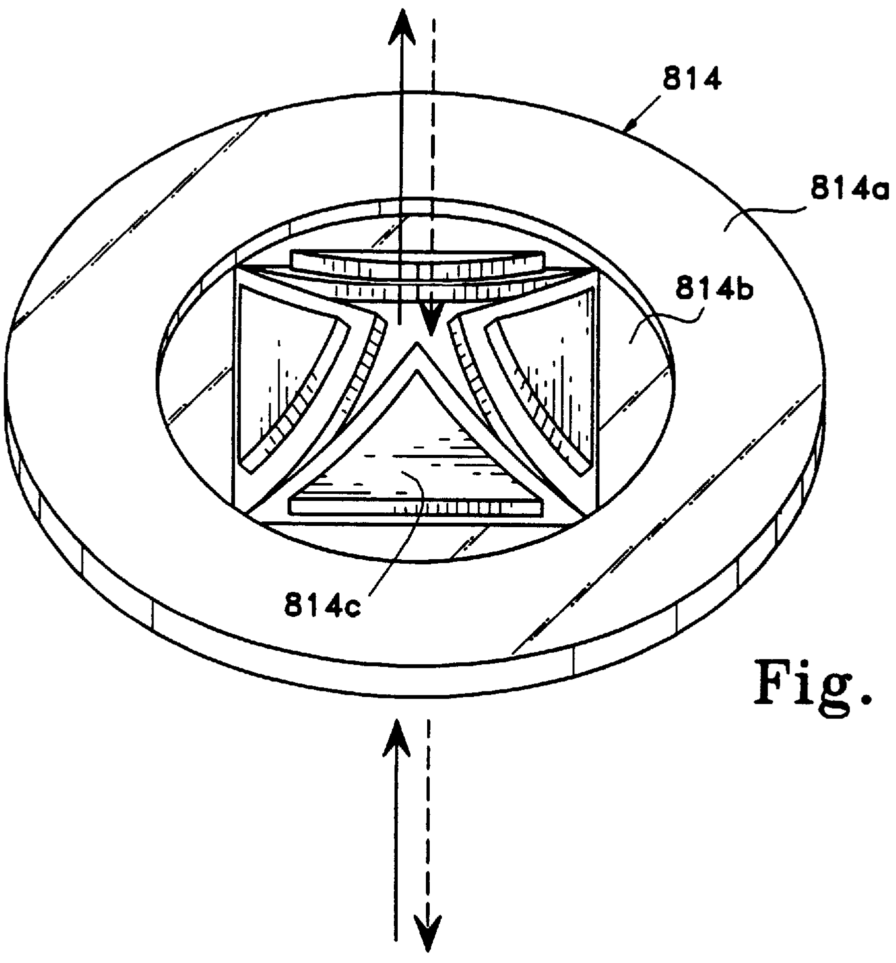

FIG. 44A shows valve 814 in a steady-state condition as would exist when the pressure in the associated cell is equal to the pressure generated by the fan. FIG. 44B shows valve 814 with flaps 814*c* bent upwards, as would occur when the associated cell is being inflated. The flaps also bend downwardly when the cell is being deflated.

Valve 814 does not control the flow of air into and out of the cell. When the flaps are in the normal or unflexed position, as is shown in FIGS. 43 and 44A, they form a block in the passageway into the cell. More specifically, they function as sound baffles, diminishing the transmission of sound waves from the associated fan into the cell when the cell is inflated by reflecting the sound waves back toward the fan.

It is thus seen that the distributed fan system just described provides a simple yet effective way to independently control the various sets of cushions making up mattress 104. The different sets of cushions are thus capable of being inflated independently and with different pressures without requiring the use of a large blower, such as blower 204 as described with reference to the embodiment shown in FIG. 2, and without the associated valves and structure to accommodate the valves. Further, rapid deflation of the cushions is possible by simply turning the fans off and allowing the air to bleed through the fans. Additionally, relatively accurate pressure levels are achieved by the proper selection of the voltages applied to the fan motors, thereby avoiding the need for a dynamic feedback system that requires the use of air pressure sensors in each set of cushions and a controller that is responsive to the sensed pressures to adjust the valve or fan operation.

2. Footboard Gate

FIGS. 45–60 illustrate a footboard assembly 146 generally described previously with regard to FIG. 1. As mentioned assembly 146 includes a table assembly 172 mounted on each frame 170. A footboard panel 178 is mounted on each frame, and supports a storable table 174.

Figure 45:
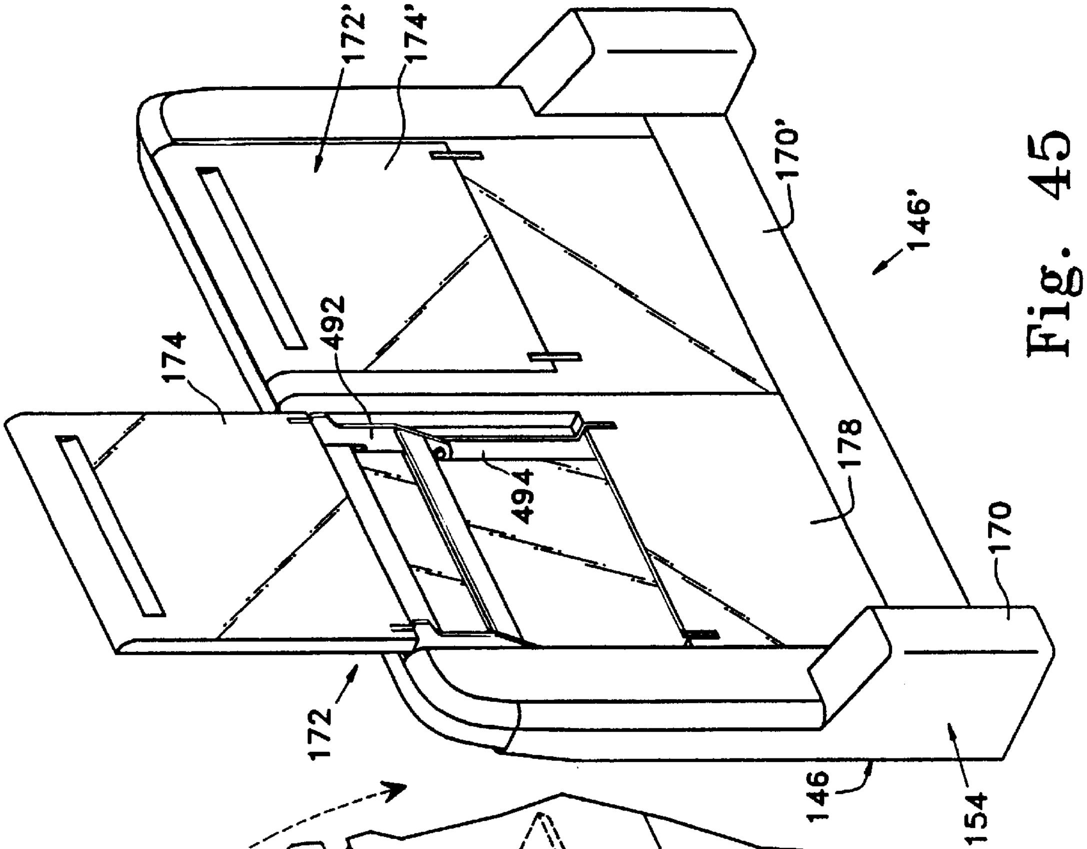
FIG. 45 is an isometric view of a footboard assembly made according to the invention.
Figure 46:
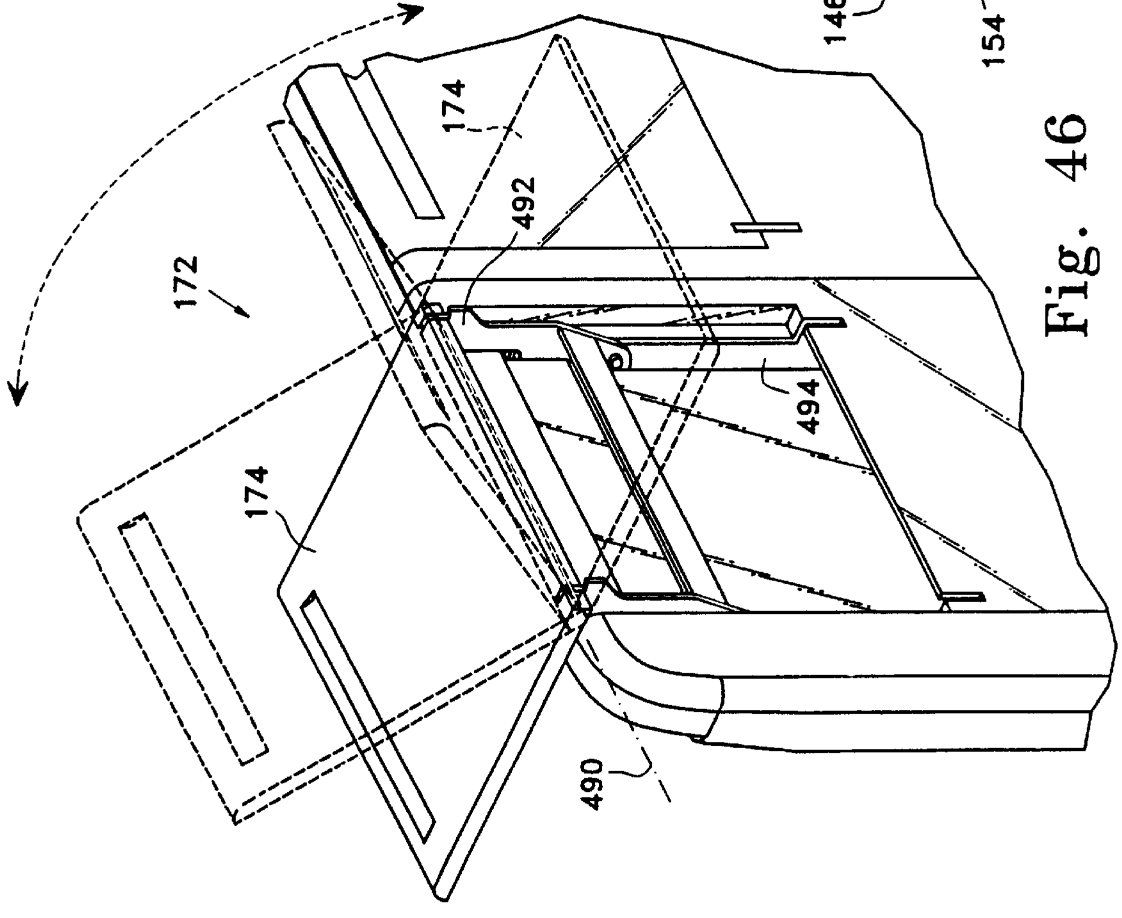
FIG. 46 is a partial view of the footboard assembly of FIG. 45 showing alternative positions of a storable table.
Figure 47:
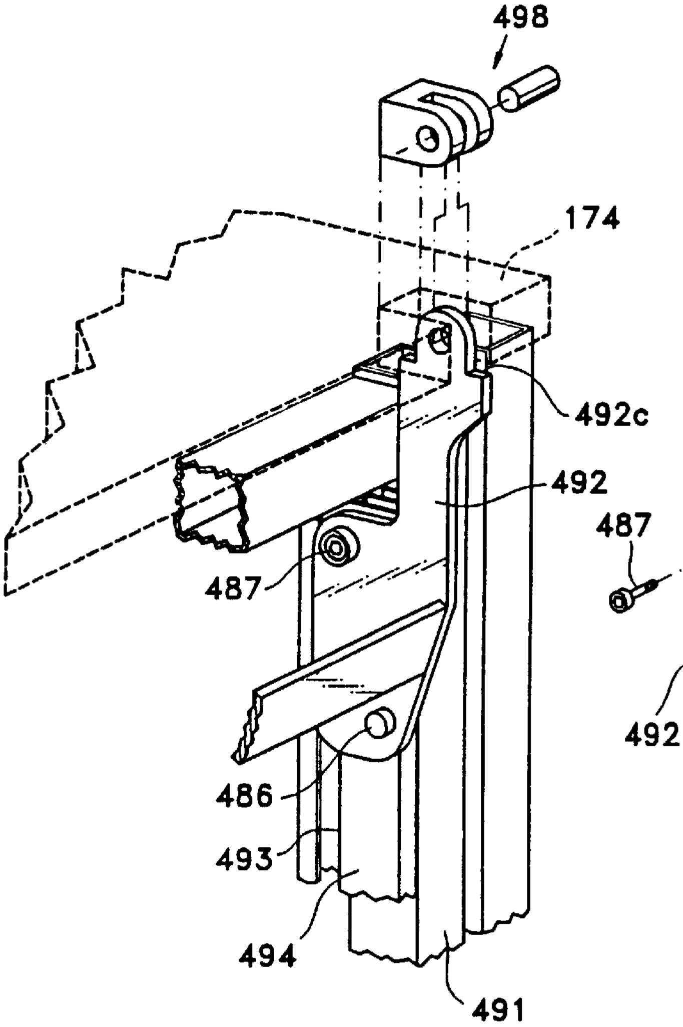
FIG. 47 is an enlarged fragmentary partial view of the mounting assembly for the storable tables of FIGS. 45 and 46.
Figure 48:
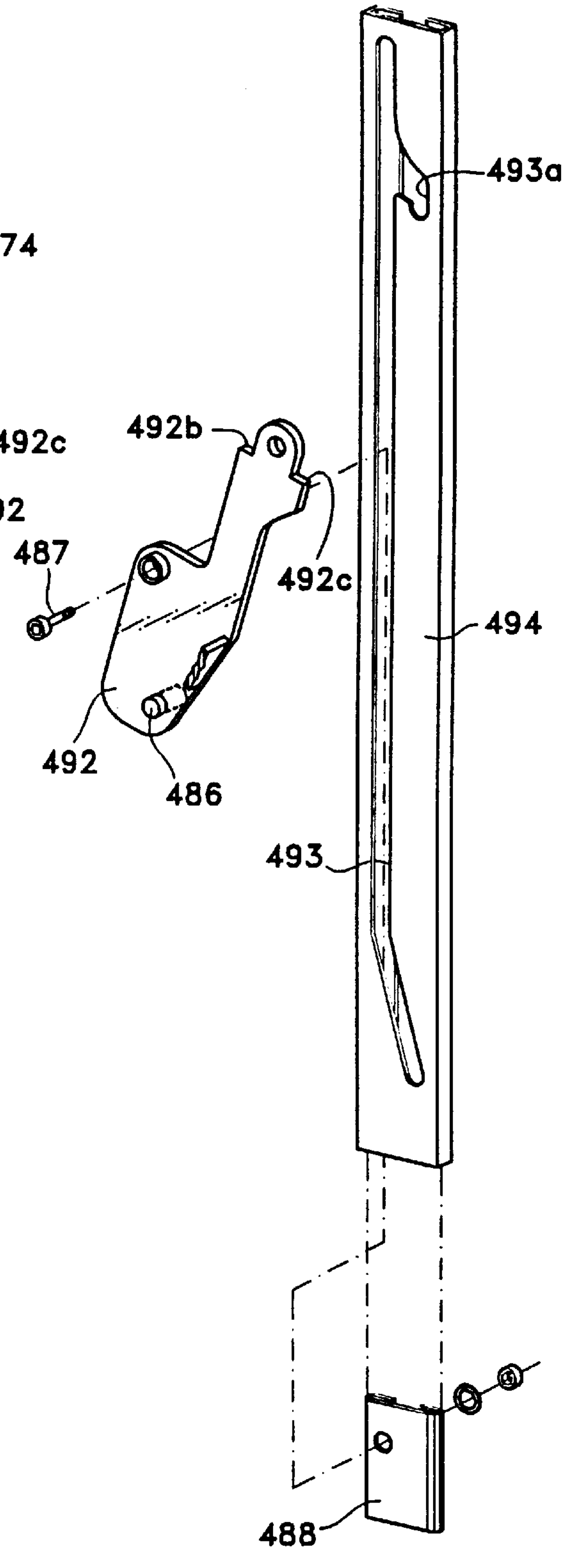
FIG. 48 is an exploded view of a portion of the mounting assembly of FIG. 47.

As is shown in FIG. 45, a each table 174 is shiftable from a storage position in which the table is disposed vertically adjacent to the footboard panel, as shown by the table on the right in the figure, to an elevated position as shown by the table on the left.

Once the table is in the elevated position, it is pivotable about a pivot axis 490 between an outboard position shown in solid lines and an inboard position shown in the horizontal dashed lines. As shown in greater detail in FIGS. 49, 50 and 51, table 174 is pivotally mounted by a hinge assembly 489 to a bracket at each edge of the table, such as bracket 492, that is mounted for sliding receipt in a slot 493 in a hollow channel member 494. Channel member 494 is attached to a vertical member, such as member 491 of footboard frame 170. Bracket 492 is attached to a pin 486 that rides in the slot. Bracket 492 is pivotally attached by a connecting pin 487, that also extends through slot 493, to a slide element 488 slidingly received in channel member 494.

Figure 49:
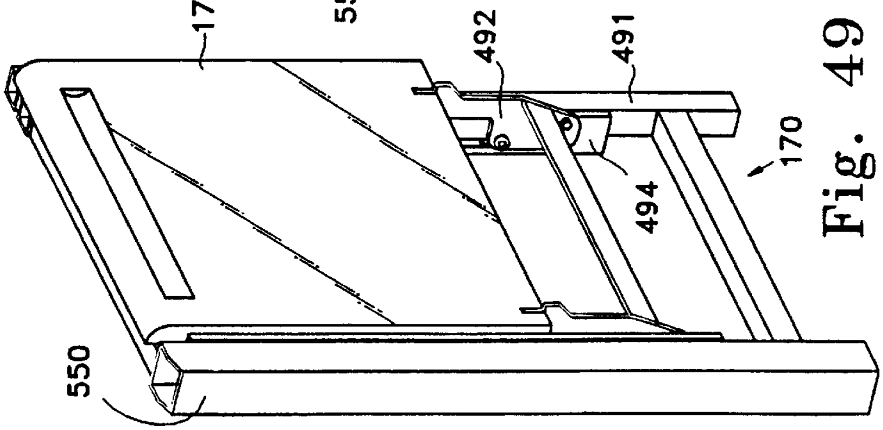
FIGS. 49, 50 and 51 illustrate various operating positions of the storable table of FIG. 45.
Figure 50:
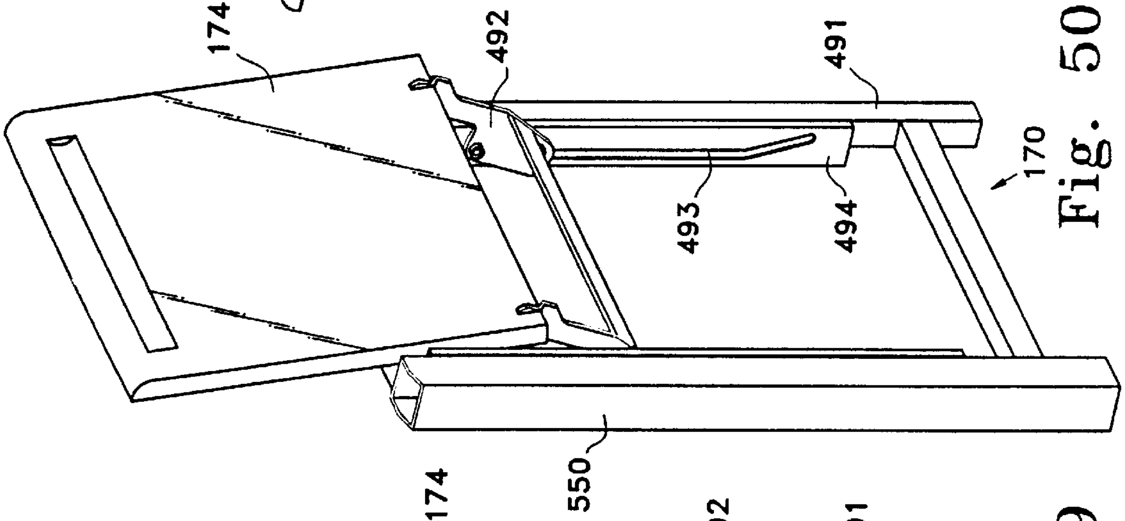
Figure 51:
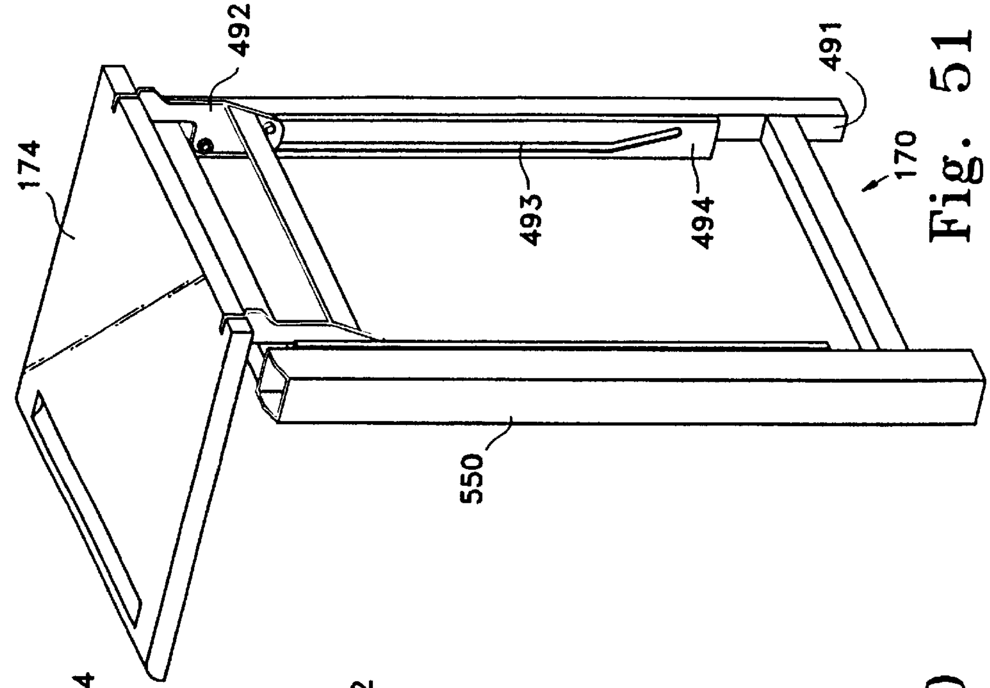

A lock extension 493*a* of the slot is positioned near the top to accommodate a repositioning of the bracket so that pin 486 is supported in it when the table is in the raised position, as is shown in FIGS. 42 and 38. Slot 493 is offset outwardly from the footboard panel at the bottom to hold the base of the table against the footboard panel during storage, as is shown in FIG. 49. FIG. 50 shows the table at an intermediate position during elevation.

The top of bracket 492 has opposing shoulders or stops 492*b* and 492*c* for supporting the table in the inboard and outboard positions.

Figure 52:
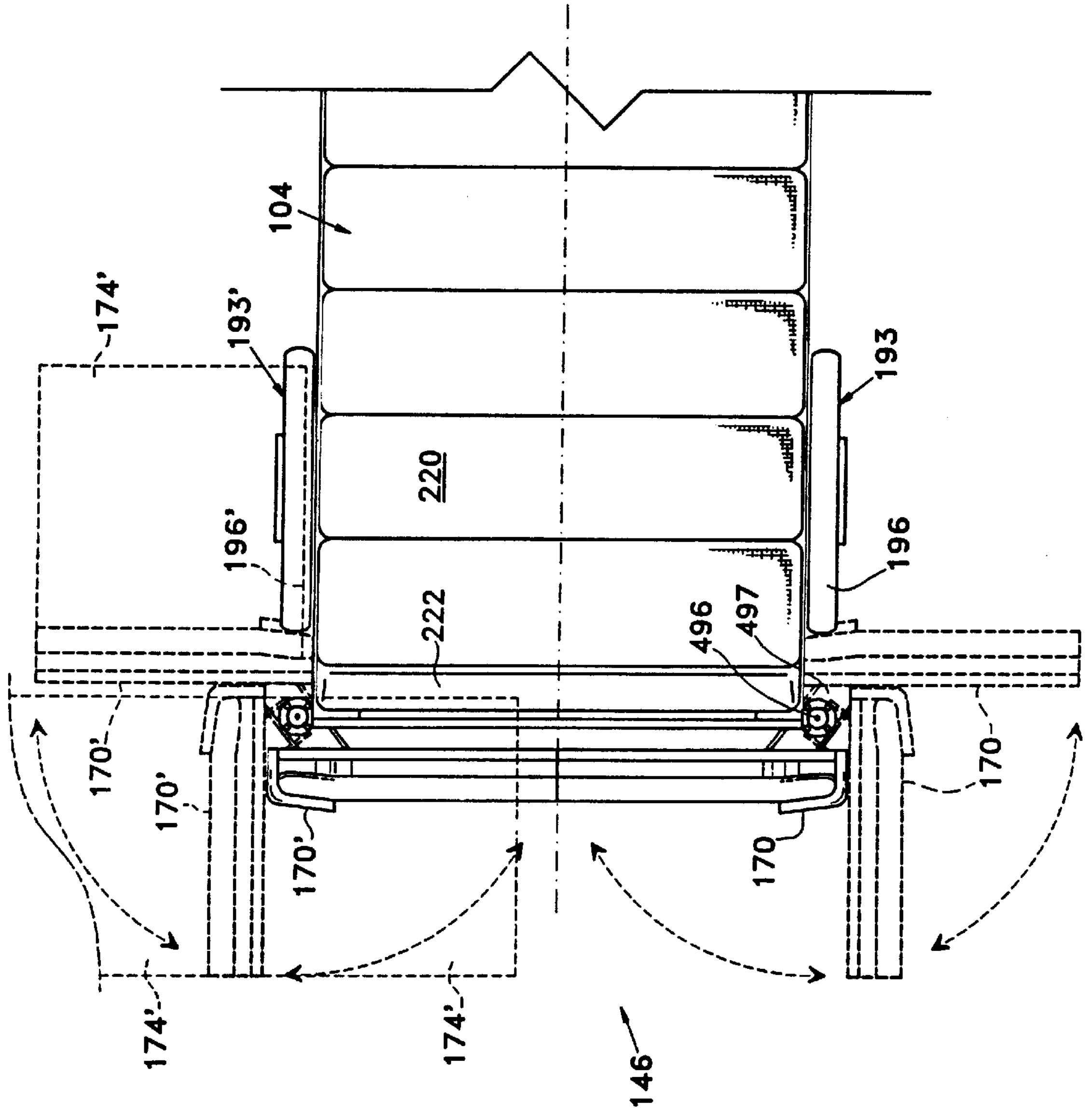
FIG. 52 is a plan view of a portion of the bed showing alternative footboard gate positions.
Figure 53:
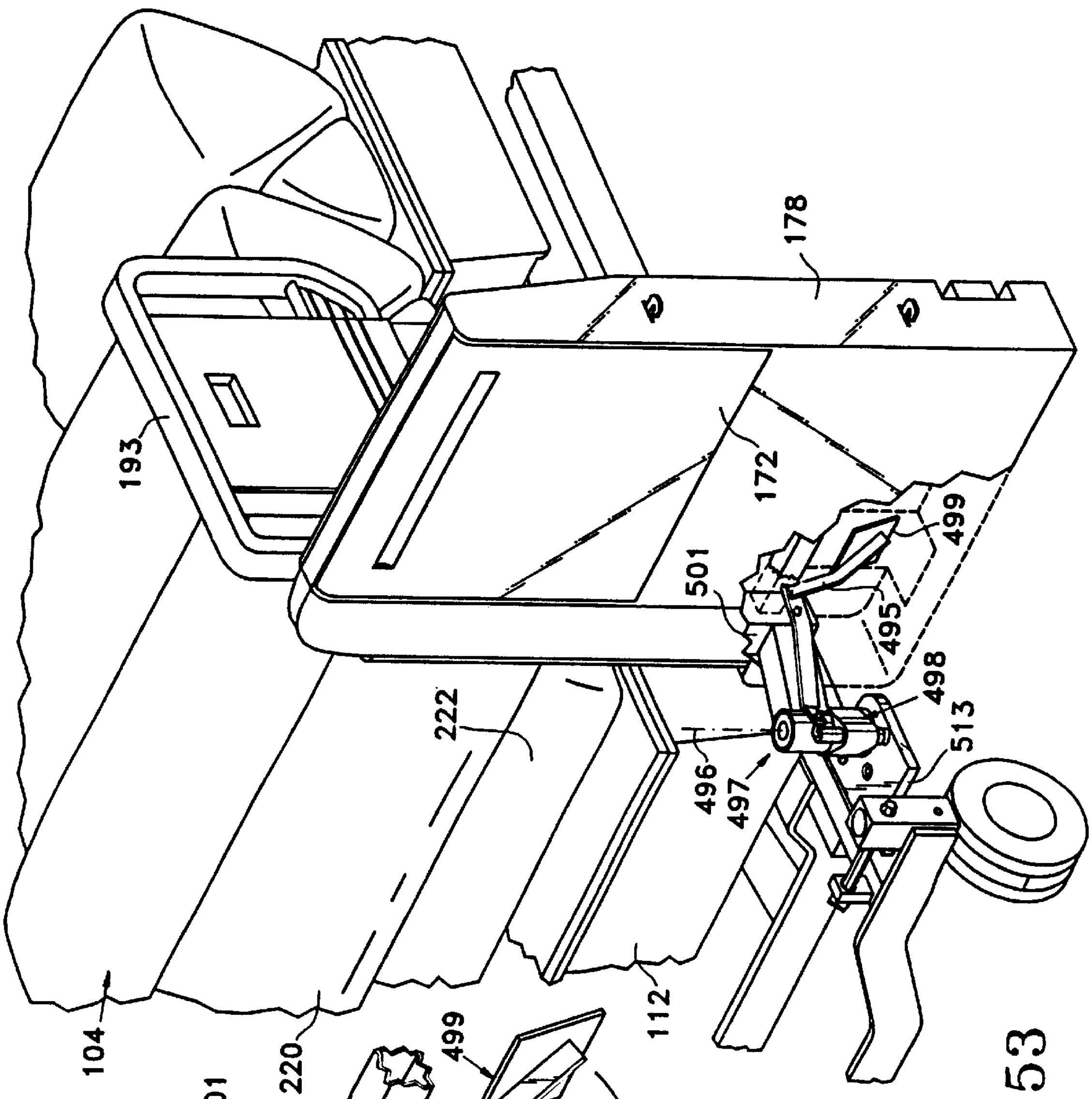
FIG. 53 is a partial isometric of a corner of the bed with a footboard gate in a swing-out position.
Figure 54:
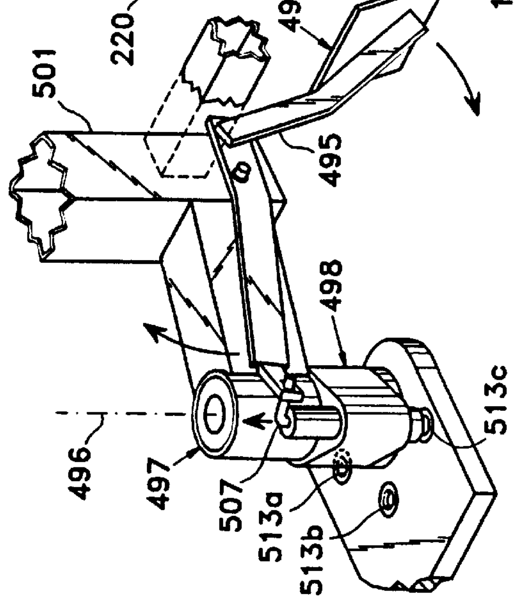
FIG. 54 is an enlarged view of the foot-lever-operated detent mechanism of FIG. 53.

FIGS. 52 and 53 show different views of footboard assembly 146. Each footboard panel 178 is pivotable about a vertical axis, such as axis 496 by a hinge 497. A detent mechanism 498 is operable by activation of a mechanical release by a foot pedal 499 for selectively fixing the footboard panel in three positions as shown particularly in FIG. 52. As shown generally in FIG. 53, and in greater detail in FIG. 54, an arm 495, fixed to foot pedal 499, pivots relative to a gate frame member 501 to raise a spring-biased detent member 507 out of the one of indents 513*a*, 513*b* or 513*c* of a frame plate 513, in which it is positioned.

In a normal position, as represented by the solid lines the footboard panels are in line and adjacent to the foot of the bed. When pivoted 90°, the panels or gates extend outwardly from the foot of the bed in what will be seen to be a "hand rail" position. When the panel is in this position, the table may be positioned outboard from the foot of the bed, not unlike the outboard position when the footboard panel is in the normal position, or alternatively, out from the corner of the bed, as shown in dashed lines at the top of FIG. 52.

Panel 178 is further pivotable another 90° to a side position, generally normal to the side of the bed. The table is positionable along the side of the bed, over guard rail 196 when it is lowered.

Figure 55:
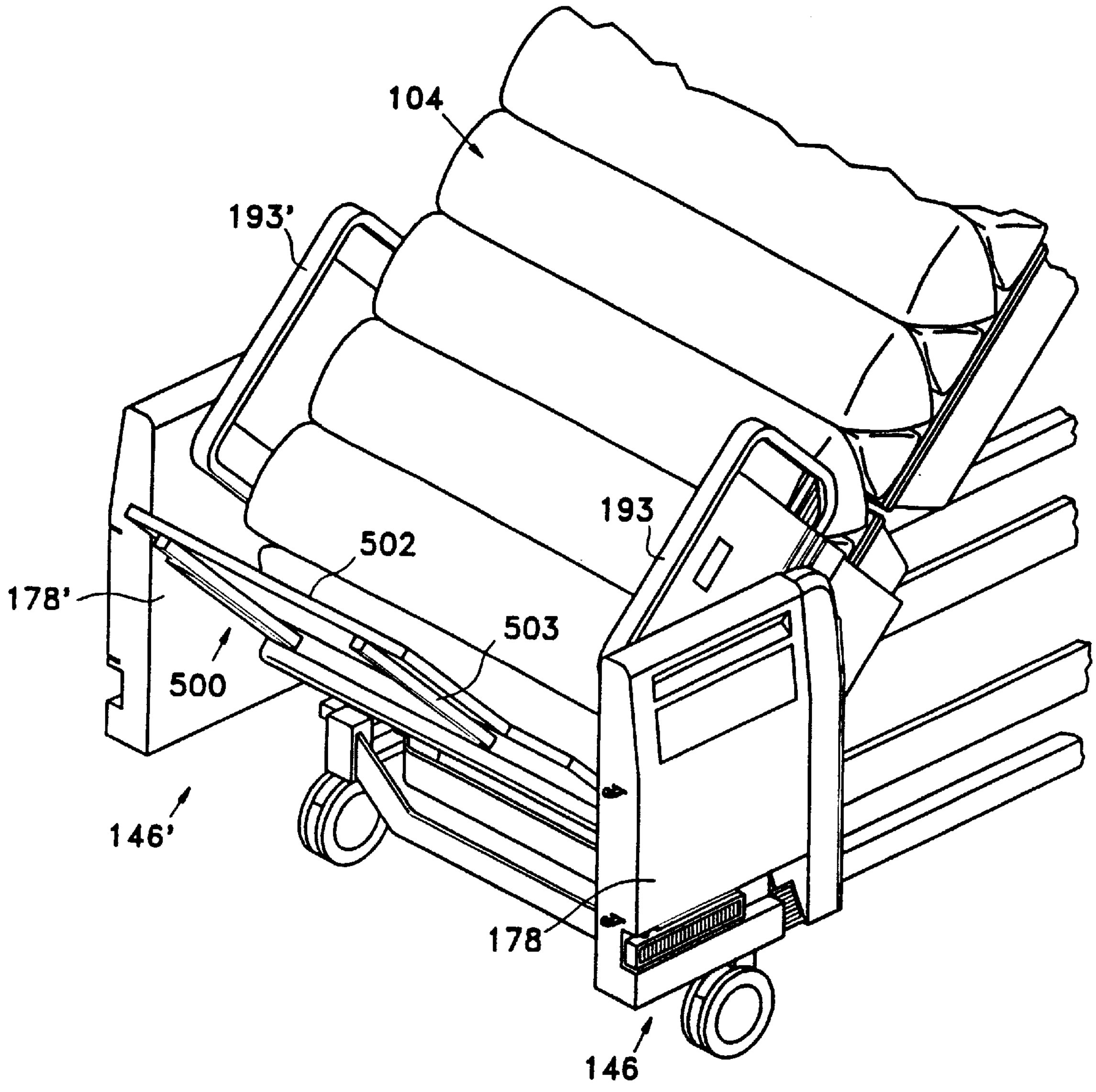
FIG. 55 is a partial isometric of the foot end of the bed in a tilted position with a stand board and the footboard gates in a "hand rail" position.

The requirement for having pivoting footboard gate panels is evident in FIG. 55, which figure shows a bed platform partially raised toward a standing position, as is described in the previously referenced patent to Ferrand. When used to stand the bed up, the footboard gate panels must be opened to allow for the foot of the bed to be lowered toward the floor. Also, by locking the footboard panels in the "hand rail" position, a patient getting in or out of the bed while the platform is in the standing position can use the footboard panels as supports or handrails to provide stability. The foot-end hand rails are positioned for convenient use during this procedure as well.

FIGS. 56–60 illustrate a latching assembly 452 for holding footboard panels 178 and 178'. Assembly 452 is controlled by a handle 453 that allows the two panels to swing independently when it is pulled outwardly from its position in the base of panel 178, as shown. Handle 453 is connected to a pivot rod 454 that has mounted on it two latch mechanisms, such as latch mechanism 455.

Latch mechanism 455 includes a mounting bracket 456 that is mounted on a footboard gate frame member 457. Pivot rod 454 extends pivotably through a hole, not shown, in the bracket. A slot 456*a* guides the travel of a first guide pin 458 that extends through it. A second guide pin 459, spaced from slot 456*a* is fixedly mounted to bracket 456. A latch plate 460 rests on bracket 456 and has a slot 460*a* through which second guide pin 459 extends. Plate 460 also has a hole, not shown, through which first guide pin 458 extends.

Plate 460 extends through a slot 178*a* in the side of panel 178, and when in the closed or locked position, also extends through a corresponding slot 178*a'* in the other panel. The distal end 460*b* of plate 460 is formed as a laterally extending hook that extends through a corresponding slot 461*a* of a frame member 461. Pivot rod 454 extends through a corresponding slot 460*c* in the plate that allows movement of the plate relative to the rod.

Figure 56:
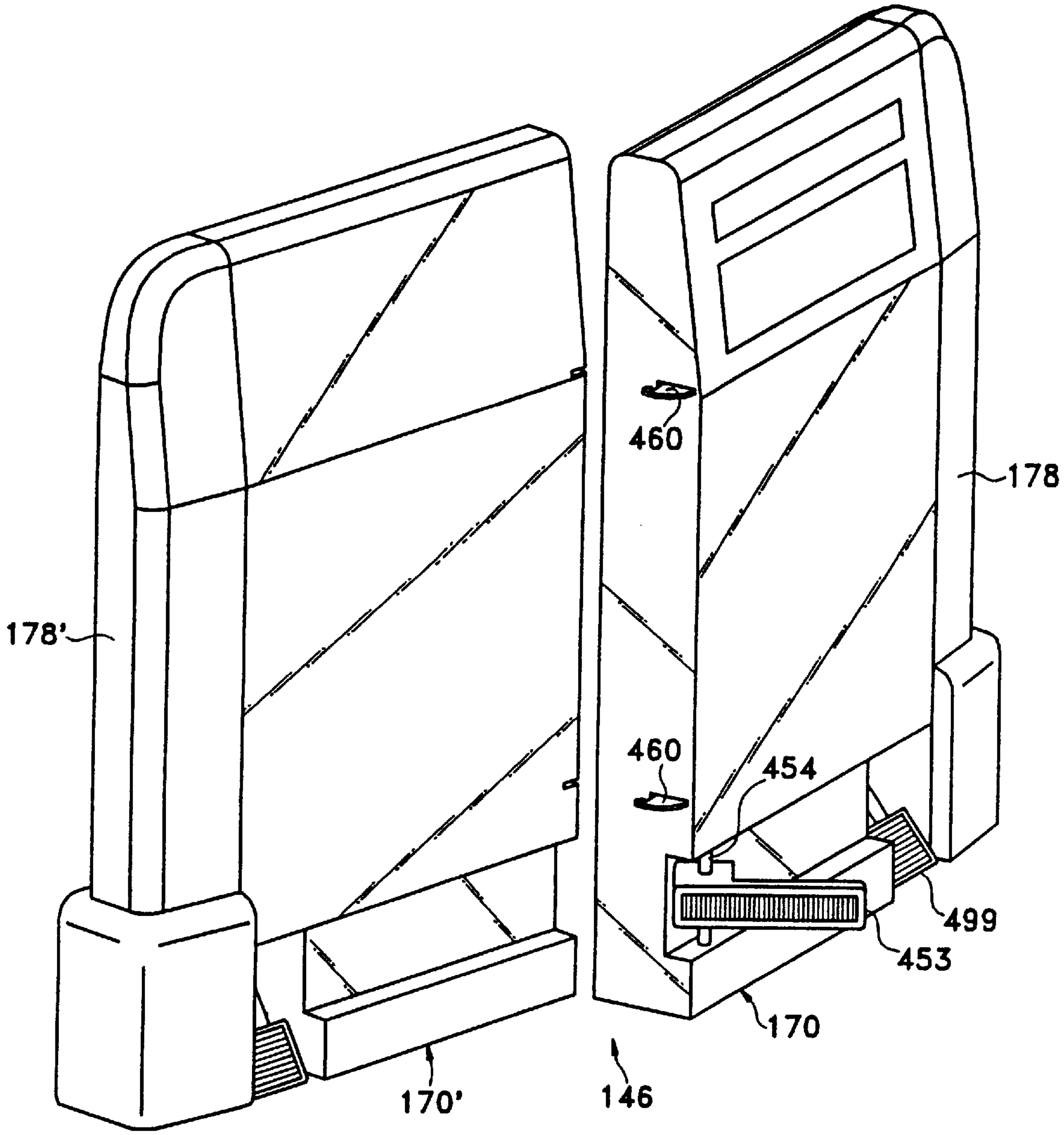
FIG. 56 is an isometric view of the two footboard gates of the invention.
Figure 58:
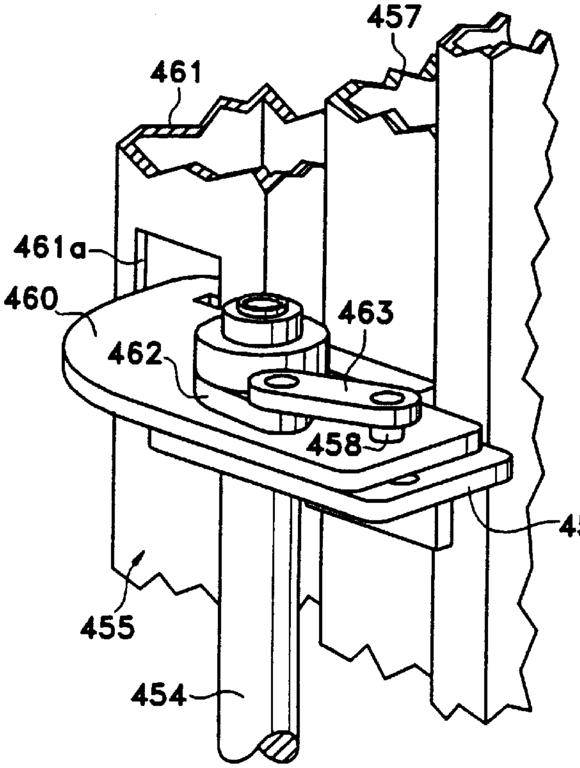
FIG. 58 is an enlarged view of a latch mechanism of the latching assembly of FIG. 57.
Figure 57:
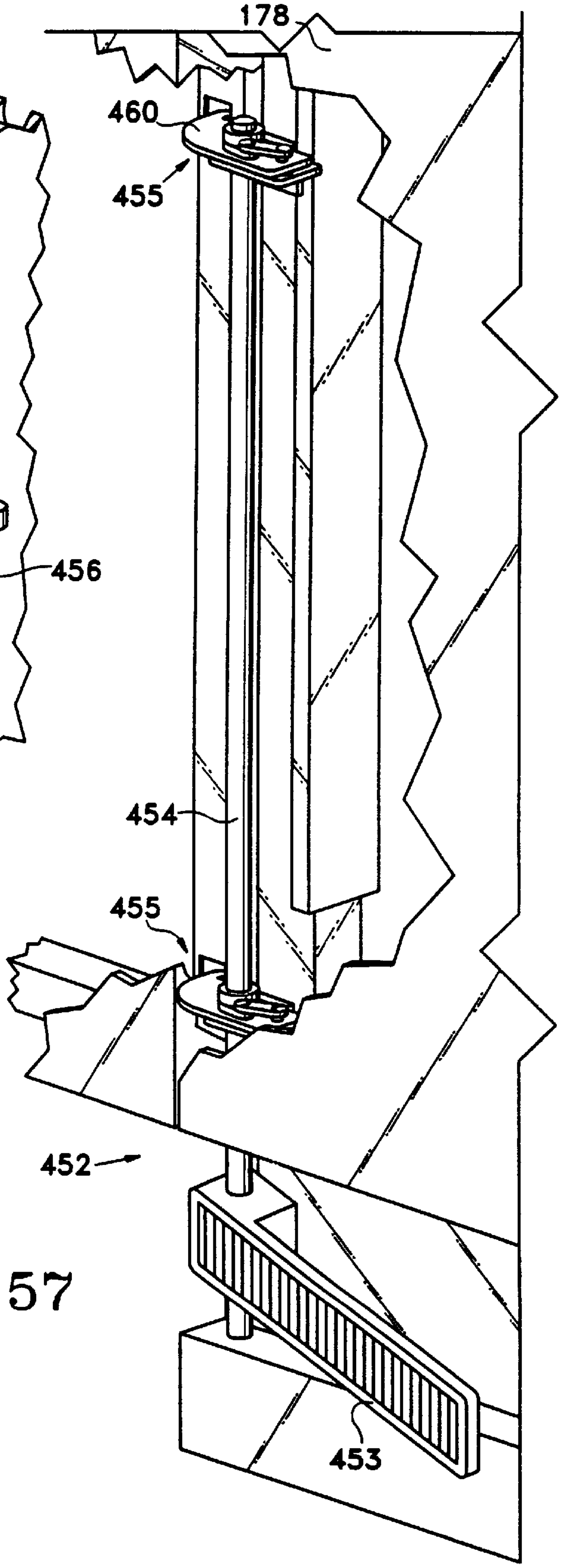
FIG. 57 is a partial fragmented view of the latching assembly for securing the footboard gates of FIG. 56.
Figure 59:
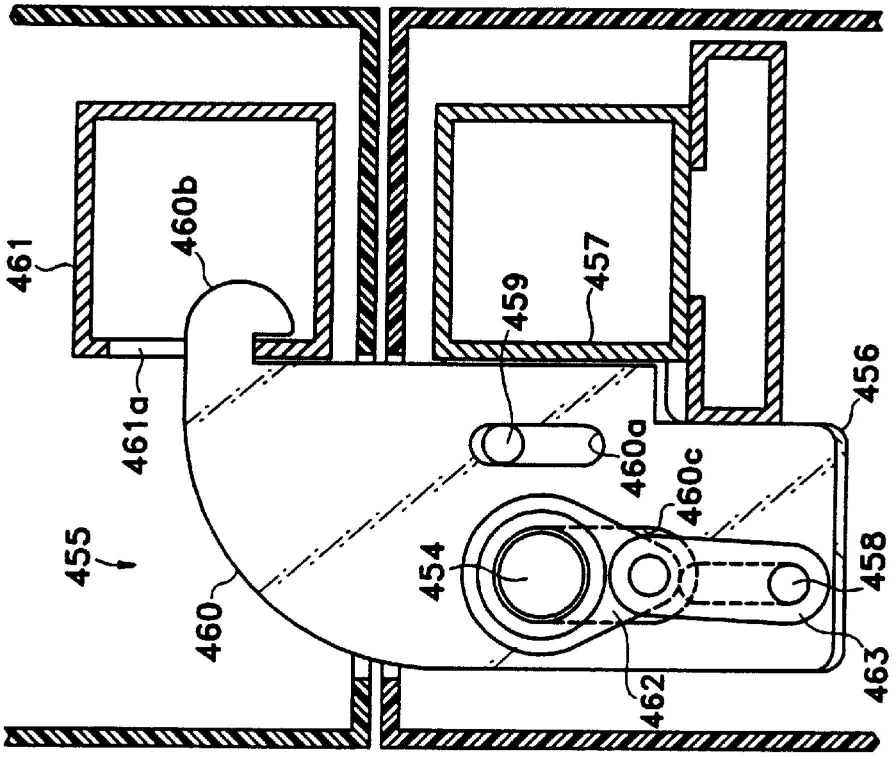
FIGS. 59 and 60 are plan views of the latch mechanism of FIG. 58 in two operative positions.
Figure 60:
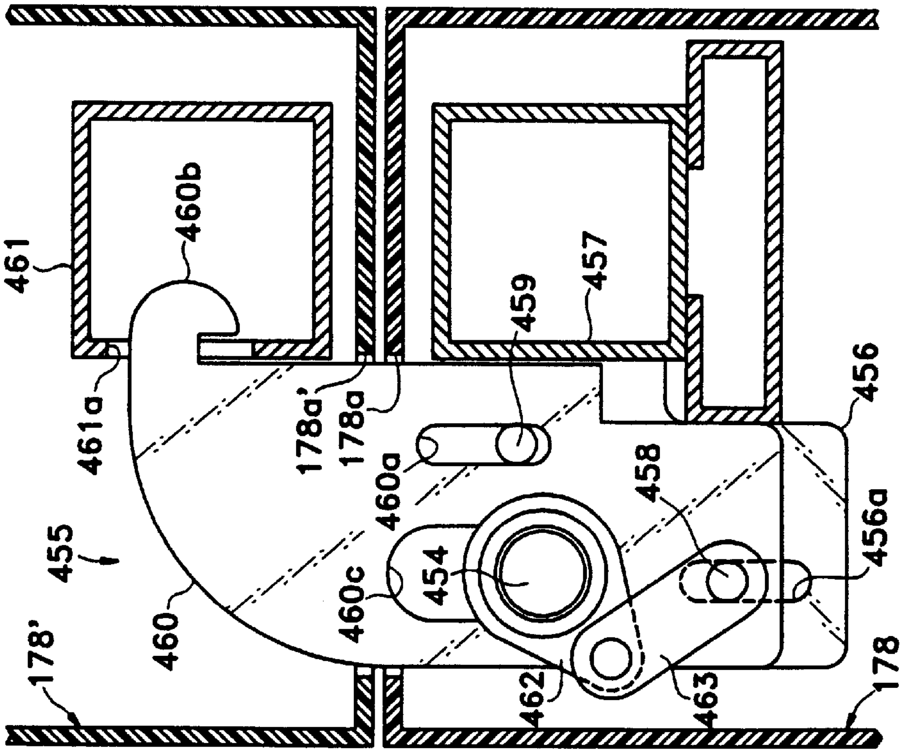

An eccentric drive arm 462 is fixedly mounted to the rod. A drive link 463 is pivotally connected at one end to arm 462 and attached to first guide pin 458 at the other end. When the pivot rod is rotated, latch plate 460 is moved in line with slots 456*a*, 460*a*, and 460*c*. When handle 453 is flush in panel 178 in a storage position, hook end 460*b* engages the edge of frame member 461, as is shown in FIG. 59. When the handle is pulled out, as shown in FIG. 56, the hook end disengages frame member 461, allowing the two footboard gates to swing open.

3. Stand-Up Board

It will be noticed in FIG. 55 that a stand board assembly 500 is mounted to the foot of the platform. A stand board 502 is mounted on a frame 503 to extend above the top surface of the mattress. The structure of the stand board assembly is shown more clearly in FIGS. 61–64. Frame 503 includes a pair of legs 505 and 506 that are positionable in corresponding openings 508 and 509 of platform extension portion 112. Each leg has a mounting hole 510 and 511 for receipt of a securing pin 512 that is positioned in one of the associated positioning holes 514, 515 and 516 or 517, 518 and 519 in a corresponding side plate 520 or 521 of the platform extension portion.

A fixed stand board plate 523 is fixedly attached to legs 505 and 506 so that it is positioned adjacent to the platform surface during use. Stand board 502 is pivotally mounted to the tops of legs 505 and 506 by a pivot rod 525.

Figure 61:
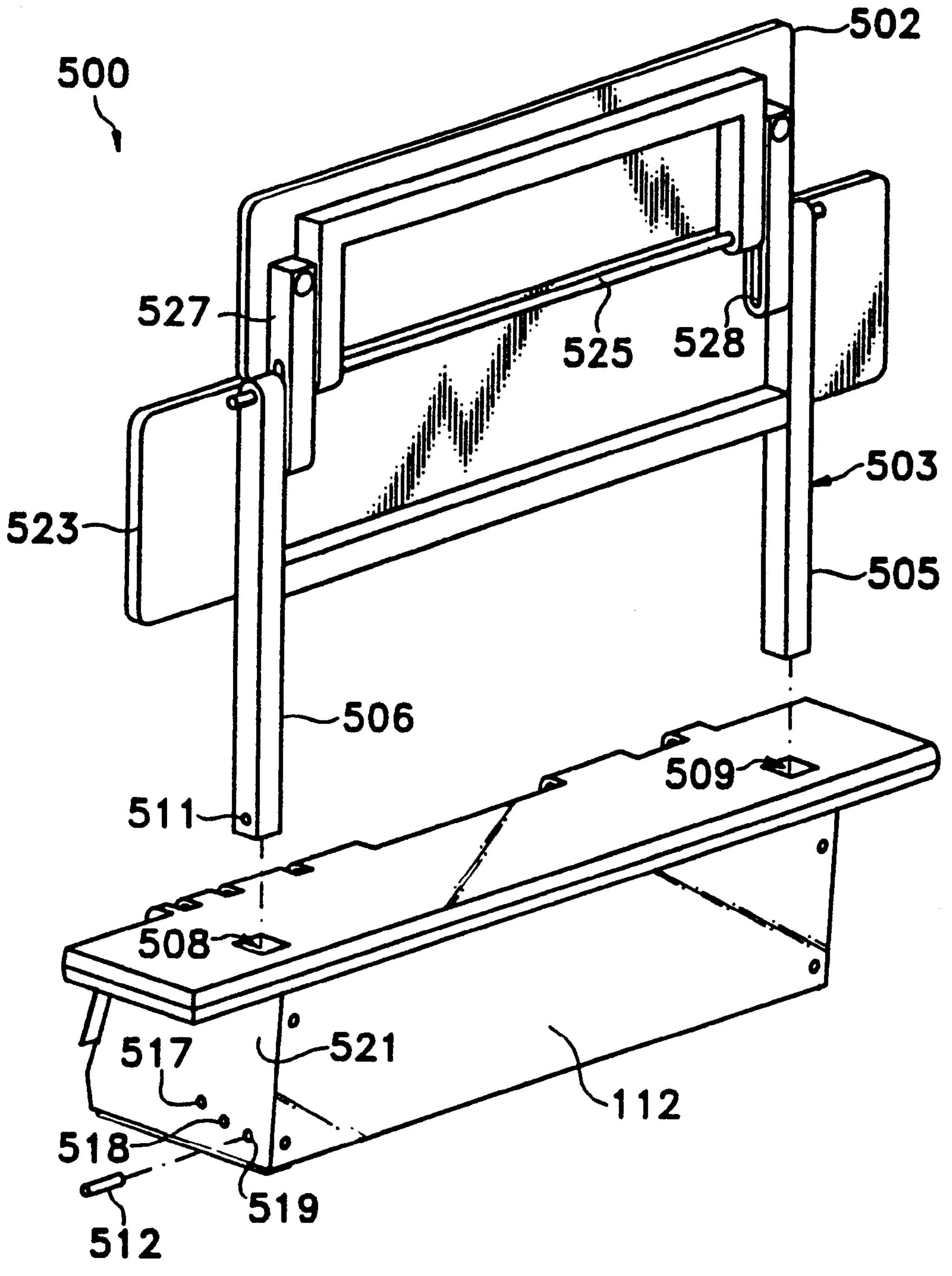
FIG. 61 is an isometric view of the platform extension member and an unfolded stand up board positioned for installation.
Figure 63:
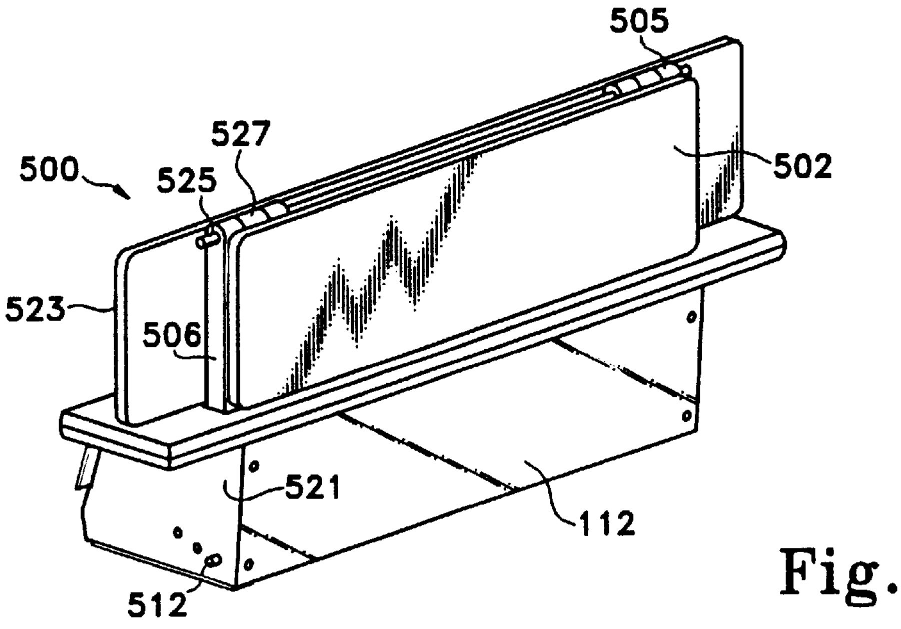
FIG. 63 is a view similar to FIG. 62 showing the stand up board folded and installed.

Board 502 is pivotable from an upright position, shown in FIG. 61 to a storage or collapsed position shown in FIG. 63. A pair of pivot locking members 527 are elongate and have closed slots 528 through which rod 525 extends. It will be noted that the slot extends close to the lower end of the member, but only midway up it. When the stand board is in the upright position, member 527 is in a lock position in which rod 525 is in the upper end of the slot. The member is held in this position by gravity and extends along both the stand board and the fixed plate.

Figure 62:
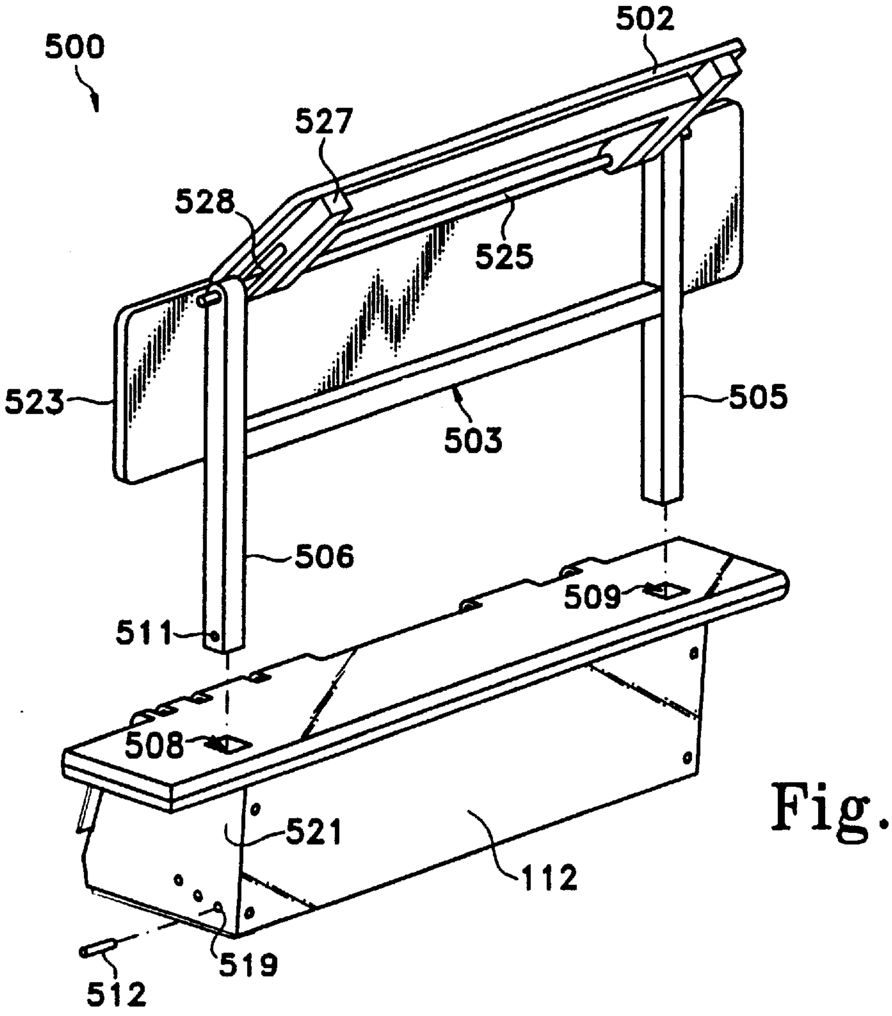
FIG. 62 is a view similar to FIG. 61 showing the stand up board partially folded.

When members 527 are raised to an unlock position, the locking member is pivotable about rod 525, thereby also allowing stand plate 502 to pivot. FIG. 62 shows the locking member in the unlock position, and pivoting with stand board 502 relative to fixed plate 523. The position of the stand board when fully pivoted to the storage position is shown in FIG. 63.

Figure 64:
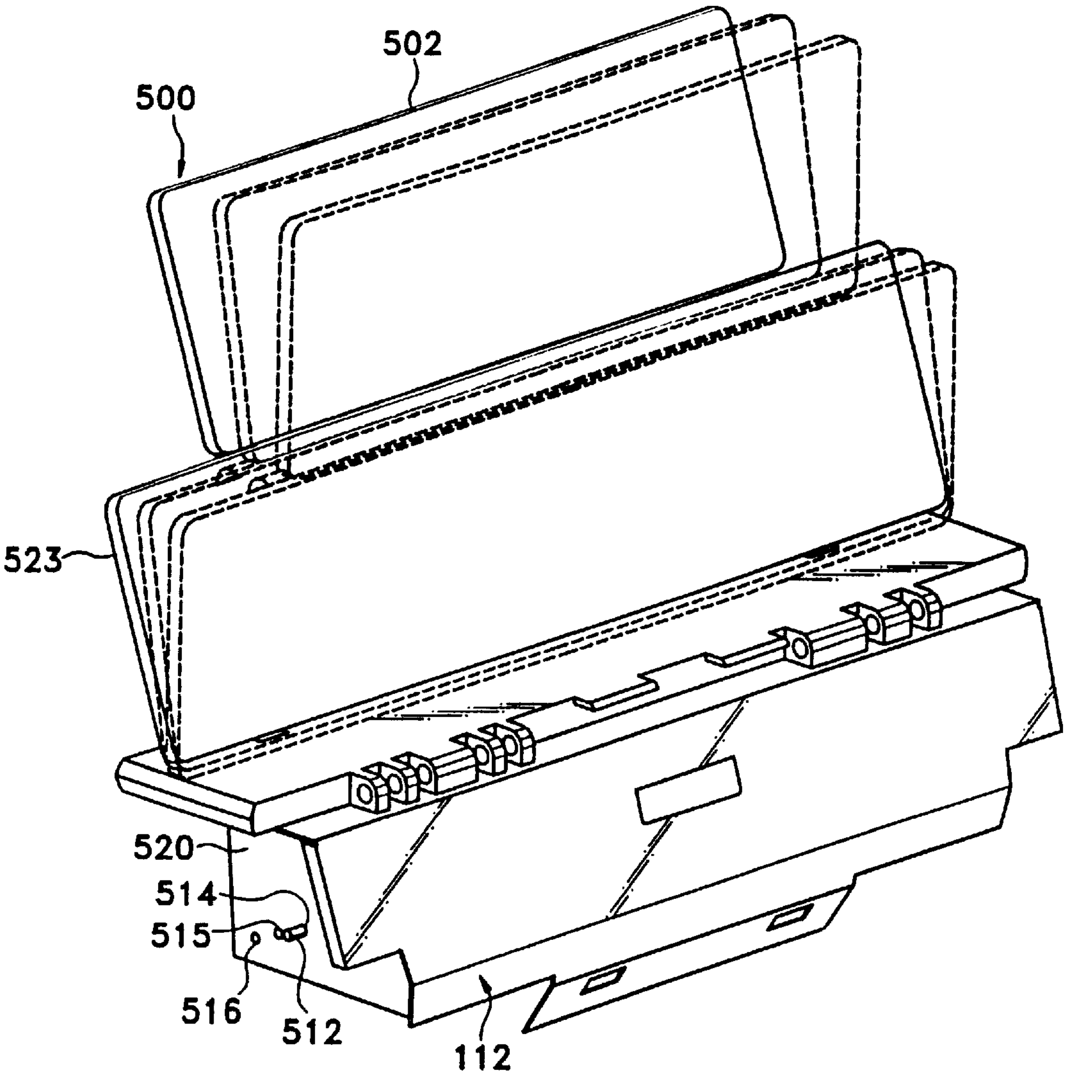
FIG. 64 is a view reverse to the view of FIG. 63 showing the unfolded stand up board in alternative positions relative to the platform extension.

Positioning holes 514 and 517, holes 515 and 518, and holes 516 and 519 are correspondingly positioned so that stand board 502 may be positioned at various angles relative to the platform. FIG. 64 illustrates, in a view opposite to the view of FIG. 63, in phantom and solid lines the various angles that the stand board may have. The position of the stand board in solid lines corresponds to an angle greater than 90°, so that when the mattress is tilted just shy of 90° from the floor, the stand board will be approximately parallel to the floor. In the opposite position shown, corresponding to the position shown in FIG. 63, the stand board is substantially normal to the platform. An intermediate position is also available, as shown.

4. Headboard

Figure 65:
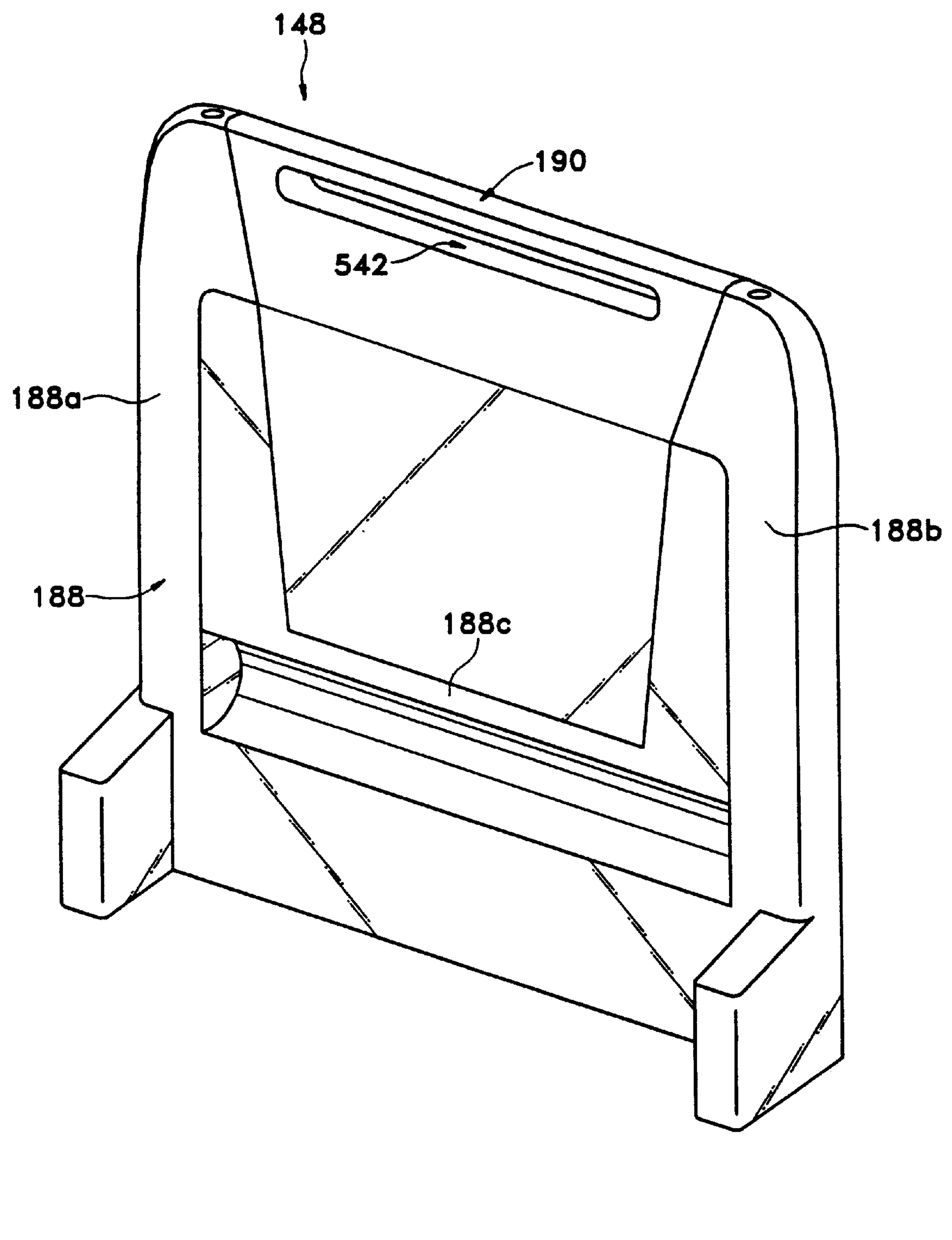
FIG. 65 is an isometric view of a headboard made according to the invention with a panel removable for providing patient access.
Figure 66:
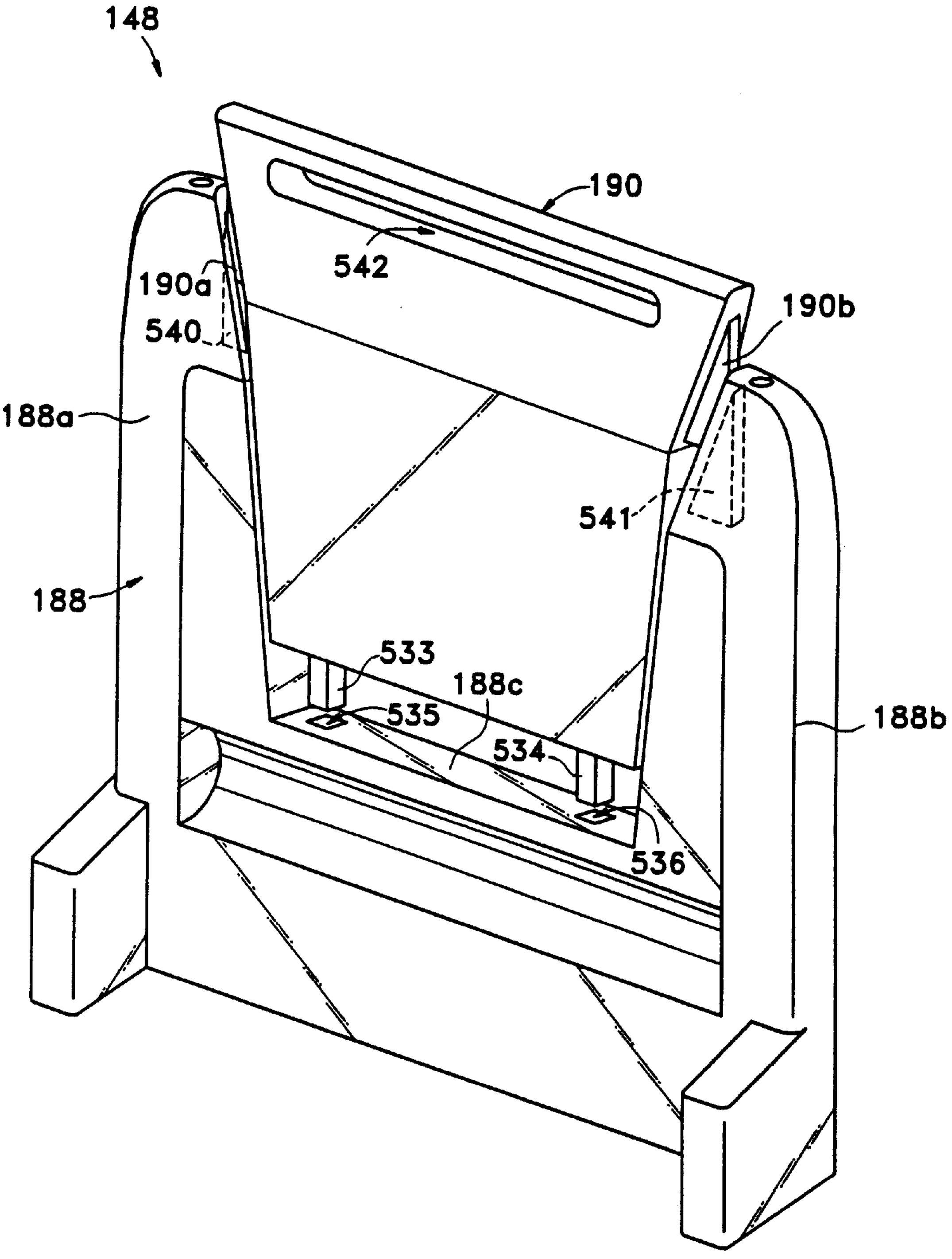
FIG. 66 is a view similar to FIG. 65 with the removable panel partially lifted out of the headboard frame.

FIGS. 65 and 66 illustrate a headboard assembly 148 made according to the invention. This assembly includes base end board 188 having raised side portions 188*a* and 188*b*, and a low intermediate portion 188*c*. The side portions extend well above the mattress of the bed, as shown in FIG. 1, and the intermediate portion preferably extends below the level of top plate 115 when the bed is in the lowest position. A removable panel 190 fills the space left open by intermediate portion 188*c* and is fixedly positionable on the intermediate portion, as shown in FIG. 65. Panel 190 preferably conforms with the size and shape of end board 188 to form a uniform head board assembly.

As shown in FIG. 66 panel 190 is removable from end board 188. To accomplish this, panel 190 has a pair of subtending legs 533 and 534 that are received in mating holes 535 and 536 in the intermediate portion of the end board. Alternatively, the removable panel can have the holes, and the end panel the legs. In order to provide lateral stability to the panel and to allow weight to be applied to it during use and transport of the bed, the panel upper sides preferably include respective wings 190*a* and 190*b*. The facing edges of side portions 188*a* and 188*b* have corresponding slots 540 and 541 into which the wings are received when the panel is lowered into position in end board 188.

Also to facilitate removal of the end panel, it preferably has means for gripping the panel, such as by an elongate hand slot 542.

Figure 67:
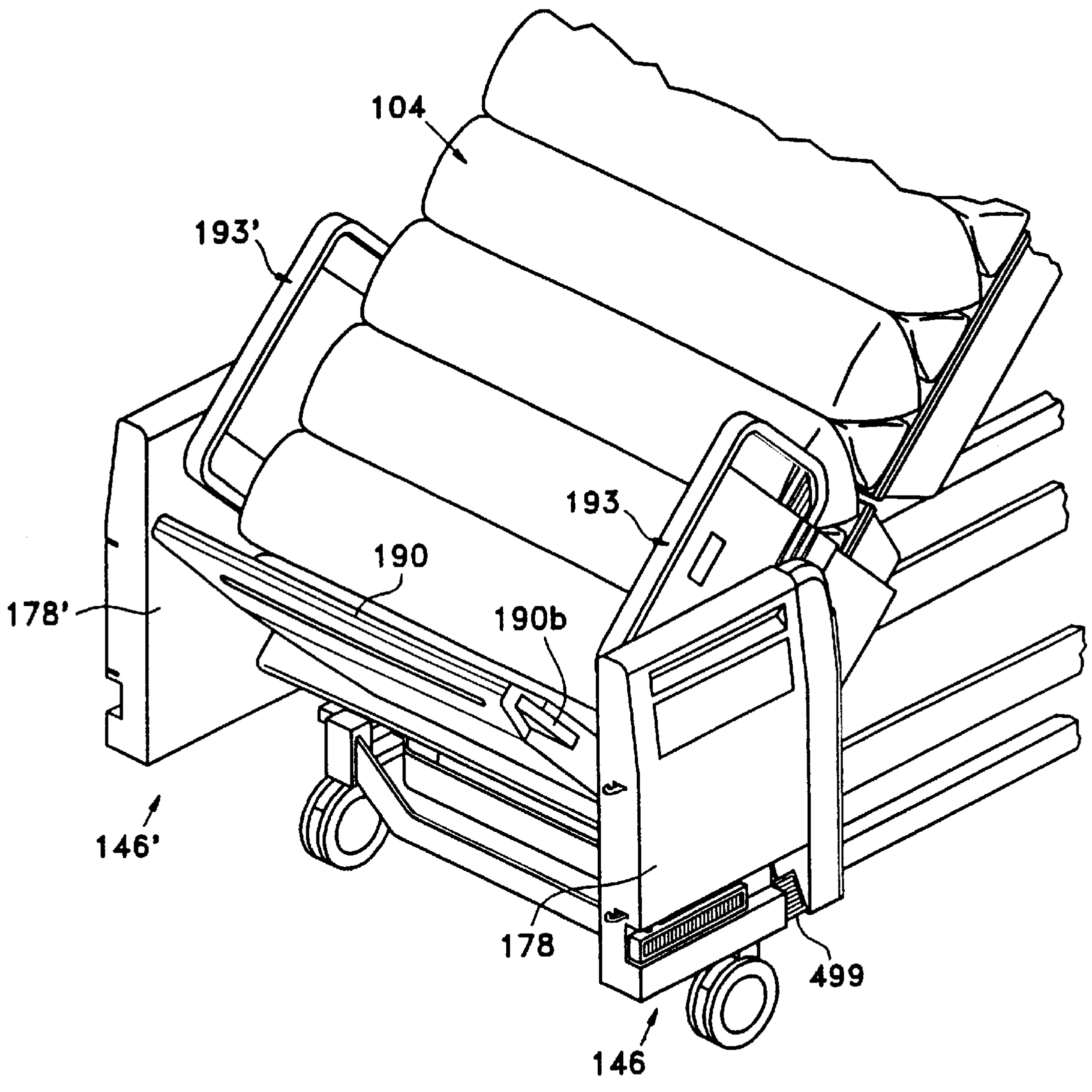
FIG. 67 is a view similar to FIG. 55 showing the headboard panel used as a stand up board.
Figure 69:
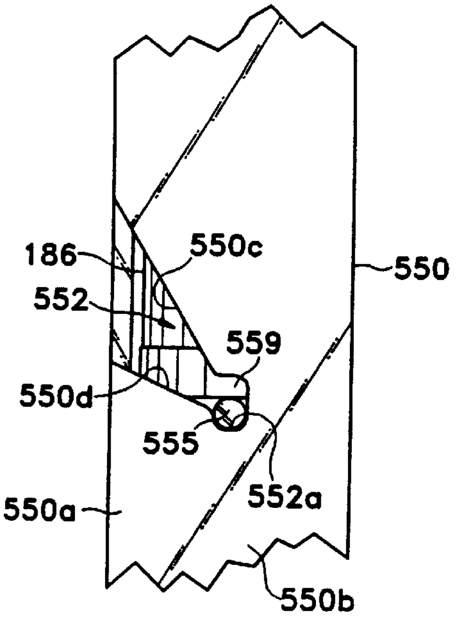
FIG. 69 is an enlarged side view of a portion of FIG. 68 showing a lock opening.

With the embodiment of the footboard panel illustrated, legs 533 and 544 preferably correspond in size and length to legs 505 and 506 of the stand board assembly just described. If so panel 190 may be used in lieu of stand board assembly 500. The use of panel 190 as a stand board is illustrated in FIG. 67. It could also be made angularly adjustable using the same structure as provided for the stand board assembly.

As has been described with reference to FIG. 1, located in each corner of the bed, imbedded in the edges of the foot and head boards, are equipment support assemblies, such as assemblies 176 and 176'. Assembly 176' associated with the foot board will typically not have equipment support apparatus 184, as it is generally to be used for traction or other heavy types of equipment.

Figure 68:
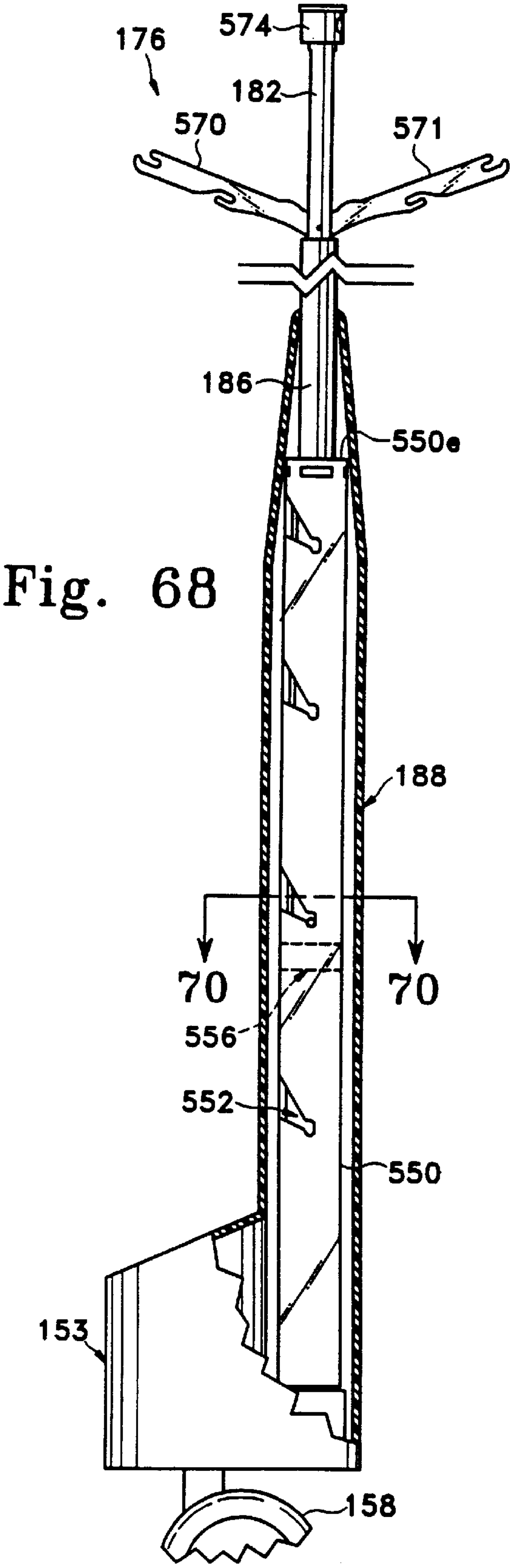
FIG. 68 is a fragmented cross section of a corner of the headboard of the invention showing the structure of a telescoping equipment support assembly.
Figure 70:
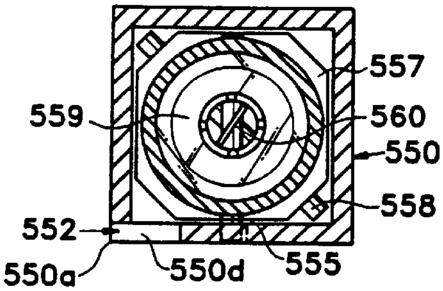
FIG. 70 is a cross section taken along line 70—70 of FIG. 68.

The structure of equipment support assembly 176 is shown in further detail in FIGS. 68–79. In FIG. 68, a channel base member 550 is fixedly mounted in a side portion of base board 188 of the head board assembly 148. It has a square cross section, as shown in FIG. 70 and has a series of downwardly angled, generally triangle shaped openings 552. Each opening 552 extends from a corner 550*a* to the middle of a side, such as side 550*b*. Each triangular opening terminates in a recess 552*a* at its lowest point and has upwardly directed sides formed by upper edge 550*c* and lower edge 550*d*. The base member ends in a top opening 550*e* positioned below the top surface of the base head board.

Figure 71:
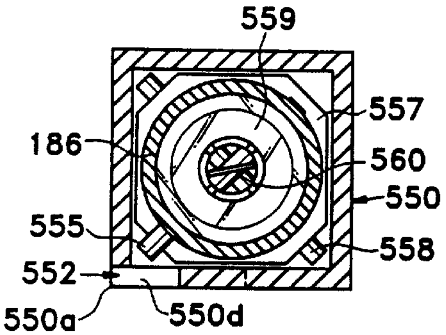
FIG. 71 is a view similar to FIG. 70 showing a different operative position.

Intermediate hollow rod 186 is disposed within base member 550, as shown in FIG. 70 for sliding vertically. A pin 555 is mounted in a bushing assembly 556 attached to the bottom end of rod 186 to extend radially from the rod, as shown particularly in FIGS. 76–79. The rod is rotated so that pin 555 is moved from recess 552*a* to the corner of the base member, as shown in FIG. 71. In this position the intermediate rod can be freely moved up and down relative to the base member. As shown in FIG. 77, a bushing 556 is mounted in the base of rod 186 which applies a counter-clockwise torque to the rod relative to the base member. This torque urges pin 555 into the triangular openings 552 and once in an opening, toward the associated recess 552*a*. This causes the intermediate rod to be somewhat self positioning if allowed to rotate in base member 550 while being lifted. If the rod is not allowed to rotate, it can be lifted freely to any position. When being lowered, the pin will further be directed into a triangular opening recess by the angle of edges 550*c* and 550*d*.

Figure 76:
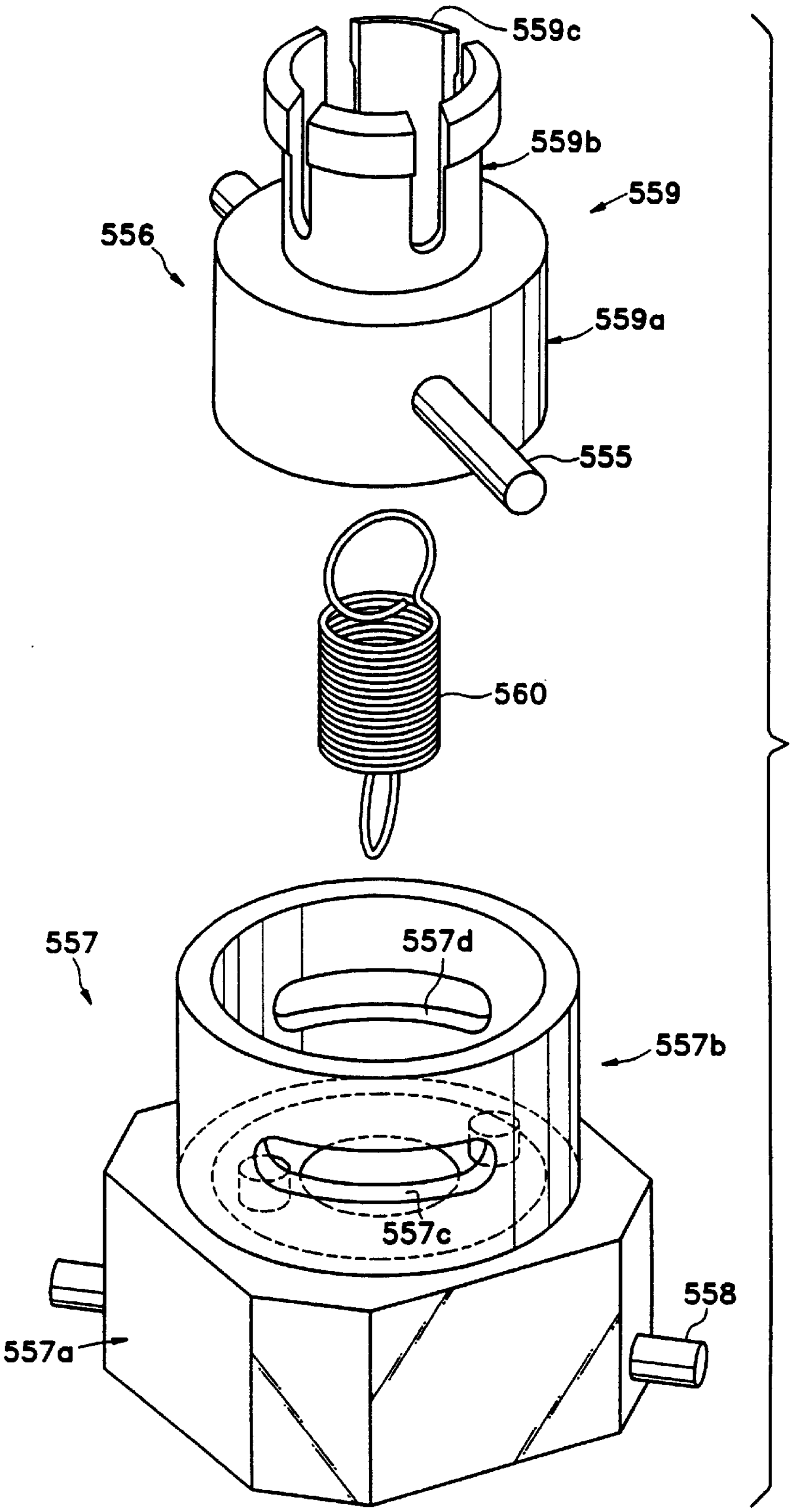
FIG. 76 is an enlarged exploded view of a torsion bushing used in the equipment support assembly of FIG. 68.
Figure 77:
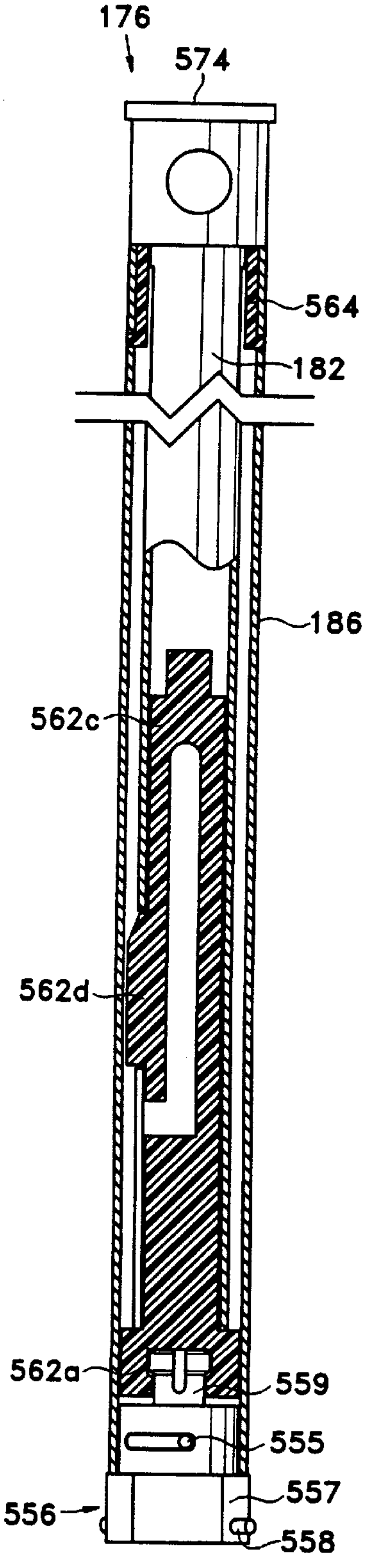
FIGS. 77, 78 and 79 are enlarged cross-sections of a portion of the equipment support assembly of FIG. 68 illustrating operation of a telescoping rod bushing.

Referring to FIG. 76 bushing assembly 556 includes a base unit 557 having an anchor pin 558 in the lower portion. A base section 557*a* is hollow and has an exterior constructed to fit into base member 550 and yet too large for intermediate bar 186. The base unit has an upper portion 557*b* sized to fit within bar 186, as shown in FIG. 77. The upper portion os also hollow and has opposite circumferential slots 557*c* and 557*d*.

A hollow insert unit 559 has a lower portion 559*a* that fits into upper portion 557*b* of the base unit. Pin 555 extends through lower portion 559*a* sufficiently far to also extend through slots 557*c* and 557*d* and out through one side of intermediate bar 186, as has been discussed.

The upper portion 559*b* of the insert unit is in the form of resilient fingers 559*c*. Upper portion 559*b* is releasably insertable in a snap bushing 562, a base end 562*a* having a cavity 562*b* conforming with the upper portion. Insert unit 559 is held in place on inner shoulder 557*e* between the upper and lower portions by a spring 560 that is attached to pins 555 and 558. The spring is twisted before assembling assembly 556 so that pin 555 is given a counter clockwise torque, from a perspective above the assembly. This causes pin 555 to rotate into recesses 552 in base member 550 as has been described.

Support assembly 176 is stored in a collapsed position with upper bar 182 positioned in insert unit 559, as is shown in FIG. 77. Bushing assembly 556, attached to intermediate bar 186, is seated in the bottom of base member 550. When upper bar 182 is lifted out of the headboard, intermediate bar 186 rises with it, due to the connection provided by insert unit 559 in cavity 186*c* of the intermediate bar.

Figure 78:
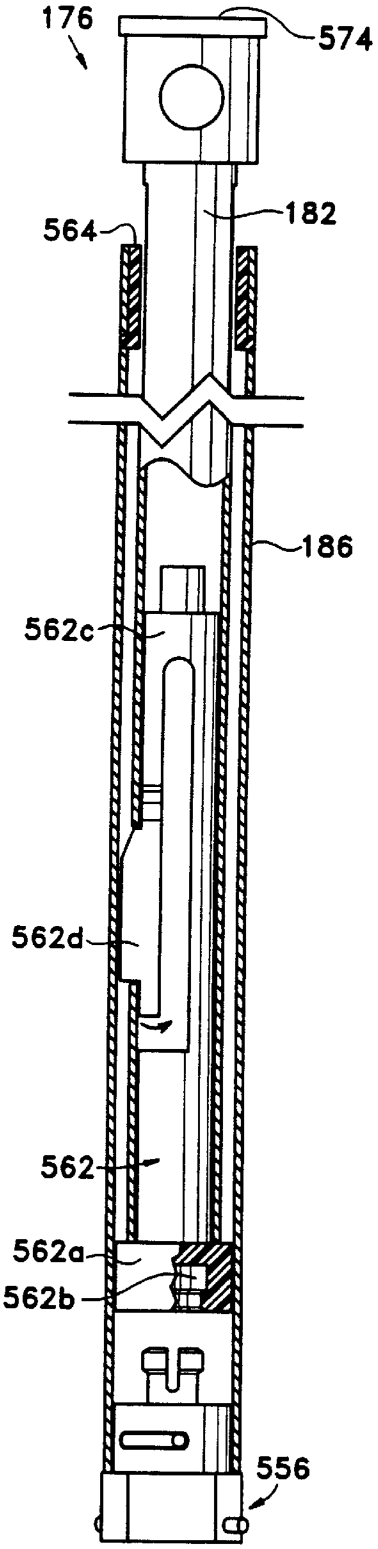

When pin 555 enters the first opening 552, the intermediate bar rotates under the torsion of spring 560 into the associated recess 552*a*. This stops the initial upward travel of the intermediate bar at a position suitable for attaching traction equipment to the top of it. Further upward force on upper bar 182 releases it from the intermediate bar, as shown in FIG. 78.

Figure 79:
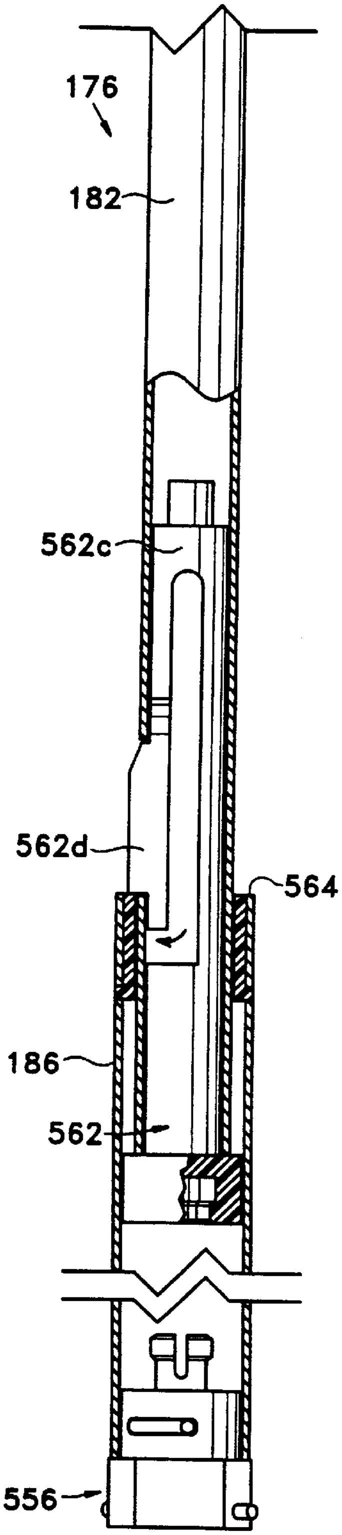
Figure 80:
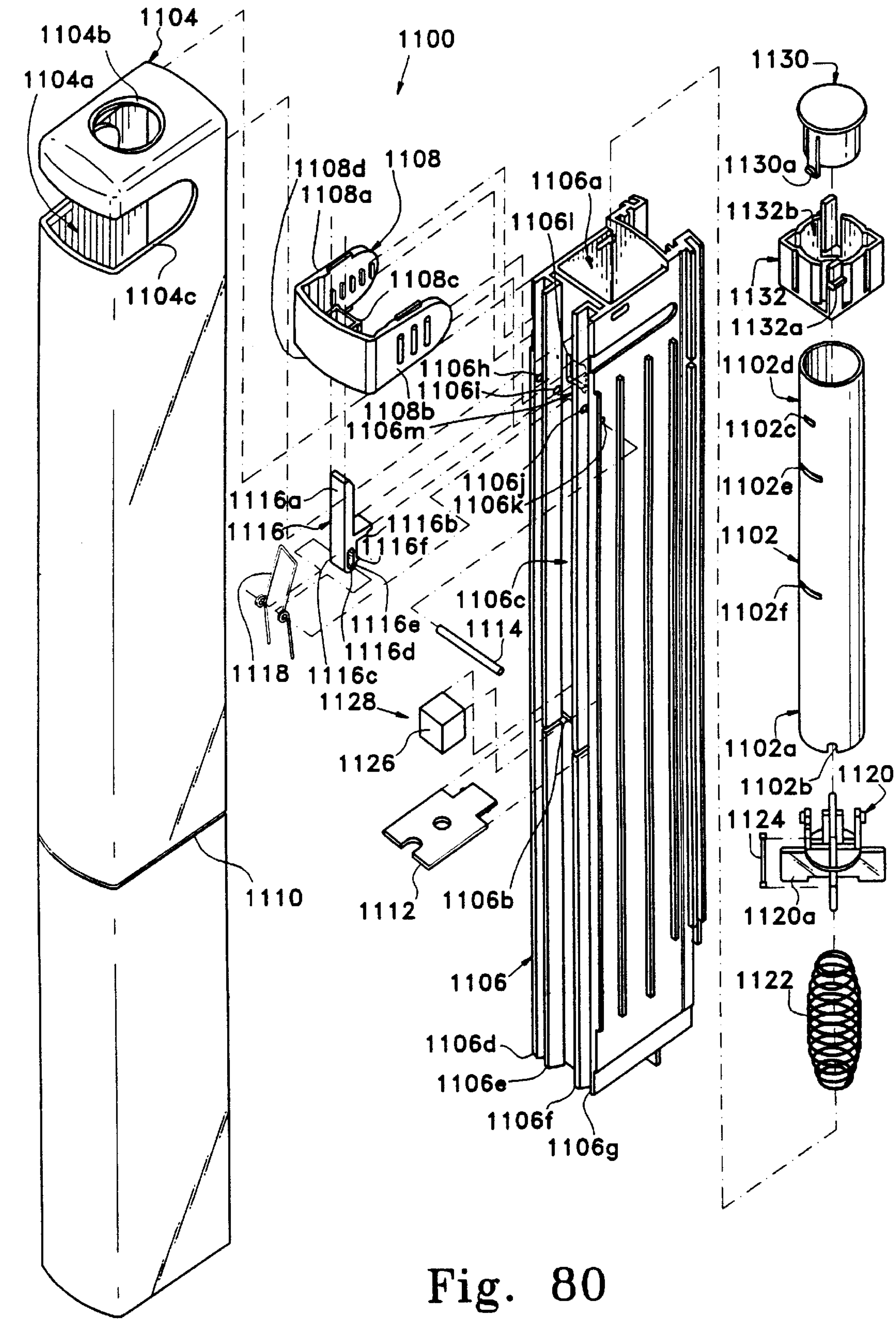
FIG. 80 is an exploded view of a traction pole support assembly made according to the invention.

Snap bushing 562 extends up into the bottom end of upper bar 182 to an upper end 562*c* from which it extends back down to a trigger 562*d*. This trigger extends out through an opening 182*b* in the side of the upper bar. As the upper bar is pulled up out of intermediate bar 182, the trigger is deflected inwardly as it passes through a spacer bushing 564 at the top of the intermediate bar. After it passes the spacer bushing it snaps back out through opening 182*b*. The upper bar is held in an extended position, as shown in FIG. 79, by the seating of trigger 562*d* on the top of spacer bushing 564.

Figure 72:
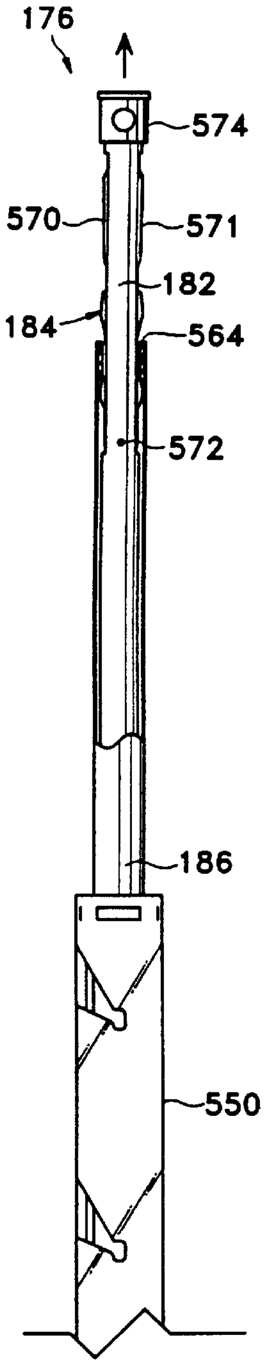
FIGS. 72, 73 and 74 are partial views of the equipment support assembly of FIG. 68 in stages of setup.
Figure 74:
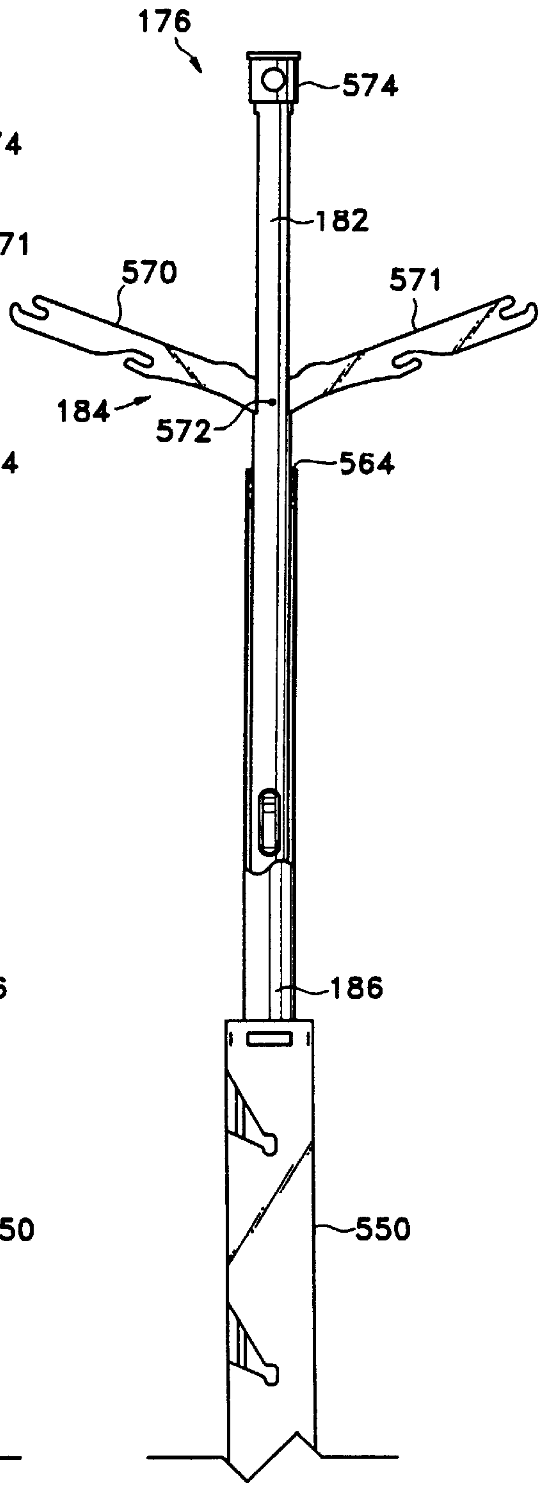

As has been mentioned, mounted in the top of upper rod 182 is equipment support apparatus 184. The upper end of rod 182 has a slot 182*a* that receives opposing, generally planar, equipment support arms 570 and 571. These arms are mounted to rod 182 for pivoting about a pivot rod 572 between a storage position in slot 182*a,* as is shown in FIG. 72, and an equipment support position as is shown in FIGS. 2, 68 and 74. The distal ends of the arms have an upwardly opening slot 570*a* and 571*a*. At an intermediate location along the underside of the arms are intermediate slots 570*b* and 571*b*. These slots are for supporting various patient related equipment such as IV bottles.

Figure 75:
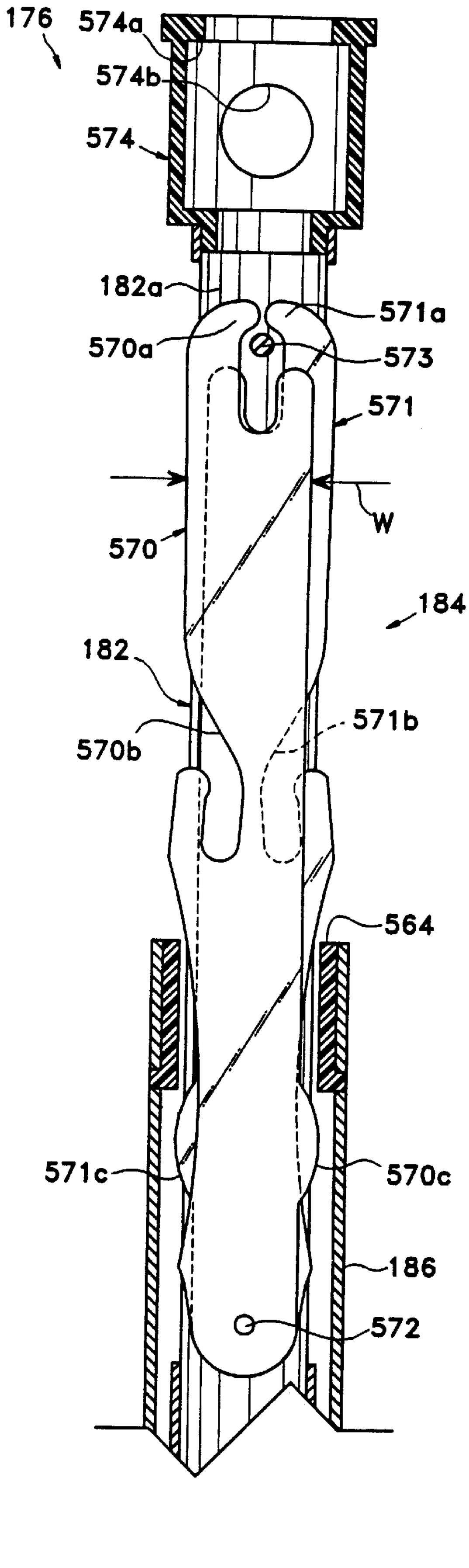
FIG. 75 is an enlarged cross section of the equipment support assembly of FIG. 68.

As is shown particularly in FIG. 75, the distal ends of arms 570 and 571 have a general width W that corresponds to the width of rod 182. The arm distal ends thereby pass through spacer bushing 564 readily. However, curved protrusions 570*c* and 571*c* extend outwardly from the sides of the arms opposite from the direction they pivot away from the top of rod 182. These protrusions are sized to engage bushing 564 when rod 182 is lifted out of intermediate rod 186. When the protrusions engage the bushing they are forced into slot 182*a,* and this forces the tops of the arms out of slot 182*a* in order to accommodate passage of the protrusions past the bushing.

Figure 73:
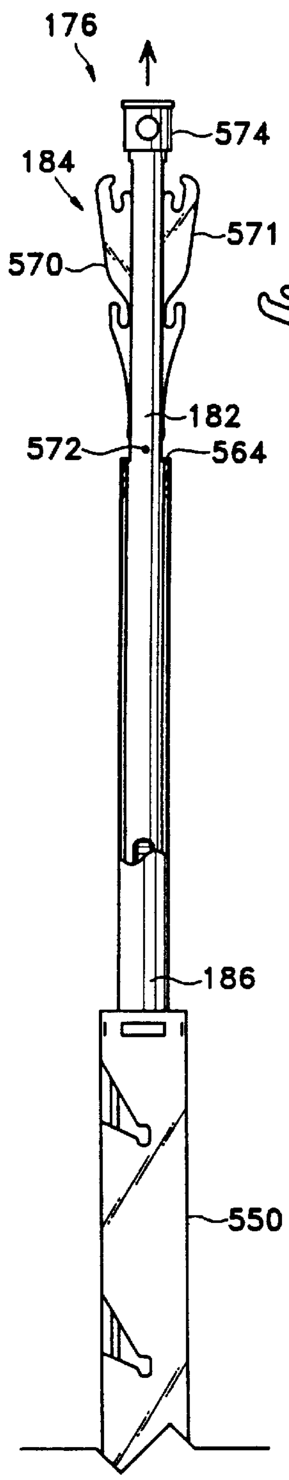

This automatic extension of the equipment support arm ends is illustrated in FIGS. 72–74. In FIG. 72 the tops of the arms, housed in slot 182*a,* have passed through bushing 564, but protrusions 570*c* and 571*c* have not contacted the bushing. In FIG. 73, the protrusions have contacted the bushing and have been forced into the slot, thereby moving the tops of the arms out of the slot. The arms are then moved into a full open position, determined by the contact of the arms on the lower edge of the slot, by gravitational or manual pull to the position shown in FIG. 74.

As is shown in FIG. 75, when arms 570 and 571 are returned to their storage position, a limit pin 573 prevents the arms from pivoting past the vertical position.

It will also be noted that the very tip of upper rod 182 has a hollow cylindrical handle 574 mounted to it. This handle also preferably has in inward directed upper lip 574*a* and opposing holes 574*b* and 574*c*. The lip and holes provide means for gripping the top of rod 182 with a finger when the handle is in a storage position flush with or below the top surface of the headboard, as is shown in FIGS. 65 and 66.

Referring now to FIGS. 80–84, a traction pole assembly 1100 is shown. Assembly 1100, shown in exploded view in FIG. 80, includes a short heavy-duty pole 1102 used for an anchor or base to which traction apparatus, not shown, is secured. Assembly 1100 is mounted in a corner section 1104 of a foot board frame, similar to equipment support assembly 176 just described. Corner section 1104 has a hollow channel 1104*a* sized to snugly receive a pillar 1106. At the top of corner section 1104 is a circular opening 1104*b* sized to slidingly receive pole 1102. Just below the top and extending around three adjacent sides of the corner section is a cutout 1104*c* sized to receive a U-shaped release handle 1108. A partition 1110 closes the bottom end of channel 1104 andn provides a support for the bottom of pillar 1106.

Pillar 1106 also defines a channel 1106*a* extending through its length that is sized to slidingly receive pole 1102. A horizontal slot 1106*b* extending through a side face 1106*c* is sized to receive a bottom plate 1112 that forms a floor in the channel. Side 1106*c* of the pillar has four parallel flanges 1106*d*–1106*g* extending perpendicularly from it and along the length of the pillar, as shown. Coaxial holes 1106*h*–1106*k* are positioned in these flanges just below the top of the pillar to support a pivot pin 1114. A generally square opening 11061 extends through pillar side 1106*c* just above the line of pin 1114, as shown particularly in FIGS. 81–84.

Figure 83:
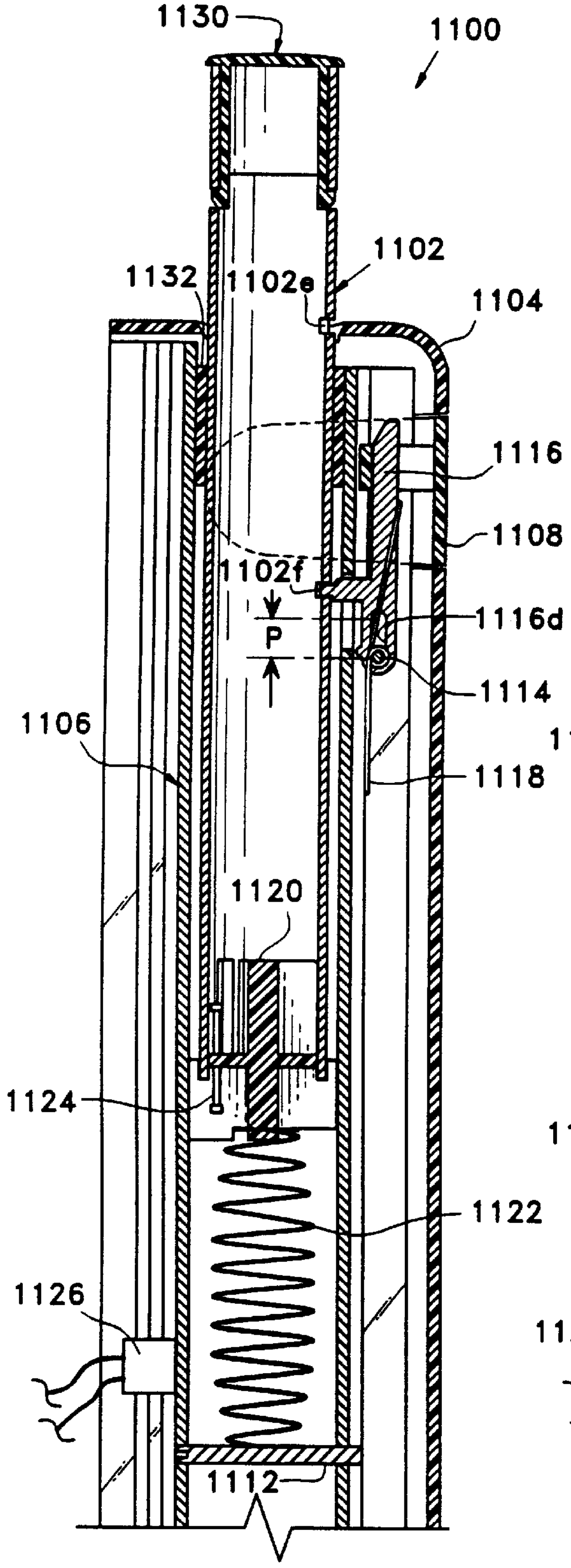
FIG. 83 is a view similar to that of FIG. 82 showing the traction pole in a deployed position for use as a traction anchor.

A lever 1116 is pivotably supported on pin 1114, as is a bias spring 1118. Spring 1118 biases lever 1116 toward a pole-engaging or holding position, as shown in FIG. 83. The lever has an upwardly extending arm 1116*a,* a horizontally extending, pole-engaging arm 1116*b,* also referred to as holding means, and a downwardly extending pivot base 1116*c*. Base 1115*c* has a lateral pivot bore 1116*d* that receives pin 1114 and is elongate vertically, as shown particularly in FIG. 83. On the bottom inside surface 1116*e* of base 1116*c,* that is, the surface facing pillar 1106, there is a ridge 1116*f* also referred to as a foot.

Pole 1102 is hollow and cylindrical, with open ends. The lower end 1102*a* has four equally spaced slots, such as slot 1102, sized to receive the edges of upwardly extending wings, such as wing 1120*a* of a bushing 1220. Bushing 1120 supports pole 1102 and in turn is attached to and supported on a pop-up spring 1122. The bottom of spring 1122 rests on and is attached to bottom plate 1122. Wings 1120*a* of the bushing are sized to slide down the corners of pillar channel 1106*a,* which channel has a square cross section in a horizontal plane. These wings then, when in position on the bottom of the pole, keep the pole in alignment in the pillar and keep the pole from rotating.

Mounted on bushing 1120 is a one-inch long, 900 gauss reed-switch magnet 1124. This magnet activates a magnetically sensitive reed switch 1126 mounted to pillar 1106 just above bottom plate 1112. When pole 1102 is in a recessed or storage position, as shown in FIG. 83, the magnet is close to the reed switch, causing the switch to close. The reed switch assembly thus functions as a sensor 1128 for determining whether the traction pole is in the recessed position, a first state, or in a raised position above the recessed position, a second state. The use of this sensor, like other sensors built into the bed, is described below in the section having the heading Multifunction Control System.

Pole 1102 also has small, circumferentially opposed slots, such as slot 1102*c* near upper end 1102*d.* Each slot receives a biased tongue 1130*a* of a cap 1130 that is thereby fixedly positioned within upper end 1102*d* of the pole. The cap simply closes the end of the pole and provides a smooth surface that is safe to handle.

An upper bushing 1132 is fixedly mounted in the upper end of channel 1106*a* of the pillar. The pillar has opposite lateral slots, such as slot 1106*d,* adjacent to the upper edge of the pillar. These slots receive corresponding biased tongues, such as tongue 1132*a,* which secure the bushing in the pillar. Bushing 1132 has an inner circular channel 1132*b* sized to slidingly receive pole 1102. This bushing thus stabilizes the pole within pillar 1106.

Figure 81:
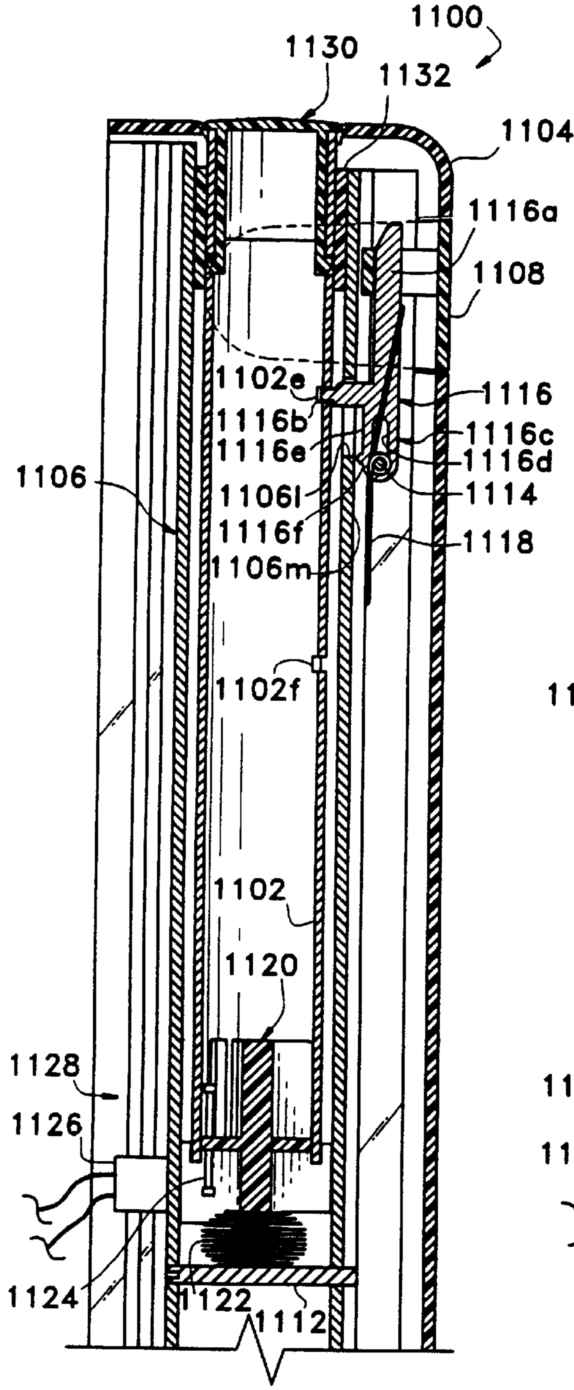
FIG. 81 is a partial cross-sectional view of the assembly of FIG. 80 showing the traction pole in a recessed position.

Disposed intermediate the ends of pole 1102 are axially spaced-apart circumferentially elongate lock slots 1102*e* and 1102*f.* These slots are sized and aligned to receive the distal end of pole-engaging arm 1116*b* of lever 1116, as shown in FIGS. 81 and 83. When the lever engages a lock slots the pole is locked in vertical position relative to the pillar and end frame. However, in this configuration, lever 1116 may be moved vertically in a range of movement defined by the height P of pivot bore 1116*d.*

When pole 1102 is in the recessed position, as shown in FIG. 81, the pole top cannot be manually grasped. Pop-up spring 1122 holds the pole and lever combination in a slightly raised position with pin 1114 nested in the bottom of pivot bore 1116*d* and pole-engaging arm 1116*b* of the lever extends into lock slot 1102*e.* By pulling side wings 1108*a* and 1108*b* of release handle 1108, which handle has a U-shaped finger loop 1108*c* extending from a base portion 1108*d,* upper arm 1116*a* of the lever, which extends through loop 1108*c,* is pulled away from the pole. This pulls pole-engaging arm 1116*b* out of slot 1102*e,* allowing spring 1122 to pop upper end 1102*d* of the pole up above the top of end frame section 1104, to the position shown in FIG. 82.

It will be noted that when the lever is pivoted with the pivot pin in the bottom of pivot bore 1116*d,* the lever is free to rotate in the space between pillar side 1106*c* and the opposing face of the end frame section.

With the top of the pole now extending above the top of the end frame, the pole may be manually grasped and raised until pole-engaging arm 1126 becomes aligned with and snaps into lock slot 1102*f* under the force of bias spring 1118, as is shown in FIG. 83. Pop-up spring 1122 is held in tension when the pole is raised to this level, so there is a downward force on the pole. In this deployed or support position of the pole, pivot pin 1114 is in the lower portion of pivot bore 1126*d* of the lever. The pole and lever are also in what is referred to as a release position.

When the pole is released, the downward force of spring 1122 pulls the pole along with now attached lever 1116 to a slightly lower position relative to pillar 1106. The pole then ends up in the position shown in FIG. 84, also referred to as a lock position. In this position, pivot pin 1124 is now in the upper portion of pivot bore 1116*d*. If the lever is pivoted about pin 1114 by outward pull on handle 1108, ridge 1116*f* on pivot base 1116*c* of the lever immediately contacts a blocking portion 1106*m* on side 1106*c* of the pillar. The lever thus cannot be pivoted when the pin is in the upper portion of the pivot bore. Portion 1106*m* is also referred to as an element, which along with ridge 1116*f* are referred to as preventing means.

Figure 84:
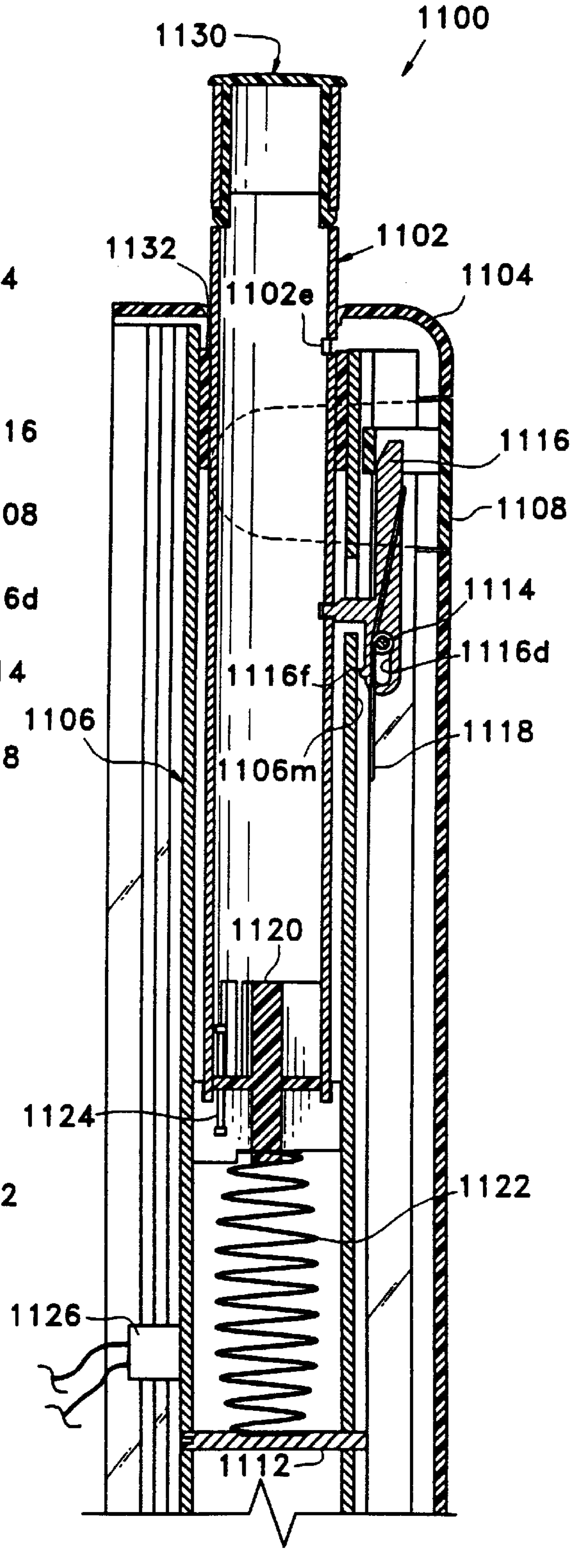
FIG. 84 is a view similar to that of FIG. 83 showing a release lock mechanism engaged to prevent inadvertent release of the traction pole from the deployed position.

When the pole is in the lock position shown in FIG. 84 then, an attendant or other person cannot inadvertently pull release handle 1108. The release mechanism (handle 1108 and lever 1116) is thereby defeated by this structure making the position of the traction poles very secure.

Figure 82:
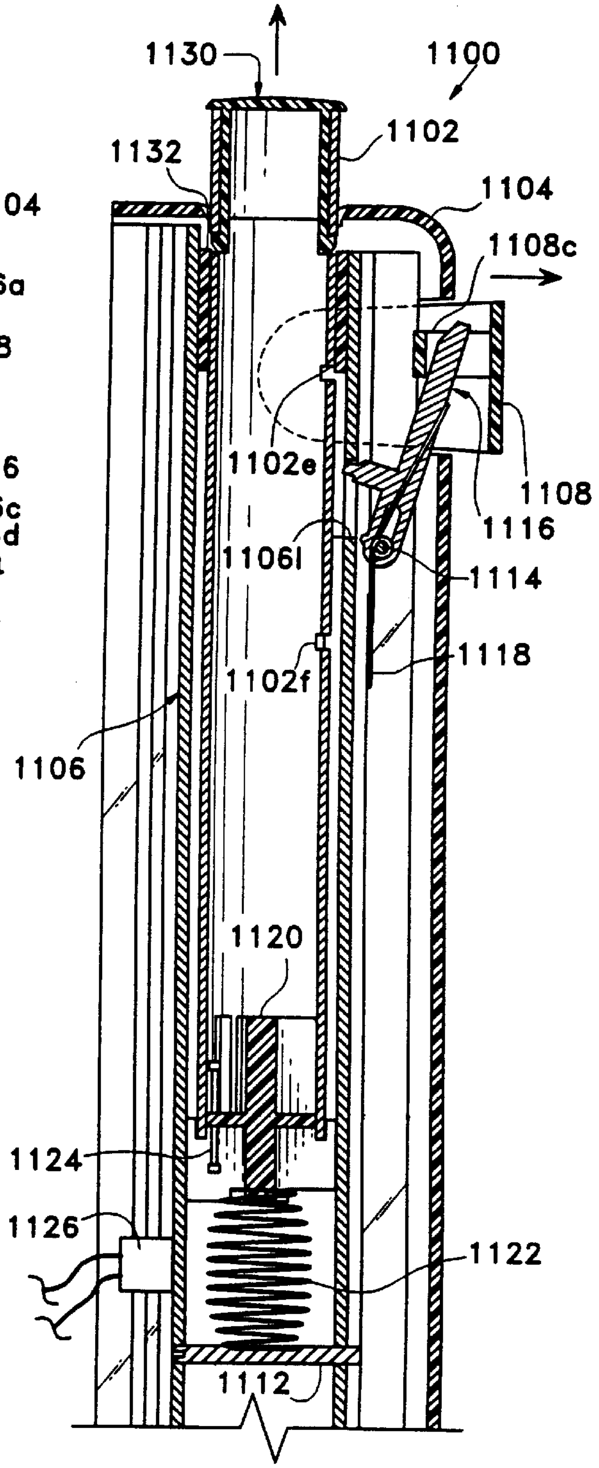
FIG. 82 is view similar to that of FIG. 81 showing the traction pole in a released, pop-up position.

In order to lower the traction pole it is simply a process of reversing the previously described steps used to deploy the pole. That is the pole is raised slightly from the lock position shown in FIG. 84 to the release position shown in FIG. 83. With the pivot pin now in the lower portion of the pivot bore, the lever is free to pivot about the pin. This is accomplished by pulling the release handle away from the pole while holding the pole in this raised position. This pulls the lever away from the holding position. While holding the release handle out, pole-engaging arm 1116*b* is held out of slot 1102*f*, and the pole is lowered. The release handle is then released. Bias spring 1118 pulls lever 1116 and handle 1108 back toward the holding position. If it is desired to store the traction pole, the top of the pole is pushed down against the force of spring 1122. The end of arm 1116*b* rides on the surface of the pole, as shown in FIG. 82, until upper lock slot 1102*e* is encountered. The pole is now returned to the storage position shown in FIG. 81.

It is seen that traction pole assembly 1100 provides a traction or heavy equipment pole that is very convenient, easy to use, and further provides the benefit of locking out the function of the release handle when the pole is deployed, thereby preventing inadvertent lowering of the pole during use.

5. Weight-Sensing System

FIGS. 85–92 illustrate weigh system 133. The mechanical structure is shown in plan view in FIG. 85. Weigh frame 132 is shown supported on base frame 142. The weigh frame is formed of structural members 138 and 140 forming a wishbone shape that extends from central support 134 at the head of the bed to lateral supports 135 and 136 at the foot of the bed.

Figure 86:
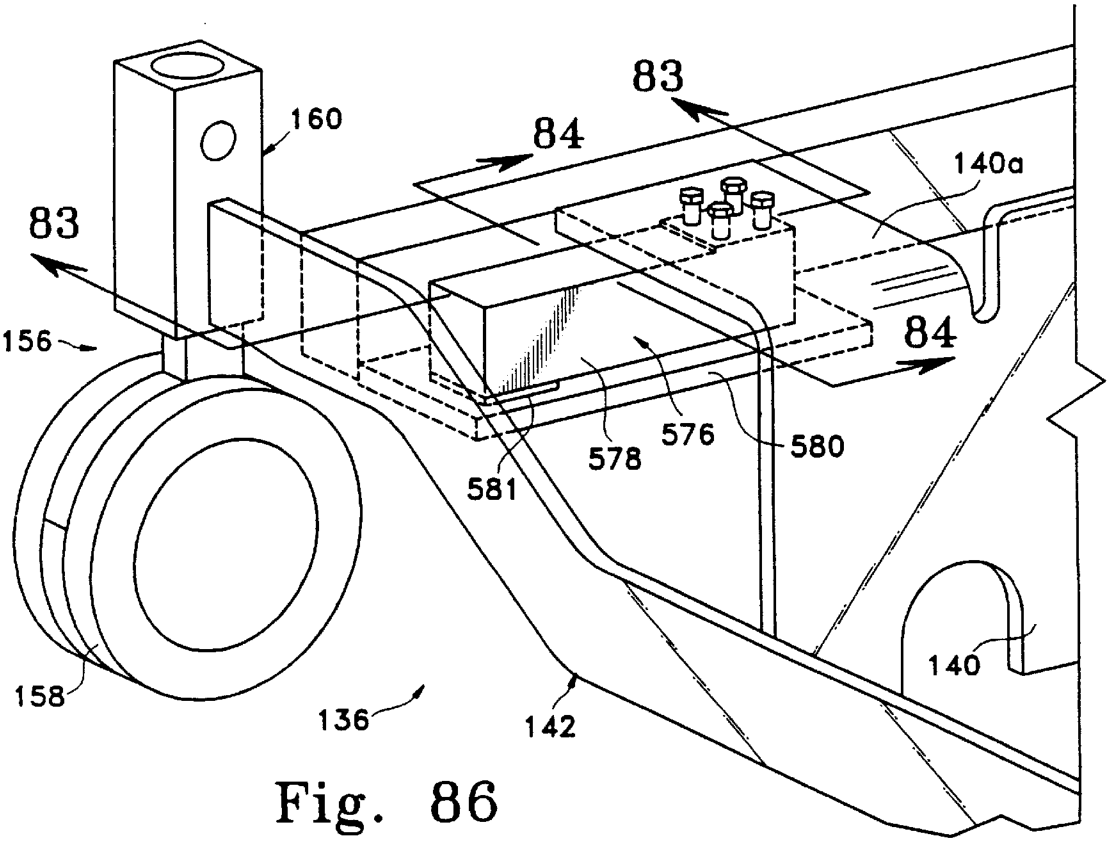
FIG. 86 is a simplified isometric of a corner of the base and weigh frames of FIG. 85 showing of a single weight-sensing load cell used between the weigh frame and base frame.
Figure 87:
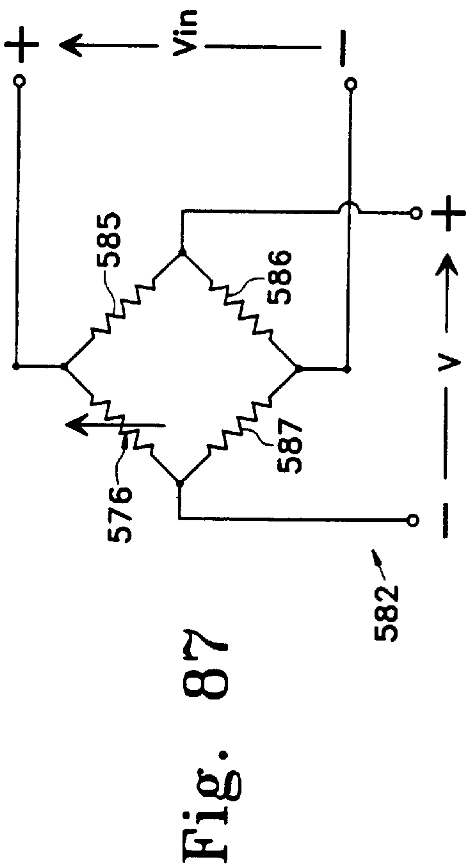
FIG. 87 is a circuit schematic illustrating the electrical structure of the load cell of FIG. 86.
Figure 88:
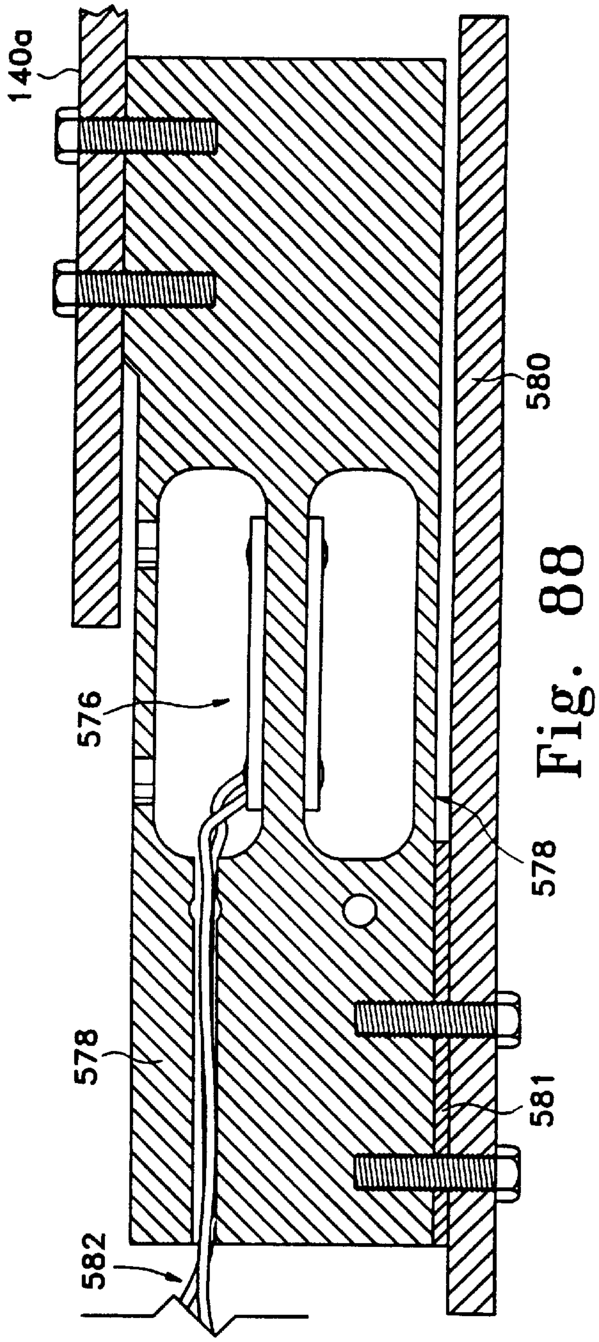
FIG. 88 is a partial cross-section taken along line 88—88 in FIG. 86.
Figure 89:
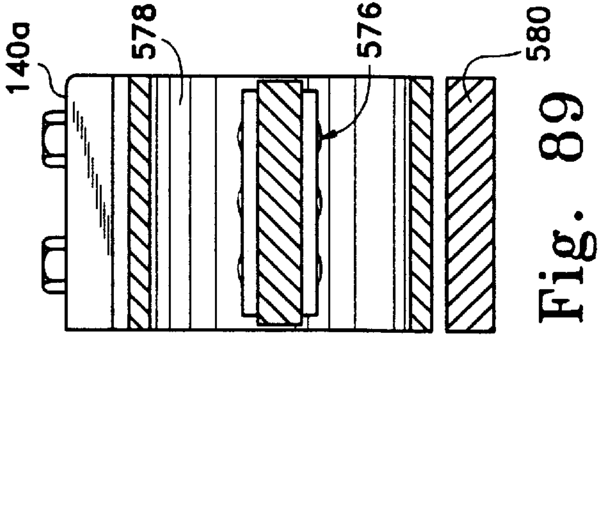
FIG. 89 is a partial cross-section taken along line 89—89 in FIG. 86.

Each support includes a load cell 576 mounted in a block 578, as is shown in isometric view in FIG. 86 and in cross-section along lines 88—88 and 89—89 in FIGS. 88 and 89, respectively, for lateral foot support 136. Block 578 is elongate and is supported at one end on a base plate 580 and a shim 581 by suitable bolts. The other end supports a wing 140*a* of the structural member, as shown. The load cell is mounted centrally in the block, with conventional structure to generate an electrical signal on wires 582 representative of the weight supported by the block. The generation of the weight signal is based on a bridge network having fixed resistors 585, 586 and 587. The load cell acts as a variable resistance. The driving voltage is shown as Vin. The sensed output voltage is Vout.

Figure 90:
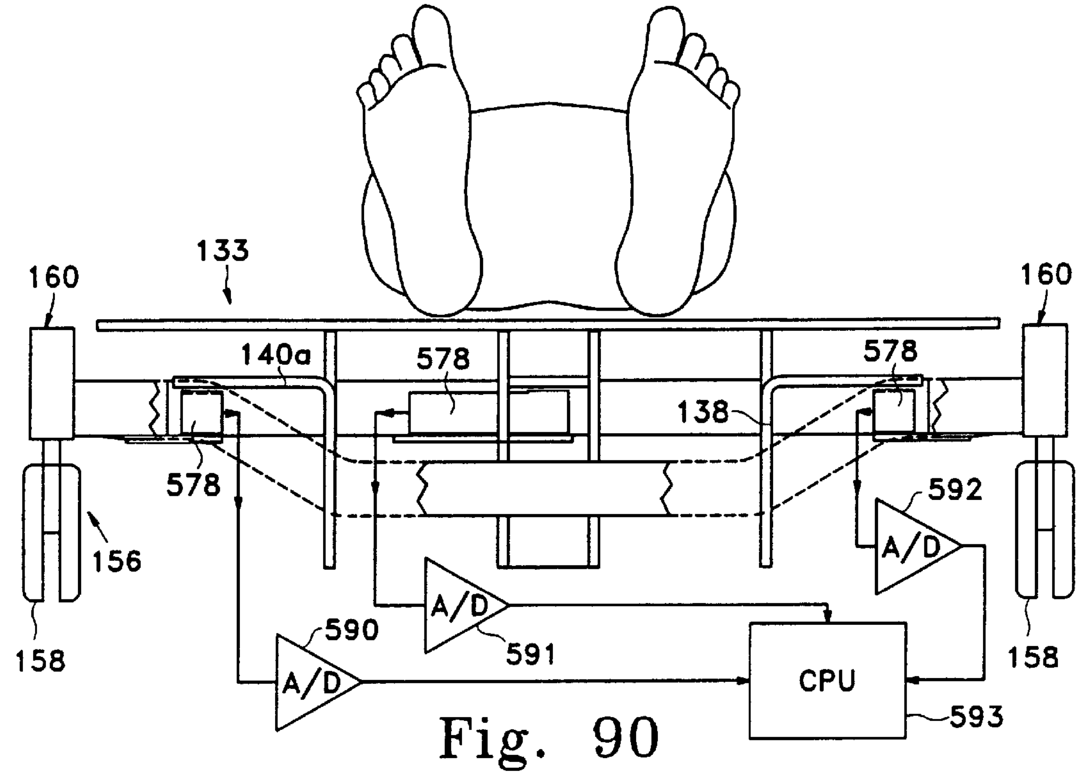
FIG. 90 is a simplified illustration of the weigh system of the invention.

FIG. 90 shows in a simplified, symbolic drawing the overall structure of weigh system 133. The load cells associated with each of supports 134, 135 and 136 generate separate signals that are input to respective analog-to-digital converters 590, 591 and 592. The separate digital weight signals are then input into a computer or CPU shown generally at 593.

Figure 91:
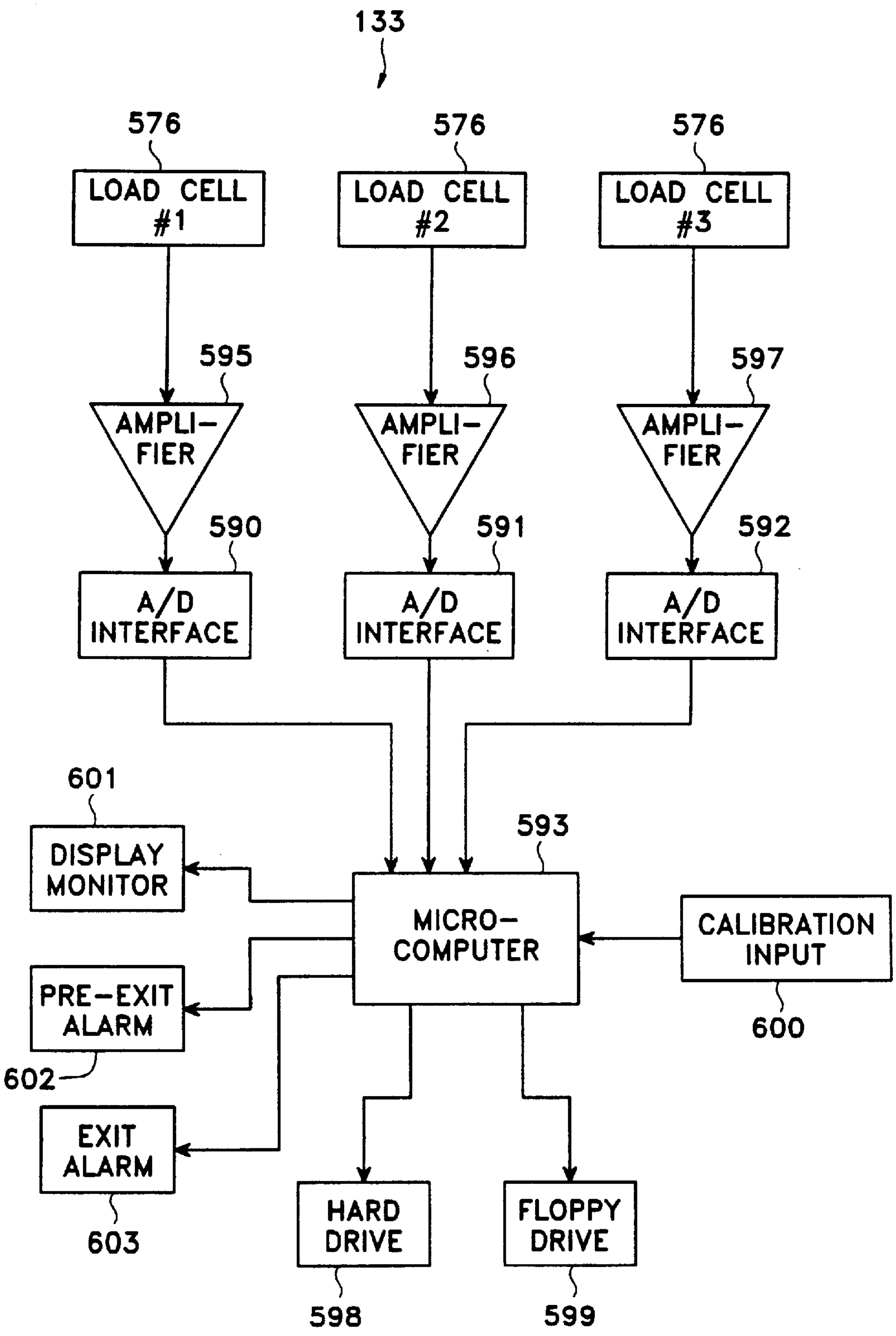
FIG. 91 is a block diagram of the weigh system of FIG. 85.

A more detailed diagram is shown in FIG. 91. This diagram shows an amplifier 595, 596 and 597 coupling the load cell of each support to the respective A/D converter. CPU 593 is connected to various accessories, including memory devices, such as hard and floppy disk drives 598 and 599. An input device 600, such as a keyboard, is used to input calibration information. A monitor display 601 provides a visual display of data and instructions for inputting calibration data. Based on movement of the patient, as described below, the CPU generates a pre-exit alarm and an exit alarm on output devices 602 and 603.

Figure 92:
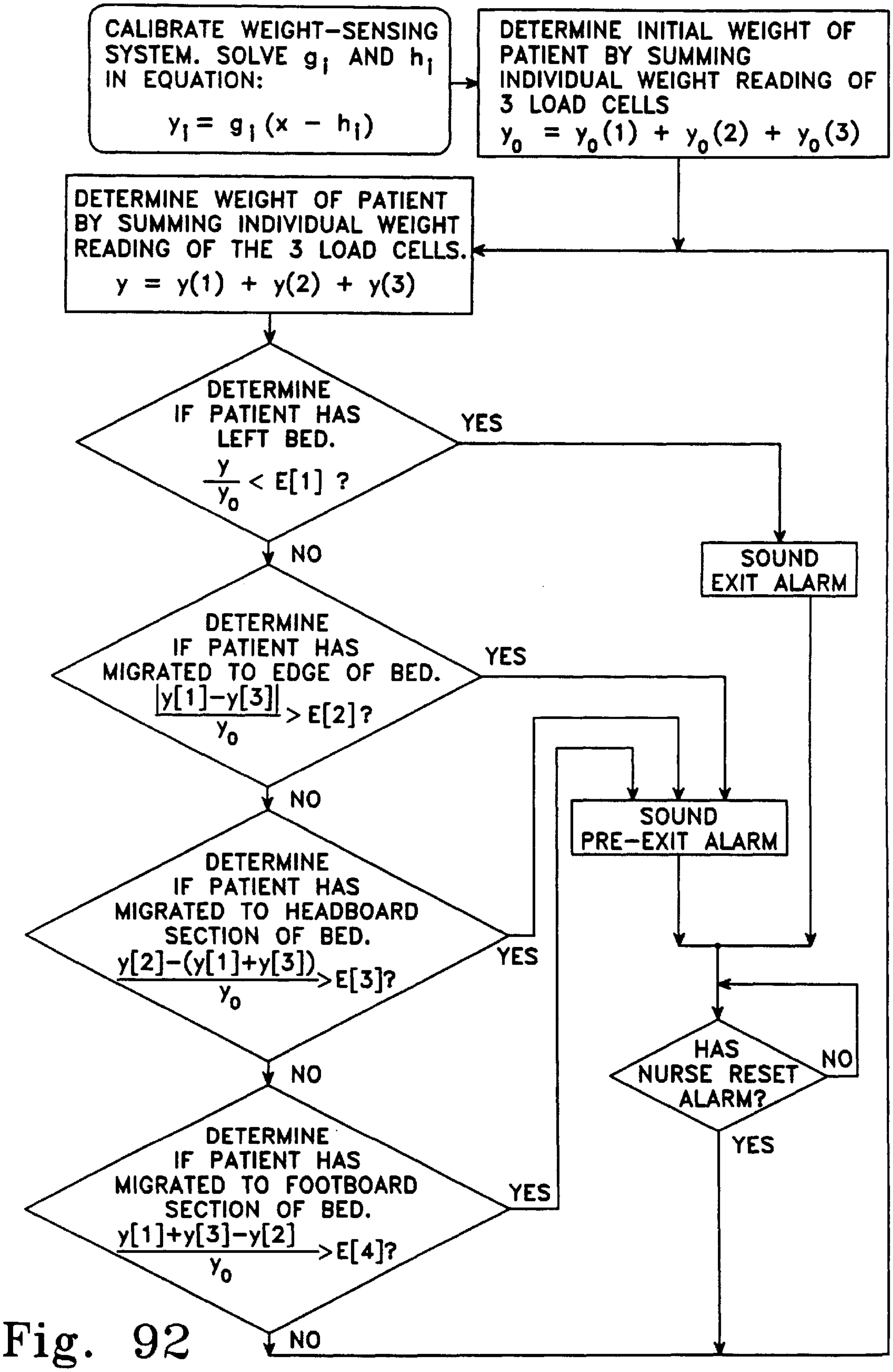
FIG. 92 is a flow-chart illustrating operation of the weigh system of FIG. 85.
Figure 93:
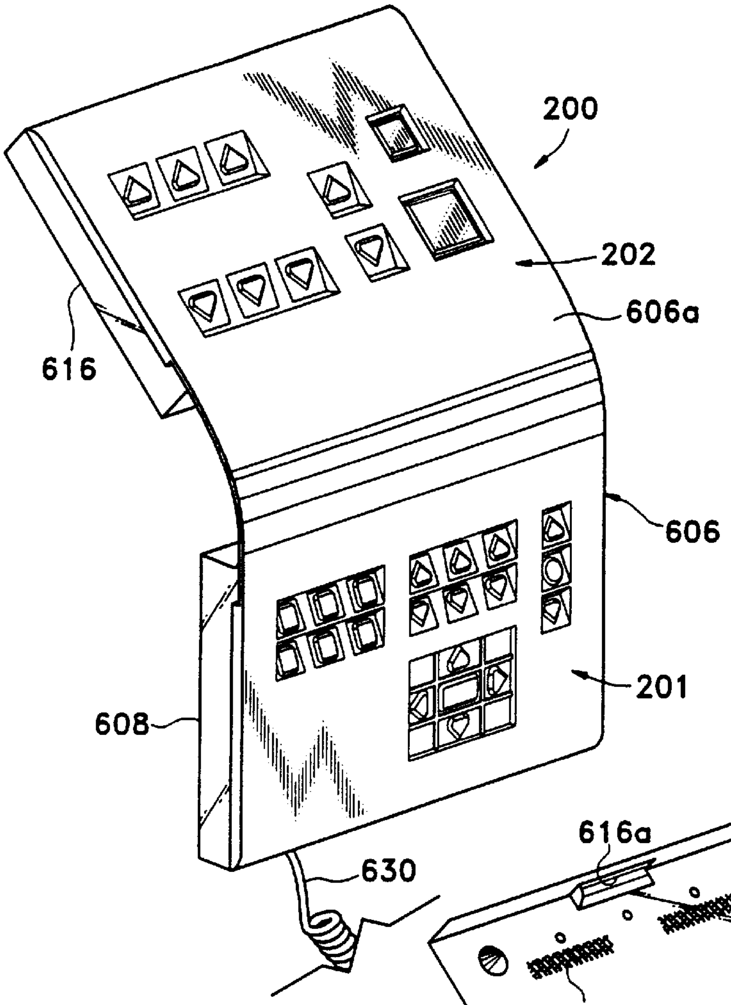
FIGS. 93 and 94 are isometric views of different sides of a saddle-bag controller made according to the invention.
Figure 94:
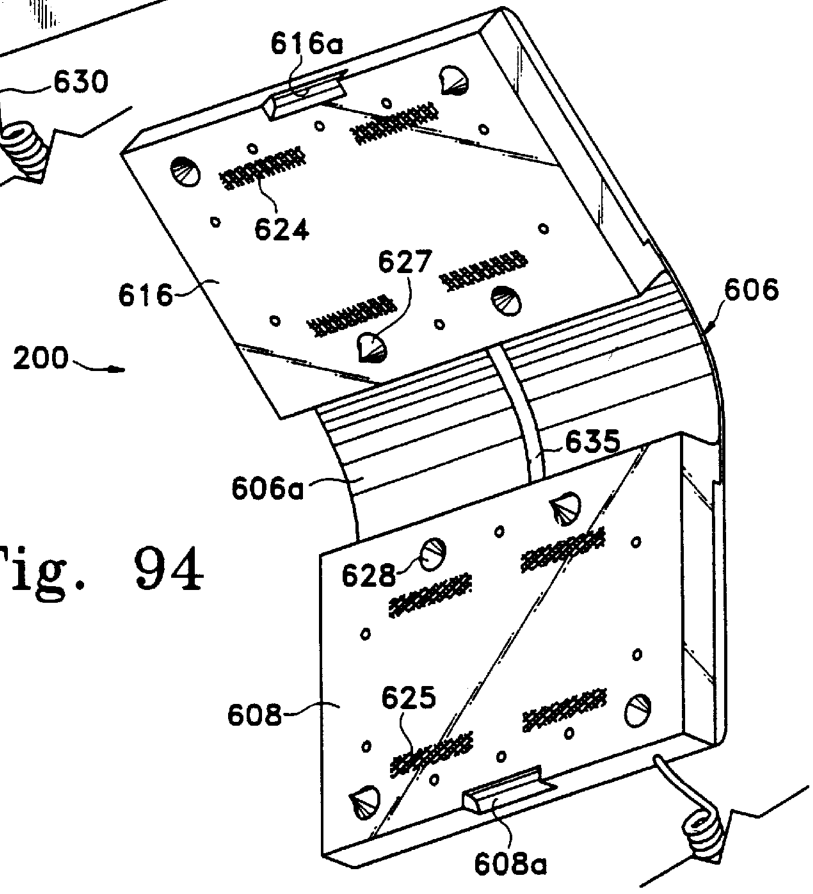

The operation of weigh system 133 is provided in FIG. 92. When the bed is first installed the weigh system is calibrated by placing a standard weight at three spaced-apart locations on the mattress. The mattress should be placed in a horizontal orientation in order to avoid unusual torques on the load cells. The locations are arbitrary, but for the best results they should be as far apart as possible. In each instance, the total weight equals the sum of the weights read by the three sensors. The basic equation for each sensor is $$y[i]=g[i](x-h[i]) \tag{1}$$

where y=patient weight, x=the A/D converter output, and g[i] and h[i] are constants. In words, x is a sensed value proportional to the total weight sensed by the load cell, h[i] is the sensed value corresponding to the weight of the bed without a patient, and g[i] is a constant to convert the digital signal into a weight unit of measure, such as pounds.

Initially, then, three equations are formed by removing all patient loading. The three equations are $$032\ g[1](x[0,1]-h[1]) \tag{2}$$

$$0=g[2](x[0,2]-h[2]) \tag{3}$$

$$0=g[3](x[0,3]-h[3]) \tag{4}$$

These equations reduce to $$h[1]=x[0,1] \tag{5}$$

$$h[2]=x[0,2] \tag{6}$$

$$h[3]=x[0,3]. \tag{7}$$

With a standard weight applied to the three locations, three more equations are derived based on the equation for total sensed loading (patient) weight $$y=y[1]+y[2]+y[3]. \tag{8}$$

The three resulting equations are $$y=\sum_{i=1}^{3} g[i](x[1,i]-h[i]) \tag{9}$$

$$y=\sum_{i=1}^{3} g[i](x[2,i]-h[i]) \tag{10}$$

$$y=\sum_{i=1}^{3} g[i](x[3,i]-h[i]) \tag{11}$$

where x[j,i9 for j,i=1,2,3 are the respective A/D converter readings and y is the standard weight.

Using a standard Gauss-Jordan or other appropriate elimination method equations (5)–(7) and (9)–(11) are solved to obtain values for g[1], g[2], g[3], h[1], h[2], and h[3].

When a patient is initially put in the bed, the patient's weight is measured and set equal to $y_0$. Thereafter, the dynamic weight of the patient, y, is measured. In determining if the patient has left the bed, the ratio of measured weight to original weight is determined and compared to a constant E[1], which is some value less than one such as 0.75. This value can be adjusted to make the system appropriately sensitive. It should not be set to activate the exit alarm if the patient momentarily unweights the bed, such as by shifting position or holding on to the guard rails or traction equipment.

While a change in total weight flags an exit condition, a change in weight distribution flags a pre-exit condition, such as a patient positioned next to a side or end of the bed. If the patient is lying in the middle of the bed, y[1]=y[3], or y[1]−y[3]=0, where y[1] and y[3] correspond to the two laterally spaced load cells at the foot of the bed. If the patient moves to the left or to the right, y[1]−y[3]<>0. Thus, a pre-exit condition exists when $$\frac{|y[1]-y[3]|}{y_0} > E[2] \tag{13}$$

where E8 2] is a constant nominally set to 1.00, and adjusted to make the system more or less sensitive. Although logic would seem to indicate that the constant should have a value less than 1.00, since some of the weight will be on the head load cell, i.e., y[2]>0, experience indicates that the dynamics of the system require the value suggested.

If desired other pre-exit conditions could be determined. For instance, if the patient approaches the head of the bed, y[2] increases and y[1] and y[3] decrease. Thus a further pre-exit condition exists:

$$\frac{y[2]-(y[1]+y[3])}{Y_0} > E[3] \tag{14}$$

If the patient approaches the foot of the bed, y[2] decreases and y[1] and y[3] increase. The corresponding pre-exit condition is $$\frac{y[1]+y[3]-y[2]}{y_0} > E[4] \tag{15}$$

When the mattress is articulated, the center of mass of both the bed and the patient move. It may be desirable to alter the values of the constants corresponding to the configuration of the articulated bed, although this has not been determined at the time of this writing.

After a pre-exit or exit alarm has sounded, the system preferably waits for the nurse or other attendant to reset the alarm. This requires an acknowledgement that the alarm has occurred. Once reset, the system returns to a monitoring procedure until the next alarm condition is identified.

6. Control Unit

FIGS. 93–100 illustrate the structure of portable "saddle-bag" controller 200. Outer, nurse-operated, and inner, patient-operated control panels 201 and 202 are formed in a unitary, resilient membrane 606. Panels 201 and 202 are coupled together by a support portion 606*a*. Mounted behind panel 201 is a housing 608 containing a circuit board 610 on which are mounted LEDs 612 and other conventional circuit components, not shown. The circuit board includes an embedded metallic ground plane 614. Similarly, behind panel 202 is mounted a housing 616, also enclosing a circuit board 618 with LEDs 620 and embedded ground plane 622.

Figure 95:
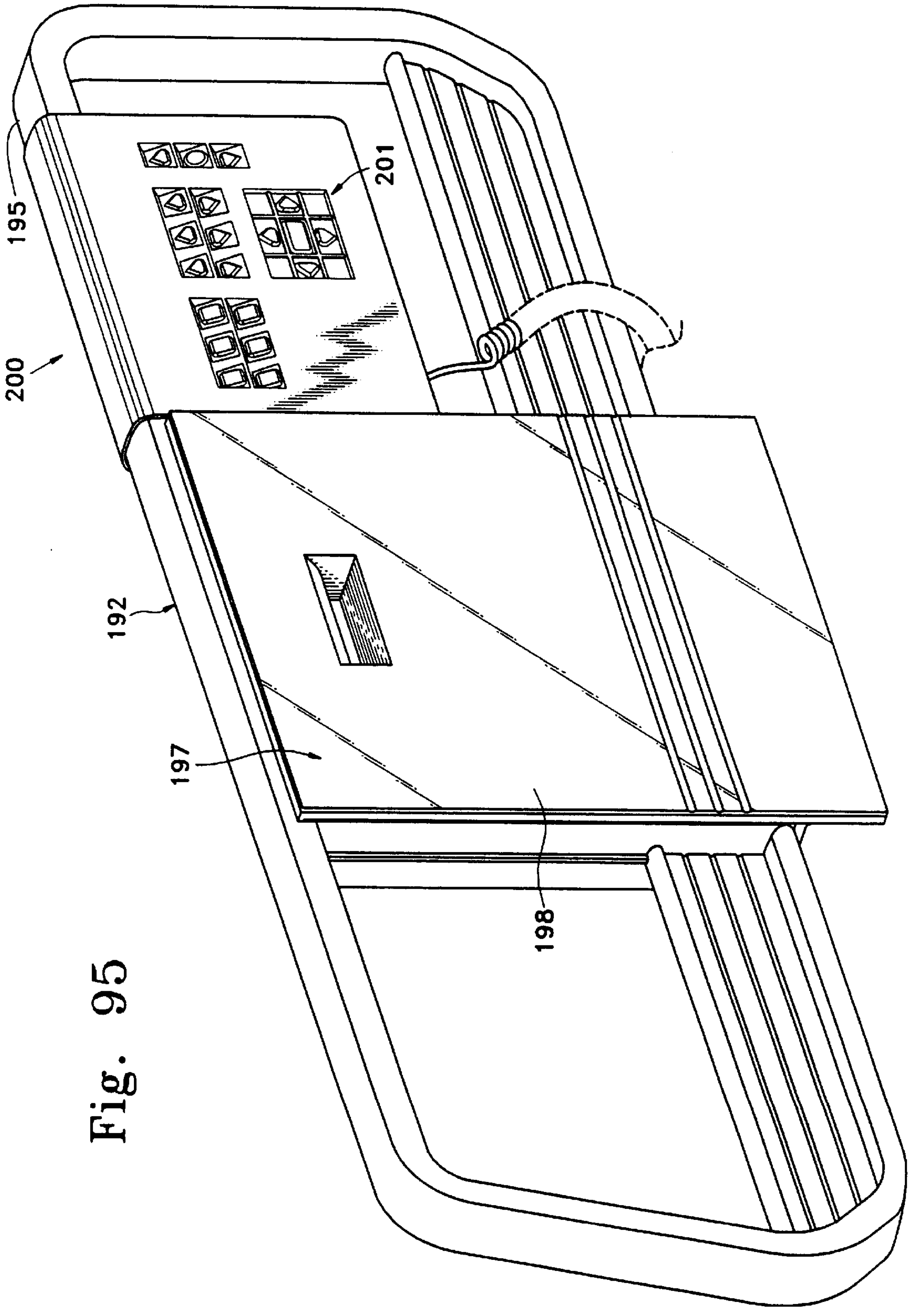
FIG. 95 is an enlarged isometric view of the saddle-bag controller of FIG. 93 installed on a guard rail.

The backs of housings 608 and 616 have hook-and-loop fabric strips, such as strips 624 and 625 that hold the housings together when placed around a guard rail, such as rail 195 shown in FIG. 95.

The housing backs also have mating cones and cavities, such as cone 627 and cavity 628. This provides for alignment of the housings when they are folded against each other. The outer edges of the housings also preferably have recesses 608*a* and 616*a* to provide a place to grip the housings when it is desired to separate them. Also disposed along the side edges are channels, such as channels 608*b* and 616*b* shown in FIG. 100. This figure shows a view of the top of controller 200 when mounted on a rail, with a fragmentary section removed to show the structure adjacent to the guard rail.

Channels 608*b* and 616*b* receive a corresponding ridge 195*a* in the guard rail for preventing pivoting of the controller when buttons are pushed. If membrane 606 requires sufficient stretch when the controller is positioned on a guard rail, the resulting friction grip has been found to adequately support the controller without engaging ridge 195*a*. A control and power cord 630 joins outer housing 608 to the bed CPU.

Outer panel 201 has a plurality of flexible control buttons, such as button 632. Similarly, inner panel 202 has buttons, such as button 634. When pressed, these buttons have conductive hidden surfaces that contact a conductor array on the corresponding circuit board to function as a switch using well known techniques.

Figure 96:
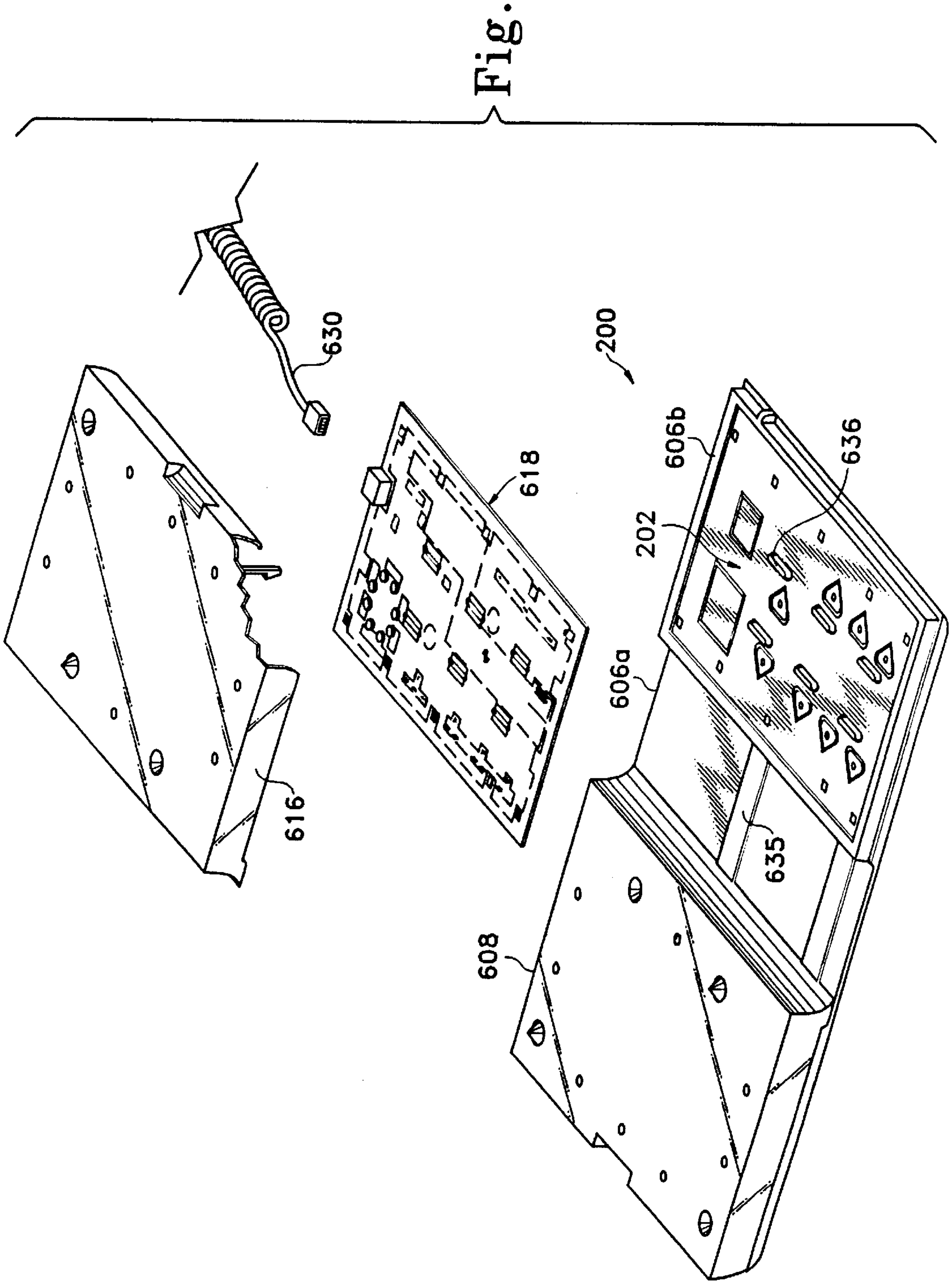
FIG. 96 an isometric exploded, partial fragmented view showing the components of the controller of FIG. 93.
Figure 97:
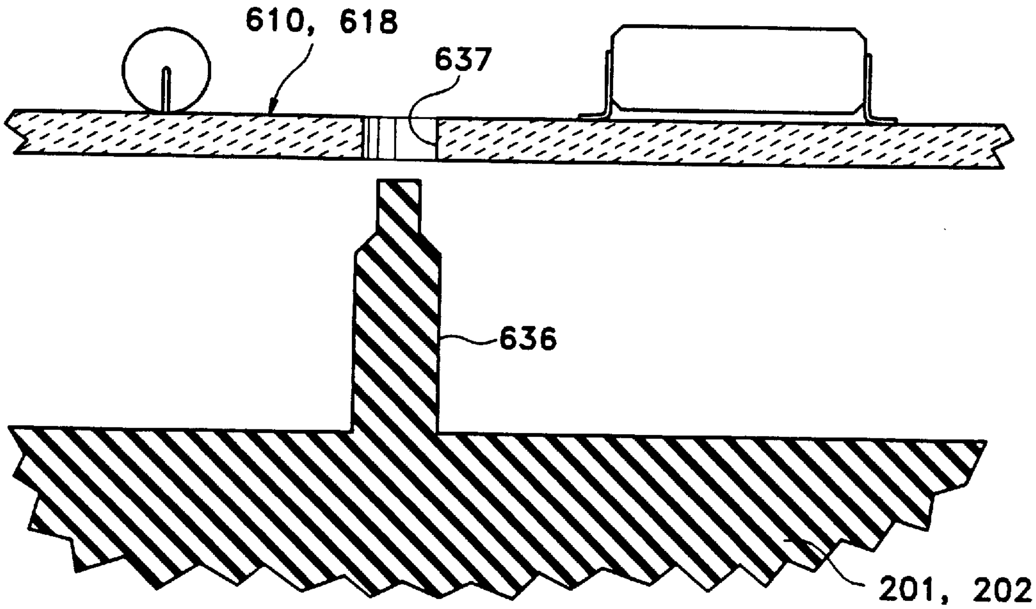
FIGS. 97 and 98 are enlarged partial cross sections illustrating structure and installation of a circuit board in the controller of FIG. 93.
Figure 98:
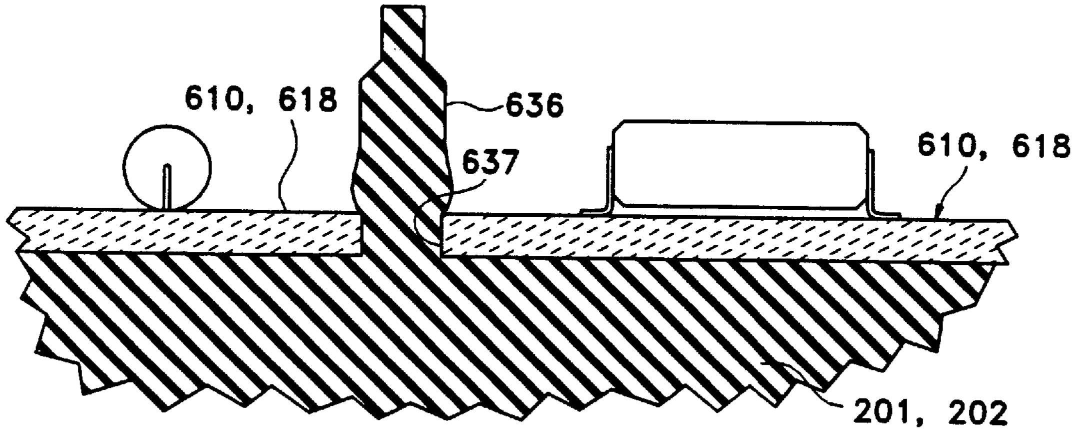

FIGS. 96–99 illustrate how the circuit boards are attached to membrane 606. FIG. 96 shows an exploded view of the membrane, circuit board 618 and housing 616. The inside surface of the membrane has a plurality of elongate tabs such as tab 636, that extend toward the circuit board. The circuit board has corresponding slots, such as slot 637, sized to snugly receive the tabs. FIGS. 97 and 98 show the position of the circuit board relative to a tab prior to and after installation.

It is found that if the circuit board side edge is positioned under the corresponding portion of a lip 606*b* that extends inwardly around panel 202 and then pivoted down, the tabs readily feed into the slots, initially by a top corner, after which they are easily manually pulled through. Conventional cylindrical pillars are found to be very difficult to align with corresponding circular holes in the circuit board. Thus, the circuit board of the invention is substantially easier to install.

Figure 99:
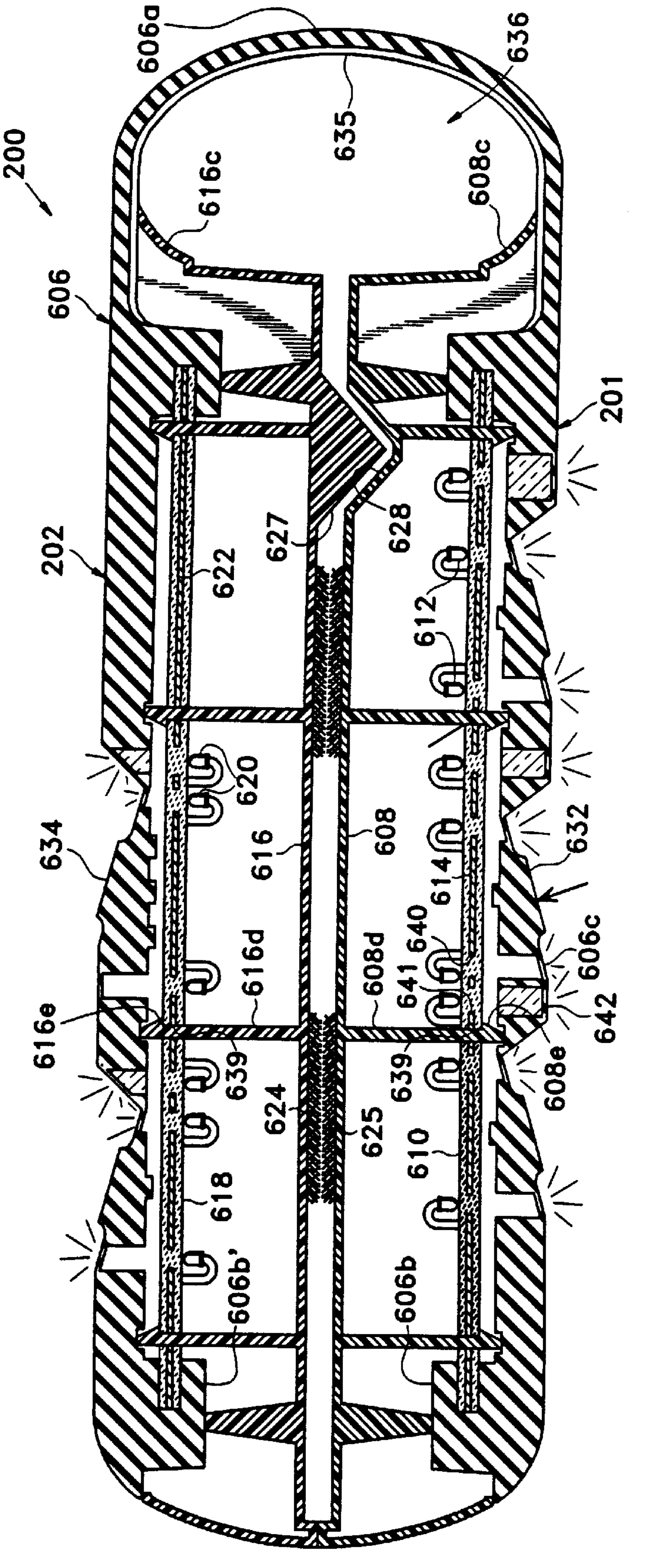
FIG. 99 is a cross-section of the controller of FIG. 93.
Figure 100:
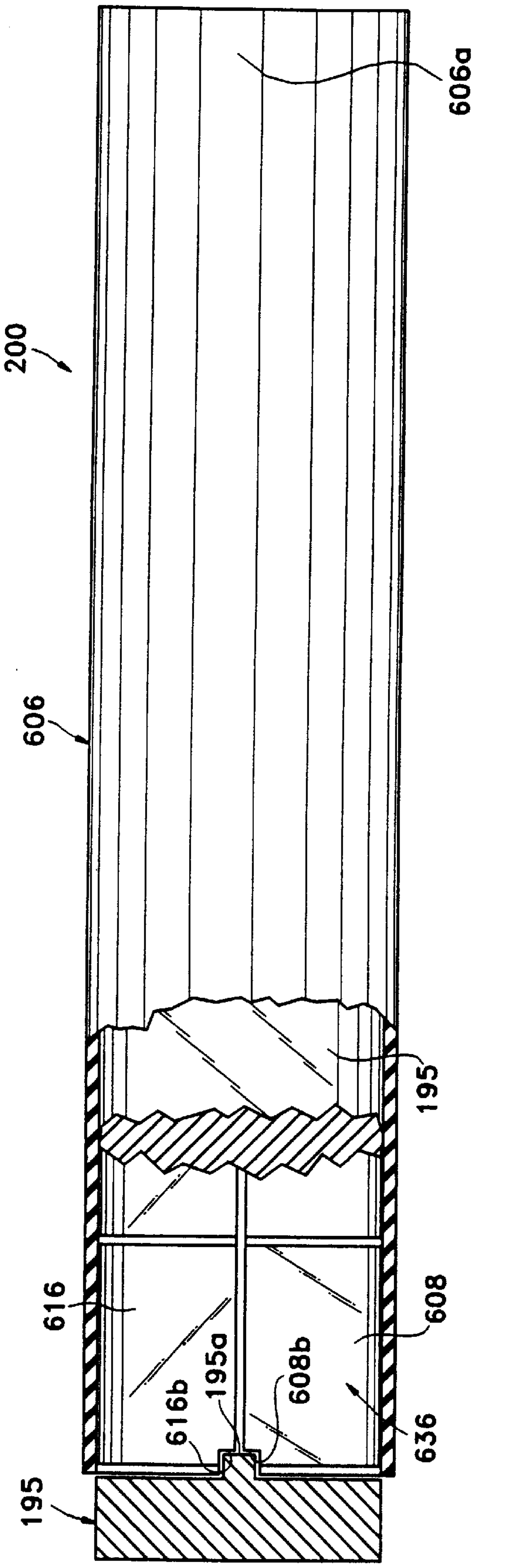
FIG. 100 is a top view of the controller of FIG. 93 when installed on a guard rail with a partial fragmented cut away section.

FIG. 99 shows a simplified cross-section of controller 200 in a folded position, as it would appear when wrapped around a guard rail. An electrical conductor ribbon 635 wraps around the arch formed by support portion 606*a*. Preferably the stretch has a channel formed in it to accommodate this conductor ribbon. The upper margins 608*c* and 616*c* of the housings adjacent to the support stretch are arched to form, with the stretch, a channel 636 conforming to the curve of the guard rail.

The housings are fastened to membrane 606 by legs, such as legs 608*d* and 616*d* having tapered feet 608*e* and 616*e*, respectively, that snap into corresponding apertures 638 and 639 in the respective circuit boards. The outer housing margin is pulled against the outer surface of lip 606*b* to form a seal.

Light is transmitted from LEDs mounted on the circuit boards in two ways. In both ways, openings, such as openings 640 and 641, exist in the ground plane of the circuit board. LEDs are mounted on the protected inside surface of the circuit board adjacent to the rigid housing. The light passes through the circuit board and associated openings, which results in diffuse to light being directed toward membrane 606.

In positions corresponding to the LEDs and associated button, the membrane is formed as a bridge, such as bridge 606*c*. These bridges serve three functions. They support the button in suspension over the circuit board; they are flexible, allowing the buttons to be pressed against the circuit board; and by the thinness of them, light from the LEDs is transmitted through them, illuminating the margins of the buttons.

Illumination of legends on the membrane are provided by the same circuit board structure. However, instead of leaving the membrane thin since flexibility is typically not desirable in these locations, a relatively rigid and transparent plastic filler, such as filler 642, as a backing to support the otherwise flexible bridge. In this way, the continuity of the membrane is maintained, while providing illumination in rigid regions.

7. Transport Guide Wheels

FIGS. 101–104 illustrate guide wheel assembly 162. There is a guide wheel assemoly on each side of the bed, and they are connected together by actuator rod 163, manually controlled by foot pedal lever 164. As is conventional, lever 164 has opposing pedals 644 and 645 used to move a guide wheel 646 from a storage position shown in FIG. 101, to an engaged position shown in FIG. 103. The guide wheel is mounted to a support rod 648 extending slidingly through an opening 650*a* in a flange 650*b* of a wheel mounting frame 650. The top of the rod passes through a second opening 650*c* in an upper flange 650*d*. Flange 650*d* has a mass sufficient to counter the weight of wheel 646 when the wheel is in the storage position. A disk 652 is attached to the rod between flanges 650*b* and 650*d*. A compression spring 653 is positioned around rod 648 and between disk 652 and flange 650*d*. The spring urges disk 652 toward flange 650*b*, and thereby urges wheel 646 toward flange 650*b*, and thereby toward the floor when the wheel is in the engaged position.

Wheel mounting frame 650 is coupled to actuator rod 163 via a mechanical linkage system 654 connected to an arm 650*e* subtending from flange 650*b* toward wheel 646. A sleeve 656 is connected to the back of wheel mounting frame 650 and receives actuator rod 163 for pivoting of the guide wheel thereabout.

A wheel link 658 is pivotally attached at a pivot pin 659 to the bottom of arm 650*e*. The opposite end is attached at a pivot pin 657 to a generally triangular coupling plate 660 pivotally mounted by pivot pin 661 to bed frame side rail 152. A spacer block 662 is fixedly mounted to the bed rail between plate 660 and the rail, and has a sloping surface 662*a* with a rounded bulge 662*b*. A tension spring 663 is connected at one end to pivot pin 657 and at the other end to a mounting pin 667 fixedly attached to the distal end of spacer block 662. A connecting link 664 also is pivotally connected at a pivot pin 665 to a third point on coupling plate 660, as shown, and has a rounded recess 664*a* conforming with rounded bulge 662*b*.

The opposite end of connecting link 664 is pivotally attached by a pivot pin 666 to the end of an arm 668*a* of a V-shaped drive link 668. The base of drive link 668 is fixedly attached to actuator rod 163.

The other arm 668*b* has a pin 669 attached to it so that it extends outwardly. The pin engages an L-shaped slot 670 in an upstanding arm 671*a* of a castor-actuating plate 671. Plate 671 has elongate, horizontal slots, such as slot 671*b* that receive mounting pins 672. Plate 671 thus rides on pins 672 during horizontal movement of the plate during actuation of the guide wheel assembly by pedal lever 164.

The distal ends of plate 671 have a vertical slot 672*c*. A castor-actuating rod 674 is attached to a radially extending arm 675, the distal end of which is attached to a pin 676 that slides up and down in slot 671*c*. Movement of rod 674 secures the corner castors, such as castor 678 by means of a castor actuator 679, as is conventionally known, and commercially available.

In operation, the guide wheels are normally stored in the storage position shown in FIG. 101. The counterweight of flange 650*d* keeps the wheels from swinging down toward the floor and spring 663 is relaxed. Also, in this mode, castor-actuating plate 671 is in the left-most position, as viewed in the figure, and the V-shaped drive link is in the position shown, with pin 669 in the upper portion of slot 670. Arm 675 is in a position rotated to the left, which locks the castors in position. Connecting link 664 is in an extended position against surface 662*a* of the spacer block with recess 664*a* engaged by bulge 662*b*. Foot pedal lever 164 is in a generally horizontal position.

To engage the guide wheels, pedal lever 164 is rotated clockwise as viewed in FIG. 101, by applying force to pedal 644. This rotates actuator rod 163 and V-shaped link 668 clockwise. Pin 669 pushes against the side of L-shaped slot 670, sliding castor-actuating plate 671 to the right. This rotates castor rod 674 counterclockwise, freeing the castors to pivot. When arm 668*b* pivots far enough down, pin 669 slides out of slot 670, and movement of plate 671 stops.

During this movement, coupling plate 660 pivots clockwise, causing frame 650 and guide wheel 646 to pivot counterclockwise, lowering the wheels until they come in contact with the floor. This is an intermediate position in which the wheel support rod 648 is not quite vertically disposed, but in which spring 663 is generally aligned over pivot pin 661.

Figure 103:
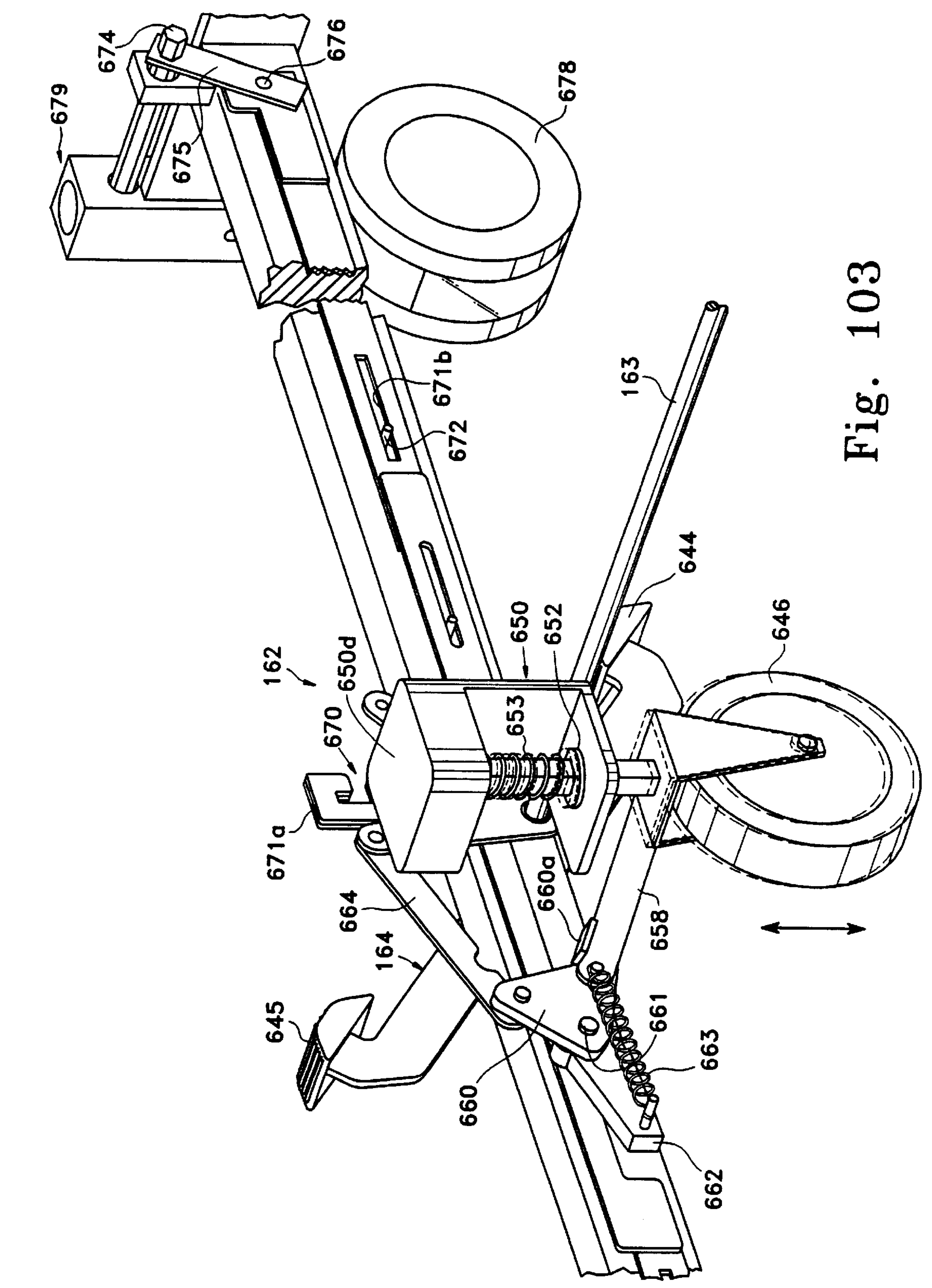
Figure 104:
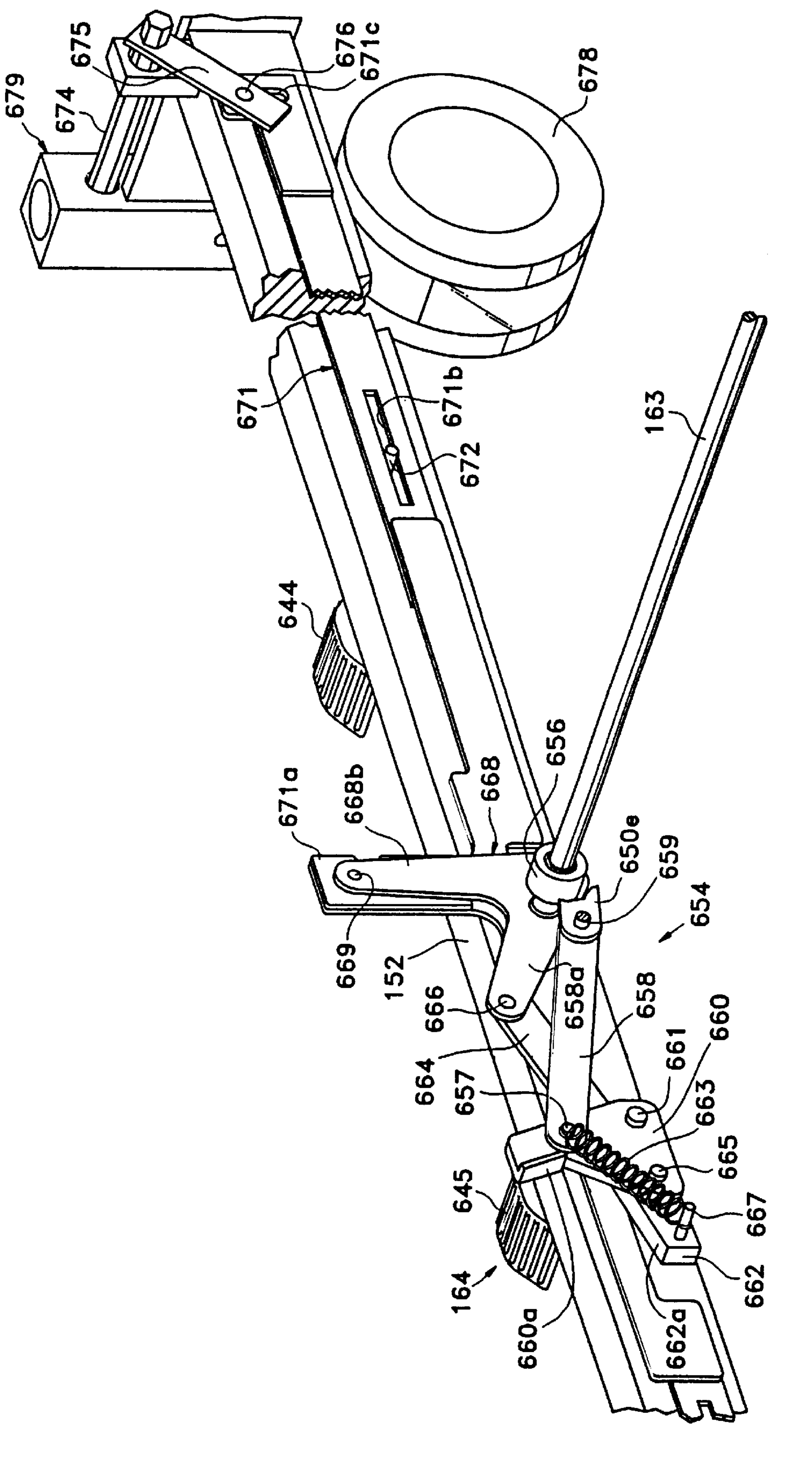
FIG. 104 is a view similar to FIG. 101 with the guide wheel removed to show the linkage assembly of the guide wheel assembly.

As the pedal lever is pushed further, the wheel is rolled along the floor, with the weight of the bed causing spring 653 to compress, so that downward pressure is applied on the guide wheels, and it is maintained in contact with the floor. This assures the traction necessary for guiding the bed while the castors are free-wheeling. When this position of the wheel is reached, coupling plate 660 has pivoted further, so that tension spring 663 has moved over pivot pin 661 of the coupling plate, and thereby locks the plate in this position. The spring force and leverage prevents counterclockwise rotation of coupling plate 660, and thereby raising of the wheel. A boss or flap 660*a* extends out from the plane of coupling plate 660 so that wheel link 658 engages it and is stopped from further rotational movement in this direction. This final position is shown in FIG. 103. Reverse movement of the pedal lever returns the wheel to the storage position, and locks the castors.

It has been found that movement of a bed having a freely pivoting castor at each corner is very difficult to control, particularly when the bed is moved along straight stretches, such as along a corridor. By adding a fifth wheel and preferably a sixth wheel to the bed frame, which wheels are secured in alignment for motion along the longitudinal length of the bed, the bed is much easier to control.

8. Guard Rail Elevation System

Figure 105:
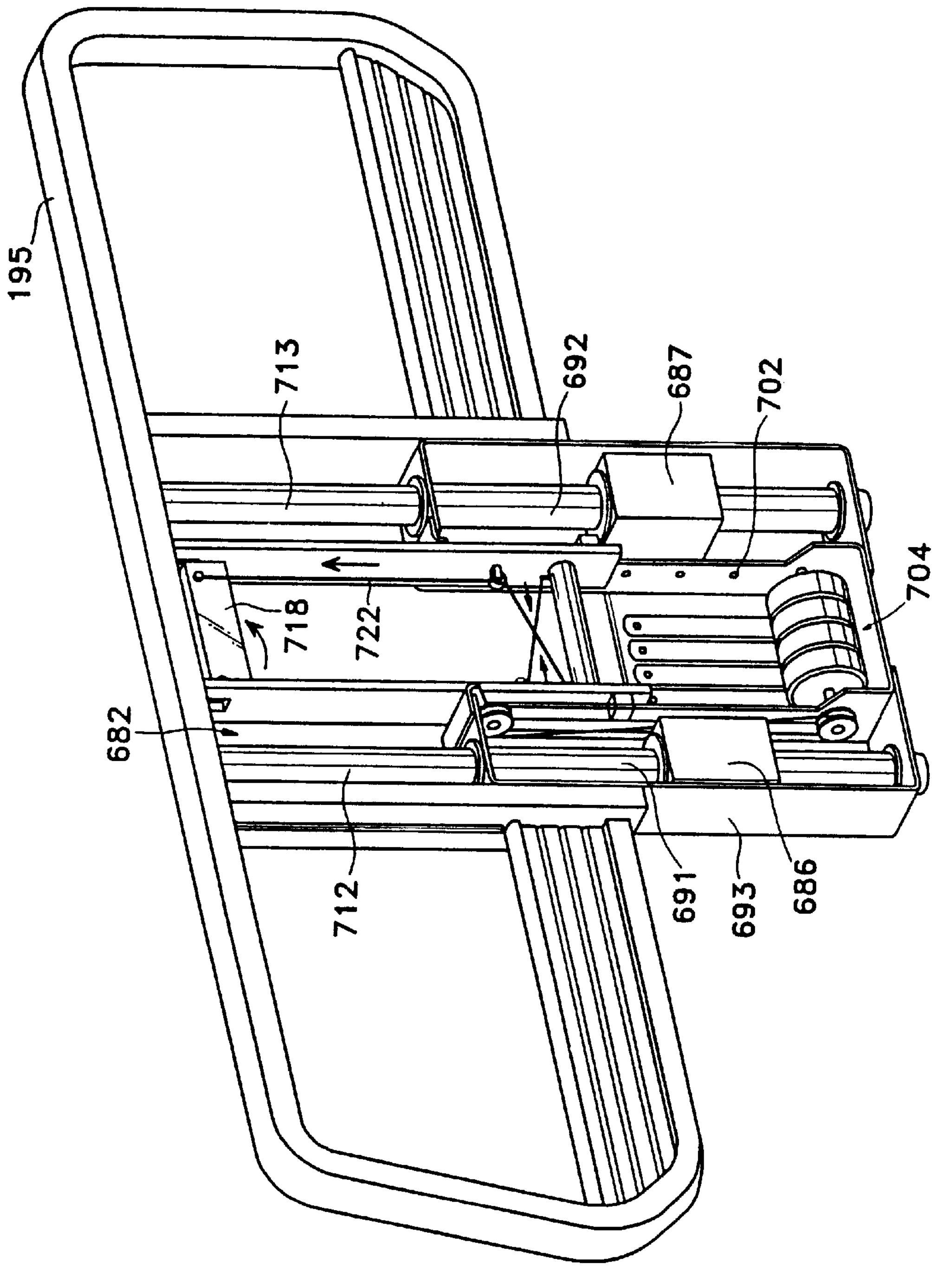
FIG. 105 is an isometric view of a guard rail assembly made according to the invention in an intermediate position.
Figure 106:
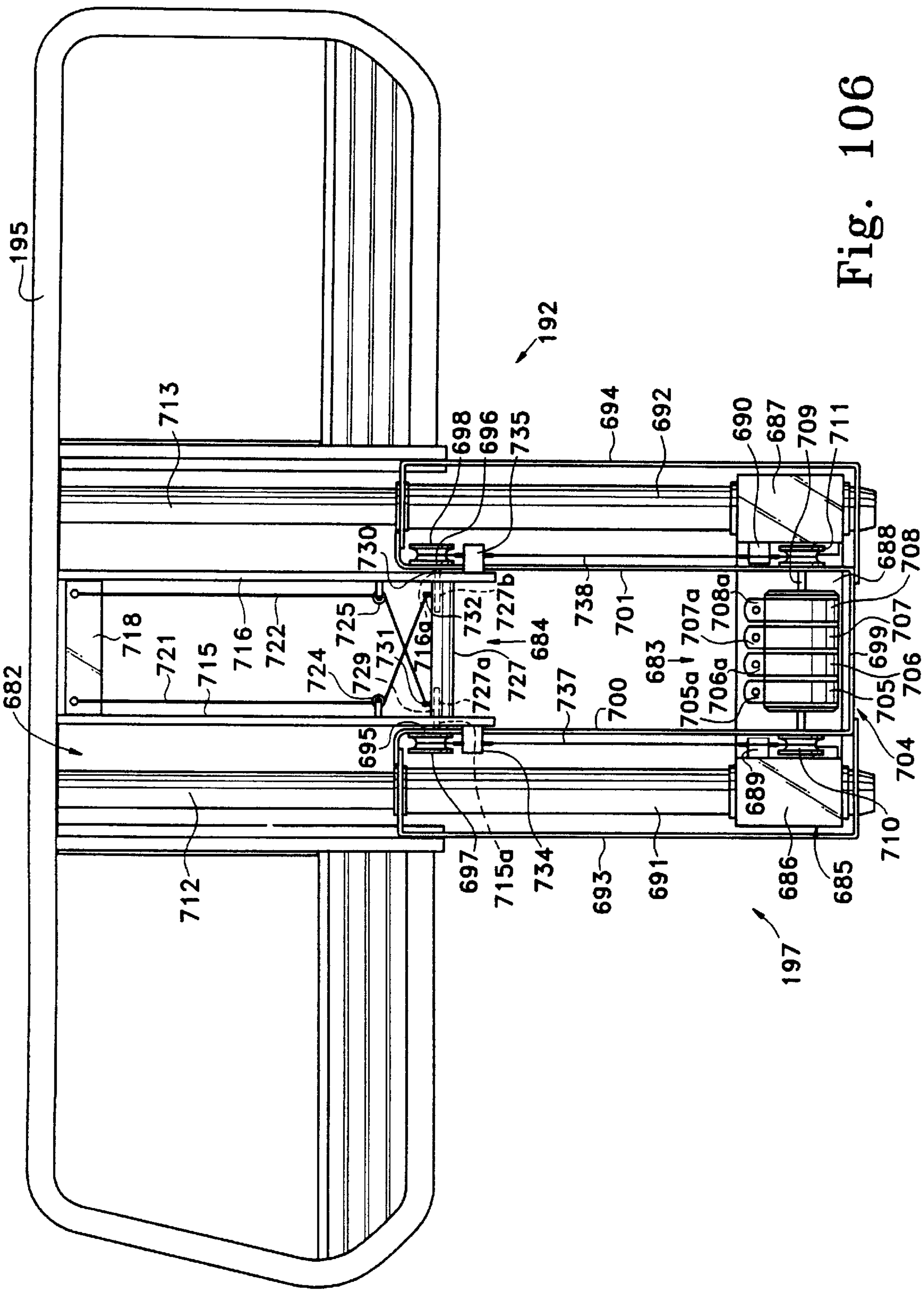
FIGS. 106, 107 and 108 are side views of the guard rail assembly of FIG. 105 in different positions.
Figure 107:
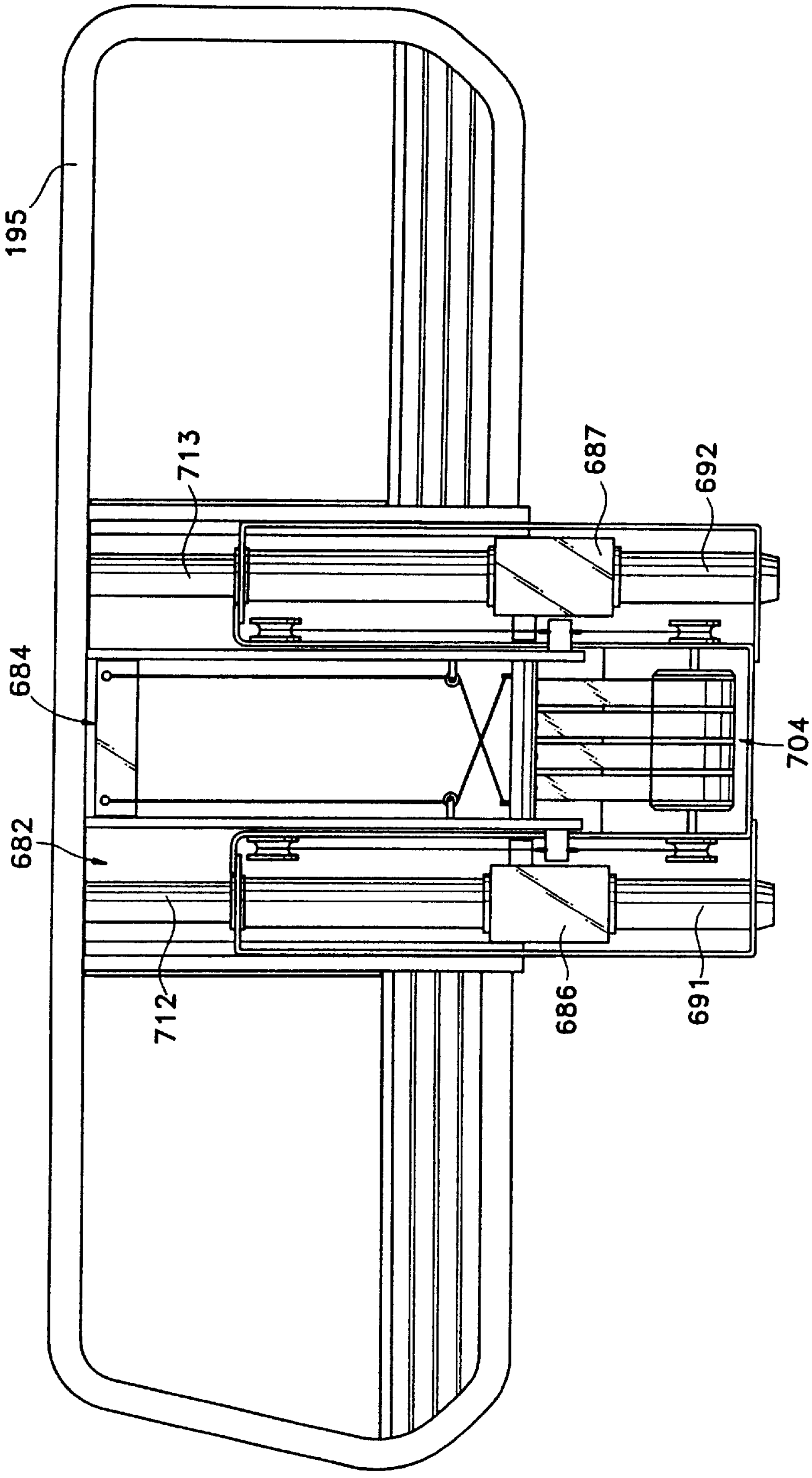
Figure 108:
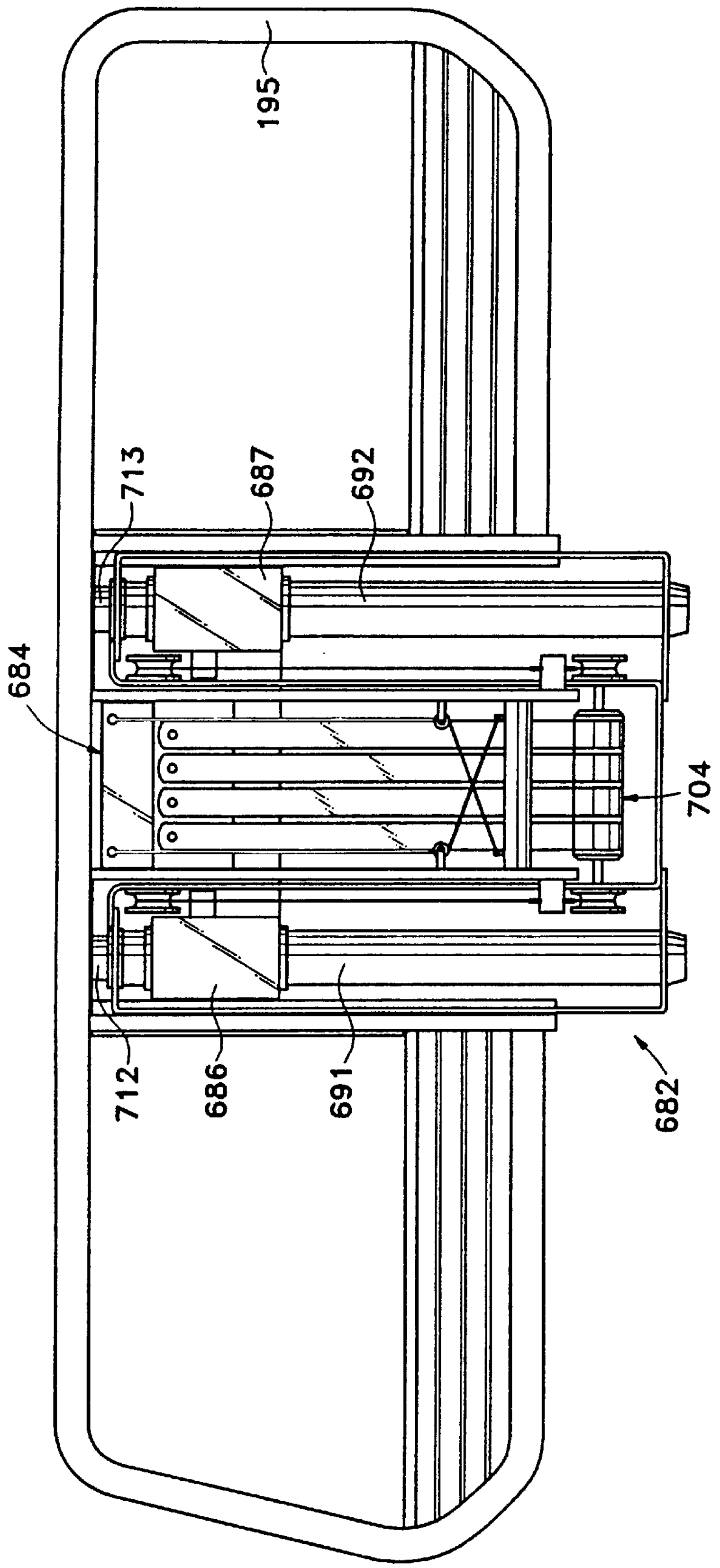

FIGS. 105–108 illustrate guard rail assembly 192 having guard rail 195 and elevator mechanism 197 housed in housing 199 (as is shown in FIG. 1). FIG. 106 shows assembly 192 in a raised or barrier position without housing 199. FIG. 108 shows it in a lowered or storage position, and FIG. 107 shows it in an intermediate position. FIG. 105 is an isometric view of the assembly of FIG. 107.

Mechanism 197 includes a telescoping mounting assembly 682, an energy storage assembly 683, and a lock assembly 684. The telescoping assembly includes a base member 685 fixedly mounted to platform panel 109. Base member 685 includes sleeves 686 and 687, and adjoining plate 688. A pair of cable anchor blocks 689 and 690 are mounted to the outer surfaces of sleeves 686 and 687, respectively, adjacent to plate 688. Hollow, tubular intermediate members 691 and 692 are slidingly received in sleeves 686 and 687. Plate-like stabilizing members 693 and 694 are fixed at each end to the opposite ends of members 691 and 692 and extend there between outside of sleeves 686 and 687.

The inside edges of the upper ends of the stabilizing members have plates 695 and 696 extending downwardly for supporting a first pair of pulleys 697 and 698. The inside edges of the lower ends of the stabilizing members are joined by a plate 699 having upwardly extending bars 700 and 701. These bars have a vertical series of holes, such as hole 702. A set 704 of coil leaf springs 705, 706, 707 and 708 are mounted for rotation about a rod 709 between bars 700 and 701. The ends 705*a,* 706*a,* 707*a* and 708*a* are mounted to plate 688, as shown. A second pair of pulleys 710 and 711 are mounted to the lower ends of bars 700 and 702 opposite from spring set 704, and in line with pulleys 697 and 698.

Upper, tubular inner telescoping members 712 and 723 are attached at upper ends to guard rail 195. The lower ends are received slidingly in the upper ends of intermediate members 691 and 692. Extending parallel with and between members 712 and 713 are bars 715 and 726. These bars are also parallel to and overlap bars 700 and 701, as shown.

Mounted between bars 715 and 716 is lock assembly 684. This assembly locks the position of the guard rail relative to intermediate members 691 and 692. A trigger plate 718 is mounted between the upper ends of bars 715 and 716 for pivoting. Plate 718 is accessible through hand holes in the guard rail housings, such as hole 720 shown in FIG. 1. Attached to the edges of the sides of plate 718 are trigger cables 721 and 722. These cables extend down along bars 715 and 716 to small pulleys 724 and 725. A brace bar 727 extends between the lower ends of bars 715 and 716. Mounted inside cavities 727*a* and 727*b* in the upper ends of bar 727 are spring-biased pins 729 and 730. These pins extend through holes 715*a* and 716*a* and into aligned holes in bars 700 and 701, such as hole 702. The pins are connected to cables 722 and 722 by connectors 731 and 732.

By manually pivoting trigger plate 718, cables 721 and 722 are pulled upwardly. This in turn pulls pins 729 and 730 out of holes 702, releasing the upper members 712 and 713 from intermediate members 691 and 692.

To the outer lower ends of bars 715 and 716 are mounted a second set of anchor blocks 734 and 735. A pair of cables 737 and 738 extend from blocks 734 and 735 upward and around upper pulleys 697 and 698, and downward and around lower pulleys 710 and 711. From pulleys 710 and 711, the cables extend to base anchor blocks 689 and 690. As a result of the cable/pulley mechanism, when the upper telescoping member is locked in position relative to the intermediate telescoping member, the intermediate member is locked in position relative to the base member, and therefore the mattress platform. The cable/pulley mechanism also regulates the rate of movement of the intermediate and upper telescoping members relative to the base member, as is illustrated in the illustration of the guard rail assembly in the figures.

Additionally, the set 704 of springs act to store energy when the guard rail is lowered and return the energy when it is raised. As shown in FIG. 106, when the guard rail is in the fully raised position, bottom plate 699, adjacent to which the springs are mounted, is adjacent to plate 688 to which the spring ends are fastened and which is fixed relative to the bed platform. When the trigger is activated and the guard rail lowered, plate 699 drops below plate 688, causing the springs to uncoil. When the guard rail is in the lowest position, plates 688 and 699 are separated a maximum distance corresponding to the travel distance of the intermediate members 693 and 694 relative to sleeves 686 and 687. The springs have thus stored the maximum amount of available energy, since the springs are biased to form a tight coil. In this position the top of the guard rail is adjacent to base member 685 which is mounted to the side of the platform tray. The top of the guard rail is thus below the top surface of the platform, making the mattress and patient fully accessible.

When it is desired to return the guard rail to the raised position, the reverse procedure is followed. The trigger is activated to release the guard rail. A manual force is applied to lift the guard rail. The stored energy of the springs is applied in a direction to also raise the guard rail, assisting in returning the springs to a fully coiled condition. As the guard rail is raised, the springs recoil, thereby recovering the spring energy. Thus the person raising the guard rail only has to apply a force corresponding to the weight of the guard rail less the spring force. This makes an otherwise heavy guard rail relatively manageable, both as to the "braking" force applied by the springs during lowering of the guard rail, and as to the "assisting" force applied when the guard rail is raised, permitting single-handed operation.

9. Swing Arm Extension Brace

Figure 109:
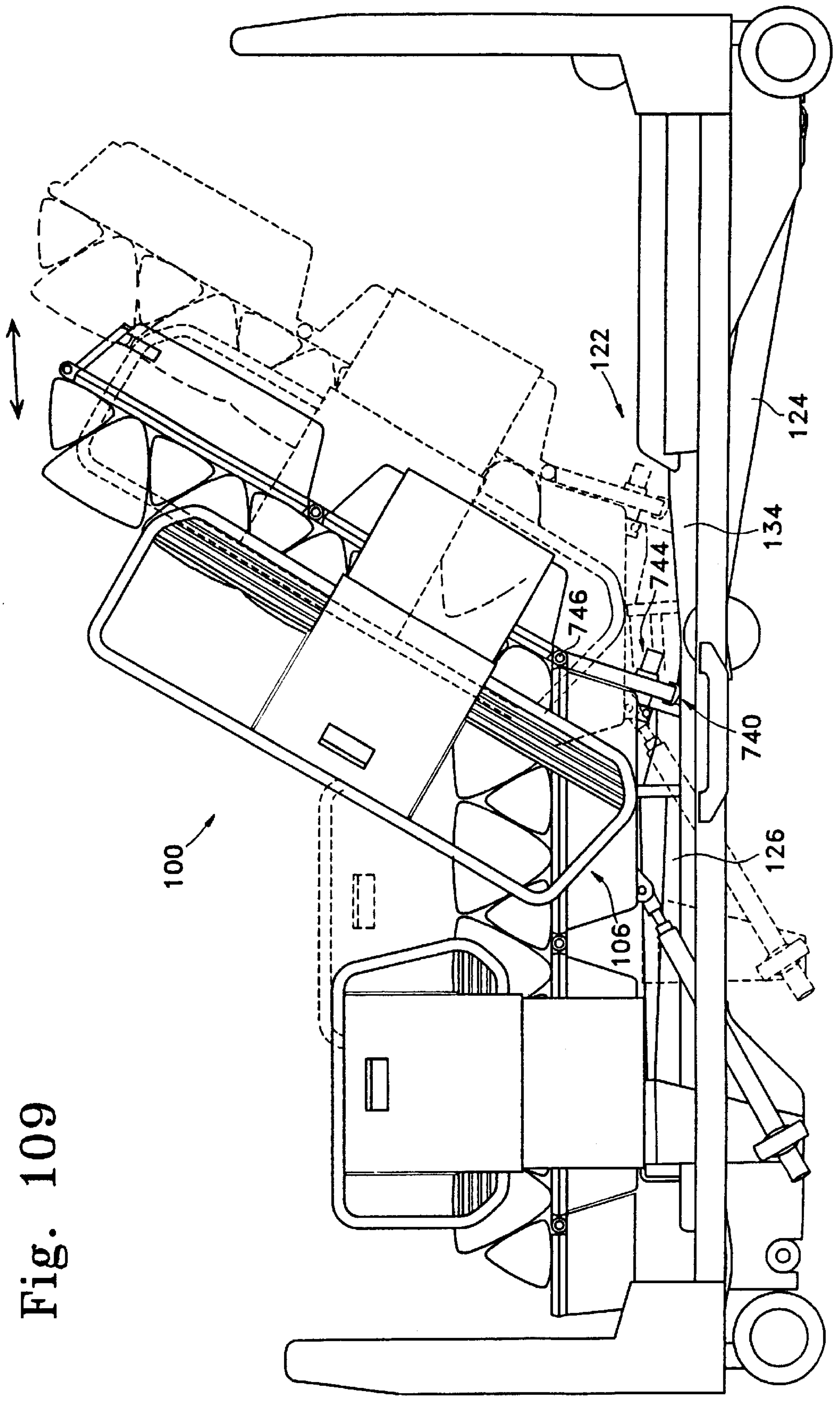
FIG. 109 is a side view of the bed articulated into a low sitting position and showing a mechanism for transferring weight directly between the platform and weigh frame.
Figure 110:
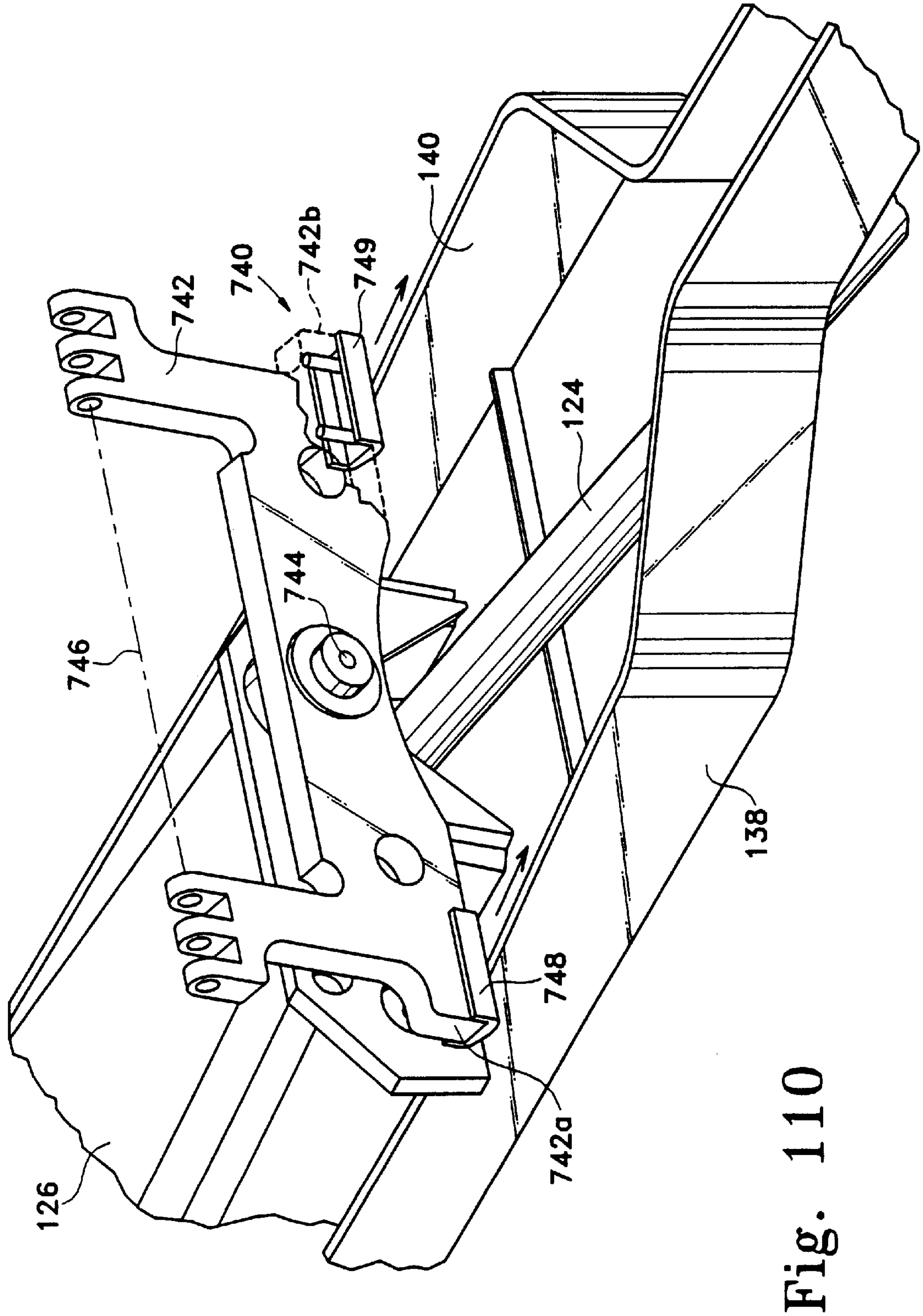
FIG. 110 is an isometric view of a portion of the structure of FIG. 109 showing the weight-transferring mechanism.

Finally, FIGS. 109 and 110 illustrate an improvement on the apparatus for supporting the bed platform above the base frame, and in particular in the preferred bed, above the weigh frame. FIG. 209 shows a side view of bed 100 with platform 106 articulated in a low sitting position. Supporting apparatus 122 has the capability of moving the platform toward the head of the bed, in order to maintain the position of the patient relative to the head of the bed. When such a low position is used, drive support 124 and swing arm 126 extend toward each other at a very wide relative angle. This angle puts substantial stress on these support arms.

In order to reduce the amount of stress, a means 740 for transferring weight directly from the platform to the weigh frame is provided. As can be seen most clearly in FIG. 110, platform 106 is hingedly attached to swing arm 126 by a yoke 742. Yoke 742 is pivotable relative to the swing arm about pivot 744 and is hinged relative to the platform about a hinge axis 746. The yoke thus functions generally as a universal joint coupling the swing arm to the platform. Drive cylinder 124 is then pivotally attached to the upper end of the swing arm near the yoke.

Yoke 742 includes downwardly extending shoulders 742*a* and 742*b* in line with the weigh frame rails 138 and 140. Covering the lower faces of shoulders 742*a* and 742*b* are friction-reducing covers 748 and 749. In order to fully benefit from this weight transferring system, it is preferably that platform 106 be laterally supported horizontally, i.e., without any roll. This puts both of covers 748 and 749 in contact with the weigh frame. As shown by the phantom lines in FIG. 109, the swing arm is then extended and the drive cylinder ram shortened to position the bed closer to the head of the bed. This movement back and forth along the weigh frame is also represented by the arrows shown in FIG. 110. The strength of swing arm 126 and drive cylinder ram 124 can thereby be reduced, since a substantial amount of force is removed from them through the use of weight-transferring means 740.

10.Platform Joint

Figure 111:
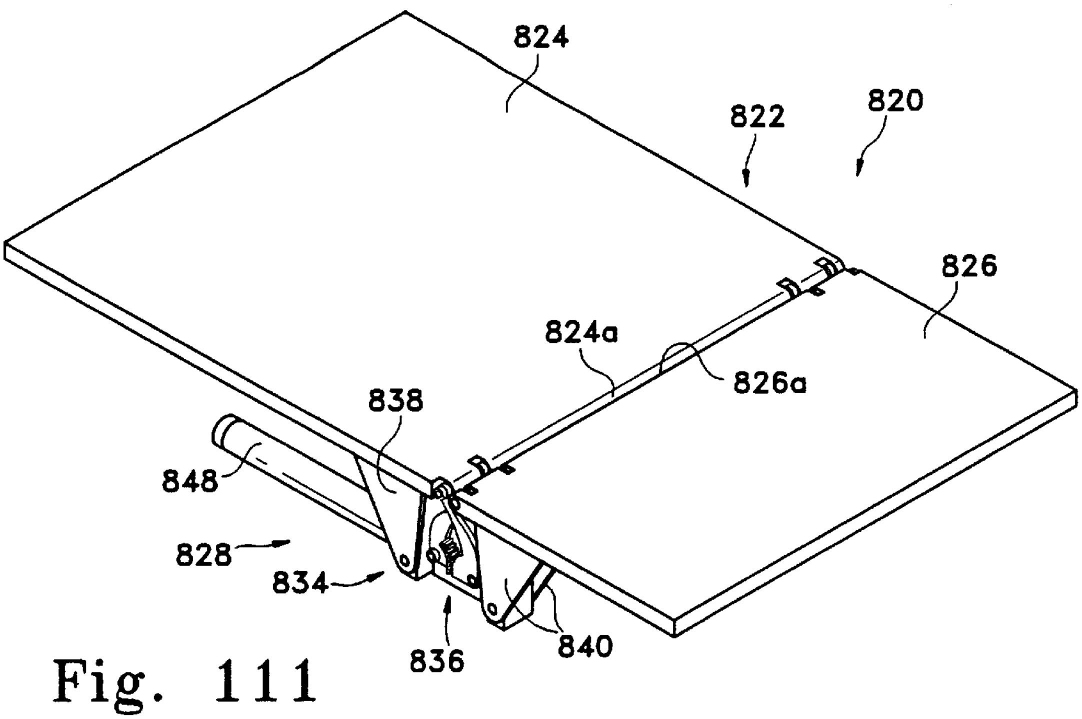
FIG. 111 is a partial isometric view of one embodiment of a bed made according to the invention with two joined panels in coplanar orientation.

A bed according to the present invention also has a joint between platform panels that varies the distance between the panels as the angle between the panels varies. One embodiment of this feature of the invention is shown in FIG. 111 as a partial bed 820. Bed 820 includes a generally upwardly directed support surface or platform 822 formed of a first, back panel 824 and a second, seat panel 826. Panels 824 and 826 have respective adjacent edges 824*a* and 826*a*. Coupling panels 824 and 826 along these adjacent edges is an articulating seat joint 828.

Bed 820 also includes, typically, additional panels joined to panels 824 and 826 for supporting the full length of a person's body as well as a frame for supporting the platform above the floor, as is shown in FIG. 111. A mattress cushion 825, of some form is supported on the platform, as shown in dash-dot outline in FIG. 115.

These other panels do not require the length-varying features provided by the present invention to the extent the seat joint does. Thus although the invention is described herein specifically with reference to the seat joint, it will be understood that it can be applied equally well to other joints, and can be readily designed to provide different amounts of expansion or contraction of the joint, or different positions of the axis of panel rotation.

Figure 112:
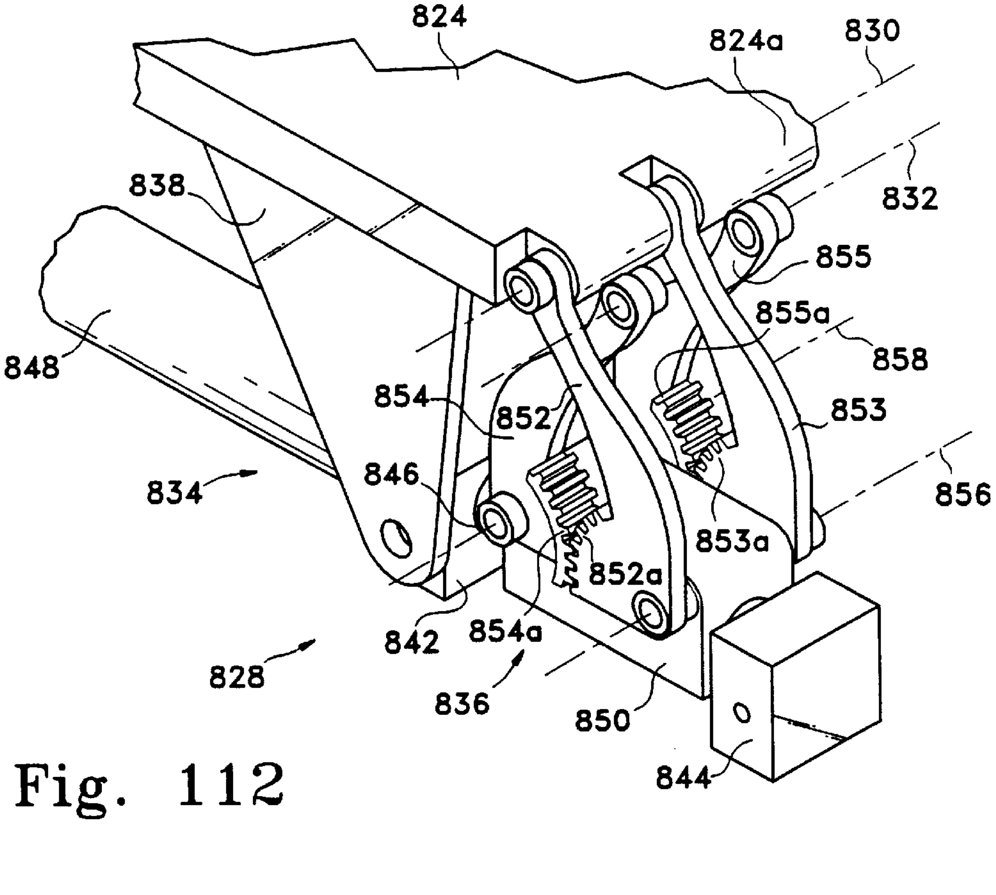
FIG. 112 is an enlarged view of the articulating joint of the bed of FIG. 111.
Figure 113:
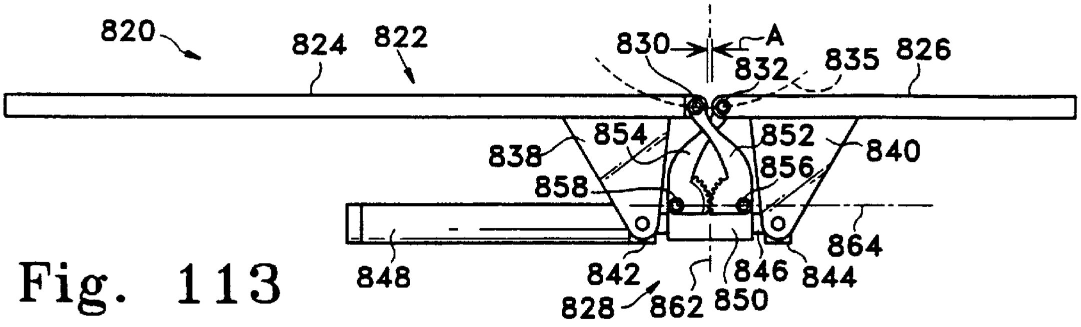

Joint 828 forms what may be considered to be an expanding hinge. Thus, instead of hinging each panel at a common axis, they are hinged about respective axes 830 and 832, as shown, which axes move away from each other as the panels move from a coplanar or flat orientation for reclining, as shown in FIGS. 111, 112 and 113, through an intermediate sitting position shown in FIG. 114, to a full sitting position, as shown in FIGS. 215 and 216.

Figure 115:
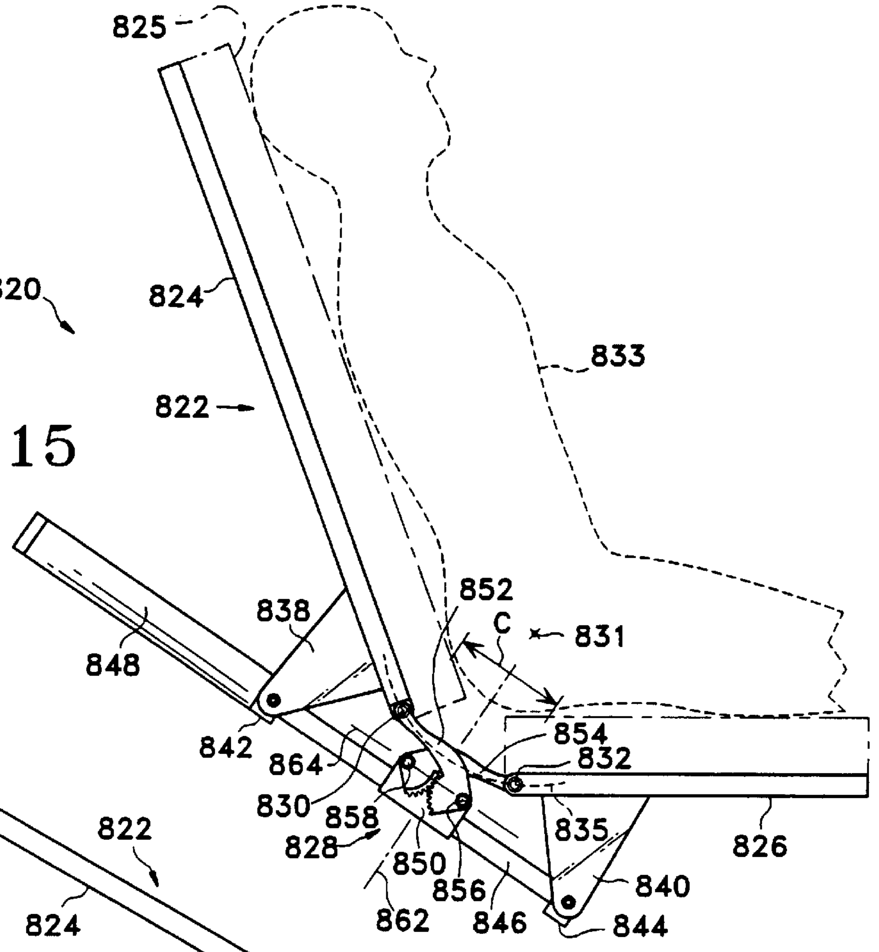
FIGS. 113, 114 and 115 are side views of the bed of FIG. 111 showing the two panels in different angular orientations.

Panels 824 and 826 actually rotate about an axis 831 of rotation, identified specifically in FIG. 115. This axis coincides with the hip joint of a person 833 supported on the bed. As a result, axes 830 and 832 move along an arc 835, shown in dashed lines in FIGS. 113–115.

The structure of joint 828 includes a drive assembly 834 for pivoting the two panels relative to each other, and a separation-varying hinge assembly 836 for varying the distance between the adjacent edges of the two panels, on each end of joint 828. The structure of one set of assemblies 834 and 836 are described, it being understood that the description applies to the structure on both ends.

Drive assembly 834 includes two support members 838 and two support members 840 fixedly attached to and extending downwardly from the underside of panels 824 and 826, respectively. The bottom ends of the support members bracket and support, for pivoting movement, respective support blocks 842 and 844. An extension rod 846 is attached at one end to block 844 and passes through a bore, not shown, in block 842. A hydraulic drive cylinder 848, attached at one end to block 842, drives rod 846 outwardly or inwardly to vary the separation between blocks 842 and 844.

Slidingly mounted on rod 846 is a base member 850. A first pair of link arms 852 and 853 are mounted at one end to base member 850 for pivoting about an axis 856 adjacent to block 844, as shown. The upper ends of arms 852 and 853 are pivotably mounted to panel 824 for pivoting about hinge axis 830. Similarly, a second pair of link arms 854 and 855 are hingedly connected to base member 850 for pivoting about an axis 858 adjacent to block 842 and to panel 826 for pivoting about axis 832.

Link arms 852–855 also have corresponding facing and meshing pinions 852*a*–855*a*, respectively. The teeth of these pinions mesh as arms 852, 853 and 854, 855 pivot about axes 856 and 858, respectively.

The operation of bed 820, and more specifically, joint 828, is illustrated by the progression in relative angular displacement of panels 824 and 826 shown in FIGS. 108–110. FIG. 106 shows panels 824 and 826 in a coplanar orientation, as would be appropriate for a person in a reclining position. With the panels in this orientation, the adjacent edges 824*a* and 826*a* are separated by a relatively small distance A and the teeth of pinions 852*a*–855*a* are meshed at the lower ends of the arc of teeth. Also, link arms 852–855 are in a generally upright orientation.

Figure 114:
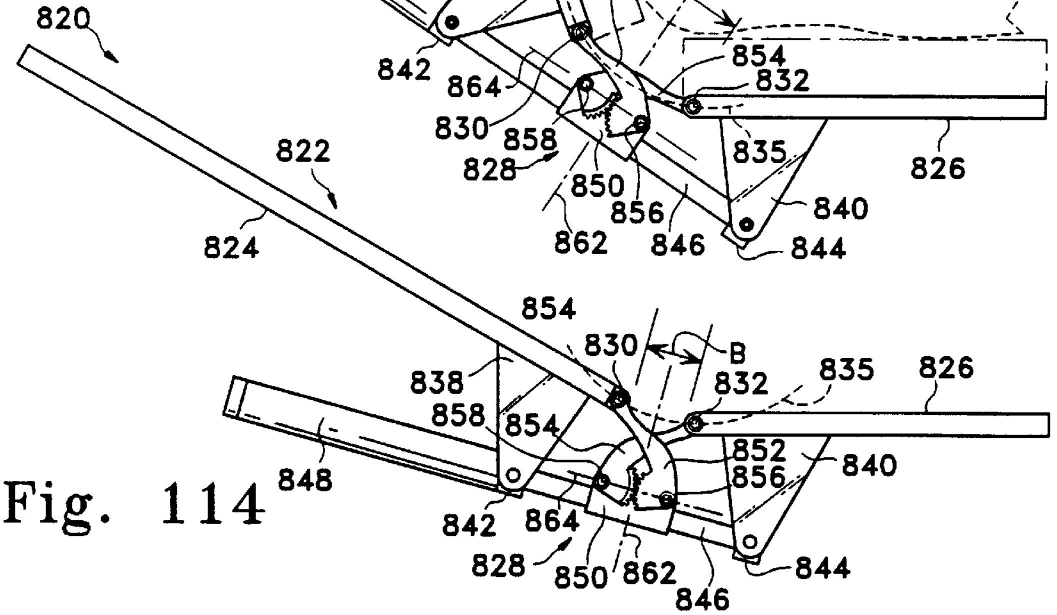
Figure 116:
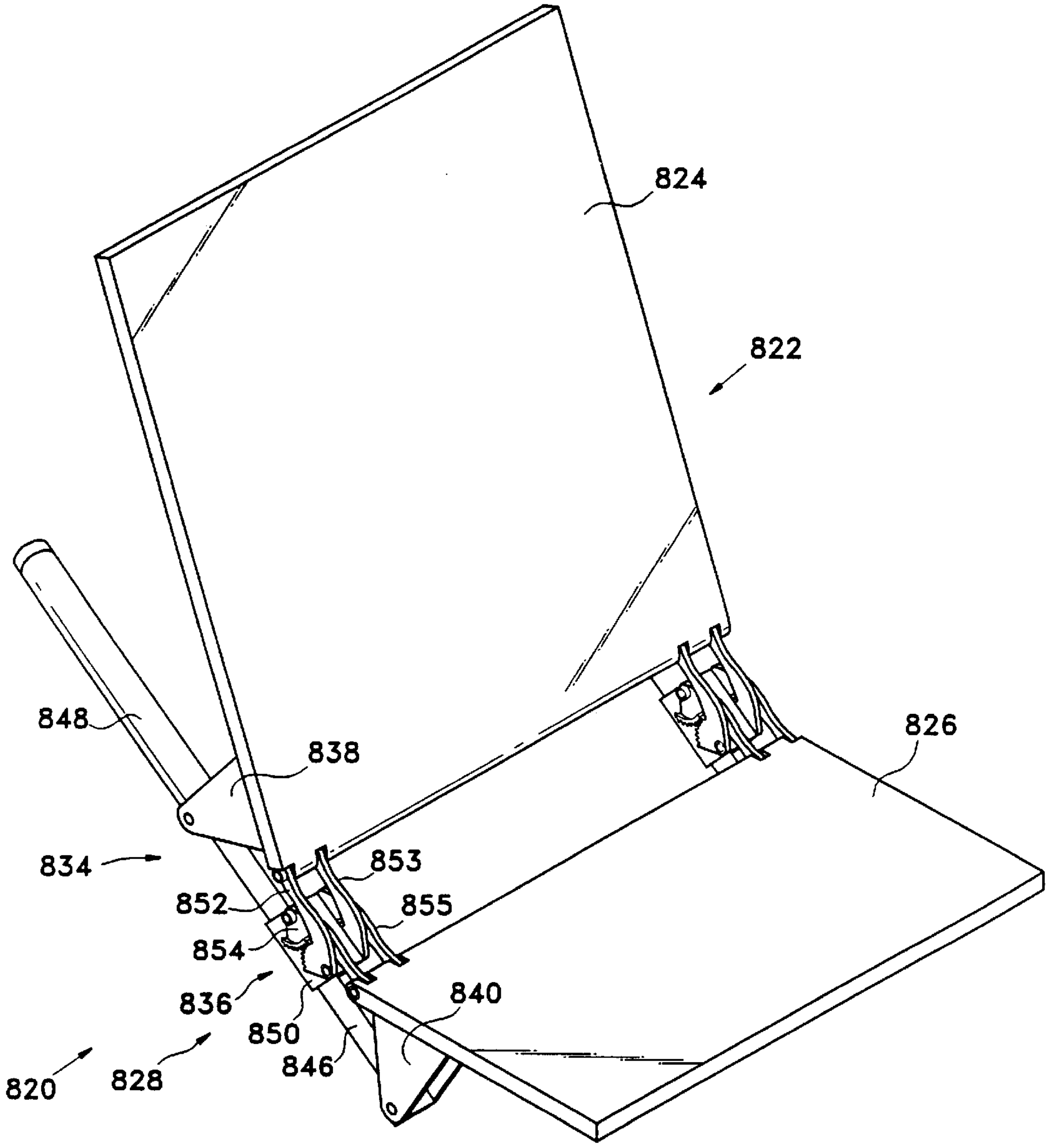
FIG. 116 is a view similar to FIG. 111 showing the panels positioned as shown in FIG. 115.

As drive cylinder 848 extends rod 846 out, panel 824 pivots upwardly about axis 830, as shown by the progression illustrated by FIGS. 114 and 115, as axis 830 moves along arc 835. FIG. 114 represents what may be considered an intermediate sitting position with adjacent edges 824*a* and 826*a* separated by a distance B greater than distance A. FIGS. 115 and 116 represent a full sitting position with adjacent edges 824*a* and 826*a* separated by an even greater distance C. The outline of a person 833 sitting in bed 820 is shown in FIG. 115.

The link arms also pivot about the respective axes 830 and 832, with axis 830 moving in arc 835 which is defined by the dimensions of arms 852–855. The two panels in effect both rotate about axis 831 and move away from a centerline 862 of joint 828. The pinions 852*a*–855*a* extend along a sufficient arc to allow for the relative movement of the panels through a desired range of angles. This angle is also limited by the length of arms 852–855, since as axes 830 and 832 approach a line 864 passing through axes 856 and 858, there is less leverage for moving the arms, and in the limit there ceases to be any increase in separation of the panels as axes 830 and 832 move parallel with centerline 862.

It will also be appreciated that the joint expansion described and corresponding to the progression through FIGS. 113–115, when reversed, results in a joint contraction. Also, by simply reversing the alignment of the upper ends of arms 852–855, so that arms 852 and 853 terminate at axis 830 and arms 854 and 855 terminate at axis 832, and extending the lengths of the arms with a reverse bend so that axes 830 and 832 are spaced apart when the panels are flat, the joint would contract as the angle between the panels is decreased from 180.

FIGS. 117–121 illustrate a bed 870 that is another embodiment of the invention. The structure of bed 870 is preferred to that of bed 820 due to its mechanical simplicity and ease of manufacture. Bed 870 has some basic structural elements that are the same as those of bed 820. Thus, for simplifying the description of the bed, those structural features that are the same are given the same reference numbers as are used for bed 820. In this regard, bed 870 includes platform 822 comprising panels 824 and 826 that hinge about hinge axes 830 and 832, respectively, and support mattress 825. Drive assembly 834 includes support members 838 and 840 with blocks 842 and 844, respectively on the distal ends of the support members. Extension rod 846 is driven by cylinder 848 for varying the separation between the blocks.

A seat joint 872 is different than seat joint 828 described above. Joint 872 includes link arms 874, 875, 876 and 877 hingedly connected at upper ends, such as ends 874*a* and 876*a* to panels 824 and 826 for pivoting about axes 830 and 832, respectively Axes 830 and 832 move along arc 835 as the panels rotate about axis 831. Link arm 874 is connected at an intermediate point to base member 878 for pivoting about an axis 880. Link arm 876 is connected at a lower end 876*b* to base member 878 for pivoting about an axis 882 so that the link arms cross, as shown.

Lower end 874*b* of link arm 874 extends below base member 878 and is connected to one end of a coupling arm 884 for pivoting relative to the coupling arm. The other end of arm 884 is connected for pivoting to link arm 876 intermediate the link arm ends. The coupling arm functions as a coupling means similar to pinions 852*a*–855*a* of joint 828. This link arm in combination with the connections between the lower ends of the link arms and the base member, assure that the link arms move concurrently in opposite rotation directions when the associated panels 824 and 826 are mutually pivoted.

Figure 118:
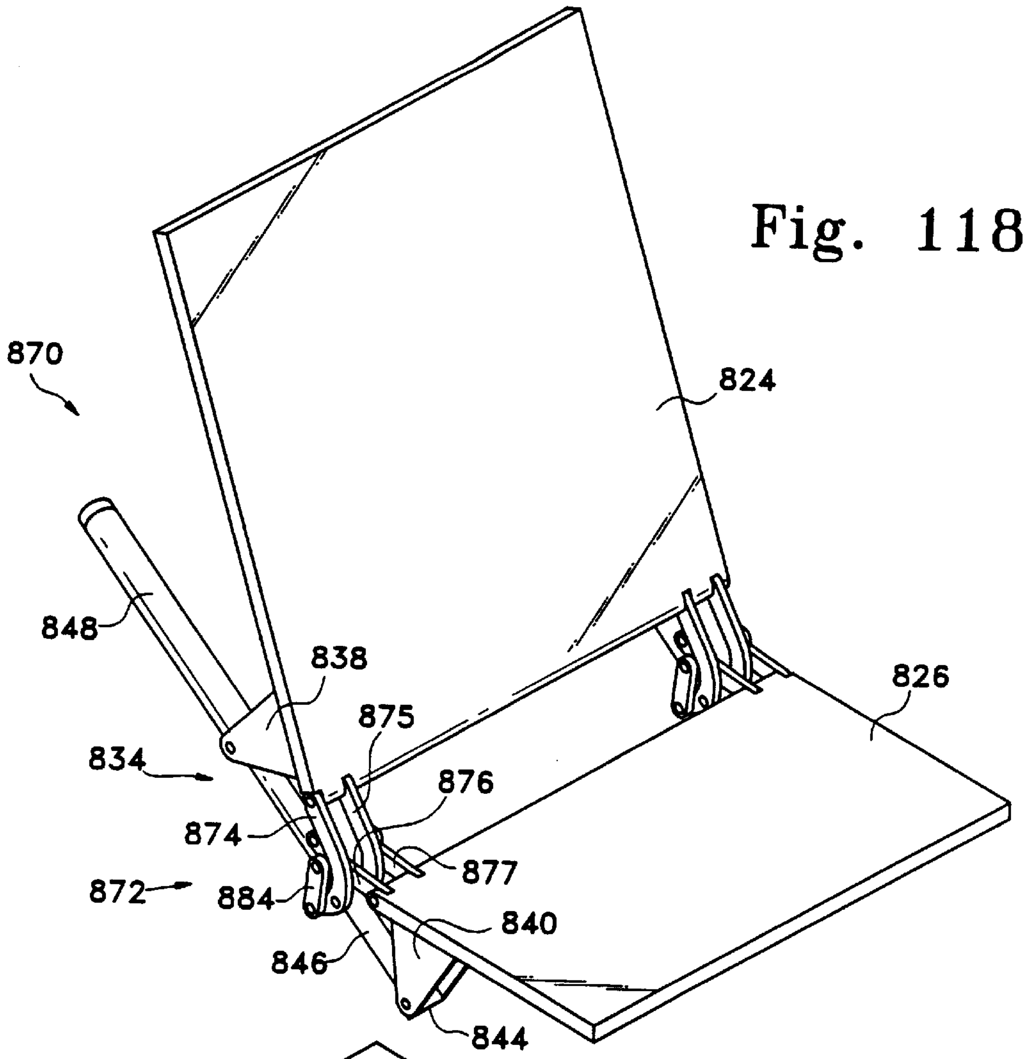
FIG. 118 is a view similar to FIG. 116 of the embodiment of FIG. 117.
Figure 117:
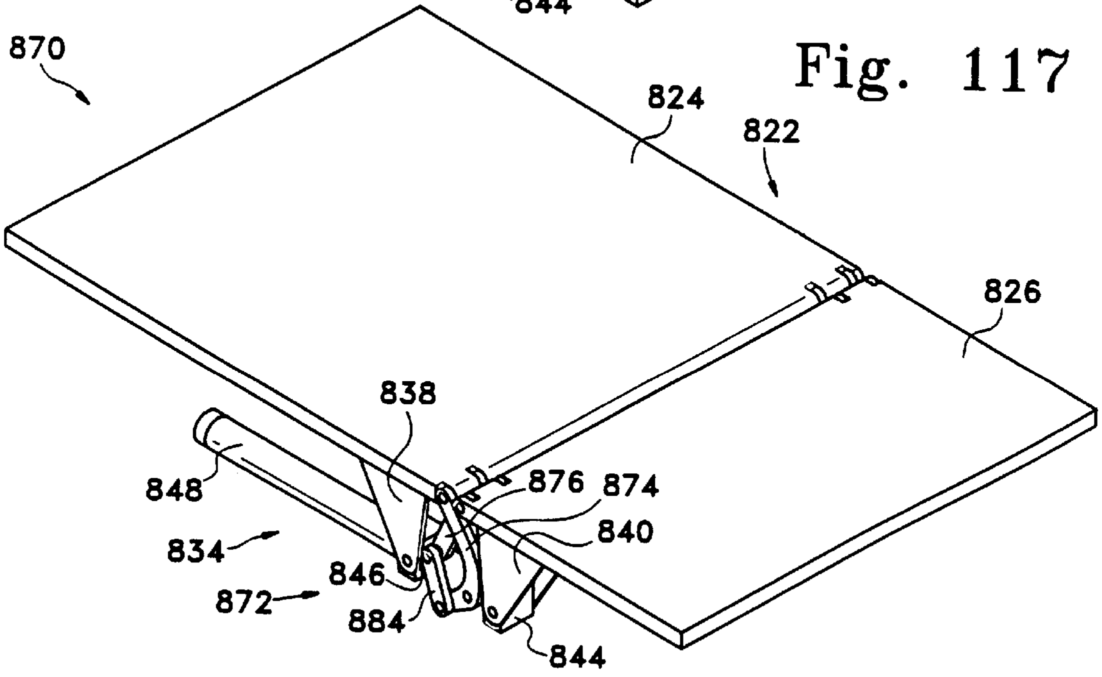
FIG. 117 is a view similar to FIG. 111 of the preferred embodiment.
Figure 121:
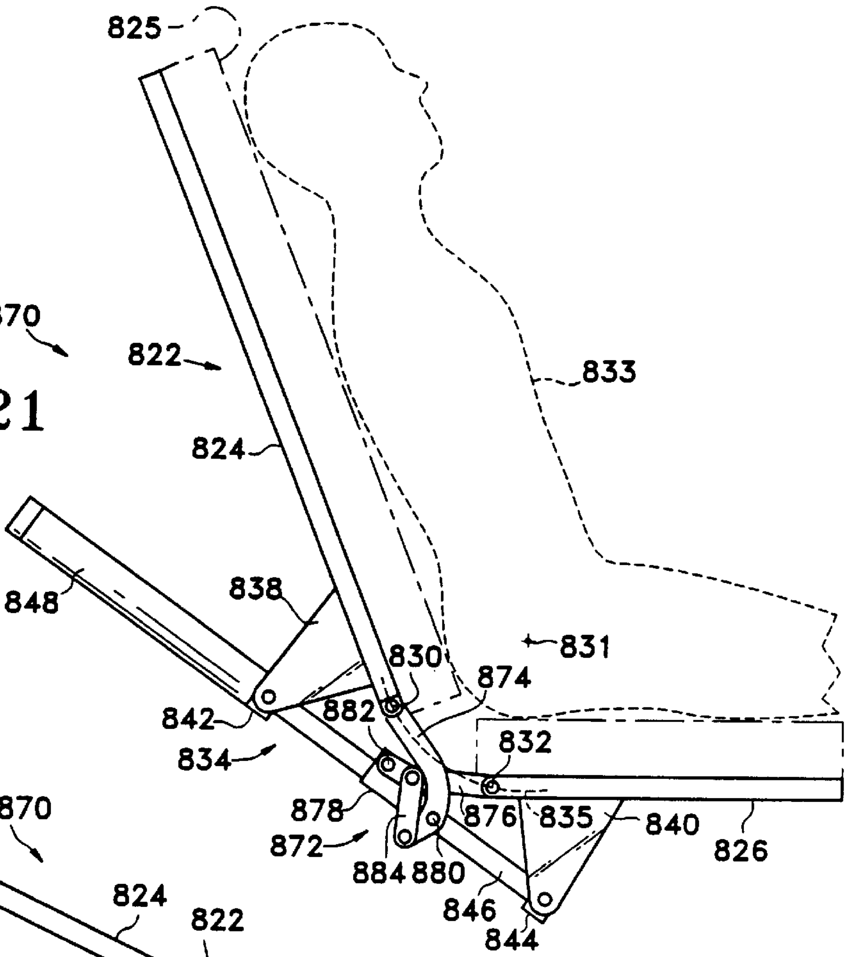
FIGS. 119, 120 and 121 are side views of the bed of FIG. 117 showing two panels in different angular orientations.
Figure 120:
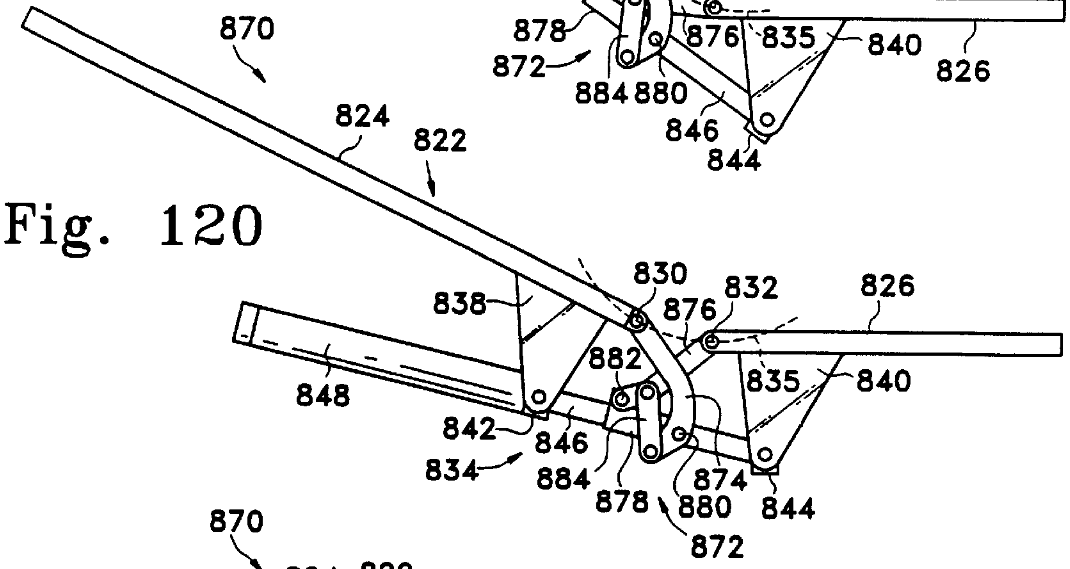
Figure 119:
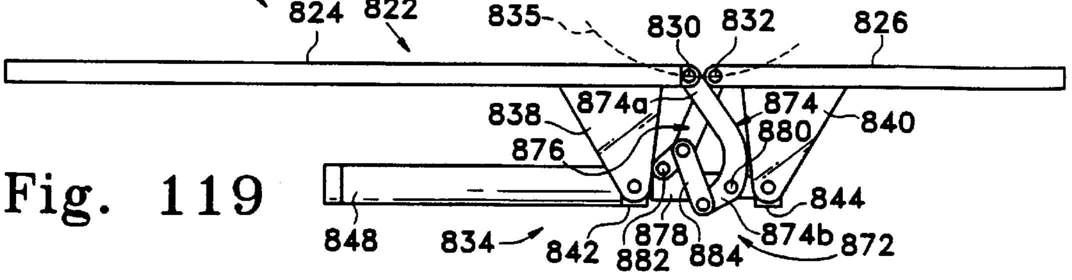
Figure 122:
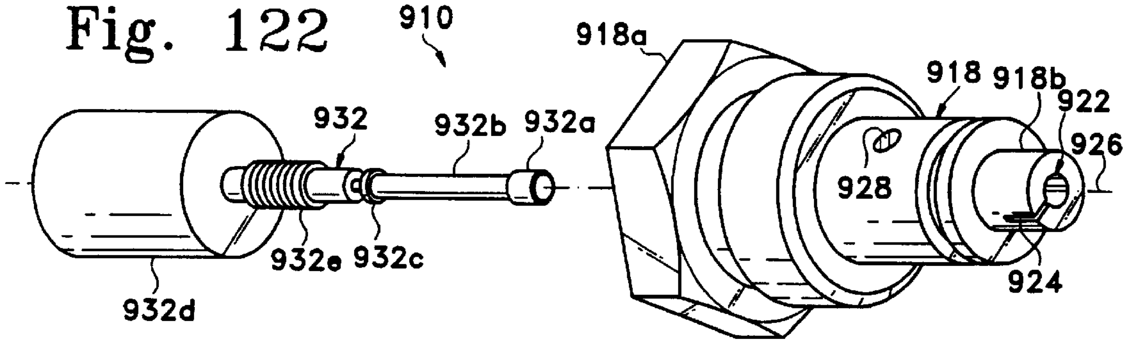
FIG. 122 is an exploded isometric view of a hydraulic valve made according to the invention.
Figure 123:
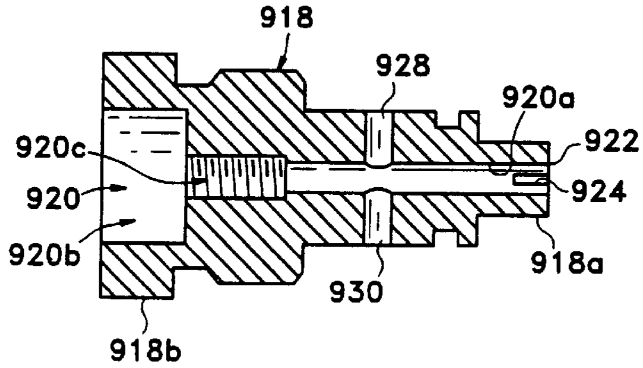
FIG. 123 is a longitudinal cross section of the housing of the valve of FIG. 122.
Figure 129:
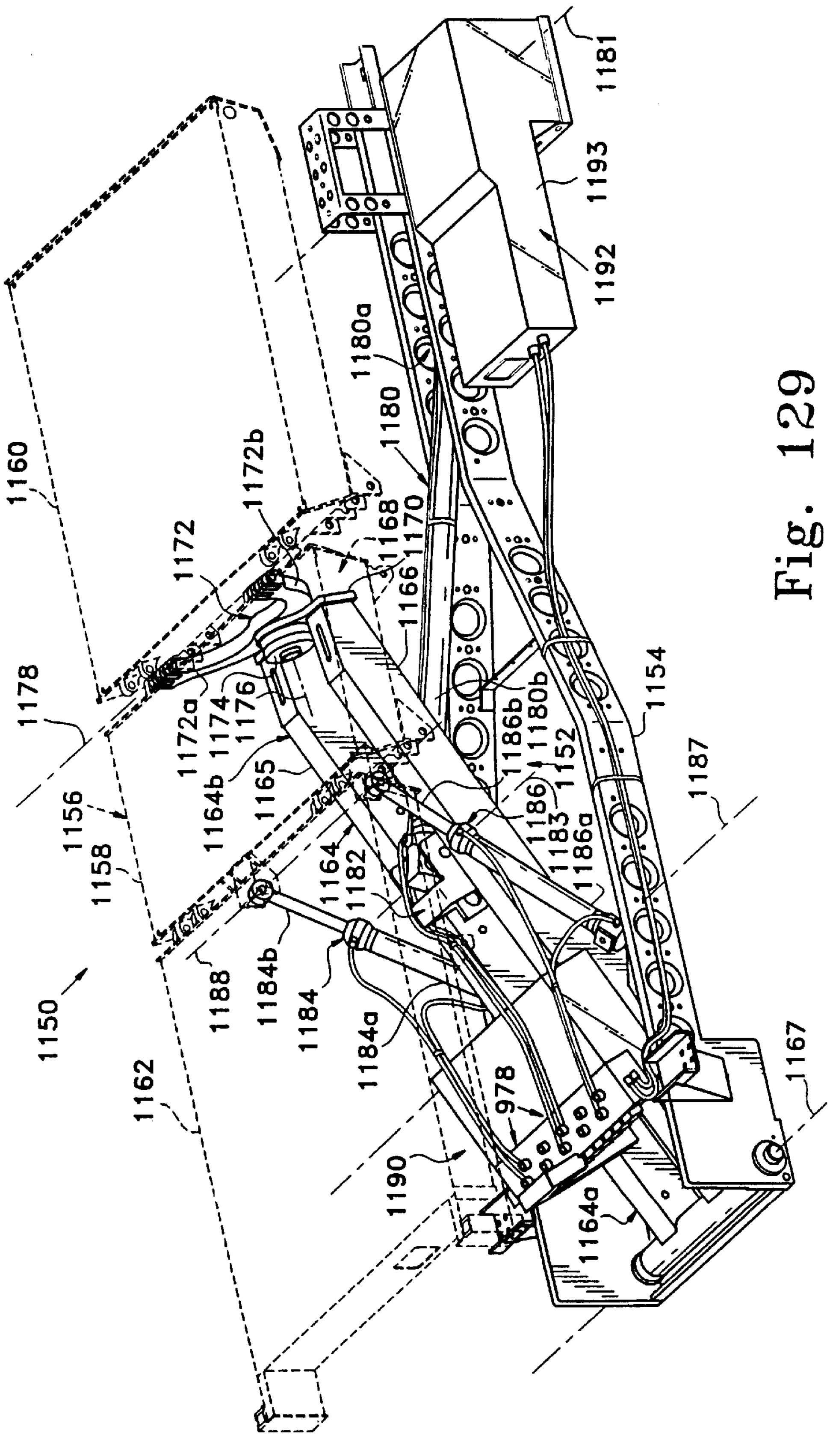
FIG. 129 is a simplified perspective view of an articulating platform support system made according to the invention.

The operation of bed 870 is similar to the operation of bed 820, as is shown by FIGS. 117–221. FIGS. 117 and 118 show in isometric view and FIGS. 119–221 show in side view different operative positions of panel 824 relative to panel 826. FIG. 129 shows the platform in a reclining position, FIG. 120 shows the back panel in a slightly inclined position, and FIG. 121 shows the back panel in a nearly upright, sitting position. The function of bed 870 is very similar to the function of bed 820.

It will be noted that arm 874 has a general arched form extending away from coupling arm 884. The arch provides additional clearance allowing the panels to be placed at a more transverse angle, as shown in FIG. 121. Link arm 876 has a bend at the point of connection of the coupling arm. This structure of joint 872, including the dimensional lengths of and connections between the respective linkages, is selected so that both panels move substantially equivalently as the relative angles between the panels is changed. By varying the relative dimensions of these elements, other relative changes are possible.

11. Hydraulic Valve

Figure 124:
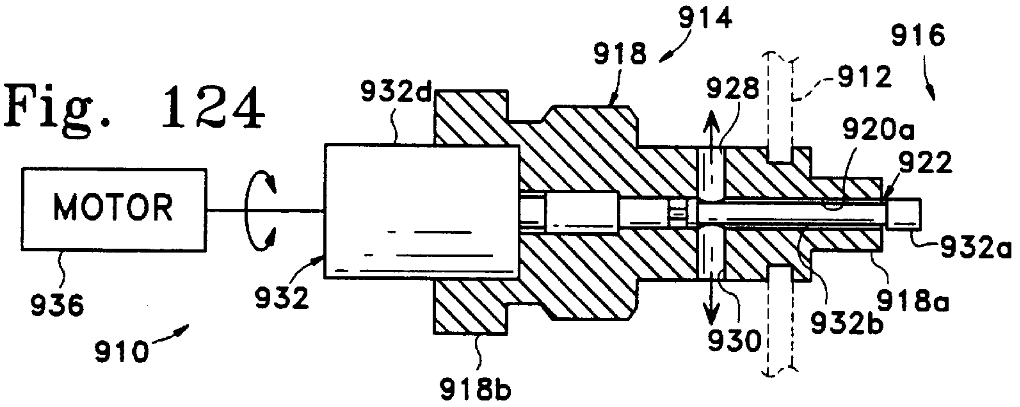
FIG. 124 is a simplified illustration in partial cross section showing the valve of FIG. 122 with the plunger in an open position.
Figure 125:
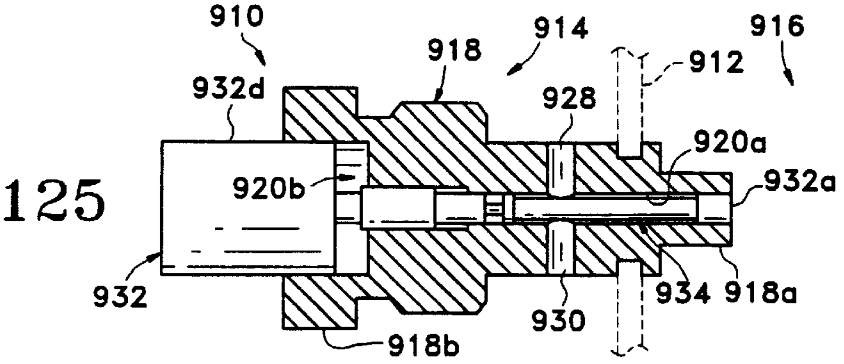
FIG. 125 is a view similar to FIG. 124 showing the plunger in a closed position.

FIGS. 122–125 illustrate a hydraulic valve 910 made according to another aspect of the invention. FIG. 124 in particular illustrates simplistically valve 910 relative to a partition 912 that divides a first fluid chamber 914 from a second fluid chamber 916. Valve 910 controls the flow of fluid between these two chambers. The form and structure of the chambers and partitions is according to the requirements of each particular application.

Salve 910 includes a housing 928 defining a longitudinal bore 920 including a channel 920*a* in an end 918*a* extending into chamber 916 and through which fluid flows. Bore 920 terminates with an enlarged cylindrical chamber 920*b* in an end 918*b* opposite from end 918*a*. Next to chamber 920*b* is a threaded intermediate chamber 920*c*. Channel 920*a* terminates at a port 922 at the tip of housing end 918*a*. An opening or slit 924 extends through the side of housing end 918*a* parallel with a channel longitudinal axis 926. Slit 924 has a uniform width along its length axially. Two opposing outlet ports 928 and 930 extend radially in housing 918, are spaced from slit 924, and provide fluid communication between chamber 914 and channel 920*a*.

Valve 910 also includes a plunger 932 sized to be received in bore 920. It includes a gate end 932*a* that moves slidingly and seelingly in channel 920*a*. A shaft 932*b* adjacent to gate end 932*a* has a reduced diameter, thereby forming a fluid passageway 934 between the walls forming channel 920*a* and shaft 934*b*. A section 932*c* also slidingly and sealingly moves through channel 920*a* and defines the end of passageway 934 An enlarged cylinder end 932*d* is received in chamber 920*b*. An intermediate threaded cylinder portion 932*e* is threadedly received within chamber 920*c*.

Figure 126A:
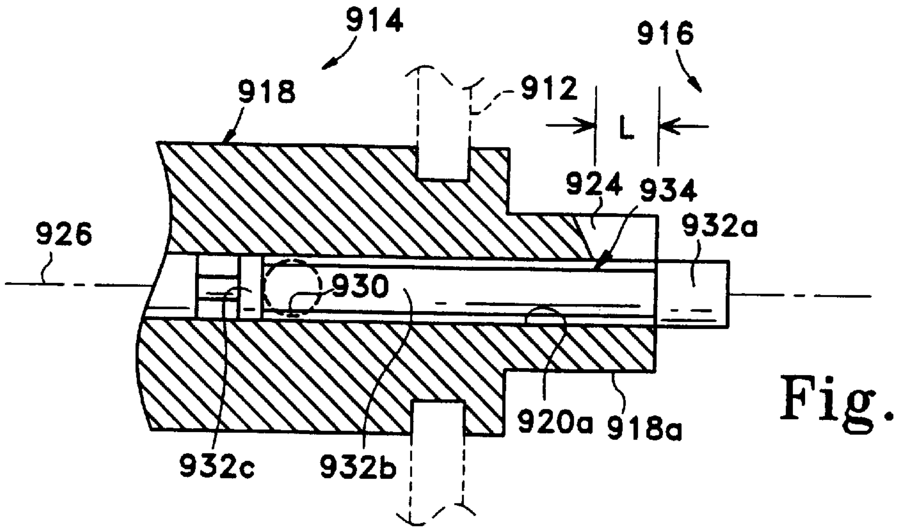
FIGS. 126A–126C are enlarged partial cross sections of a portion of the housing and plunger illustrating three operative positions.
Figure 126B:
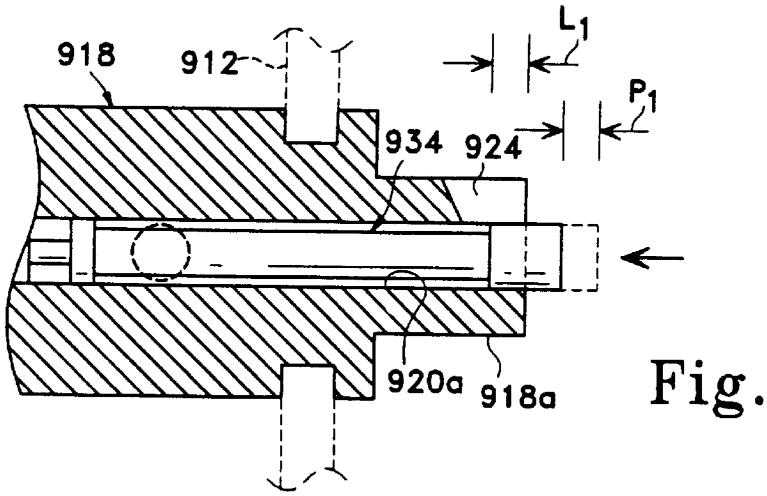
Figure 126C:
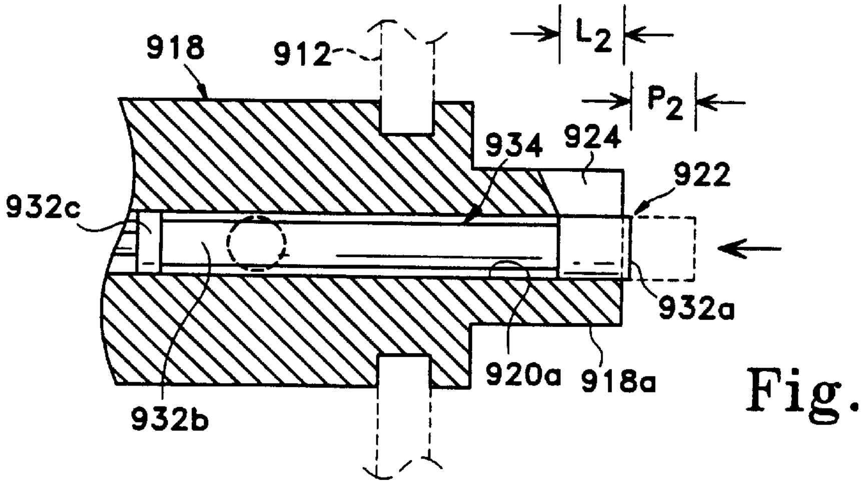

Rotation of plunger 932 relative to housing 918 is provided by a motor 936, such as a stepper motor that provides precise control of plunger rotation. The plunger thus advances along axis 926 a known amount for each rotation. As is seen in FIGS. 126A–126C in particulars this changes the axial position of plunger gate end 932*a* an incremental amount, thereby opening or closing slit 924 by the same amount. The size of the slit that is unrestricted by gate end 932*a* thus varies linearly with movement of the plunger along axis 926.

FIG. 124 shows plunger 932 in its fully extended position. The plunger extends sufficiently through end port 922 to open the port slightly. This position is used when it is desired to allow a relatively large flow of fluid.

FIG. 126A shows an enlarged view of the portion of valve 910 associated with channel 920*a*, similar to FIG. 124 except that gate end 932*a* is just even with the distal end of housing 918, thereby closing port 922 and leaving slit 924 open with a length L. As the plunger is withdrawn or moved to the left as viewed in these drawings, slit 924 is closed a predetermined amount for each rotation of the plunger in threaded chamber 920*b*.

FIG 126B shows gate end 932*a* in an intermediate position, having moved a distance $P_1$ equal to a length $L_1$ that slit 924 is closed. When the plunger is withdrawn a distance $P_2$, the slit is closed by a length $L_2$ equal to L and equal to $P_2$, as shown in FIG. 126C. The reverse procedure opens the slit to increase fluid flow linearly with the axial displacement of the plunger along axis 926.

Figure 127:
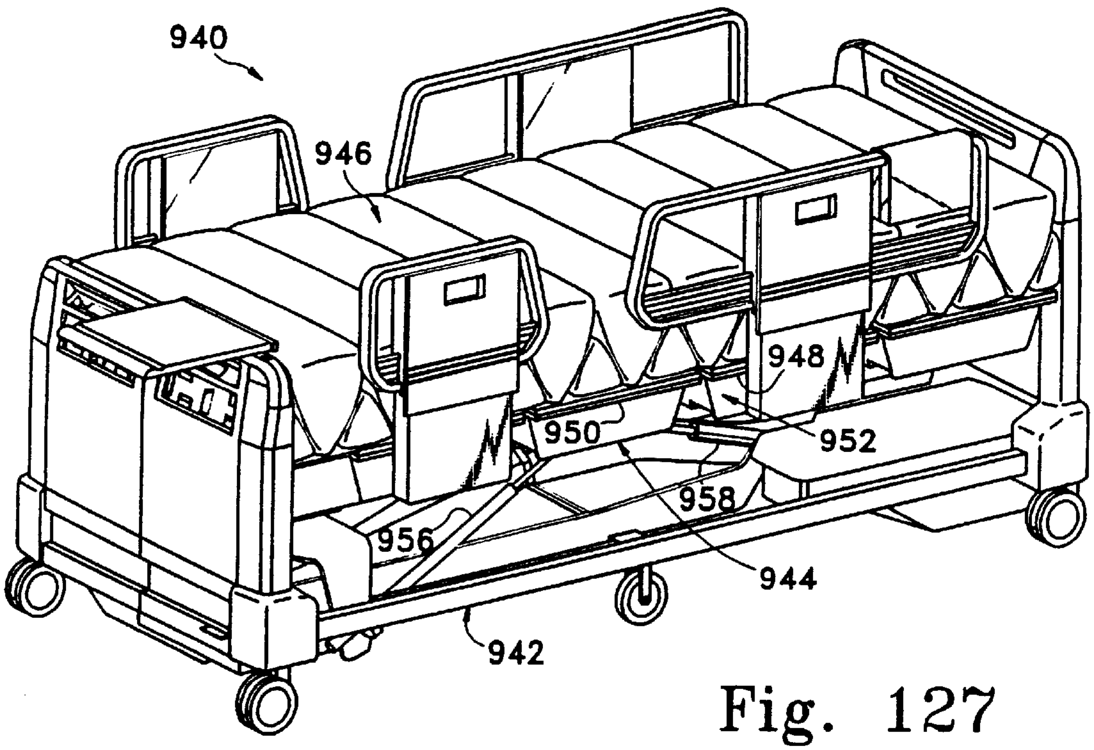
FIG. 127 is a perspective view of a hospital bed made according to the invention.

FIG. 127 is a perspective view of a hospital bed 940, similar to bed 100 shown in FIG. 1, having a hydraulic system with a valve 910. Bed 940 includes a base frame 942 supported on a floor. A platform 944 on which is positioned a mattress 946 supports a person. Platform 944 is divided into a plurality of panels, such as panels 948 and 950. These panels as well as the platform generally, are also referred to as support surfaces. The panels are hinged, such as at hinge joint 952, with the pivoting of the panels about the hinge joints controlled by respective hydraulic circuits, such as circuit 954 shown in FIG. 128. The bed also contains hydraulic circuits like circuit 954 for controlling movement of the platform generally. For instance, hydraulic cylinders 956 and 958 shown in FIG. 127 are used to control the side-to-side tilt of the platform.

Figure 128:
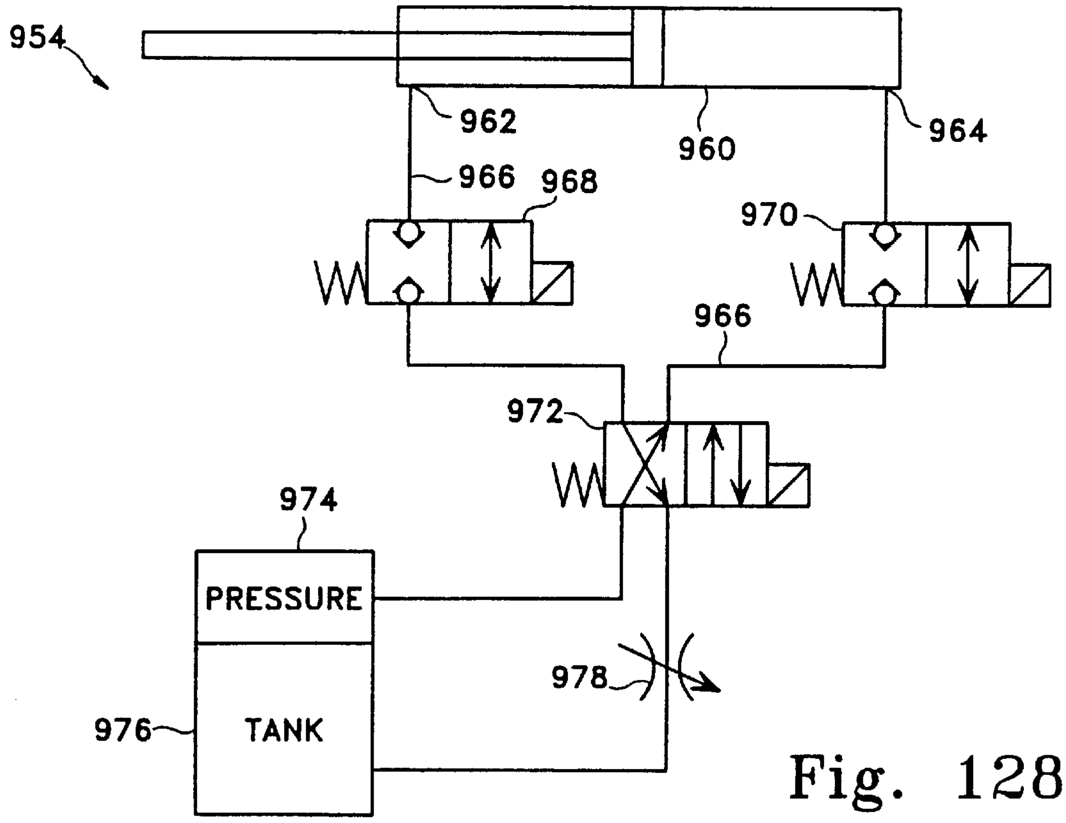
FIG. 128 is a schematic of a hydraulic circuit representative of circuits used in the bed of FIG. 127.

Referring specifically to FIG. 128, hydraulic circuit 954 includes a hydraulic cylinder 960 having fluid ports 962 and 964. A hydraulic line 966 connects ports 962 and 964 to respective check valves 968 and 970. Line 966 connects the two check valves to a directional valve 972 that selectively connects a pressure source 974 and an unpressurized fluid reservoir tank 976 to check valves 968 and 970. A regulating valve 978 is positioned in line 966 between directional valve 972 and tank 976. Valve 978 is thus usable for controlling fluid flow from cylinder 960 regardless of whether the cylinder is being extended or retracted, as determined by the position of directional valve 972. Since the check valves are either open or closed, they do not provide for variation in the fluid flow rate through them. In this configuration, only one regulating valve is required to control operation of the cylinder in either direction.

Valve 978 is preferably the same as valve 910 described with reference to FIGS. 122–126. In such use chamber 914 corresponds to the line coupled to the directional valve and chamber 916 corresponds to the line coupled to the tank. In this configuration the exposed face of enlarged gate end 932*a* has low pressure fluid applied to it. It will also be noted that the pressure of fluid in passageway 934 is applied to the opposing faces of the inside of end 932*a* and seal 932*c*. The valve is thereby pressure-balanced. As a result, a smaller torque (less energy) is required to turn plunger 932, permitting a more light-weight, less-expensive drive motor 936. A bed control system can then control the speed of movement of all of the parts of a bed platform by coordinating the positions of the respective plungers in each of the regulating valves.

This configuration has a further advantage of providing a backup for the in-line check valve. If the check valve fails, the regulating valve can be closed to hold the position of the associated support member. Additionally, when enlarged end 932*a* is extended out of end port 922 fluid passes through the port allowing the valve to be flushed with fluid. This allows any particles in the fluid to flow through the valve, thereby reducing the likelihood of clogging. Further, the valve can be made in a sufficiently small size to mount unobtrusively under the bed platform. This design is then compact and lightweight, and allows use of a smaller cylinder than would otherwise be required.

12. Platform Support

Figure 130:
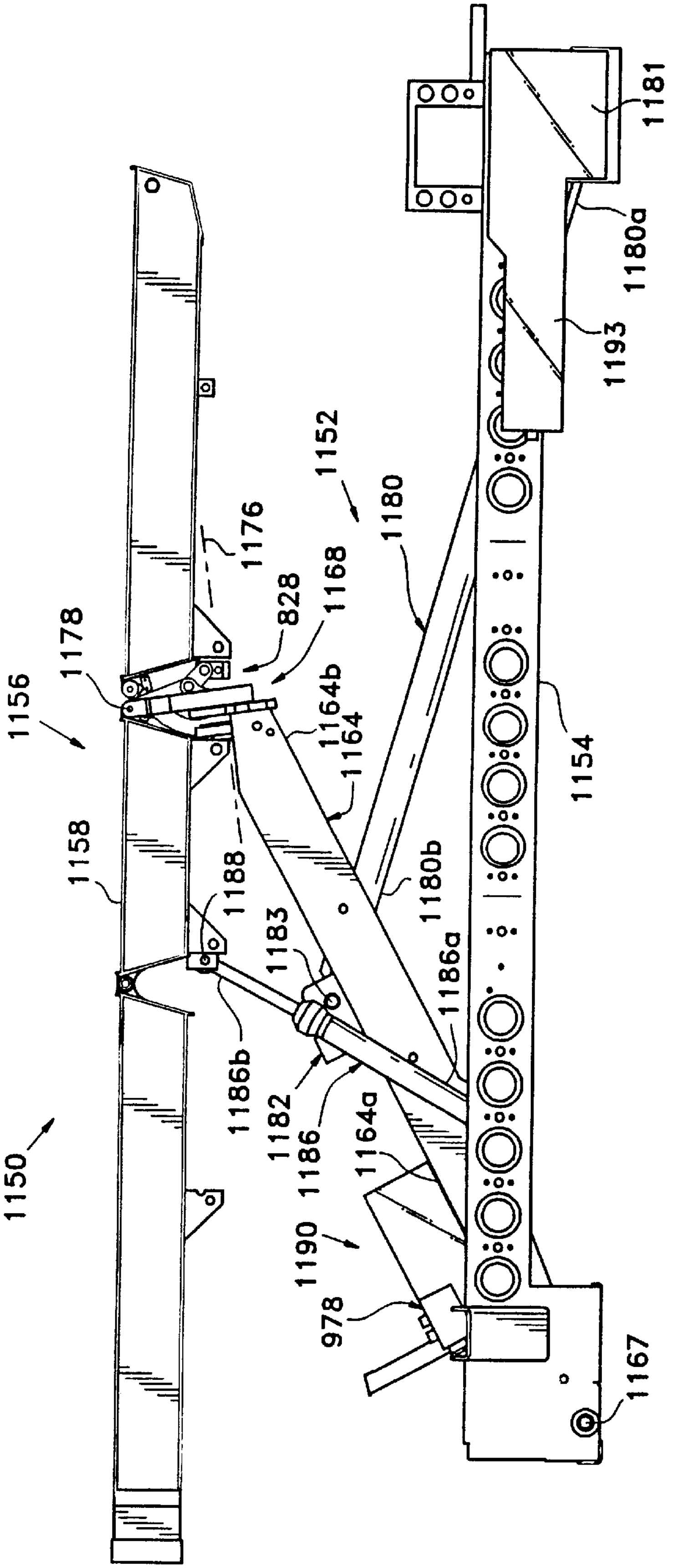
FIG. 130 is a side view of the system of FIG. 129 showing the platform in a raised position.
Figure 131:
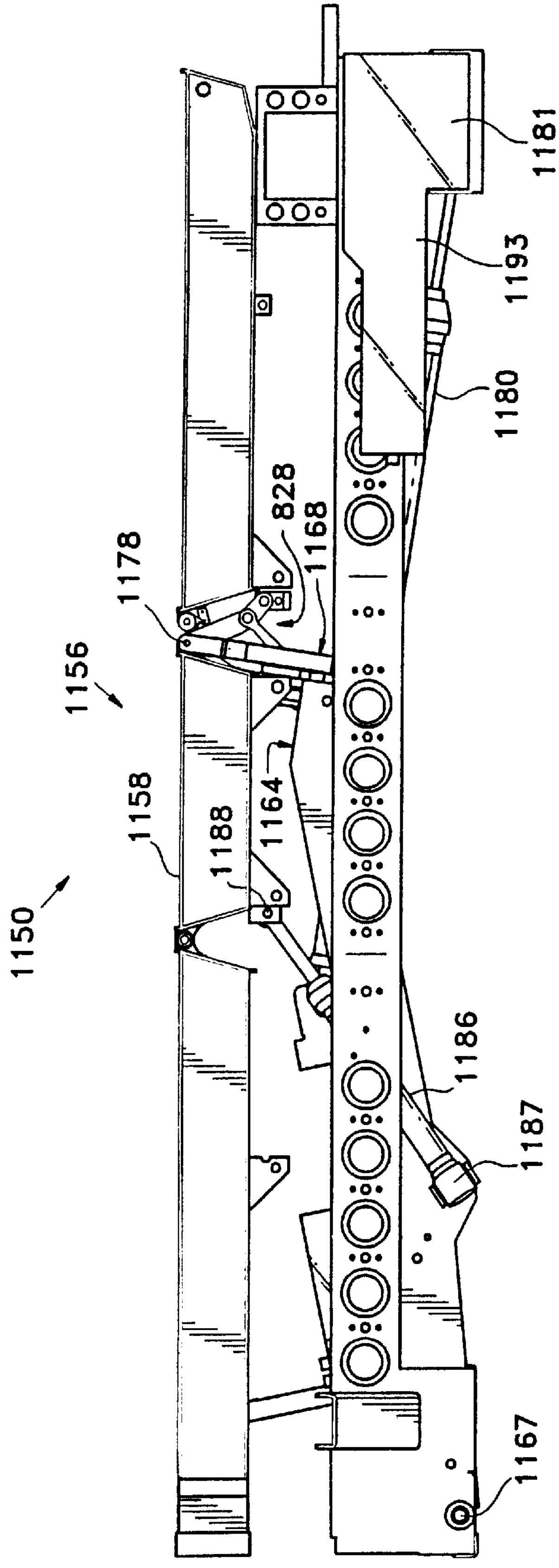
FIG. 131 is a view similar to FIG. 130 showing the platform in a lowered position.
Figure 132:
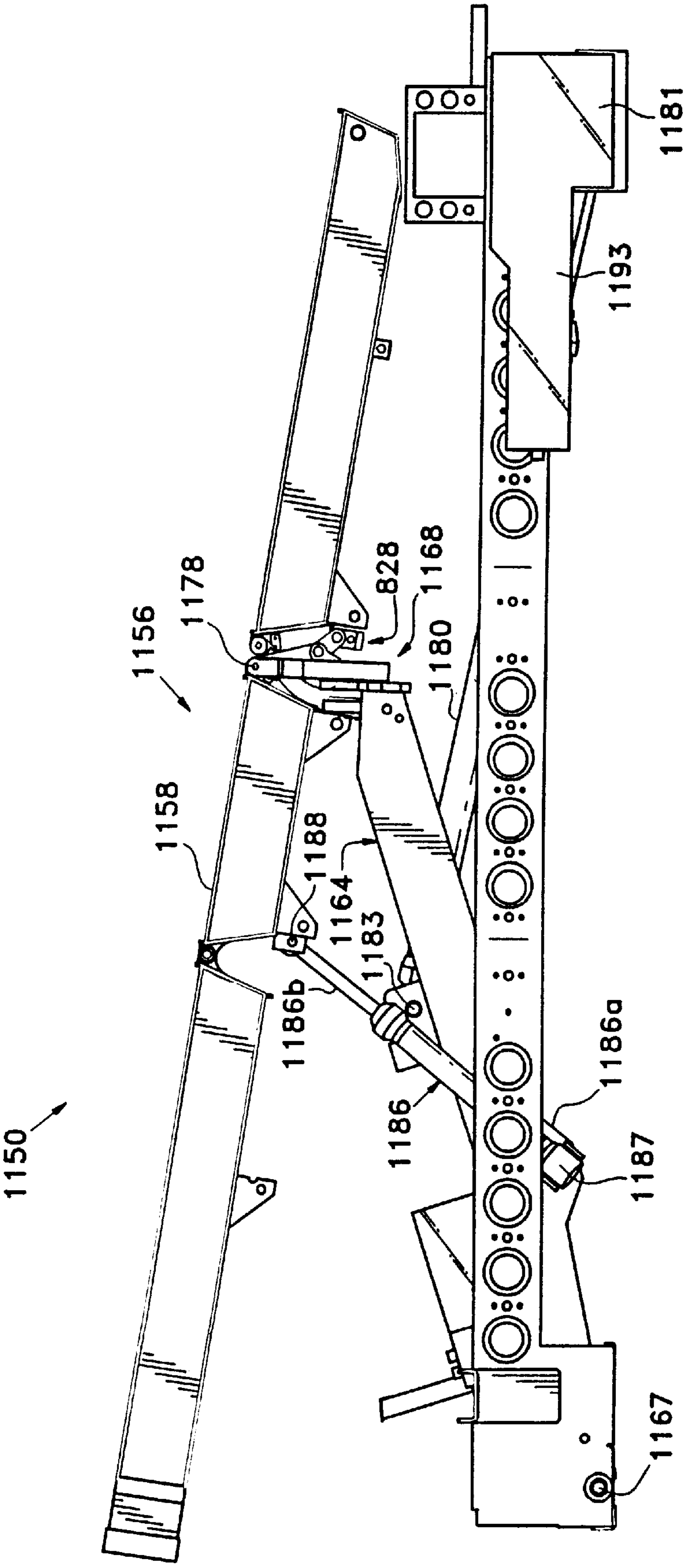
FIG. 132 is a view similar to FIG. 130 showing the platform in a Trendelenburg position achieved by reducing only the length of the main cylinder ram.

Referring now to FIGS. 129–132, a bed 1150 made according to another aspect of the invention has an improved three-axis support system 1152. This support system is mounted on a base frame 1154 for supporting a platform 1156. This base frame is substantially the same as weigh frame 132 shown in FIG. 85. Platform 1156 includes a central seat panel 1158 and head and foot panels 1160 and 1162, respectively. Panels 1158 and 1160 are coupled together by an expanding platform joint, such as joint 828 as described with reference to FIGS. 115–116 or joint 872 described with reference to FIGS. 117–121. This joint, referred to as joint 828 for consistency, is not shown in FIG. 129 for simplicity of illustration, but is shown in FIGS. 130–132.

Support system 1152 includes a fixed-length swing arm 1164 formed of parallel members 1165 and 1166. Arm 1164 is pivotally mounted at a lower end 1164*a* to the foot end of base frame 1154 for pivoting about an axis 1167. The upper end 1164*b* is attached to a universal joint 1168, also referred to as means for allowing pivoting of the swing arm relative to the platform. Joint 1168 includes a base plate 1170 connecting the upper ends of members 1165 and 1166. An upwardly opening yoke 1172 is pivotingly coupled to base plate 1170 and pivot disk 1174, as shown for lateral pivoting of the platform about an axis 1176. Upwardly extending arms 1172*a* and 1172*b* are pivotably connected to the upper edge of panel 1158 for pivoting about lateral axis 1178. Joint 1168 thus provides pivoting about transverse axes 1176 and 1178, which together function as a universal joint to provide pivoting about other axes passing through the joint, as is also described and illustrated in FIG. 5 of U.S. Pat. No. 5,023, 967.

A main cylinder ram 1180 is pivotably connected at a lower end 1180*a* to base frame 1154 at the head of the bed for pivoting about an axis 1181. The upper end 1180*b* is pivotably connected between swing arm members 1165 and 1166 via a mounting assembly 1182 attached to the two members, for pivoting about an axis 1183. Mounting assembly 1182 is positioned well below the upper end of the swing arm, and preferably is between one-fourth and one-half the way down from the upper end.

A pair of hydraulically driven side arms 1184 and 1186 are mounted between the platform and the swing arm. More particularly, the side arms have lower ends 1184*a* and 1186*a* pivotably attached to the outer face of members 1165 and 1166, respectively, for pivoting about a common axis 1187. Upper ends 1184*b* and 1186*b* are pivotably attached to the foot-end edge of panel 1158 for pivoting about an axis 1188. The lower ends of the side arm, similar to the ram connection, are preferably mounted to the swing arm members between one-fourth and one-half the length of the swing arm up from the lower end of the swing arm. As will be seen with reference to FIGS. 130–132, this provides a significant amount of movement of the side arms with the swing arm, yet still provides sufficient separation from joint 1168 to provide a stable base for supporting platform 1156. It is also preferable to mount the side arms lower on the swing arm than the point of attachment of the upper end of the ram in order to provide an increased range of movement through use of the side arms, and to provide a broader overall base of support for the platform.

The hydraulic cylinders in ram 1180 and side arms 1184 and 1186 are part of a hydraulic system 1190 having circuits similar to circuit 954 described previously with reference to FIGS. 127 and 128. System 1190, controlled by a controller 1192 contained in a housing 1193, generally includes the elements of a conventional hydraulic system as described in the noted figures. In particular, system 1190 preferably includes a linear valve 978 for each circuit, as described previously with reference to circuit 954 shown in FIG. 128. These valves are driven by suitable stepper motors, not specifically shown.

FIG. 130 shows bed 1150 with platform 1156 supported in a level and partially raised position. With a relatively small amount of shortening of the length of ram 1180, less than ten percent of its length in FIG. 130, the platform is lowered to about one-fourth the distance from base frame 1154, as shown in FIG. 131. If the ram was attached to joint 1168, it would have been necessary to shorten the length of the ram by about twenty percent. It can thus be seen that by mounting the upper end of the ram down about one third of the way from the upper end of the swing arm, approximately twice the movement of the upper end of the swing arm, and therefore the platform is achieved. However, the ram must be made more robust in order to take the increased forces resulting from the corresponding reduced angle between the swing arm and the ram.

It will also be observed that it was only necessary to shorten the length of the side arms slightly in order to maintain the platform in a level orientation during movement to the lowered position. FIG. 132 shows the orientation of the platform if the lengths of the side arms are held constant and the ram is shortened. The head of the platform angles down about ten degrees. if the lower ends of the side arms were mounted on the frame, they would not lower with the swing arm, and less lowering of the bed would have been possible. Thus, a greater range of movement of the ram is available than would be possible if the swing arms were mounted on the frame or at the bottom of the swing arm.

It will also be noted that the side arms and the universal joint are connected to opposite edges of seat panel 1158. The orientation of the platform is controlled by simply adjusting the orientation of the single seat panel. The orientation of the head and foot panels is provided by separate, independently controlled hydraulic arms, omitted from the drawing for simplicity of illustration. The seat panel is therefore controlled much more simply.

13. Multifunction Control System

Figure 133:
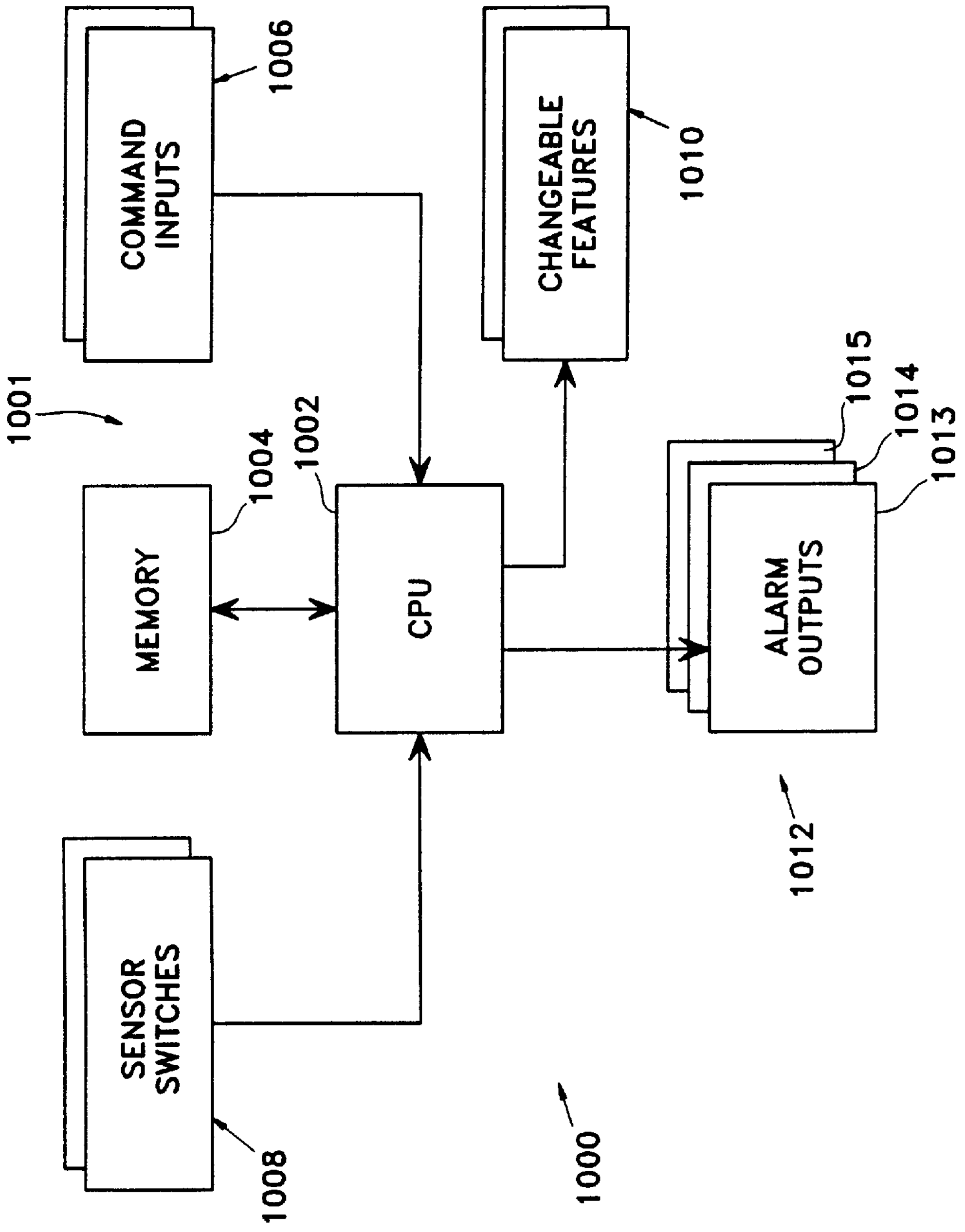
FIG. 133 is a generalized block diagram illustrating the processor-controlled feature-interlock system according to the invention.

The present invention also provides for coordination between the changing of various features on a bed in order to assure proper patient treatment and safety. FIG. 133 illustrates a processor-controlled feature-interlock system 1000 providing this coordination. System 1000 is driven by a controller 1001 including a conventional microprocessor or CPU 1002 accessing ROM and RAM memories shown generally at 1004. Commands for controlling processor-controlled features of the bed are input by various input devices shown generally at 1006. These typically include a patient or bed-side control unit, such as controllers 201 and 202, shown in FIG. 93 specifically and in FIG. 1 generally, or such as built-in control unit 180 in the foot board panel shown in FIG. 1 and which includes a character display, not specifically identified.

Various sensor switches, shown generally at 1008, are used to determine whether various features are in respective first states. As was discussed with reference to FIG. 80, an example of such a sensor is a magnetic-field sensitive reed switch for determining whether a traction pole is in a fully recessed, storage position, i.e., a first state, or is not in this position, such as when it is raised for use as a traction anchor. In the preferred embodiment of the bed, when the traction pole is deployed, various mattress or platform movements are not allowed, such as side tilt, lateral rotation, and stand-up. These latter movements are considered changeable features of the bed, and are shown generally at 1010.

If the change in the selected feature is not allowed it is preferable that suitable alarms, shown generally at 1012 be provided to notify the user. These may include an audio or tone alarm 1013, a simple visual alarm 1014, such as a warning light, or a verbal display 1014, which typically includes LEDs or LCDs to form a phrase of alphanumeric characters describing the alarm condition. This latter display is preferably in the foot board display 180 accessible to nurses and other attendants.

System 1000 also includes conventional sensor switches 1008 used to determine the state of the retractable steering wheels, side guardrails, standup stabilizers (not shown), foot board equipment table and, as has been mentioned, the foot board traction poles. The following table lists various selectable actions that can be taken with regard to the bed, and an associated list of conditions required in order for the action to be taken, or used to determine whether or how the action is to be taken.

TABLE

| | DESIRED ACTION | REQUIRED CONDITION(S) |
|---|---|---|
| A. | Elevation and Articulation change | If Foot-end Traction Pole is Up, (Proceed at Slower Linear and Angular Rates). |
| B. | Change Pitch | Steering Wheels are Retracted.<br>Side Rails are Up.<br>Foot-end Traction Pole is Down. |
| C. | Change Roll (side tilt) | Down-hill Side Rails are Up.<br>Footboard Equipment Table is Stored.<br>Foot-end Traction Support Poles are Down. |
| D. | Put Mattress Platform in Standup Position | Steering Wheels are Retracted.<br>Side Rails are Up.<br>Standup Stabilizers are installed.<br>Foot-end Traction Poles are Down. |
| E. | Standup Preparation | Standup Stabilizers are installed.<br>Foot-end Traction Poles are Down. |
| F. | Foot Up/Down | Footboard Equipment Table is Stored. |
| G. | Knee Up/Down | Footboard Equipment Table is Stored. |
| H. | Head Up/Down | Footboard Equipment Table is Stored. |
| I. | Trendelenburg Position | Footboard Equipment Table is Stored.<br>(OK with confirmation) |
| J. | Deploy Foot-end Traction Support Pole | Mattress Air Flow On. |

It is seen that system 1000 provides variations in a general method of controlling the bed. Basically, when a command is entered to produce a desired action, a determination is made as to whether there is an associated condition that must be satisfied. If there is, the associated sensor is used to determine the state of the conditioning feature. If the condition is satisfied the action is taken. If not the action is not taken.

Figure 134A:
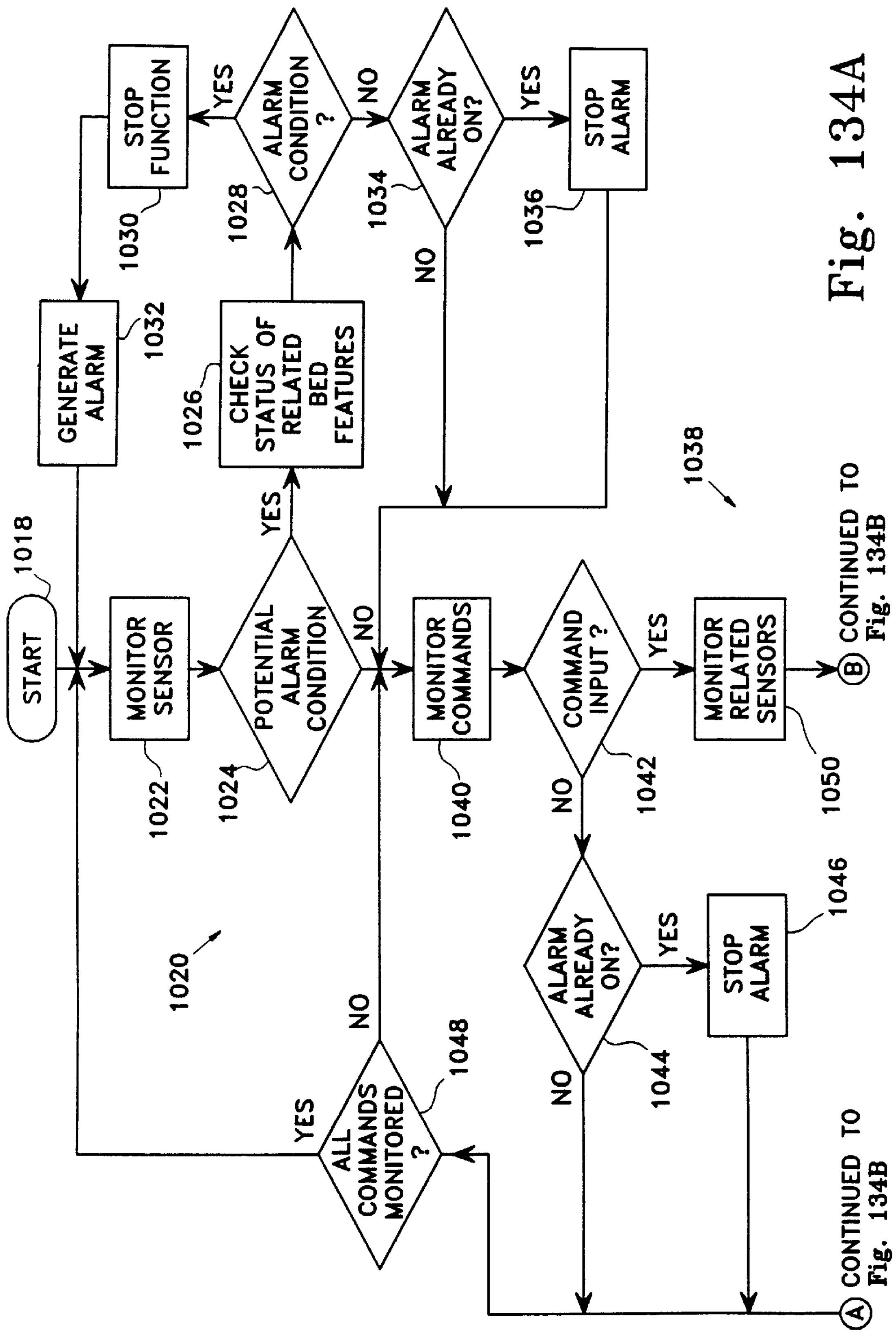
FIGS. 134A and 134B comprise a flow chart illustrating various steps for operating the interlock system of FIG. 133.
Figure 134B:
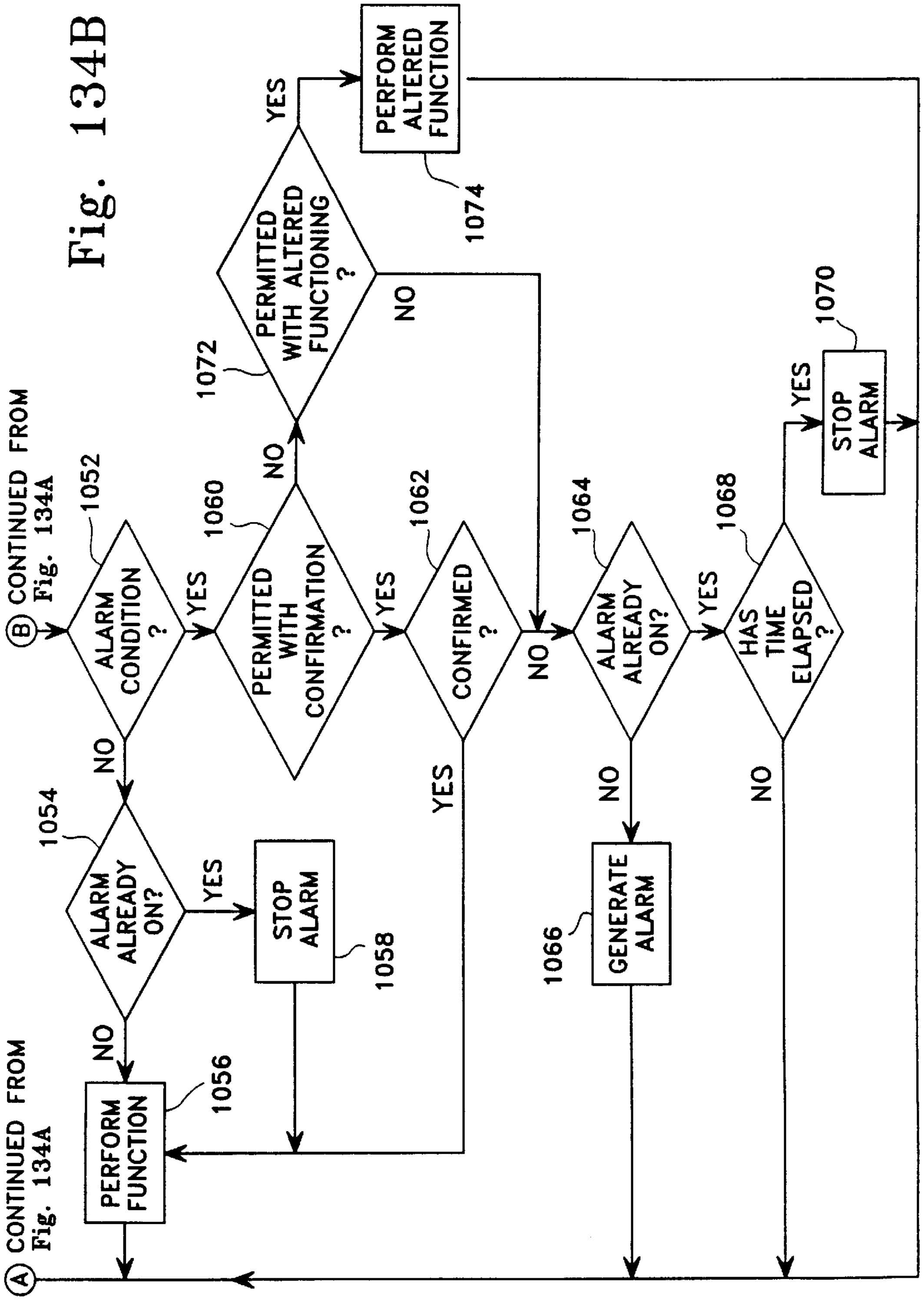

If not taken, then either an alarm is generated and no action is taken, the action is taken in a modified form, or the action is taken if the user confirms that it is desired to take the action in spite of the coexisting recondition. These steps are more specifically detailed in the accompanying flow chart shown in FIGS. 134A and 134B.

The system is started and initialized at a start step 1018. Initially, a clearing procedure 1020 determines whether a required condition of an action has changed after the action has taken place. This prevents the defeat of the interlock system by changing the state of a required condition to a forbidden state after performing the desired action. In this procedure, the various state sensor switches are monitored, as is represented by step 1022. For purposes of simplicity the various well known steps of sequencing through a series of elements until the routine has been applied to all them is not illustrated. It will be understood that such common steps are followed even though not specifically identified in this flow chart.

For each sensor output, a determination is made at step 1024 as to whether the associated feature is in a potential alarm condition. That is, if the feature must be in a first state in order to allow the change of a second feature and the first feature is not in the first state, then a potential alarm condition exists. If it does, then a check must be made of the status of the associated second feature at step 1026.

If the second feature is in changed state that would not be allowed If the first feature is not in the first state, as determined in step 1028, then an alarm condition exists. An existing function, such as a change in the pitch of the mattress, is then stopped at step 1030 and an alarm generated at step 1032. The alarm continues and the function remains terminated until the offending condition no longer exists.

This is determined at step 1034 where, if no alarm condition exists, a determination is made as to whether an alarm is already on. If so, it is terminated at step 1036. If not, and after any alarm is terminated, the procedure moves to the main interlock procedure 1038 which is activated when change commands are entered into the system.

The first step, step 1040, in the interlock procedure is to monitor the input of commands by a user to change a feature of the bed. As shown in the above table, the available commands include change in elevation change in pitch or roll of the mattress, change in the foot, knee and head sections of the mattress, move to a standup or trendelenburg position, as well as others.

If no command is being input as identified by step 1042, then a determination is made at step 1044 as to whether an associated alarm is on. If it is, it is terminated at step 1046. Then, if all command inputs have been scanned, as determined at step 1048, the procedure returns to step 1022 to begin the process over again. Each command input preferably is scanned every 120 milliseconds. If all of the command inputs have not been scanned, then processing returns to step 1040.

If it is determined in step 1042 that a command is being input, then a look-up table is used to determine what, if any associated feature conditions need to be checked. The sensor inputs for these features are monitored at step 1050 and a determination is made at step 1052 as to whether any of them are not allowed. Again, if there is no alarm condition, and an alarm is not on for the condition, as determined at step 1054, then the feature is changed according to the command at step 1056. If an alarm exists then it is stopped at step 1058 and then the feature is changed. Processing then goes to step 1048 to see if additional command inputs are to be scanned, as described previously.

If an alarm condition exists as determined in step 1052, then a determination is made in step 1060 as to whether this is a situation in which the requested feature change is allowed if the user confirms that the change should be made in spite of the offending condition. If it is permitted with confirmation, then the input is checked to see if a confirmation is entered during step 1062. If confirmation is input, such as by reentering the command, or inputting the command continuously for a period of time, such as 5 seconds, then the feature is changed according to the command, as provided in step 1056. An example of this situation is where the equipment table on the footboard is deployed over the bed and a command is entered to position the mattress in a Trendelenburg position. In such a case, there is a continuing need for use of the equipment table, so movement is allowed after confirmation that the attendant is aware of the existence of the table while the mattress position is being changed.

If an alarm condition still exists after steps 1060 and 1072, then an alarm is generated if the alarm does not already exist. This may also result when a compound condition exists, such as where a traction lockout exists. Then, a change that might be allowed with confirmation is not allowed at all. This procedure is thus effective where more than one condition must be satisfied, as is shown in the table.

Otherwise, a determination is made as to whether an alarm already exists, as provided in step 1064. If not, a timed alarm is generated at step 1066 and processing returns to step 1048 to scan any other command inputs. If it is determined in step 1064 that an alarm already exists, then in step 1068 a determination is made as to whether the alarm has existed long enough, preferably for a total time of 30 seconds. If the time has not elapsed, processing returns to step 1048 directly. If the time period for the alarm has elapsed, the alarm is terminated as step 1070 before returning to step 1048.

Returning to step 1060, if the offending condition is not allowed, even with confirmation, then a determination is made at step 1072 as to whether the feature can be changed in a way altered from the intended or usual way of making the change. If not, the procedure advances to step 1064 to provide an alarm. If so, then the feature is changed in the altered manner at step 1074, and processing then continues at step 1048. As shown in the above table, an example of this is where the traction pole is up. It is assumed that the patient is being put in traction, and therefore the changes in bed positioning is provided at slower linear and angular rates than would normally be the case.

The above procedures provide for coordinated changes in the features, which typically are functions for moving the mattress or changing the inflation of the mattress. Where certain conditions require that no changes be made at all, such as when the patient is in traction, then these procedures accommodate that. Also, where certain conditions could result in an accident to equipment, the bed or the patient, then these procedures provide a way to prevent them from occurring. Further, various approaches are provided, depending on the nature of, significance of, or relationship between the respective features. This provides for flexibility in the way different offending conditions are handled. The result is a safer bed and more effective treatment of the patient.

It will be apparent to one skilled in the art that many variations in form and detail may be made in the preferred embodiments as illustrated and described above without varying from the spirit and scope of the invention that the claims define or are interpreted or modified according to the doctrine of equivalents. The preferred embodiments of the various features of the invention are thus provided for purposes of explanation and illustration, but not limitation.

We claim:

1. A bed comprising:

a first frame having a longitudinal length and a transverse width;

first, second, and third support assemblies supported by the first frame; and a second frame supported by the first, second, and third support assemblies, each support assembly having a load cell for sensing a portion of the weight supported by the first frame, the first support assembly being aligned transversely with the second support assembly and the third support assembly being offset longitudinally and transversely with respect to the first and second support assemblies.

2. The bed of claim 1, wherein a central longitudinal axis of the first frame substantially intersects the third support assembly, the first support assembly is spaced apart from the central longitudinal axis, and the second support assembly is spaced apart from the central longitudinal axis.

3. The bed of claim 1, wherein the first, second, and third support assemblies each include a block having a length axis and said load cell coupled to the block, the length axis of the blocks of the first and second support assemblies are substantially parallel with the central longitudinal axis of the first frame, and the length axis of the block of the third support assembly is substantially perpendicular to the central longitudinal axis of the first frame.

4. The bed of claim 1, wherein the first frame includes spaced-apart first and second side members, an end member extending between the first and second side members, a first plate appended to the first side member, a second plate appended to the second side member, and a third plate appended only to the end member, and wherein the first, second, and third support assemblies are supported by respective first, second, and third plates.

5. The bed of claim 4, wherein the second frame includes a first wing tab that overlies the first plate and the first load cell, a second wing tab that overlies the second plate and the second load cell, and a third wing tab that overlies the third plate and the third load cell, and wherein the third wing tab of the second frame is spaced substantially equidistantly from the first and second side members of the first frame.

6. The bed of claim 5, wherein the second frame further includes a first side member extending between the first and third wing tabs and a second side member extending between the second and third wing tabs.

7. The bed of claim 1, wherein the second frame includes a first wing tab supported by the first load cell, a second wing tab supported by the second load cell, a third wing tab supported by the third load cell, a first frame member extending between the first and third wing tabs, and a second frame member extending between the second and third wing tabs, the first and second frame members being configured such that the second frame has a wishbone shape.

8. The bed of claim 1, further comprising a mattress-carrying platform and supporting apparatus coupled to the mattress-carrying platform and coupled to the second frame, the supporting apparatus including first, second, and third actuators, the first actuator being transversely spaced apart from the second actuator and the third actuator being longitudinally aligned with the third load cell.

9. The bed of claim 8, wherein the first, second, and third actuators are hydraulic cylinders.

10. A bed comprising:

a first frame;

a plurality of support units supported by the first frame;

a second frame supported by the plurality of support units, each support unit having a load cell for sensing a portion of the weight supported by the first frame; and a circuit coupled to the plurality of support units, the circuit being responsive to the weight sensed by the plurality of load cells, the circuit including a processor configured to determine a ratio having a numerator defined by a formula in which the weight sensed by a first of the plurality of load cells is subtracted from the weight sensed by at least a second of the plurality of load cells and having a denominator corresponding to the sum of the weights sensed by the plurality of load cells.

11. The bed of claim 10, wherein the circuit includes a pre-exit alarm, the processor is configured to compare the ratio to a predetermined number, and the processor activates the pre-exit alarm if the ratio exceeds the predetermined number.

12. The bed of claim 11, further comprising a platform supported by the second frame and having a head end, a foot end, and spaced apart sides extending between the head and foot ends, and wherein the ratio exceeding the predetermined number represents a condition in which a person supported by the platform has migrated toward one of the sides of the platform.

13. The bed of claim 11, further comprising a platform supported by the second frame and having a head end, a foot end, and spaced apart sides extending between the head and foot ends, and wherein the ratio exceeding the predetermined number represents a condition in which a person supported by the platform has migrated toward the head end of the platform.

14. The bed of claim 11, further comprising a platform supported by the second frame and having ahead end, a foot end, and spaced apart sides extending between the head and foot ends, and wherein the ratio exceeding the predetermined number represents a condition where a person supported by the platform has migrated toward the foot end of the platform.

15. The bed of claim 10, wherein the circuit includes a pre-exit alarm and an exit alarm, the processor is configured to compare the ratio to a first predetermined number, the processor activates the pre-exit alarm if the ratio exceeds the first predetermined number, the processor is configured to calculate a second ratio, the processor is configured to compare the second ratio to a second predetermined number, the processor activates the exit alarm if the second ratio exceeds the second predetermined number.

16. The bed of claim 10, wherein the first frame has a longitudinal length and a transverse width, the plurality of load cells includes a first-end load cell and a pair of second-end load cells, the pair of second-end load cells are transversely aligned with respect to one another, and the first-end load cell is offset longitudinally and transversely from each of the pair of second-end load cells.

17. A bed comprising:

a first frame;

a plurality of support units supported by the first frame;

a second frame supported by the plurality of support units, each support unit having a load cell for sensing a portion of the weight supported by the first frame; and a circuit coupled to the plurality of support units to receive input signals therefrom, the circuit including an exit alarm and a pre-exit alarm, the circuit further including a processor that activates the exit alarm when the input signals correspond to a first condition and that activates the pre-exit alarm when the input signals correspond to a second condition.

18. The bed of claim 17, wherein the circuit further includes at least one of a display monitor, a hard drive, a floppy drive, and a calibration input device.

19. A weigh system for use on a bed including a first frame and a second frame, the weigh system consisting essentially of first, second, and third support units supported by the first frame and supporting the second frame, each support unit sensing a portion of the weight supported by the first frame and generating a respective input signal; and a circuit coupled to the first, second, and third support units to receive the input signals therefrom, the circuit being configured to determine the weight of a person supported by the bed.

20. The weigh system of claim 19, wherein the first frame of the bed has a longitudinal length and a transverse width, the first support unit is aligned transversely with the second support unit, and the third support unit is offset longitudinally and transversely with respect to the first and second support units.

21. The weigh system of claim 19, wherein the circuit includes a processor configured to determine a ratio having a numerator defined by a formula in which the weight sensed by one of the first, second, and third support units is subtracted from the weight sensed by a least another of the first, second, and third support units and having a denominator corresponding to the sum of the weights sensed by the first, second, and third support units.

22. The weigh system of claim 19, wherein the circuit includes an exit alarm and a pre-exit alarm, the pre-exit alarm is activated independently from the exit alarm, the circuit further includes a processor that activates the exit alarm when the input signals correspond to a first condition and that activates the pre-exit alarm when the input signals correspond to a second condition.

* * * * *

UNITED STATES PATENT AND TRADEMARK OFFICE

CERTIFICATE OF CORRECTION

PATENT NO. : 5,906,016

DATED : May 25, 1999

INVENTOR(S) : Robert J. Ferrand, et al.

It is certified that error appears in the above-identified patent and that said Letters Patent is hereby corrected as shown below:

Please change the Assignee from "Hill-Rom" to --Hill-Rom, Inc.--.

Signed and Sealed this

Twenty-fifth Day of January, 2000

*Attest:*

Q. Todd Dickinson

*Attesting Officer*

*Acting Commissioner of Patents and Trademarks*